(12) United States Patent
Hu et al.

(10) Patent No.: US 11,586,001 B2
(45) Date of Patent: Feb. 21, 2023

(54) OPTICAL SYSTEM

(71) Applicant: TDK TAIWAN CORP., Taoyuan (TW)

(72) Inventors: Chao-Chang Hu, Taoyuan (TW); Che-Wei Chang, Taoyuan (TW); Liang-Ting Ho, Taoyuan (TW); Sin-Jhong Song, Taoyuan (TW); Hsin-Yen Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/306,679

(22) Filed: May 3, 2021

(65) Prior Publication Data

US 2021/0255368 A1 Aug. 19, 2021

Related U.S. Application Data

(63) Continuation of application No. 16/257,938, filed on Jan. 25, 2019, now Pat. No. 11,029,453.

(Continued)

(51) Int. Cl.
*G02B 7/02* (2021.01)
*G02B 27/64* (2006.01)
(Continued)

(52) U.S. Cl.
CPC ............ *G02B 7/023* (2013.01); *F03G 7/065* (2013.01); *F03G 7/0614* (2021.08); *G02B 3/12* (2013.01); *G02B 3/14* (2013.01); *G02B 6/0025* (2013.01); *G02B 6/0066* (2013.01); *G02B 7/08* (2013.01); *G02B 7/09* (2013.01); *G02B 7/102* (2013.01); *G02B 7/182* (2013.01); *G02B 7/1805* (2013.01); *G02B 7/1821* (2013.01); *G02B 13/009* (2013.01); *G02B 13/0065* (2013.01); *G02B 13/0075* (2013.01); *G02B 26/004* (2013.01); *G02B 26/0816* (2013.01); *G02B 26/0883* (2013.01); *G02B 27/0068* (2013.01); *G02B 27/0955* (2013.01); *G02B 27/0972* (2013.01); *G02B 27/0977* (2013.01); *G02B 27/646* (2013.01); *G03B 5/00* (2013.01); *G03B 9/06* (2013.01); *G03B 9/14* (2013.01); *G03B 13/36* (2013.01); *G03B 17/17* (2013.01); *G06F 1/1686* (2013.01); *G06T 7/521* (2017.01); *G06T 7/97* (2017.01); *G06T 15/08* (2013.01); *G09G 5/003* (2013.01); *H02K 41/0356* (2013.01); *H04N 5/2252* (2013.01); *H04N 5/2253* (2013.01);

(Continued)

(58) Field of Classification Search
CPC .................................................... H04N 5/2252
USPC ........................................................ 348/373
See application file for complete search history.

(56) References Cited

U.S. PATENT DOCUMENTS

2014/0185153 A1    7/2014  Shibasaki
2016/0205326 A1*   7/2016  Laroia ................ G02B 13/0065
                                                        348/369

\* cited by examiner

*Primary Examiner* — Joel W Fosselman
(74) *Attorney, Agent, or Firm* — Muncy, Geissler, Olds & Lowe, P.C.

(57) ABSTRACT

An optical system is provided. The optical system includes a first optical module with a first light-entering hole, a second optical module with a second light-entering hole, and a third optical module with a third light-entering hole. The second light-entering hole is close to the first light-entering hole and the third light-entering hole. The focal length of the second optical module is different from the focal length of the first optical module and the focal length of the third optical module.

20 Claims, 93 Drawing Sheets

Related U.S. Application Data

(60) Provisional application No. 62/785,593, filed on Dec. 27, 2018, provisional application No. 62/782,664, filed on Dec. 20, 2018, provisional application No. 62/780,077, filed on Dec. 14, 2018, provisional application No. 62/760,320, filed on Nov. 13, 2018, provisional application No. 62/753,716, filed on Oct. 31, 2018, provisional application No. 62/711,036, filed on Jul. 27, 2018, provisional application No. 62/703,147, filed on Jul. 25, 2018, provisional application No. 62/688,694, filed on Jun. 22, 2018, provisional application No. 62/682,671, filed on Jun. 8, 2018, provisional application No. 62/625,600, filed on Feb. 2, 2018, provisional application No. 62/621,967, filed on Jan. 25, 2018.

(51) Int. Cl.
| | |
|---|---|
| *G03B 9/14* | (2021.01) |
| *G02B 13/00* | (2006.01) |
| *G02B 7/182* | (2021.01) |
| *H04N 5/225* | (2006.01) |
| *G02B 7/08* | (2021.01) |
| *F03G 7/06* | (2006.01) |
| *G02B 3/12* | (2006.01) |
| *G03B 9/06* | (2021.01) |
| *G02B 7/09* | (2021.01) |
| *G03B 5/00* | (2021.01) |
| *G03B 13/36* | (2021.01) |
| *H02K 41/035* | (2006.01) |
| *G02B 7/10* | (2021.01) |
| *G06F 1/16* | (2006.01) |
| *H04N 5/235* | (2006.01) |
| *G02B 3/14* | (2006.01) |
| *G02B 26/00* | (2006.01) |
| *G02B 27/00* | (2006.01) |
| *G02B 26/08* | (2006.01) |
| *G03B 17/17* | (2021.01) |
| *F21V 8/00* | (2006.01) |
| *G02B 27/09* | (2006.01) |
| *G09G 5/00* | (2006.01) |
| *G02B 7/18* | (2021.01) |
| *G06T 7/521* | (2017.01) |
| *G06T 7/00* | (2017.01) |
| *G06T 15/08* | (2011.01) |
| *G03B 5/04* | (2021.01) |
| *G02B 5/00* | (2006.01) |

(52) U.S. Cl.
CPC ......... *H04N 5/2254* (2013.01); *H04N 5/2256* (2013.01); *H04N 5/2257* (2013.01); *H04N 5/2258* (2013.01); *H04N 5/2353* (2013.01); *G02B 5/003* (2013.01); *G02B 13/004* (2013.01); *G03B 5/04* (2013.01); *G03B 2205/0007* (2013.01); *G03B 2205/0015* (2013.01); *G03B 2205/0069* (2013.01); *G06T 2207/10028* (2013.01); *G06T 2207/10048* (2013.01); *G09G 2354/00* (2013.01)

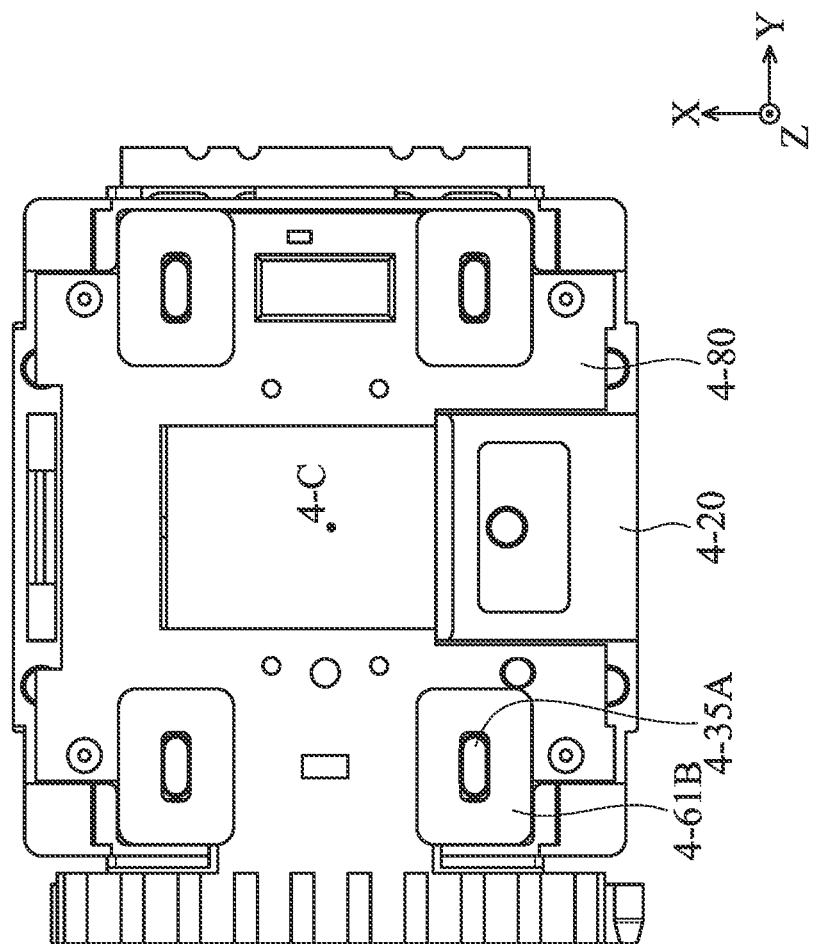
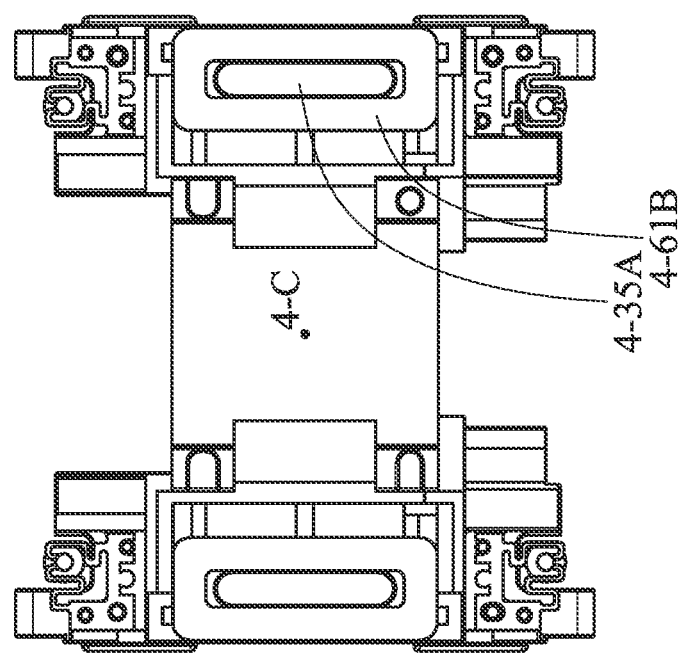
FIG. 50

OPTICAL SYSTEM

CROSS-REFERENCE TO RELATED APPLICATIONS

The present application is a Continuation Application of U.S. patent application Ser. No. 16/257,938, filed on Jan. 25, 2019, which claims priority to U.S. Provisional Patent Application No. 62/621,967, filed on Jan. 25, 2018, No. 62/625,600, filed on Feb. 2, 2018, No. 62/682,671, filed on Jun. 8, 2018, No. 62/688,694, filed on Jun. 22, 2018, No. 62/703,147, filed on Jul. 25, 2018, No. 62/711,036, filed on Jul. 27, 2018, No. 62/753,716, filed on Oct. 31, 2018, No. 62/760,320, filed on Nov. 13, 2018, No. 62/780,077, filed on Dec. 14, 2018, No. 62/782,664, filed on Dec. 20, 2018, No. 62/785,593, filed on Dec. 27, 2018, which are incorporated by reference herein in their entirety.

BACKGROUND OF THE INVENTION

Field of the Disclosure

The present disclosure relates to an optical system, and more particularly to an optical system disposed in an electronic device.

Description of the Related Art

As the relevant technologies have developed, many electronic devices (such as cameras or smart phones) can record images and videos. However, when a lens having a long focal length is provided in the electronic device, the thickness thereof may be increased to adversely impede the prospects for miniaturization of the electronic device. Furthermore, conventional micro image capturing modules are mainly designed to have an aperture with a fixed size, and the image sharpness and photosensitivity of most small mobile electronic devices are not adjustable. A smaller aperture is required to achieve better image quality if the sensor supports and if there is enough light. However, if the size of the aperture is fixed and have a small size, image quality will be low when there is not enough light (e.g. at night). As a result, the image capturing ability under different environments will be sacrificed if the size of the aperture is fixed.

BRIEF SUMMARY OF INVENTION

An optical system is provided. The optical system includes a first optical module with a first light-entering hole, a second optical module with a second light-entering hole, and a third optical module with a third light-entering hole. The second light-entering hole is close to the first light-entering hole and the third light-entering hole. The focal length of the second optical module is different from the focal length of the first optical module and the focal length of the third optical module

BRIEF DESCRIPTION OF DRAWINGS

The disclosure can be more fully understood by reading the subsequent detailed description and examples with references made to the accompanying drawings, wherein:

FIG. 50 is a plane view illustrating the carrier and the base shown in FIG. 49.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

First Group of Embodiments

Figure 1:
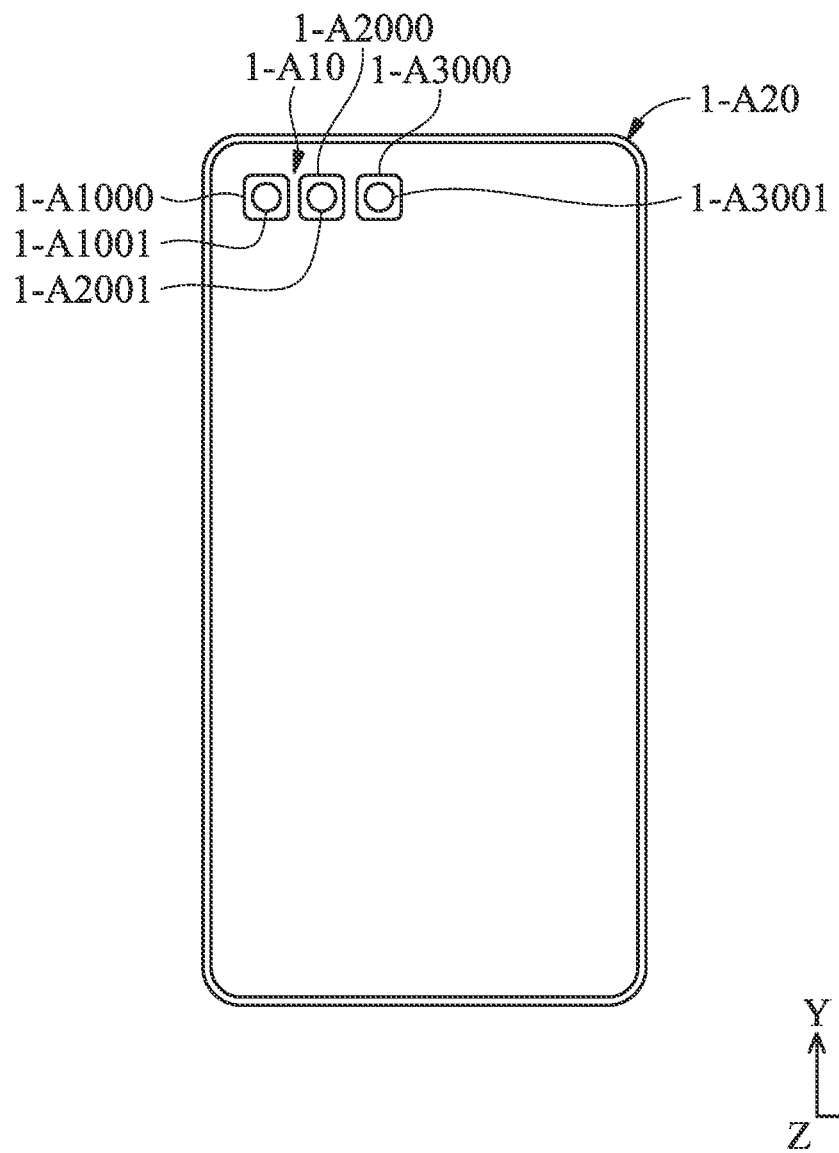
FIG. 1 is a schematic diagram of an electronic device according to an embodiment of the disclosure.

Referring to FIG. 1, in an embodiment of the disclosure, an optical system 1-A10 can be disposed in an electronic device 1-A20 and used to take photographs or record video. The electronic device 1-A20 can be a smartphone or a digital camera, for example. The optical system 1-A10 comprises a first optical module 1-A1000, a second optical module 1-A2000, and a third optical module 1-A3000. When taking photographs or recording video, these optical modules can receive lights and form images, wherein the images can be transmitted to a processor (not shown) in the electronic device 1-A20, where post-processing of the images can be performed.

In particular, the focal lengths of the first optical module 1-A1000, the second optical module 1-A2000, and the third optical module 1-A3000 are different, and the first optical module 1-A1000, the second optical module 1-A2000, and the third optical module 1-A3000 respectively have a first light-entering hole 1-A1001, a second light-entering hole 1-A2001, and a third light-entering hole 1-A3001. The external light(s) can reach the image sensor in the optical module through the light-entering hole.

Figure 2:
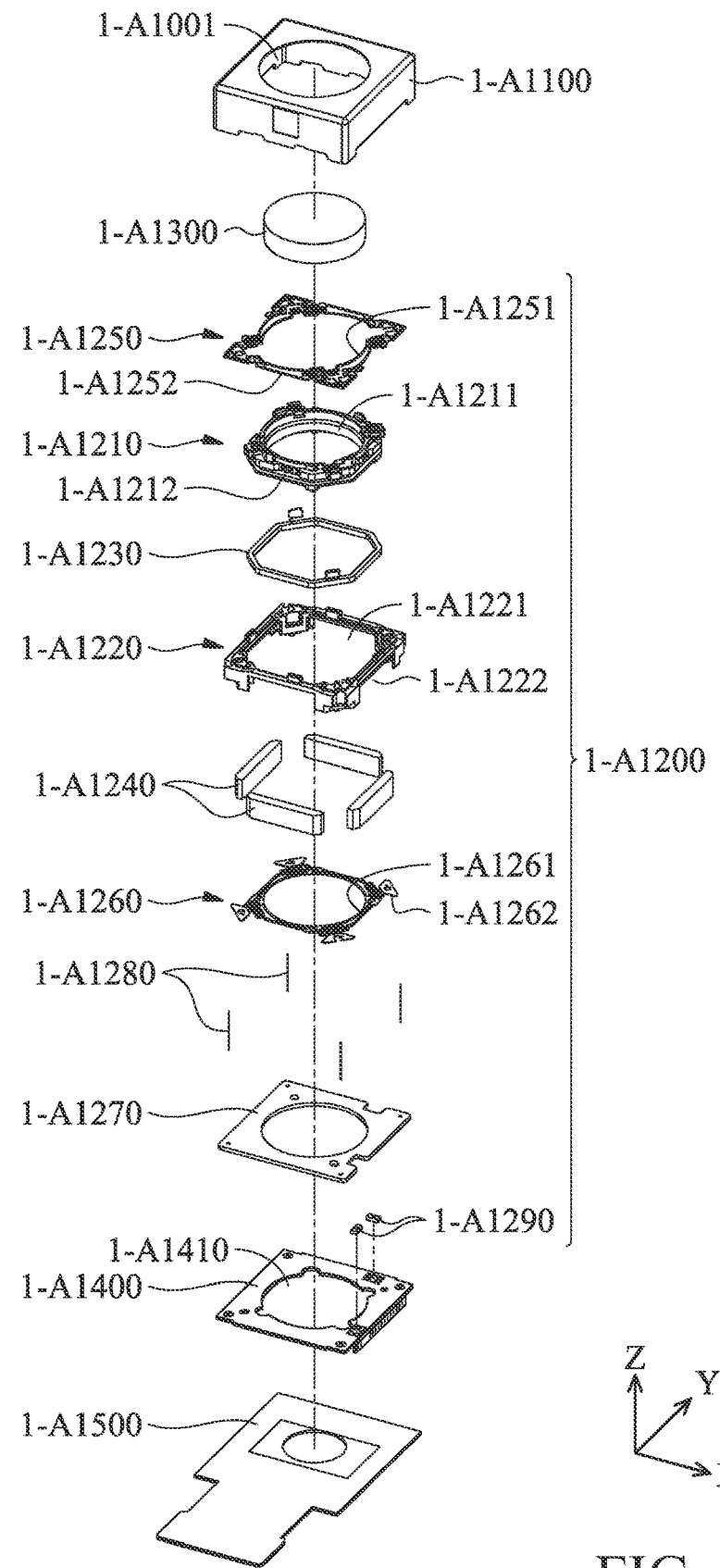
FIG. 2 is an exploded-view diagram of a first optical module according to an embodiment of the disclosure.

Referring to FIG. 2, the first optical module 1-A1000 comprises a housing 1-A1100, a lens driving mechanism 1-A1200, a lens 1-A1300, a base 1-A1400, an image sensor 1-A1500. The housing 1-A1100 and the base 1-A1400 can form a hollow box, and the housing 1-A1100 surrounds the lens driving mechanism 1-A1200. Therefore, the lens driving mechanism 1-A1200 and the lens 1-A1300 can be accommodated in the aforementioned box. The image sensor 1-A1500 is disposed on a side of the box, the first light-entering hole 1-A1001 is formed on the housing 1-A1100, and the base 1-A1400 has an opening 1-A1410 corresponding to the first light-entering hole 1-A1001. Thus, the light can reach the image sensor 1-A1500 through the first light-entering hole 1-A1001, the lens 1-A1300, and the opening 1-A1410 in sequence, so as to form an image on the image sensor 1-A1500.

The lens driving mechanism 1-A1200 comprises a lens holder 1-A1210, a frame 1-A1220, at least one first electromagnetic driving assembly 1-A1230, at least one second electromagnetic driving assembly 1-A1240, a first elastic member 1-A1250, a second elastic member 1-A1260, a coil board 1-A1270, a plurality of suspension wires 1-A1280, and a plurality of position detectors 1-A1290.

The lens holder 1-A1210 has an accommodating space 1-A1211 and a concave structure 1-A1212, wherein the accommodating space 1-A1211 is formed at the center of the lens holder 1-A1210, and the concave structure 1-A1212 is formed on the outer wall of the lens holder 1-A1210 and surrounds the accommodating space 1-A1211. The lens 1-A1300 can be affixed to the lens holder 1-A1210 and accommodated in the accommodating space 1-A1211. The first electromagnetic driving assembly 1-A1230 can be disposed in the concave structure 1-A1212.

The frame 1-A1220 has a receiving portion 1-A1221 and a plurality of recesses 1-A1222. The lens holder 1-A1210 is received in the receiving portion 1-A1221, and the second electromagnetic driving assembly 1-A1240 is affixed in the recess 1-A1222 and adjacent to the first electromagnetic driving assembly 1-A1230.

The lens holder 1-A1210 and the lens 1-A1300 disposed thereon can be driven by the electromagnetic effect between the first electromagnetic driving assembly 1-A1230 and the second electromagnetic driving assembly 1-A1240 to move relative to the frame 1-A1220 along the Z-axis. For example, in this embodiment, the first electromagnetic driving assembly 1-A1230 can be a driving coil surrounding the accommodating space 1-A1211 of the lens holder 1-A1210, and the second electromagnetic driving assembly 1-A1240 can comprise at least one magnet. When a current flows through the driving coil (the first electromagnetic driving assembly 1-A1230), an electromagnetic effect is generated between the driving coil and the magnet. Thus, the lens holder 1-A1210 and the lens 1-A1300 disposed thereon can be driven to move relative to the frame 1-A1220 and the image sensor 1-A1500 along the Z-axis, and the purpose of auto focus can be achieved.

In some embodiments, the first electromagnetic driving assembly 1-A1230 can be a magnet, and the second electromagnetic driving assembly 1-A1240 can be a driving coil.

The first elastic member 1-A1250 and the second elastic member 1-A1260 are respectively disposed on opposite sides of the lens holder 1-A1210 and the frame 1-A1220, and the lens holder 1-A1210 and the frame 1-A1220 can be disposed therebetween. The inner portion 1-A1251 of the first elastic member 1-A1250 is connected to the lens holder 1-A1210, and the outer portion 1-A1252 of the first elastic member 1-A1250 is connected to the frame 1-A1220. Similarly, the inner portion 1-A1261 of the second elastic member 1-A1260 is connected to the lens holder 1-A1210, and the outer portion 1-A1262 of the second elastic member 1-A1260 is connected to the frame 1-A1220. Thus, the lens holder 1-A1210 can be hung in the receiving portion 1-A1221 of the frame 1-A1220 by the first elastic member 1-A1250 and the second elastic member 1-A1260, and the range of motion of the lens holder 1-A1210 along the Z-axis can also be restricted by the first and second elastic members 1-A1250 and 1-A1260.

Referring to FIG. 2, the coil board 1-A1270 is disposed on the base 1-A1400. Similarly, when a current flows through the coil board 1-A1270, an electromagnetic effect is generated between the coil board 1-A1270 and the second electromagnetic driving assembly 1-A1240 (or the first electromagnetic driving assembly 1-A1230). Thus, the lens holder 1-A1210 and the frame 1-A1220 can be driven to move relative to coil board 1-A1270 along the X-axis and/or the Y-axis, and the lens 1-A1300 can be driven to move relative to image sensor 1-A1500 along the X-axis and/or the Y-axis. The purpose of image stabilization can be achieved.

In this embodiment, the lens driving mechanism 1-A1200 comprises four suspension wires 1-A1280. Four suspension wires 1-A1280 are respectively disposed on the four corners of the coil board 1-A1270 and connect the coil board 1-A1270, the base 1-A1400 and the first elastic member 1-A1250. When the lens holder 1-A1210 and the lens 1-A1300 move along the X-axis and/or the Y-axis, the suspension wires 1-A1280 can restrict their range of motion. Moreover, since the suspension wires 1-A1280 comprise metal (for example, copper or an alloy thereof), the suspension wires 1-A1280 can be used as a conductor. For example, the current can flow into the first electromagnetic driving assembly 1-A1230 through the base 1-A1400 and the suspension wires 1-A1280.

The position detectors 1-A1290 are disposed on the base 1-A1400, wherein the position detectors 1-A1290 can detect the movement of the second electromagnetic driving assembly 1-A1240 to obtain the position of the lens holder 1-A1210 and the lens 1-A1300 in the X-axis and the Y-axis. For example, each of the position detectors 1-A1290 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Referring to FIGS. 1 and 2, in this embodiment, the structure of the second optical module 1-A2000 and the structure of the third optical module 1-A3000 are substantially the same as the structure of the first optical module 1-A1000. The only difference between the first, second, and third optical modules 1-A1000, 1-A2000, and 1-A3000 is that their lenses have different focal lengths. For example, the focal length of the first optical module 1-A1000 is greater than that of the third optical module 1-A3000, and the focal length of the third optical module 1-A3000 is greater than that of the second optical module 1-A2000. In other words, in the Z-axis, the thickness of the first optical module 1-A1000 is greater than that of the third optical module 1-A3000, and the thickness of the third optical module 1-A3000 is greater than that of the second optical module 1-A2000. In this embodiment, the second optical module 1-A2000 is disposed between the first optical module 1-A1000 and the third optical module 1-A3000.

Figure 3:
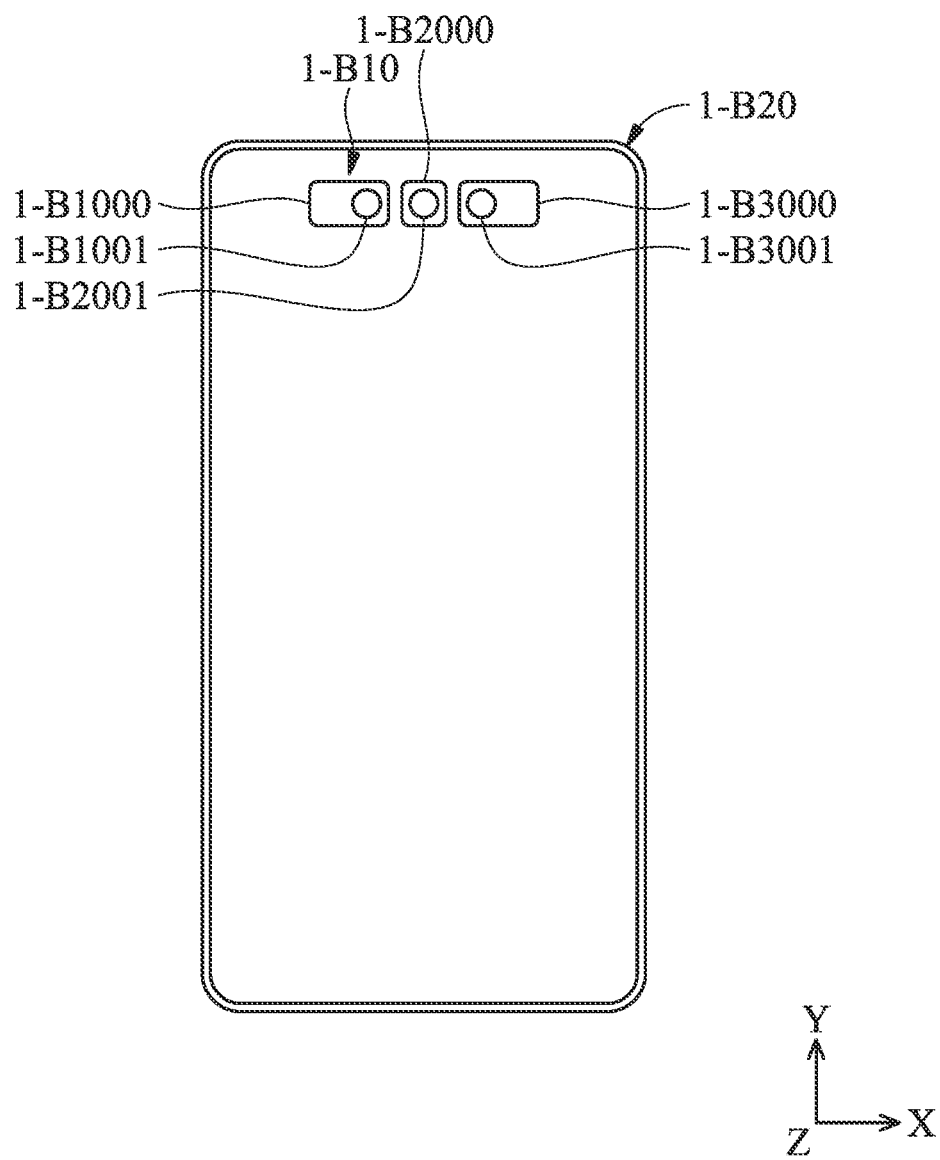
FIG. 3 is a schematic diagram of an electronic device according to another embodiment of the disclosure.

Referring to FIG. 3, in another embodiment of the disclosure, an optical system 1-B10 can be disposed in an electronic device 1-B20, and comprise a first optical module 1-B1000, a second optical module 1-B2000, and a third optical module 1-B3000. The second optical module 1-B2000 is disposed between the first optical module 1-B1000 and the third optical module 1-B3000, and the focal lengths of the first optical module 1-B1000, the second optical module 1-B2000, and the third optical module 1-B3000 are different. A first light-entering hole 1-B1001 of the first optical module 1-B1000, a second light-entering hole 1-B2001 of the second optical module 1-B2000, and a third light-entering hole 1-B3001 of the third optical module 1-B3001 are adjacent to each other.

Figure 4:
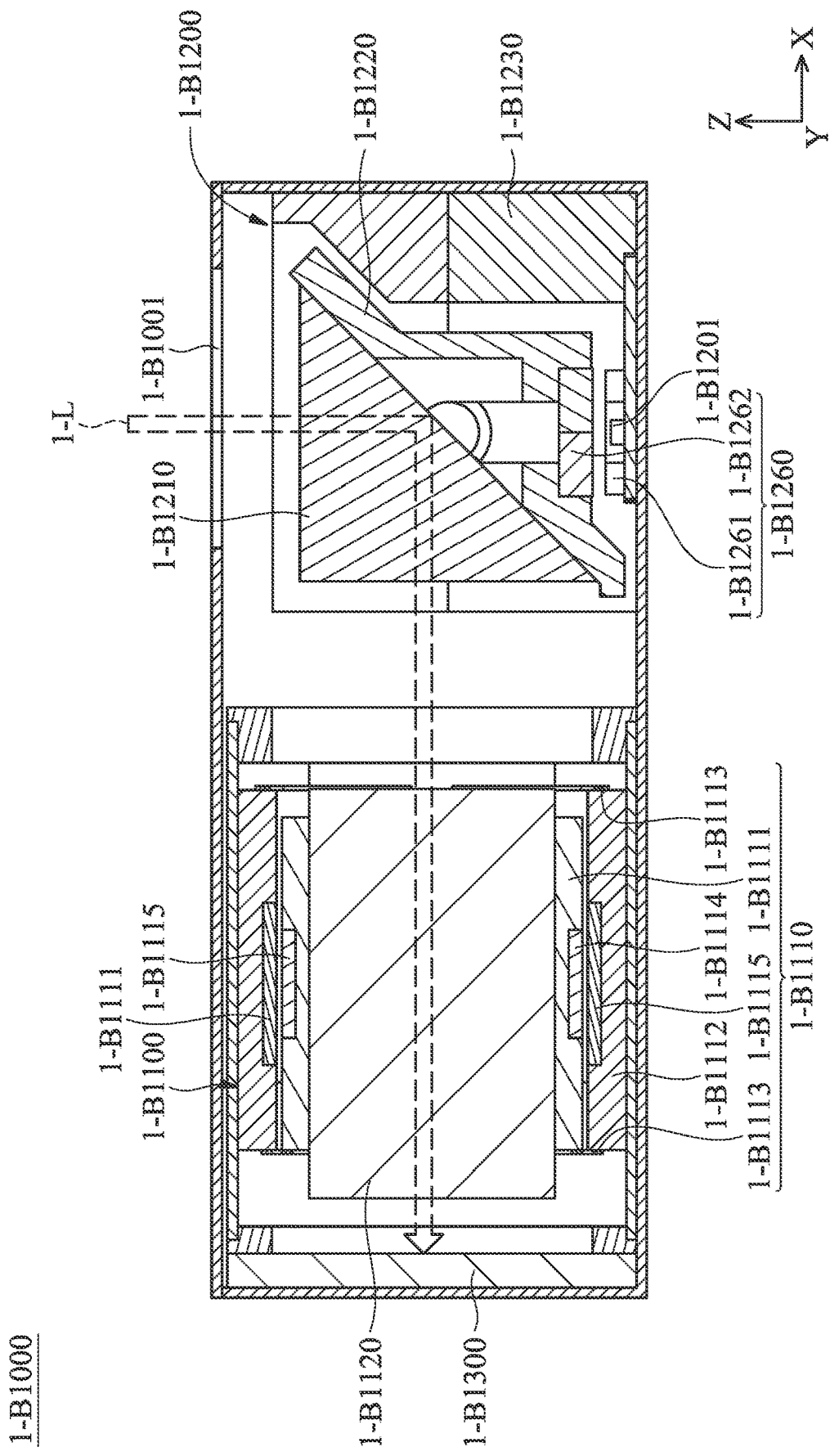
FIG. 4 is a schematic diagram of a first optical module according to another embodiment of the disclosure.

As shown in FIG. 4, the first optical module 1-B1000 comprises a lens unit 1-B1100, a reflecting unit 1-B1200, and an image sensor 1-B1300. An external light (such as a light 1-L) can enter the first optical module 1-B1000 through the first light-entering hole 1-B1001 and be reflected by the reflecting unit 1-B1200. After that, the external light can pass through the lens unit 1-B1100 and be received by the image sensor 1-B1300.

The specific structures of the lens unit 1-B1100 and the reflecting unit 1-B1200 in this embodiment are discussed below. As shown in FIG. 4, the lens unit 1-B1100 primarily comprises a lens driving mechanism 1-B1110 and a lens 1-B1120, wherein the lens driving mechanism 1-B1110 is used to drive the lens 1-B1120 to move relative to the image sensor 1-B1300. For example, the lens driving mechanism 1-B1110 can comprise a lens holder 1-B1111, a frame 1-B1112, two spring sheets 1-B1113, at least one coil 1-B1114, and at least one magnetic member 1-B1115.

The lens 1-B1120 is affixed to the lens holder 1-B1111. Two spring sheets 1-B1113 are connected to the lens holder 1-B1111 and the frame 1-B1112, and respectively disposed on opposite sides of the lens holder 1-B1111. Thus, the lens holder 1-B1111 can be movably hung in the frame 1-B1112. The coil 1-B1114 and the magnetic member 1-B1115 are respectively disposed on the lens holder 1-B1111 and the frame 1-B1112, and correspond to each other. When current flows through the coil 1-B1114, an electromagnetic effect is generated between the coil 1-B1114 and the magnetic member 1-B1115, and the lens holder 1-B1111 and the lens 1-B1120 disposed thereon can be driven to move relative to the image sensor 1-B1300.

Figure 5:
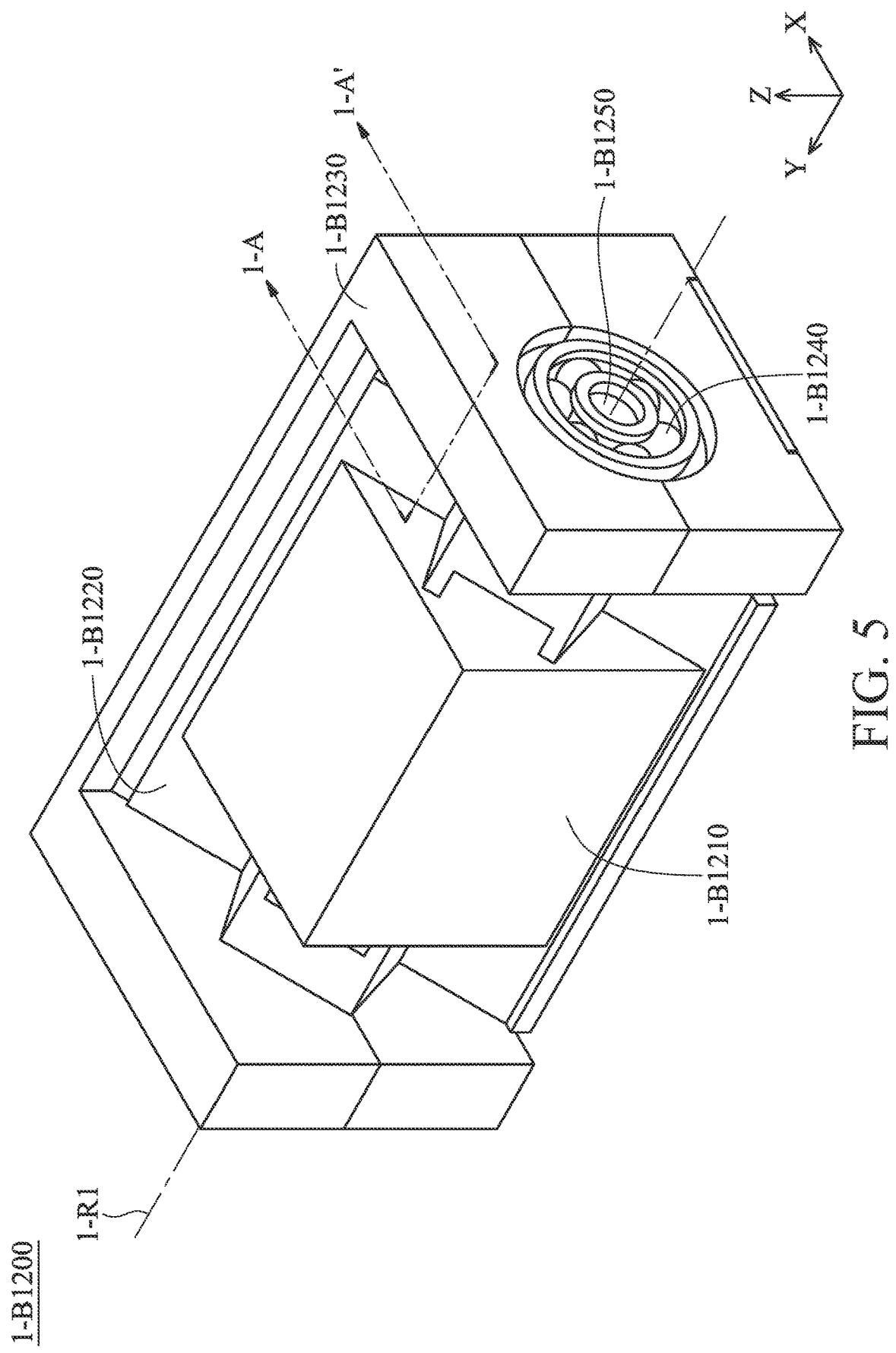
FIG. 5 is a schematic diagram of a reflecting unit according to another embodiment of the disclosure.
Figure 6:
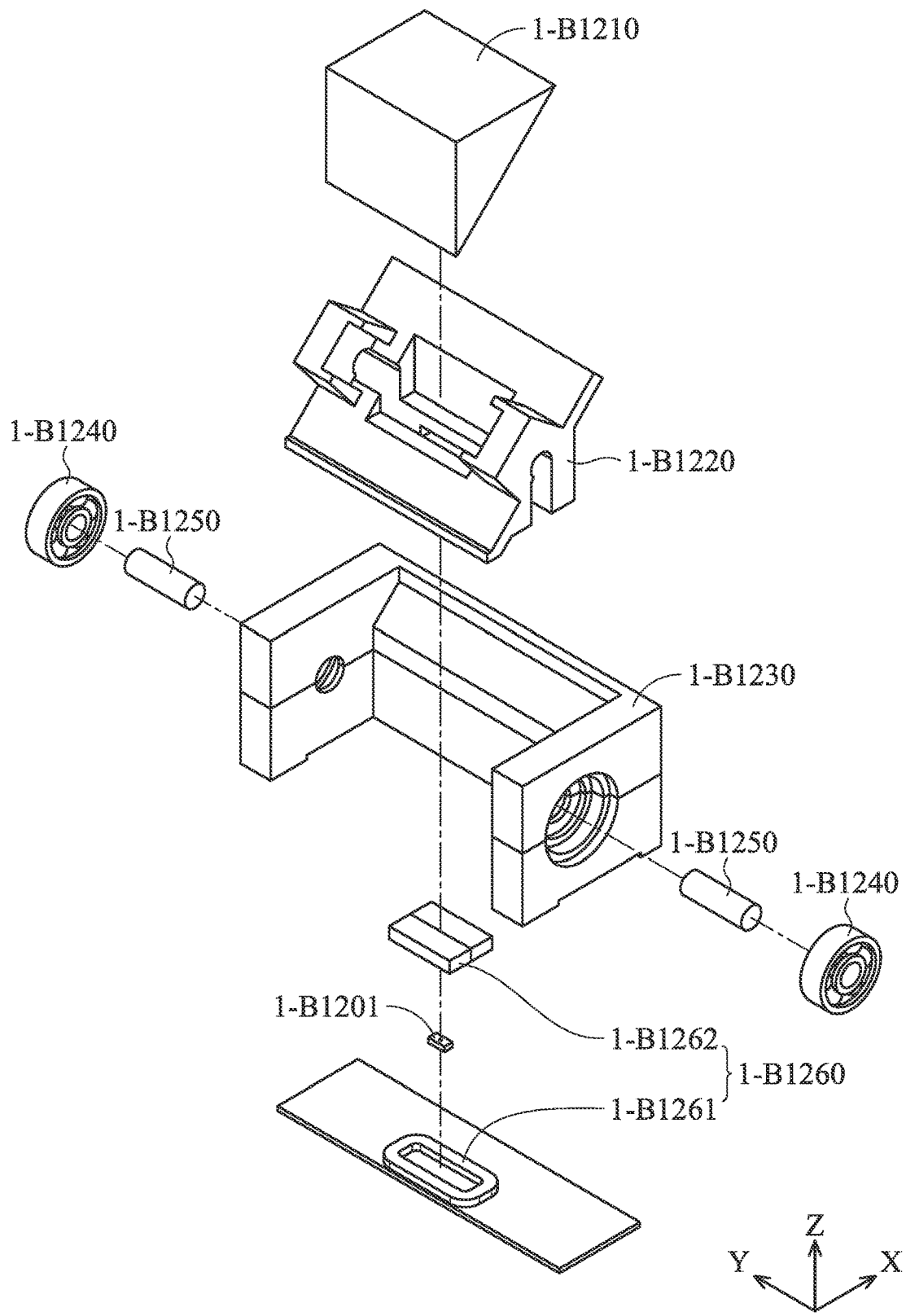
FIG. 6 is a exploded-view diagram of the reflecting unit according to another embodiment of the disclosure.

Referring to FIGS. 4 to 6, the reflecting unit 1-B1200 primarily comprises an optical member 1-B1210, an optical member holder 1-B1220, a frame 1-B1230, at least one bearing member 1-B1240, at least one first hinge 1-B1250, a first driving module 1-B1260, and a position detector 1-B1201.

The first bearing member 1-B1240 is disposed on the frame 1-B1230, the first hinge 1-B1250 can pass through the hole at the center of the first bearing member 1-B1240, and the optical member holder 1-B1220 can be affixed to the first hinge 1-B1250. Therefore, the optical member holder 1-B1220 can be pivotally connected to the frame 1-B1230 via the first hinge 1-B1250. Since the optical member 1-B1210 is disposed on the optical member holder 1-B1220, when the optical member holder 1-B1220 rotates relative to the frame 1-B1230, the optical member 1-B1210 disposed thereon also rotates relative to the frame 1-B1230. The optical member 1-B1210 can be a prism or a reflecting mirror.

Figure 7:
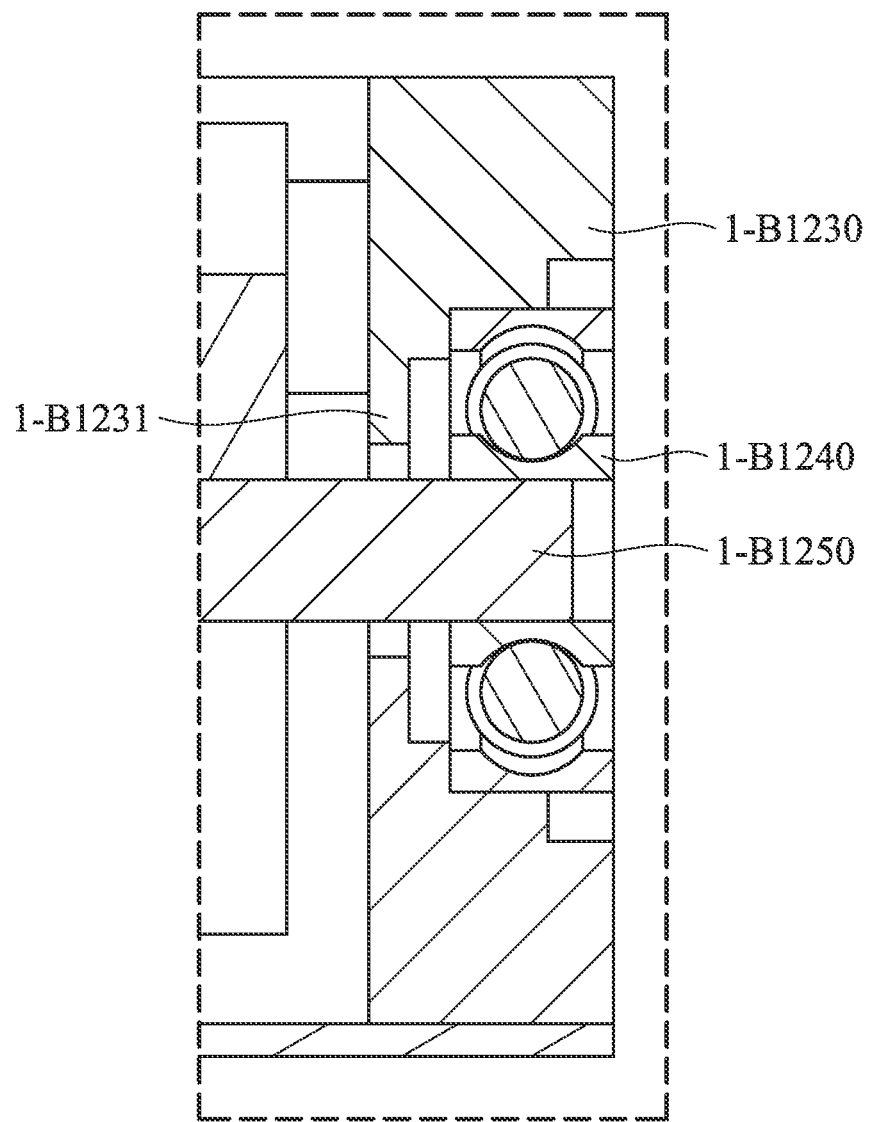
FIG. 7 is a cross-sectional view along line 1-A-1-A' in FIG. 5.

Referring to FIG. 7, in this embodiment, a dust-proof assembly 1-B1231 is disposed on the frame 1-B1230. The dust-proof assembly 1-B1231 is adjacent to the first hinge 1-B1250 and disposed between the optical member 1-B1210 and the first bearing member 1-B1240. The dust-proof assembly 1-B1231 does not contact the first hinge 1-B1250 or the first bearing member 1-B1240, in other words, a gap is formed between the dust-proof assembly 1-B1231 and the first hinge 1-B1250 and another gap is formed between the dust-proof assembly 1-B1231 and first bearing member 1-B1240.

Owing to the first bearing member 1-B1240, the dust generated from the friction between the first hinge 1-B1250 and the frame 1-B1230 when the optical member holder 1-B1220 rotates relative to the frame 1-B1230 can be prevented. Furthermore, owing to the dust-proof assembly 1-B1231, the minor dust from the first bearing member 1-B1240 can also be blocked and does not attach to the optical member 1-B1210. The optical properties of the optical member 1-B1210 can be maintained.

In this embodiment, the dust-proof assembly 1-B1231 is a plate integrally formed with the frame 1-B1230. In some embodiments, the dust-proof assembly 1-B1231 is a brush disposed on the frame 1-B1230.

Figure 8:
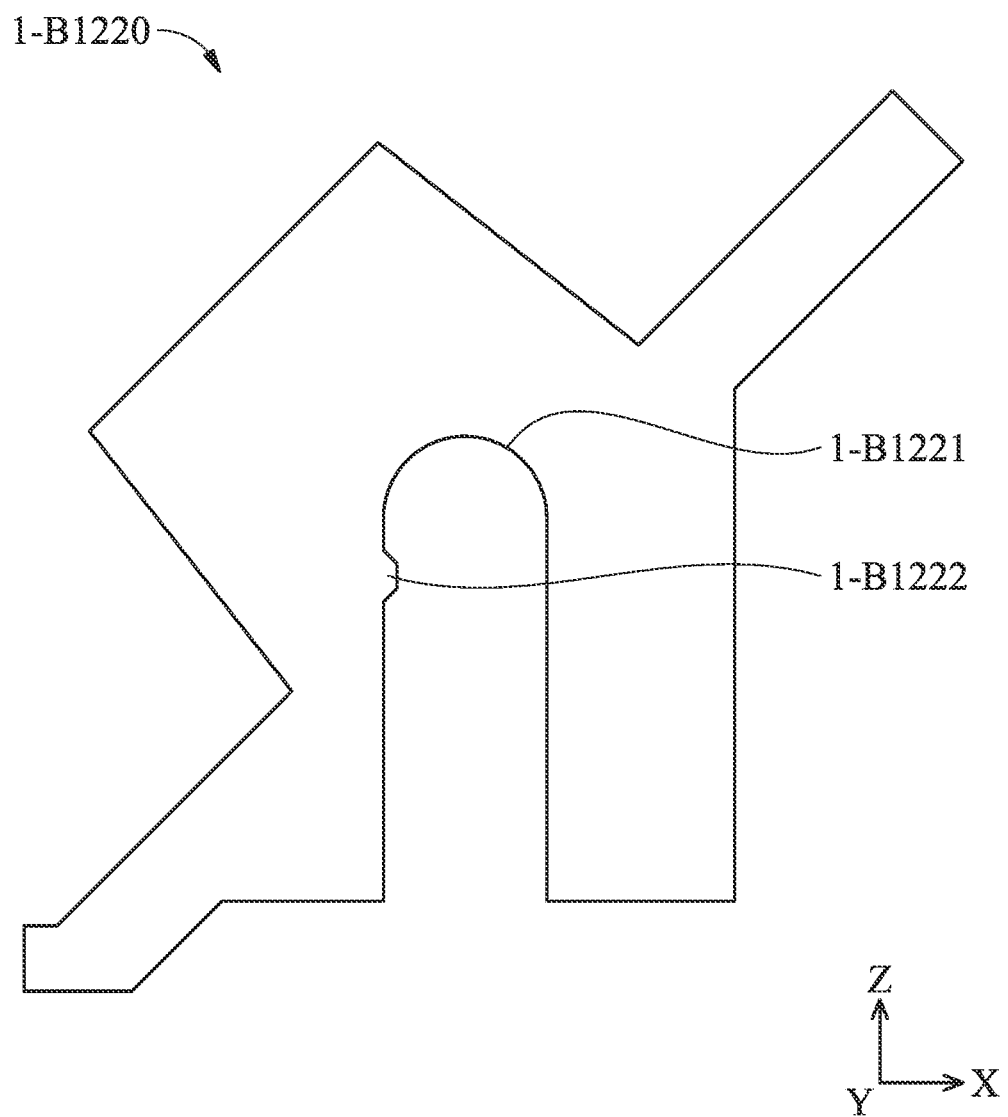
FIG. 8 is a side view of an optical member holder according to another embodiment of the disclosure.

Referring to FIG. 8, a fixing structure 1-B1221 is formed on the optical member holder 1-B1220 for joining to the first hinge 1-B1250. In this embodiment, the fixing structure 1-B1221 is a recess, and a narrow portion 1-B1222 is formed in the recess. Therefore, it is convenient to join the optical member holder 1-B1220 to the first hinge 1-B1250, and the narrow portion 1-B1222 can prevent the optical member holder 1-B1220 from falling from the first hinge 1-B1250.

In some embodiments, the position of the first bearing member 1-B1240 and the position of the fixing structure 1-B1221 can be interchanged. That is, the first bearing member 1-B1240 can be disposed on the optical member holder 1-B1220, and the fixing structure 1-B1221 can be formed on the frame 1-B1230. In some embodiments, the reflecting unit 1-B1200 can further comprise a sealing member (such as a glue or a hook). After the first hinge 1-B1250 enters the recess of the fixing structure 1-B1221, the sealing member can seal the opening of the recess.

As shown in FIGS. 4 to 6, the first driving module 1-B1260 can comprise a first electromagnetic driving assembly 1-B1261 and a second electromagnetic driving assembly 1-B1262, respectively disposed on the frame 1-B1230 and the optical member holder 1-B1220 and corresponding to each other.

For example, the first electromagnetic driving assembly 1-B1261 can comprise a driving coil, and the second electromagnetic driving assembly 1-B1262 can comprise a magnet. When a current flows through the driving coil (the first electromagnetic driving assembly 1-B1261), an electromagnetic effect is generated between the driving coil and the magnet. Thus, the optical member holder 1-B1220 and the optical member 1-B1210 can be driven to rotate relative to the frame 1-B1230 around a first rotation axis 1-R1 (extending along the Y-axis), so as to adjust the position of the external light 1-L on the image sensor 1-B1300.

The position detector 1-B1201 can be disposed on the frame 1-B1230 and correspond to the second electromagnetic driving assembly 1-B1262, so as to detect the position of the second electromagnetic driving assembly 1-B1262 to obtain the rotation angle of the optical member 1-B1210. For example, the position detectors 1700 can be Hall sensors, magnetoresistance effect sensors (MR sensor), giant magnetoresistance effect sensors (GMR sensor), tunneling magnetoresistance effect sensors (TMR sensor), or fluxgate sensors.

In some embodiments, the first electromagnetic driving assembly 1-B1261 comprises a magnet, and the second electromagnetic driving assembly comprises a driving coil. In these embodiments, the position detector 1-B1201 can be disposed on the optical member holder 1-B1220 and corresponds to the first electromagnetic driving assembly 1-B1261.

Referring to FIG. 3, in this embodiment, the structure of the first optical module 1-B1000 is the same as the structure of the third optical module 1-B3000, but the focal length of the lens 1-B1120 in the first optical module 1-B1000 is different from the focal length of the lens in the third optical module 1-B3000.

Furthermore, it should be noted that, the reflecting unit 1-B1200 in the first optical module 1-B1000 and the reflecting unit in the third optical module 1-B3000 can respectively guide the external lights entering the optical system 1-B10 from the first light-entering hole 1-B1001 and the third light-entering hole 1-B3001 to the image sensors in the first and third optical modules 1-B1000 and 1-B3000. In particular, the external light entering the optical system 1-B10 from the first light-entering hole 1-B1001 can be reflected by the reflecting unit 1-B1200 in the first optical module 1-B1000 and move along the −X-axis (the first direction), and another external light entering the optical system 1-B10 from the third light-entering hole 1-B3001 can be reflected by the reflecting unit in the third optical module 1-B3000 and move along the X-axis (the second direction).

The structure of the second optical module 1-B2000 in the optical system 1-B10 is similar to the structure of the first optical module 1-A1000 in the optical system 1-A10, the features thereof are not repeated in the interest of brevity. It should be noted that, the external light entering the second optical module 1-B2000 passes through the second light-entering hole 1-B2001 and reaches the image sensor in the second optical module 1-B2000 along the Z-axis, and the sensing surface of the image sensor in the second optical module 1-B2000 is perpendicular to the Z-axis. On the contrary, the sensing surfaces of the image sensors of the first optical module 1-B1000 and the third optical module 1-B3000 are parallel to the Z-axis.

Owing to the aforementioned structure, the thickness of the first optical module 1-B1000 along the Z-axis and the thickness of the third optical module 1-B3000 along the Z-axis can be reduced, and the first and third optical module 1-B1000 and 1-B3000 can be disposed in the thin electronic device 1-B20, wherein the focal length of the first optical module 1-B1000 and the focal length of the third optical module 1-B3000 is greater than the focal length of the second optical module 1-B2000.

Figure 9:
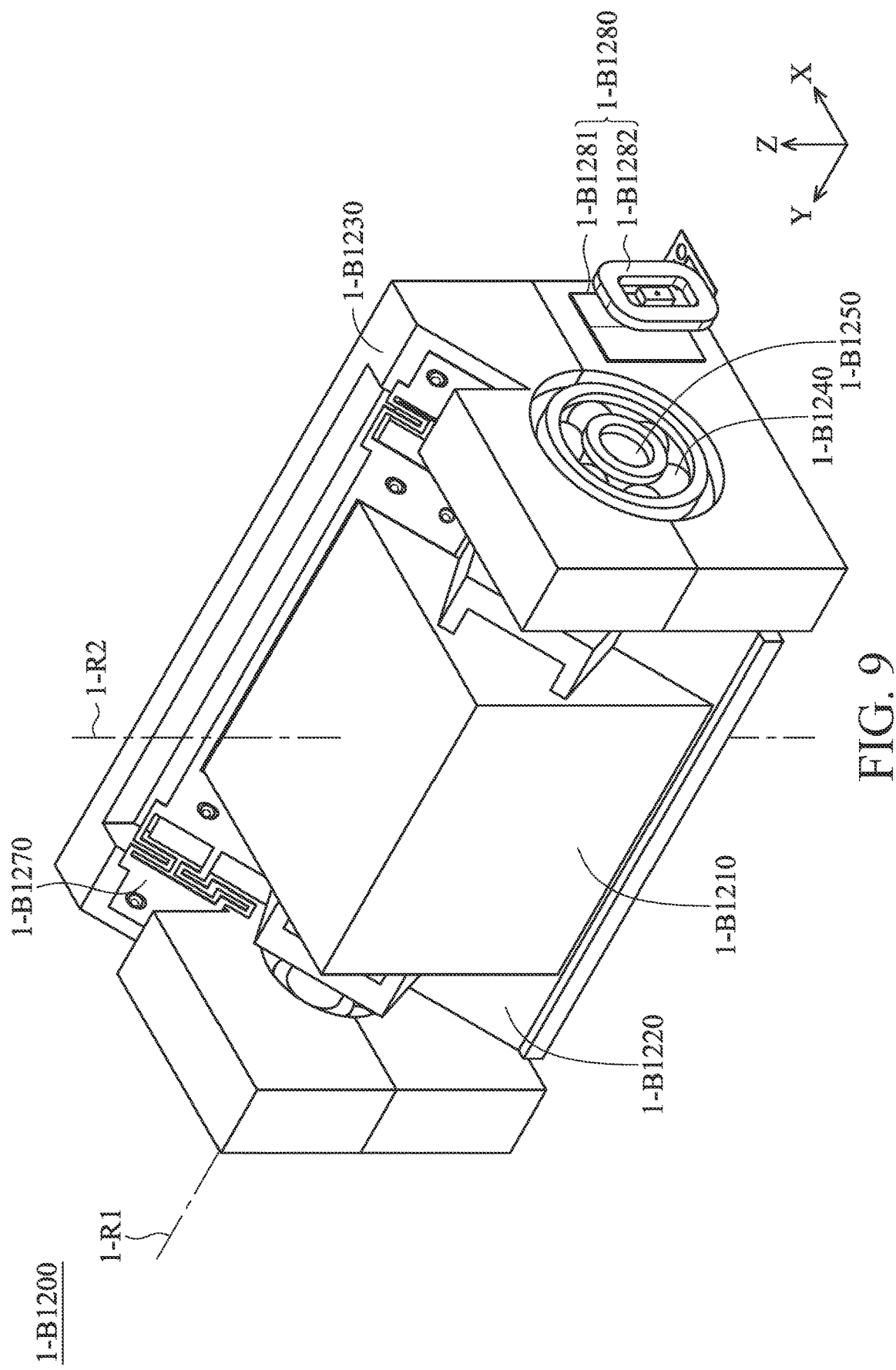
FIG. 9 is a schematic diagram of a reflecting unit according to another embodiment of the disclosure.
Figure 10:
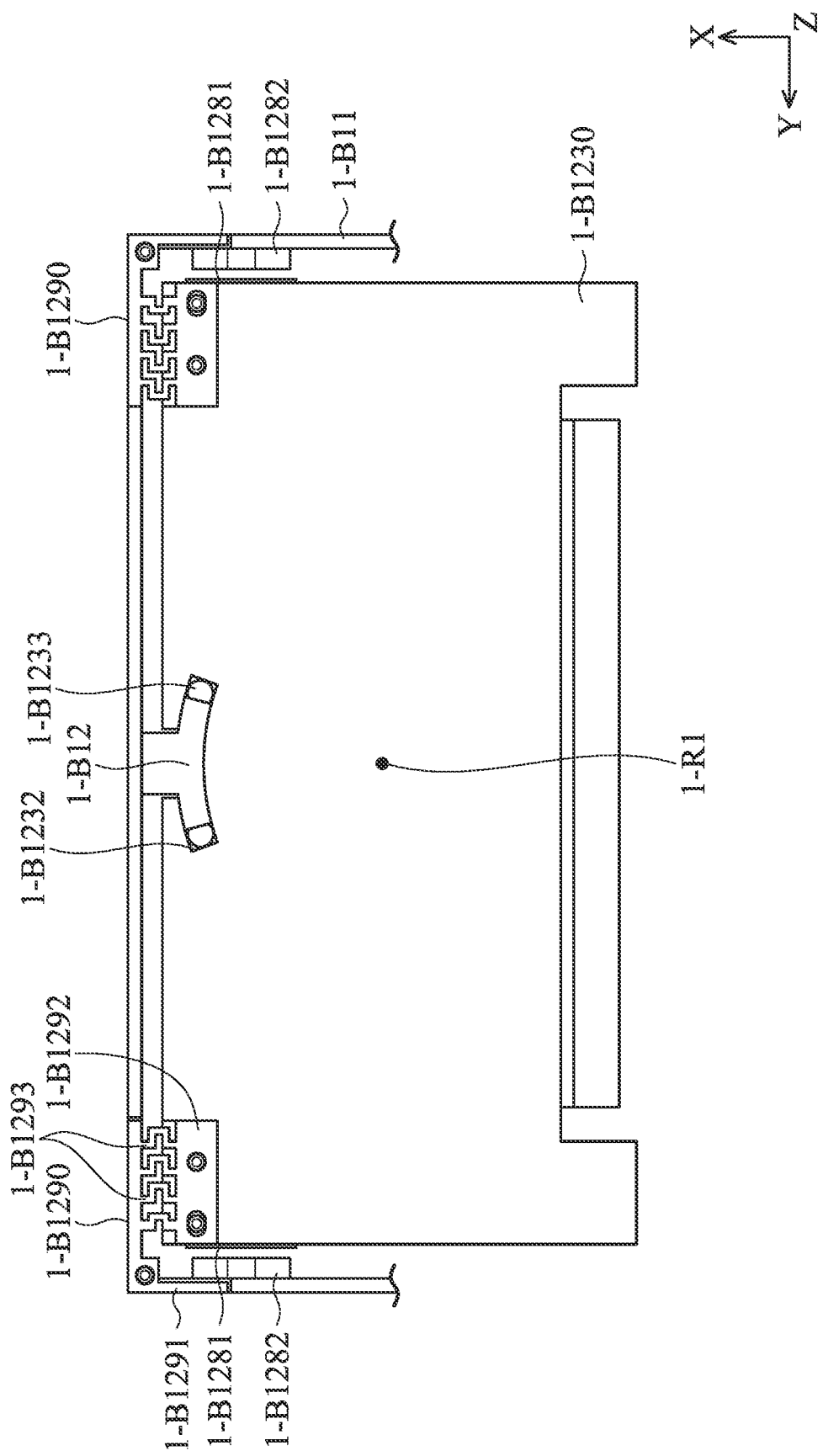
FIG. 10 is a bottom view of the reflecting unit according to another embodiment of the disclosure.

Referring to FIGS. 9 and 10, in another embodiment of the disclosure, the reflecting unit 1-B1200 further comprises a first steady member 1-B1270, a second driving module 1-B1280, and a second steady member 1-B1290. The first steady member 1-B1270 comprises at least one spring sheet connected to the frame 1-B1230 and the optical member holder 1-B1220, so that a stabilizing force can be provided to maintain the optical member holder 1-B1220 in an original position relative to the frame 1-B1230. Therefore, even when the first driving module 1-B1260 does not operate (for example, the current does not flow into the first electromagnetic driving assembly 1-B1261), the rotation of the optical member holder 1-B1220 relative to the frame 1-B1230 caused by the shake of the electronic device 1-B20 can still be avoided, and the damage of the optical member 1-B1210 due to the collision can be avoided.

The second driving module 1-B1280 comprises at least one third electromagnetic driving assembly 1-B1281 and at least one fourth electromagnetic driving assembly 1-B1282, respectively disposed on the frame 1-B1230 and the housing 1-B11 of the optical system 1-B10. For example, the third electromagnetic driving assembly 1-B1281 comprises a magnet, and the fourth electromagnetic driving assembly 1-B1282 comprises a driving coil. When current flows through the driving coil (the fourth electromagnetic driving assembly 1-B1282), an electromagnetic effect is generated between the driving coil and the magnet. Thus, the frame 1-B1230, the optical member holder 1-B1220, and the optical member 1-B1210 can be simultaneously driven to rotate relative to the housing 1-B11 around a second rotation axis 1-R2 (extending along the Z-axis), so as to adjust the position of the external light on the image sensor 1-B1300. It should be noted that, in this embodiment, the second rotation axis 1-R2 passes through the center of the reflecting surface of the optical member 1-B1210.

In some embodiments, the third electromagnetic driving assembly 1-B1281 comprises a driving coil, and the fourth electromagnetic driving assembly 1-B1282 comprises a magnet.

As shown in FIG. 10, similar to the first steady member 1-B1270, the second steady member 1-B1290 is connected to the housing 1-B11 and the frame 1-B1230, and a stabilizing force can be provided to maintain the frame 1-B1230 in a predetermined position relative to the housing 1-B11.

In this embodiment, the second steady member 1-B1290 is a spring sheet, comprising a first fixing section 1-B1291, a second fixing section 1-B1292, and a plurality of string sections 1-B1293. The first fixing section 1-B1291 and the second fixing section 1-B1292 are respectively affixed to the housing 1-B11 and the frame 1-B1230, and the string sections 1-B1293 are connected to the first fixing section 1-B1291 and the second fixing section 1-B1292. Specifically, the string sections 1-B1293 are arranged in parallel. Each of the string sections 1-B1293 has a bend structure, and the widths of the string sections 1-B1293 are different. In particular, the width of the string section 1-B1293 away from the second rotation axis 1-R2 is greater than the width of the string section 1-B1293 close to the second rotation axis 1-R2, so as to endure the larger deformation volume.

In this embodiment, a first guiding assembly 1-B1232 is disposed on the frame 1-B1230, and a second guiding assembly 1-B12 is disposed on the housing 1-B11. The first guiding assembly 1-B1232 can be a curved slot, and the second guiding assembly 1-B12 can be a slider accommodated in the slot, wherein the center of the curvature of the curved slot is situated on the second rotation axis 1-R2. When the second driving module 1-B1280 drives the optical member holder 1-B1220 to rotate relative to the housing 1-B11, the slider slides along the slot. In this embodiment, a plurality of balls are disposed in the slot, such that the slider can be smoothly slide.

Figure 11:
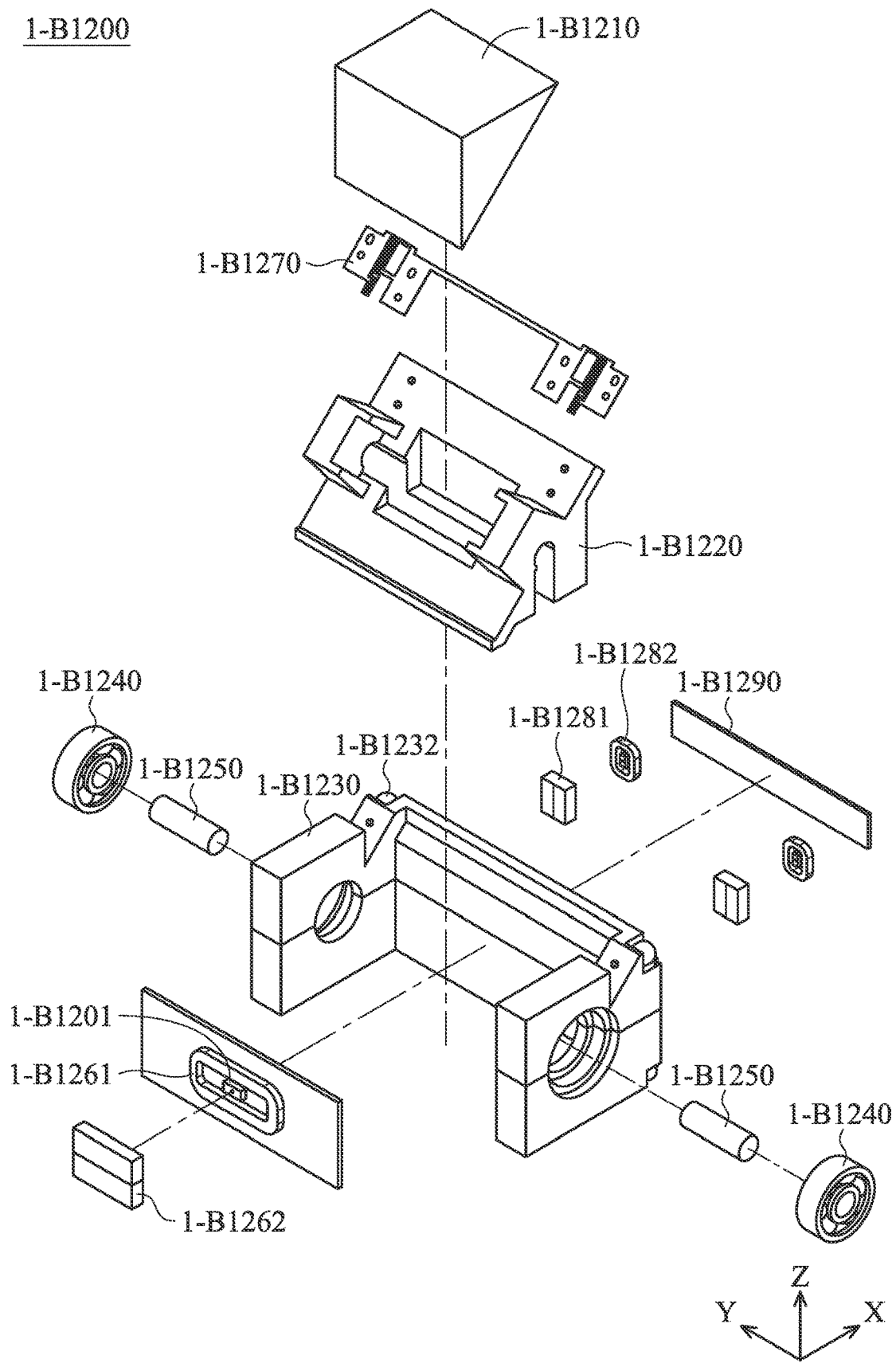
FIG. 11 is a exploded-view diagram of a reflecting unit according to another embodiment of the disclosure.
Figure 12:
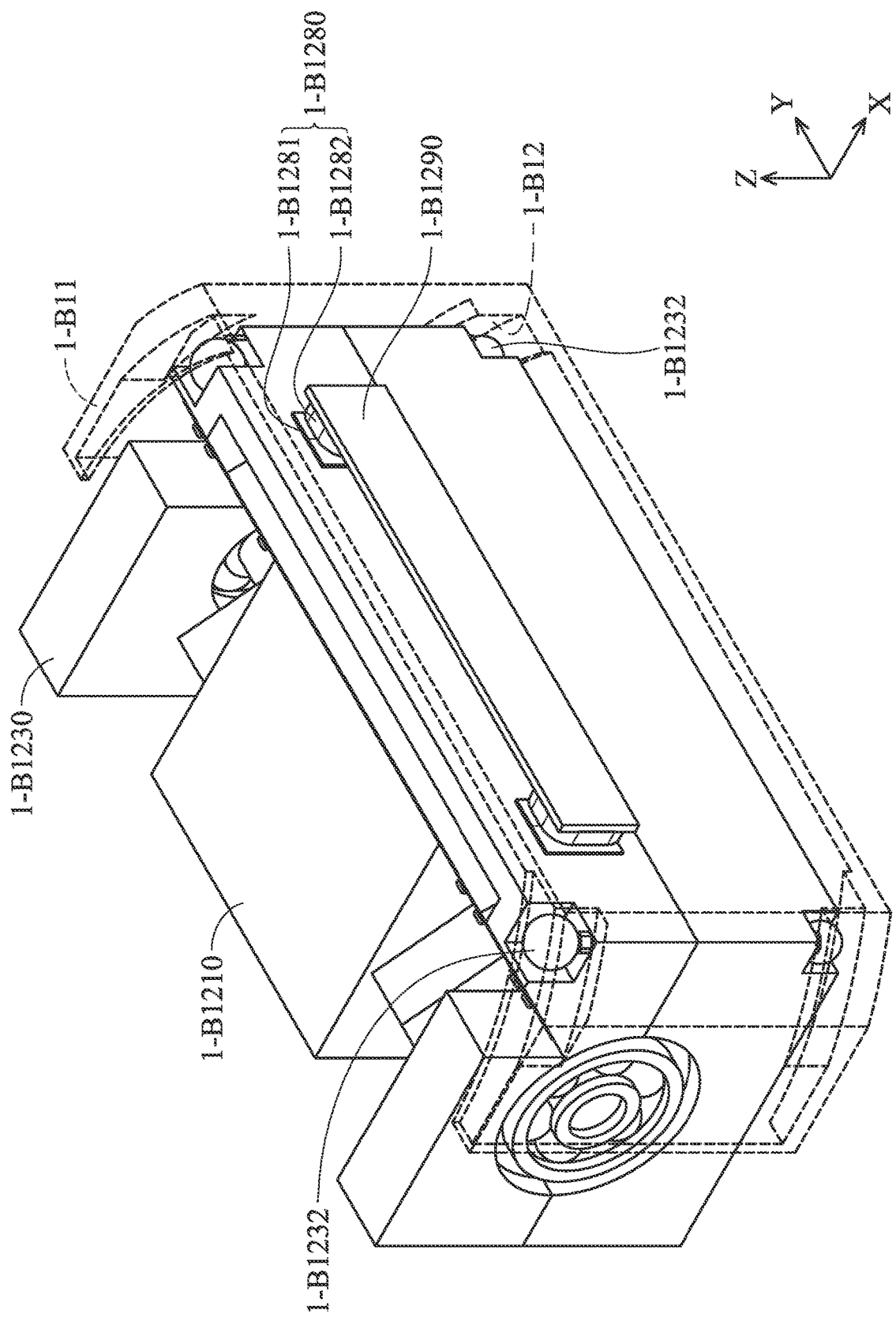
FIG. 12 is a schematic diagram of the reflecting unit according to another embodiment of the disclosure.

Referring to FIGS. 11 and 12, in another embodiment of the disclosure, the second steady member 1-B1290 is a magnetic permeability member, disposed on the housing 1-B11 and corresponding to the third electromagnetic driving assembly 1-B1281 of the second driving module 1-B1280. The third electromagnetic driving assembly 1-B1281 can be a magnet. Thus, the frame 1-B1230 can be maintained in a predetermined position relative to the housing 1-B11 by the magnetic attraction between the second steady member 1-B1290 and the third electromagnetic driving assembly 1-1281. Furthermore, the magnetic permeability member can enhance the electromagnetic effect between the third electromagnetic driving assembly 1-B1281 and the fourth electromagnetic driving assembly 1-B1282, so as to increase the driving force of the second driving module 1-B1280.

The first guiding assembly 1-B1232 disposed on the frame 1-B1230 comprises at least one ball, and the second guiding assembly 1-B12 is a curve slot formed on the housing 1-B11. The ball can be accommodated in the curved slot, and the center of the curvature of the curved slot is situated on the second rotation axis 1-R2. Thus, when the second driving module 1-B1280 drives the optical member holder 1-B1220 to rotate relative to the housing 1-B11, the ball slides along the slot.

Figure 13:
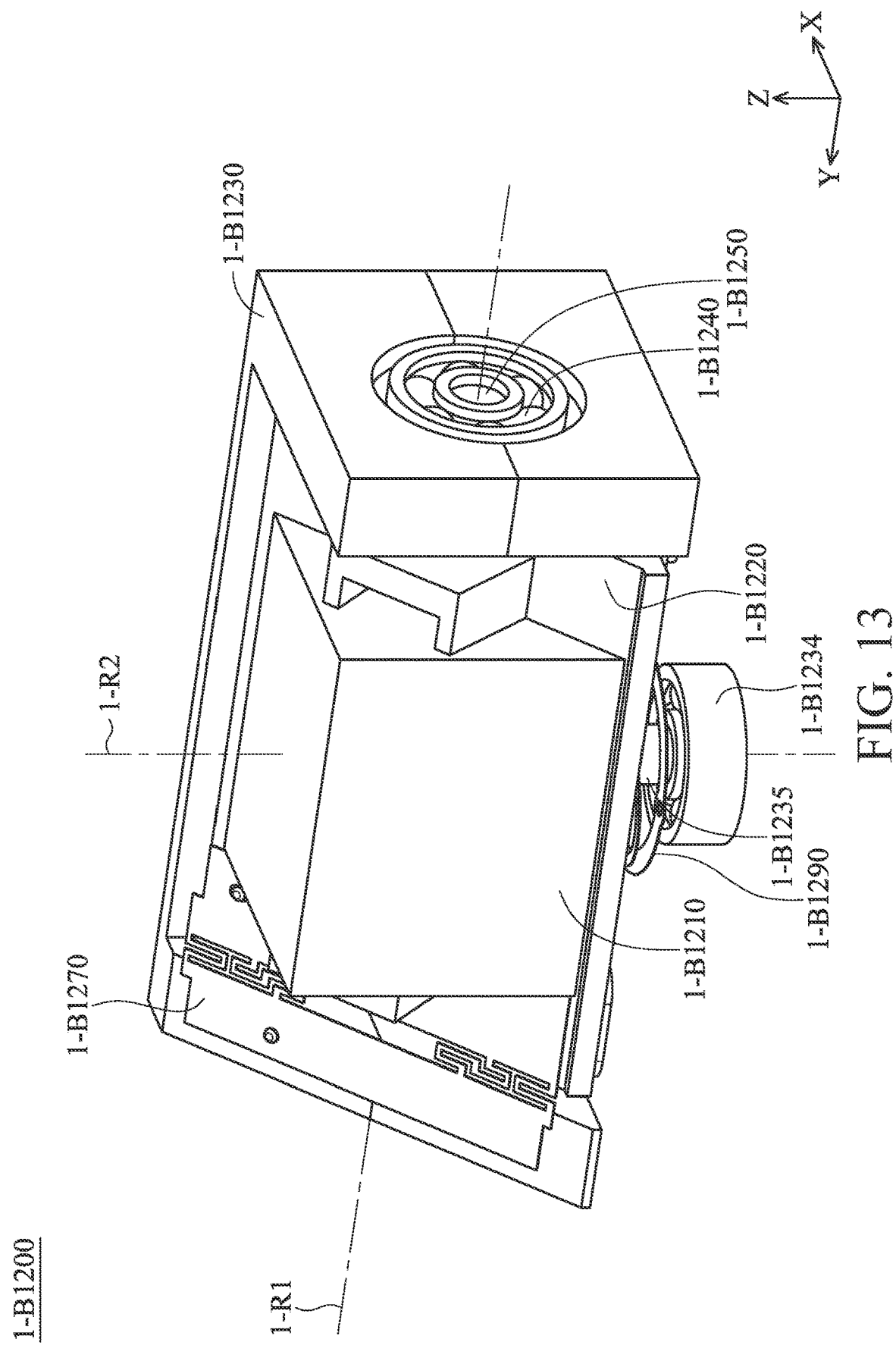
FIG. 13 is a schematic diagram of a reflecting unit according to another embodiment of the disclosure.
Figure 14:
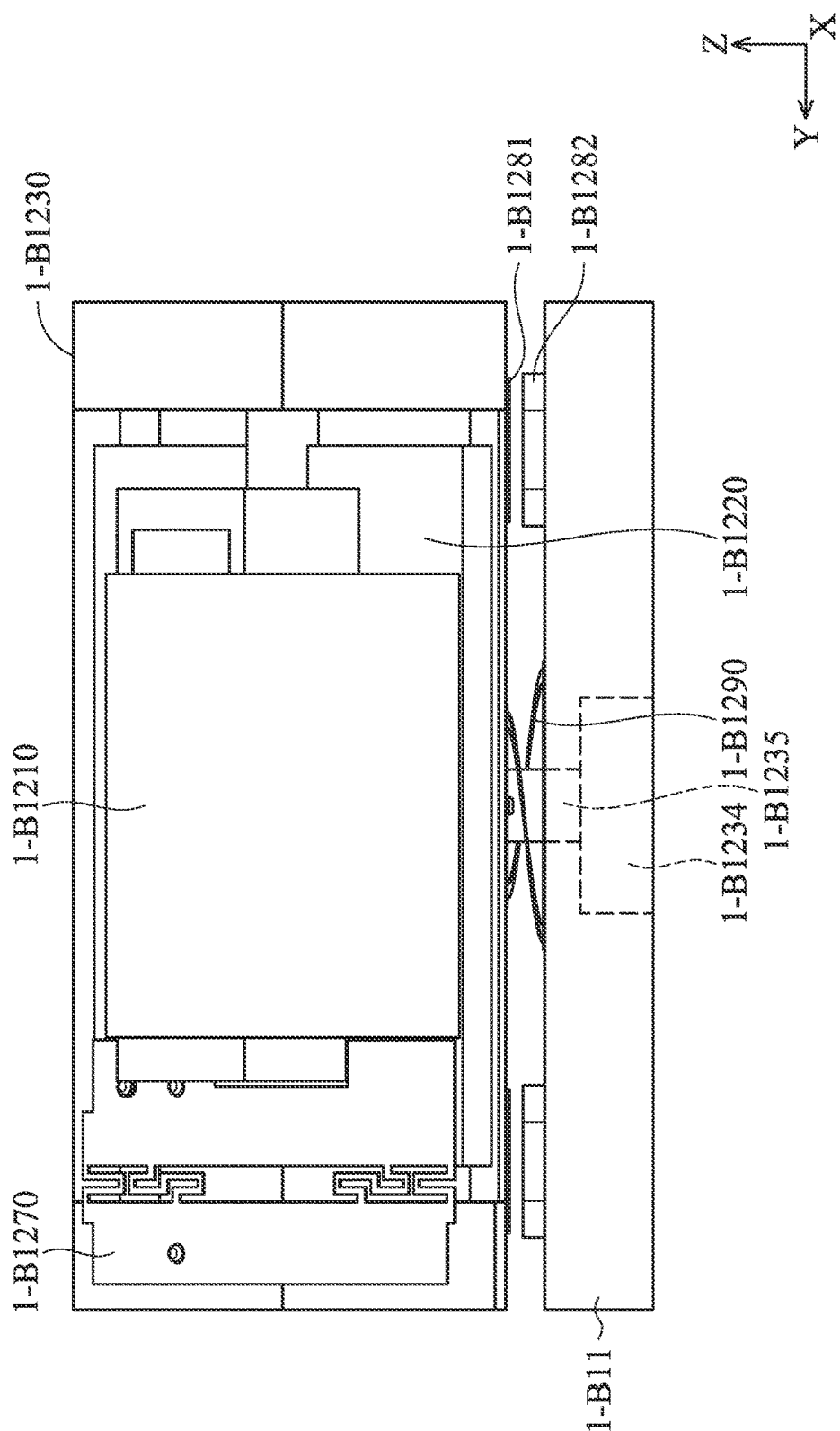
FIG. 14 is a front view of the reflecting unit according to another embodiment of the disclosure.

Referring to FIGS. 13 and 14, in another embodiment of the disclosure, the second steady member 1-B1290 is a flat coil spring connected to the frame 1-B1230 and the housing 1-B11. Furthermore, the first guiding assembly 1-B1232 and the second guiding assembly 1-B12 can be replaced by a second bearing member 1-B1234 and a second hinge 1-B1235. The second bearing member 1-B1234 is disposed on the housing 1-B11, the second hinge 1-B1235 passes through the hole at the center of the second bearing member 1-B1234, and the optical member holder 1-B1220 is affixed to the second hinge 1-B1235.

The second bearing member 1-B1234 is disposed on the second rotation axis 1-R2 and extended along the second rotation axis 1-R2. Therefore, it can ensure that the optical member holder 1-B1220 rotates around the second rotation axis 1-R2 when the second driving module 1-B1280 drives the optical member holder 1-B1220 rotates relative to the housing 1-B11. In some embodiments, the second bearing member 1-B1234 can be disposed on the optical member holder 1-B1220, and an end of the second hinge 1-B1235 is affixed to the housing 1-B11.

Figure 15:
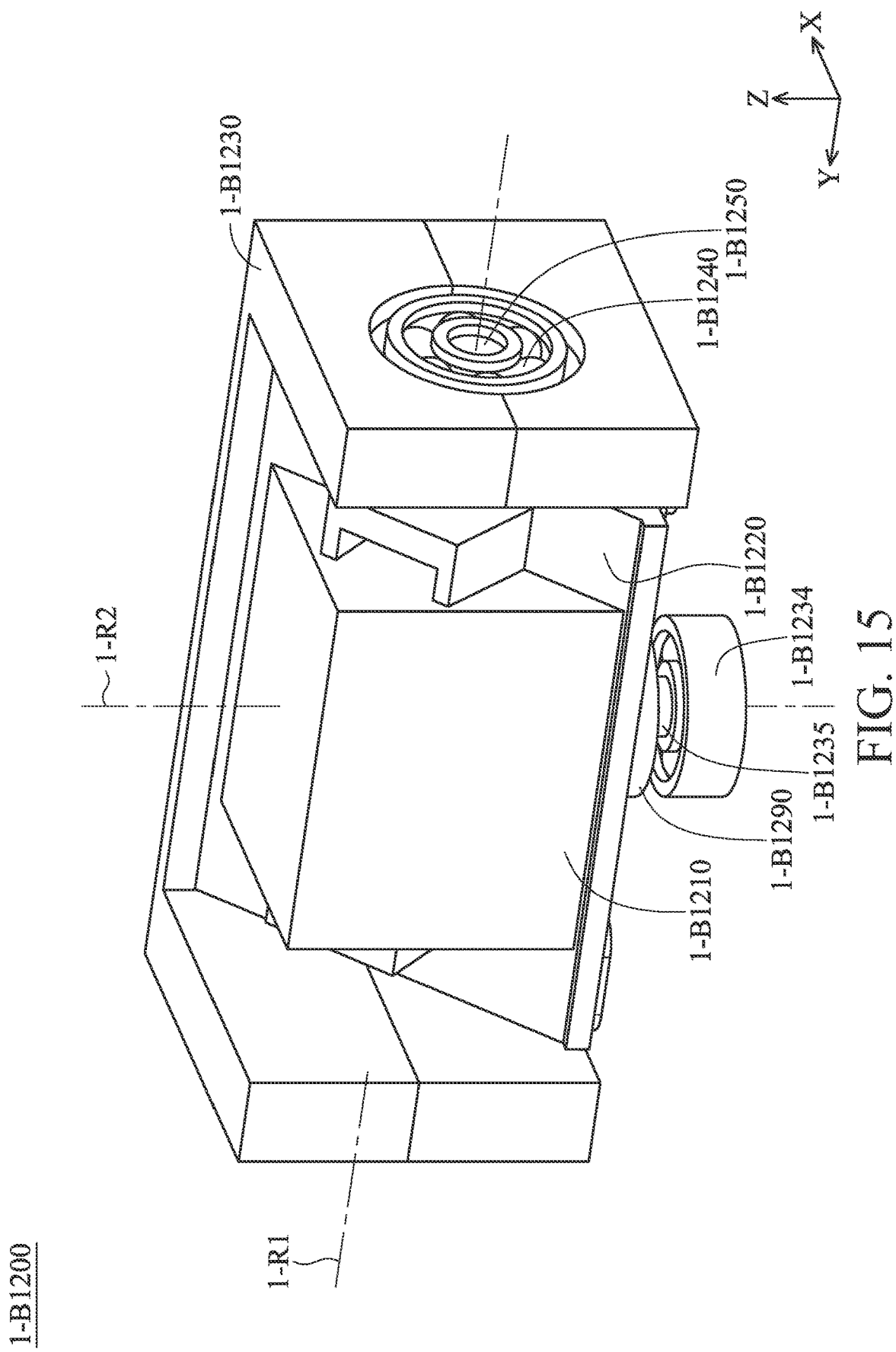
FIG. 15 is a schematic diagram of a reflecting unit according to another embodiment of the disclosure.
Figure 16:
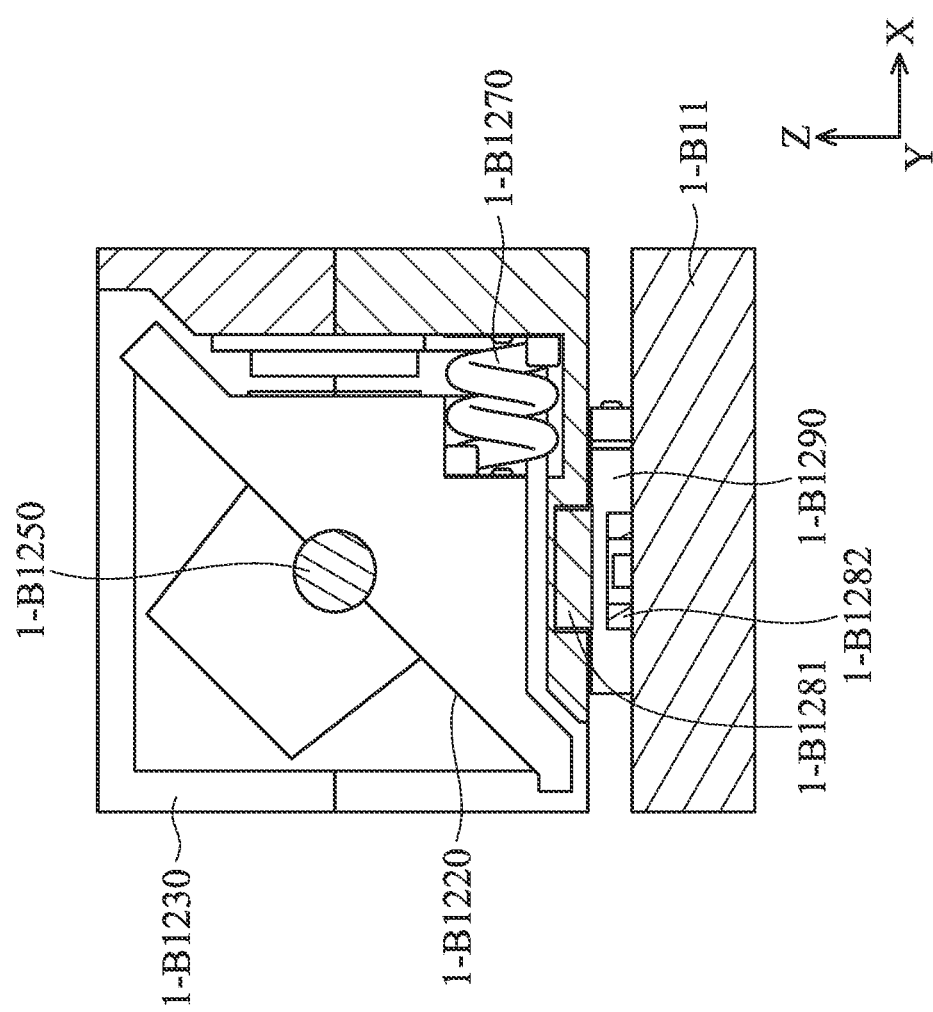
FIG. 16 is a cross-sectional view of the reflecting unit according to another embodiment of the disclosure.

Referring to FIGS. 15 and 16, in another embodiment of the disclosure, the second steady member 1-B1290 is a torsion spring connected to the frame 1-B1230 and the housing 1-B11, and the first steady member 1-B1270 is a helical spring connected to the frame 1-B1230 and the optical member holder 1-B1220.

Figure 17:
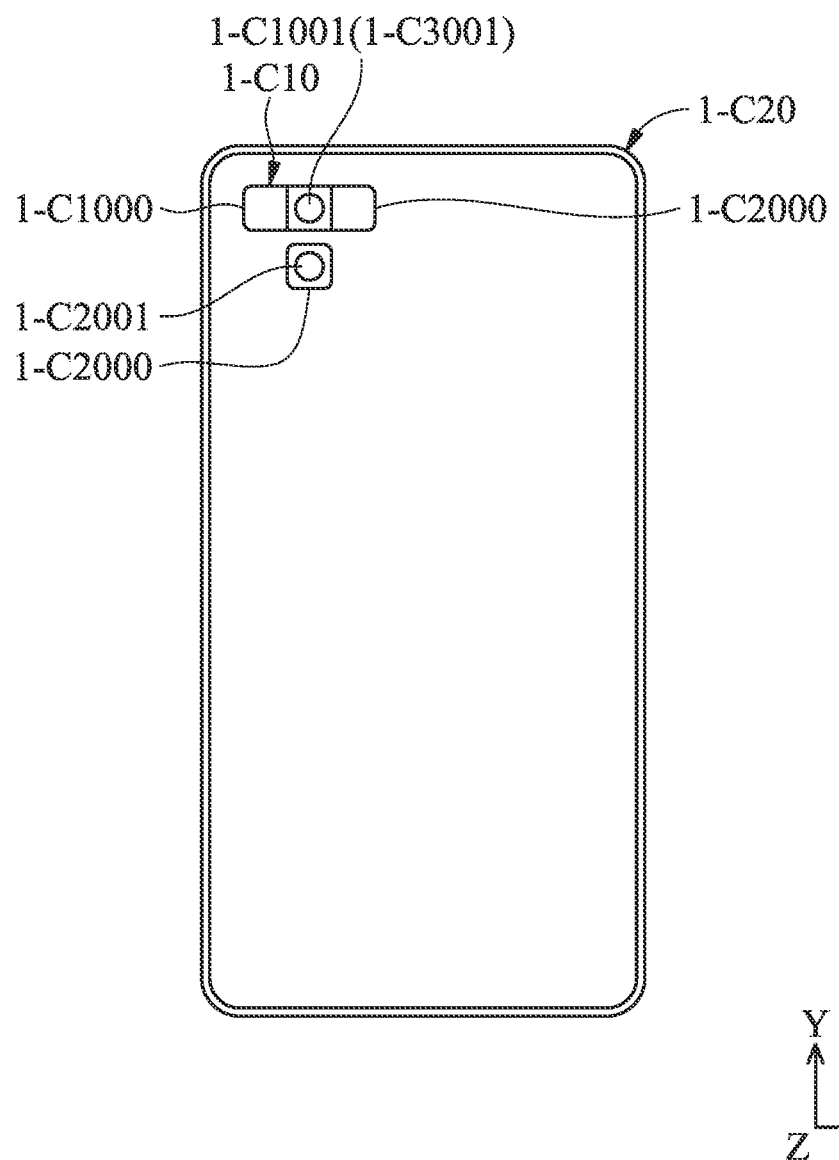
FIG. 17 is a schematic diagram of an electronic device according to another embodiment of the disclosure.
Figure 18:
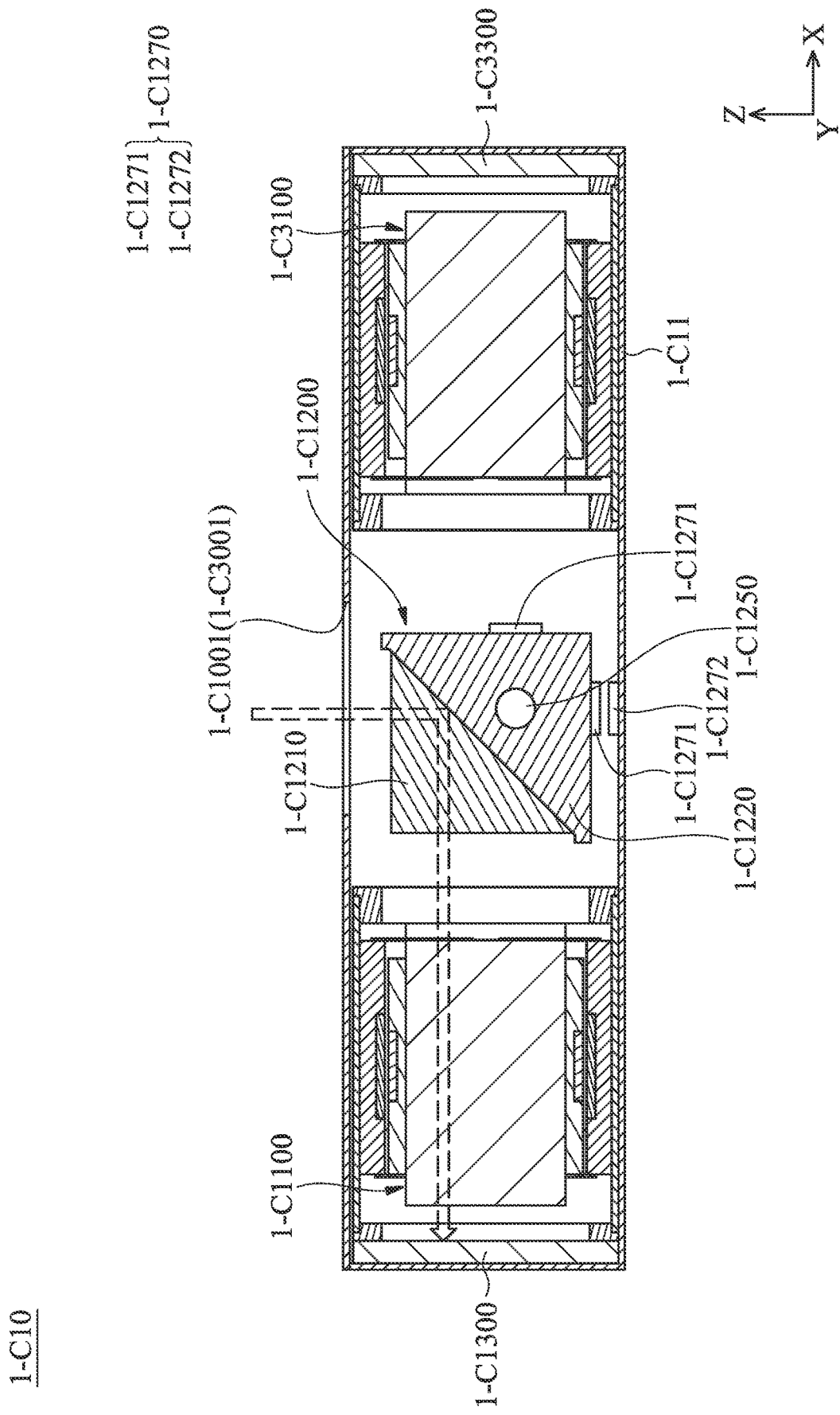
FIG. 18 is a schematic diagram of an optical member in a first angle according to another embodiment of the disclosure.
Figure 19:
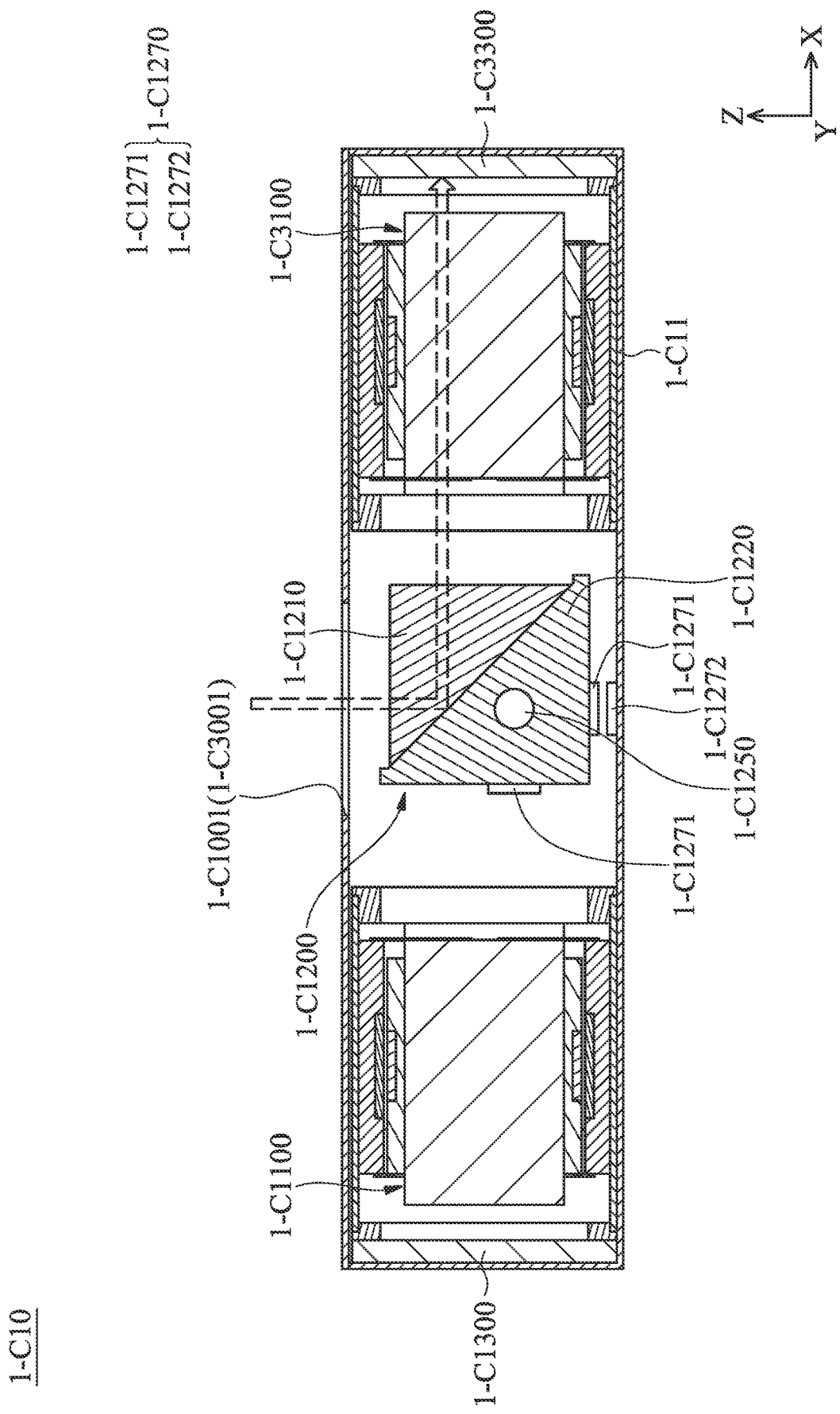
FIG. 19 is a schematic diagram of the optical member in a second angle according to another embodiment of the disclosure.

Referring to FIGS. 17 to 19, in another embodiment of the disclosure, an optical system 1-C10 can be disposed in an electronic device 1-C20, and comprise a first optical module 1-C1000, a second optical module 1-C2000, and a third optical module 1-C3000. The structure of the second optical module 1-C2000 is similar to the structure of the first optical module 1-A1000 in the optical system 1-A10, and the first optical module 1-C1000 and the third optical module 1-C3000 can respectively comprise lens units 1-C1100 and 1-C3100 and the image sensors 1-C1300 and 1-C3300, wherein the lens units 1-C1100 and 1-C3100 are the same as the lens unit 1-B1100, and the image sensors 1-C1300 and 1-C3300 are the same as the image sensor 1-B1300. The features thereof are not repeated in the interest of brevity.

A first light-entering hole 1-C1001 of the first optical module 1-C1000 and a third light-entering hole 1-C3001 of the third optical module 1-C3000 can be integrally formed, and adjacent to a second light-entering hole 1-C2001 of the second optical module 1-C2000. A reflecting unit 1-C1200 can be used by the first optical module 1-C1000 and the third optical module 1-C3000, wherein an external light can be reflected to the lens unit 1-C1100 of the first optical module 1-C1000 or the lens unit 1-C3100 of the third optical module 1-C3000 by the reflecting unit 1-C1200.

Figure 20:
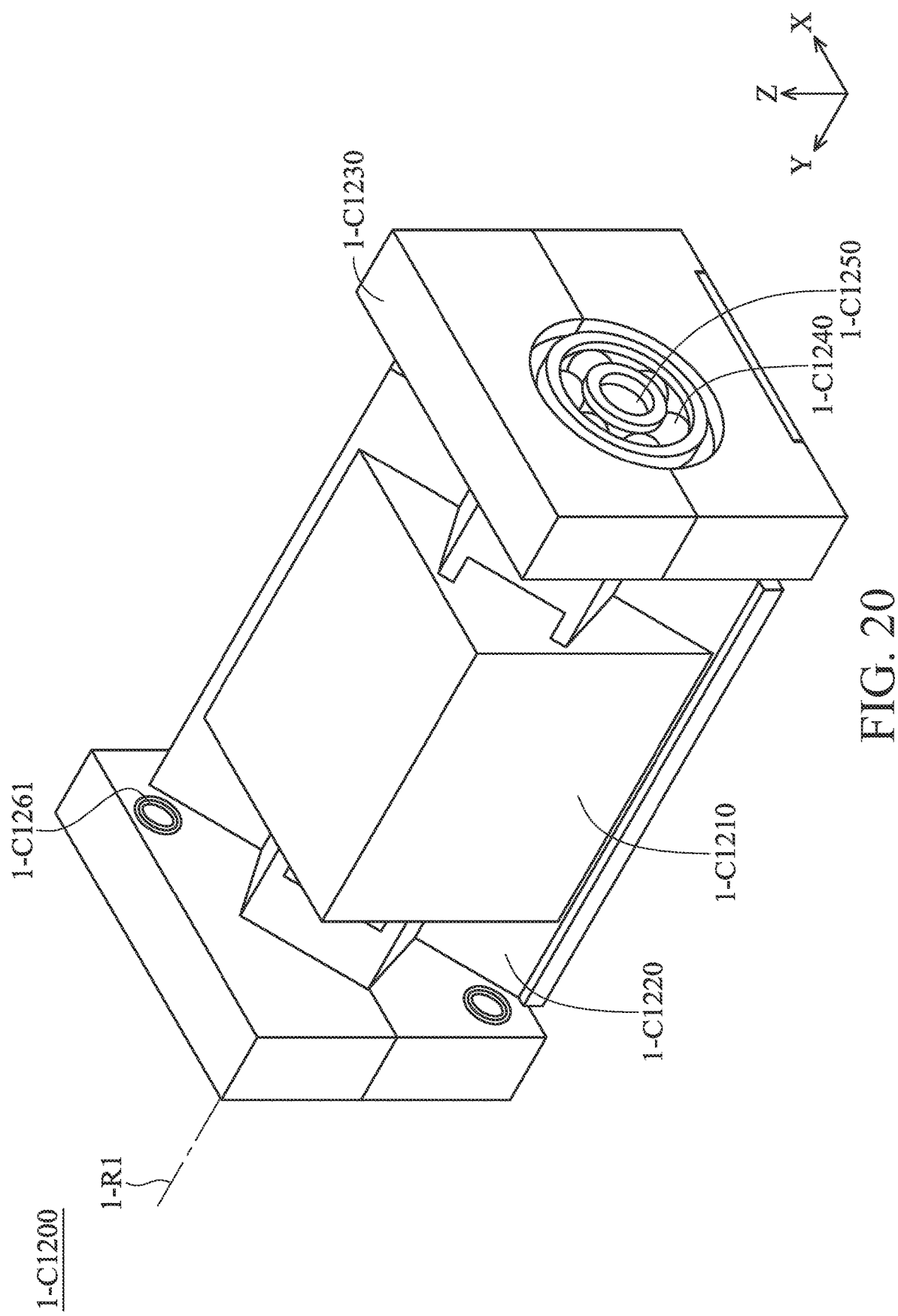
FIG. 20 is a schematic diagram of a reflecting unit according to another embodiment of the disclosure.
Figure 21:
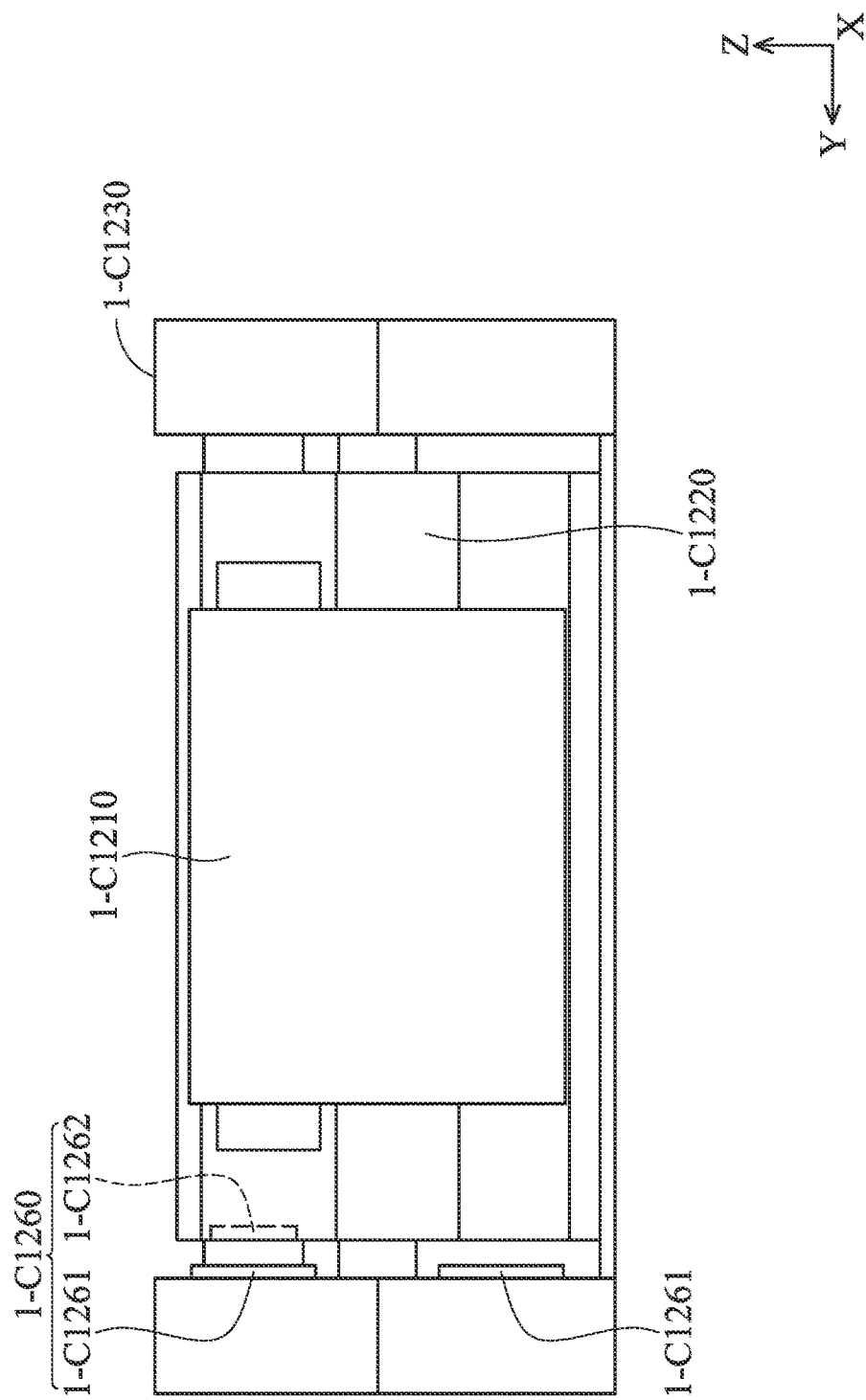
FIG. 21 is a front view of the reflecting unit according to another embodiment of the disclosure.

As shown in FIGS. 20 and 21, the reflecting unit 1-C1200 comprises an optical member 1-C1210, an optical member holder 1-C1220, a frame 1-C1230, at least one first bearing member 1-C1240, at least one first hinge 1-C1250, and a first driving module 1-C1260.

The first bearing member 1-C1240 is disposed on the frame 1-C1230, the first hinge 1-C1250 can pass through the hole at the center of the first bearing member 1-C1240, and the optical member holder 1-C1220 can be affixed to the first hinge 1-C1250. Therefore, the optical member holder 1-C1220 can be pivotally connected to the frame 1-C1230 via the first hinge 1-C1250. Since the optical member 1-C1210 is disposed on the optical member holder 1-C1220, when the optical member holder 1-C1220 rotates relative to the frame 1-C1230, the optical member 1-C1210 disposed thereon also rotates relative to the frame 1-C1230. The optical member 1-C1210 can be a prism or a reflecting mirror.

The first driving module 1-C1260 comprises at least one first electromagnetic driving assembly 1-C1261 and at least one second electromagnetic driving assembly 1-C1262, respectively disposed on the frame 1-C1230 and the optical member holder 1-C 1220.

For example, the first electromagnetic driving assembly 1-C1261 can comprise a driving coil, and the second electromagnetic driving assembly 1-C1262 can comprise a magnet. When a current flows through the driving coil (the first electromagnetic driving assembly 1-C1261), an electromagnetic effect is generated between the driving coil and the magnet. Thus, the optical member holder 1-C1220 and the optical member 1-C1210 can be driven to rotate relative to the frame 1-C1230 around a first rotation axis 1-R1 (extending along the Y-axis).

It should be noted that, in this embodiment, the first driving module 1-C1260 can drive the optical member holder 1-C1220 and the optical member 1-C1210 to rotate relative to the frame 1-C1230 more than 90 degrees. Therefore, the external light entering the optical system 1-C10 from the first and third light-entering holes 1-C1001 and 1-C3001 can be reflected to the lens unit 1-C1100 of the first optical module 1-C1000 or the lens unit 1-C3100 of the third optical module 1-C3000 according to the angle of the optical member 1-C1210.

As shown in FIGS. 18 and 19, in this embodiment, the reflecting unit 1-C1200 further comprises a first steady member 1-C1270 comprising two first magnetic members 1-C1271 and a second magnetic member 1-C1272. Two first magnetic members 1-C1271 are respectively disposed on the different surfaces of the optical member holder 1-C1220, and the second magnetic member 1-C1272 is disposed on the housing 1-C11 of the optical system 1-C10 or the frame 1-C1230.

When the optical member 1-C1210 is in a first angle (FIG. 18), one of the first magnetic members 1-C1271 is adjacent to the second magnetic member 1-C1272, and the optical member holder 1-C1220 and the optical member 1-C1210 is affixed relative to the frame 1-C1230, the external light can be reflected by the optical member 1-C1210 and reach the image sensor 1-C1300. When the optical member 1-C1210 is driven by the first driving module 1-C1260 and rotates from the first angle to a second angle (FIG. 19), the other first magnetic member 1-C1271 is adjacent to the second magnetic member 1-C1272, and the optical member holder 1-C1220 and the optical member 1-C1210 is affixed relative to the frame 1-C1230, the external light can be reflected by the optical member 1-C1210 and reach the image sensor 1-C3300.

Figure 22:
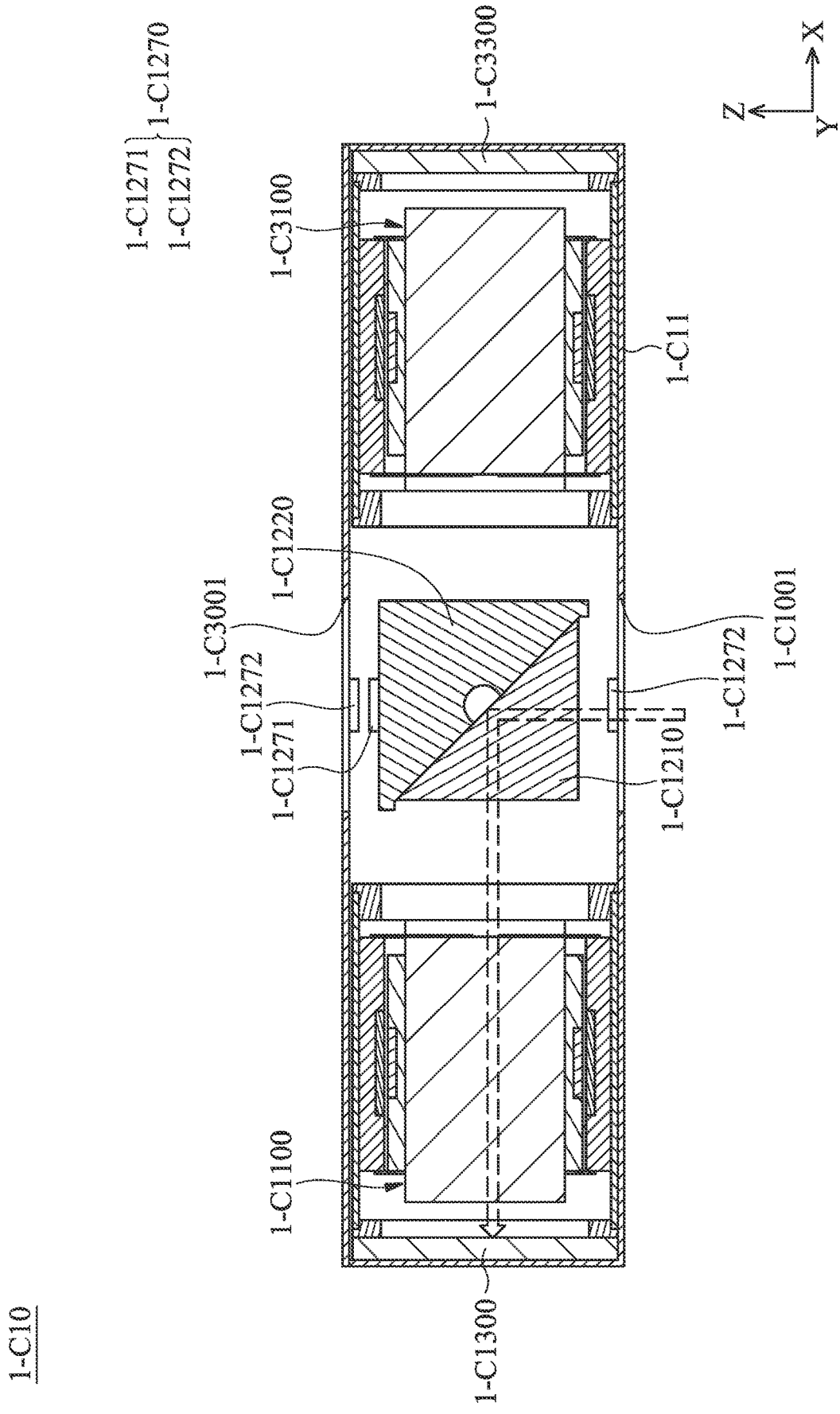
FIG. 22 is a schematic diagram of an optical member in a first angle according to another embodiment of the disclosure.
Figure 23:
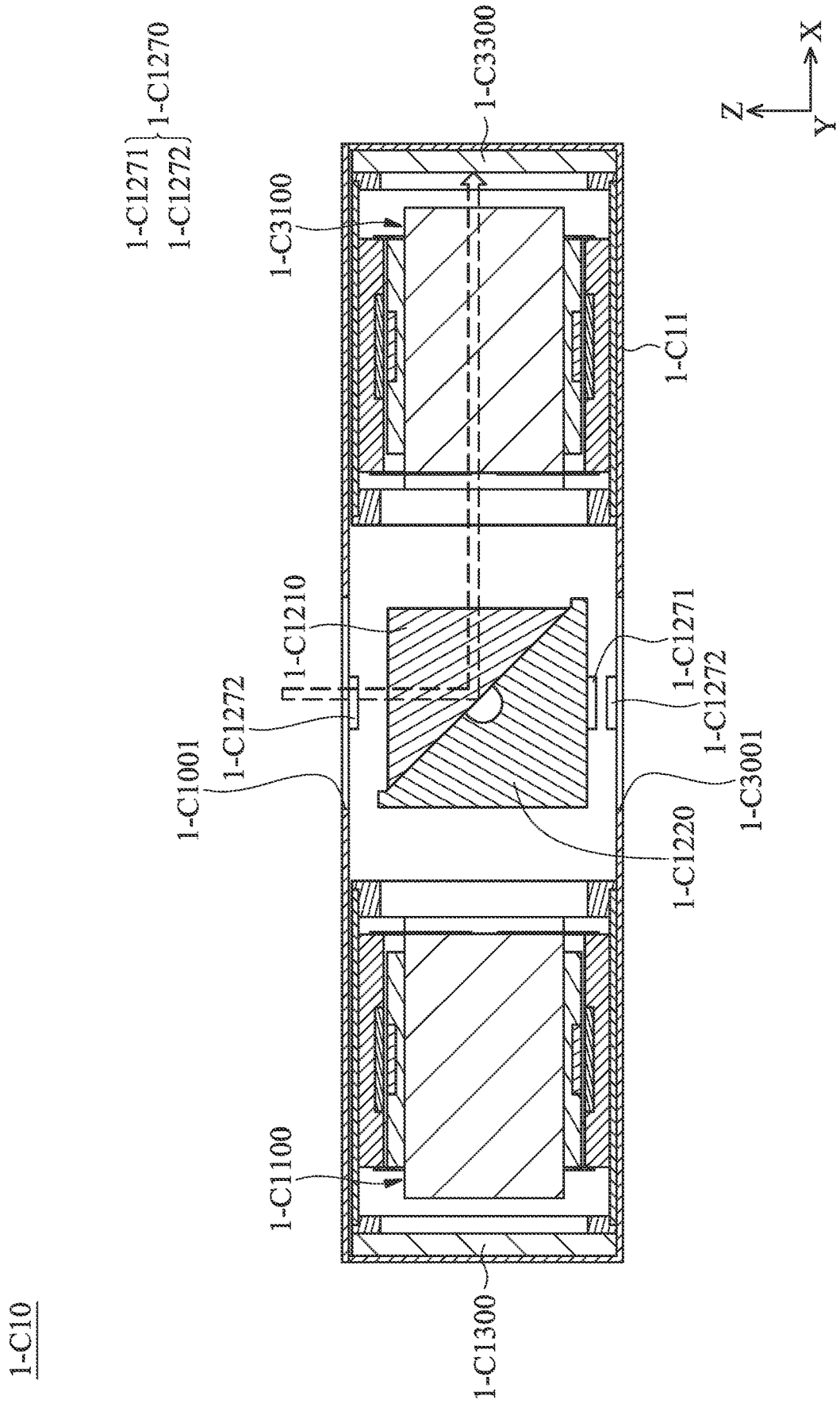
FIG. 23 is a schematic diagram of the optical member in a second angle according to another embodiment of the disclosure.

Referring to FIGS. 22 and 23, in another embodiment of the disclosure, the first light-entering hole 1-C1001 and the third light-entering hole 1-C3001 are respectively formed on the opposite surfaces of the optical system 1-C10. The first steady member 1-C1270 comprises a first magnetic member 1-C1271 and two second magnetic members 1-C1272. The first magnetic member 1-C1271 is disposed on the optical member holder 1-C1220, and the second magnetic members 1-C1272 are disposed on the housing 1-C11 of the optical system 1-C10 or the frame 1-C1230. The optical member holder 1-C1220 and the optical member 1-C1210 is disposed between two second magnetic members 1-C1272.

When the optical member 1-C1210 is in a first angle (FIG. 22), the first magnetic member 1-C1271 is adjacent to one of the second magnetic members 1-C1272, and the optical member holder 1-C1220 and the optical member 1-C1210 is affixed relative to the frame 1-C1230, the external light can be reflected by the optical member 1-C1210 and reach the image sensor 1-C1300. When the optical member 1-C1210 is driven by the first driving module 1-C1260 and rotates from the first angle to a second angle (FIG. 23), the first magnetic member 1-C1271 is adjacent to the other second magnetic member 1-C1272, and the optical member holder 1-C1220 and the optical member 1-C1210 is affixed relative to the frame 1-C1230, the external light can be reflected by the optical member 1-C1210 and reach the image sensor 1-C3300.

Figure 24:
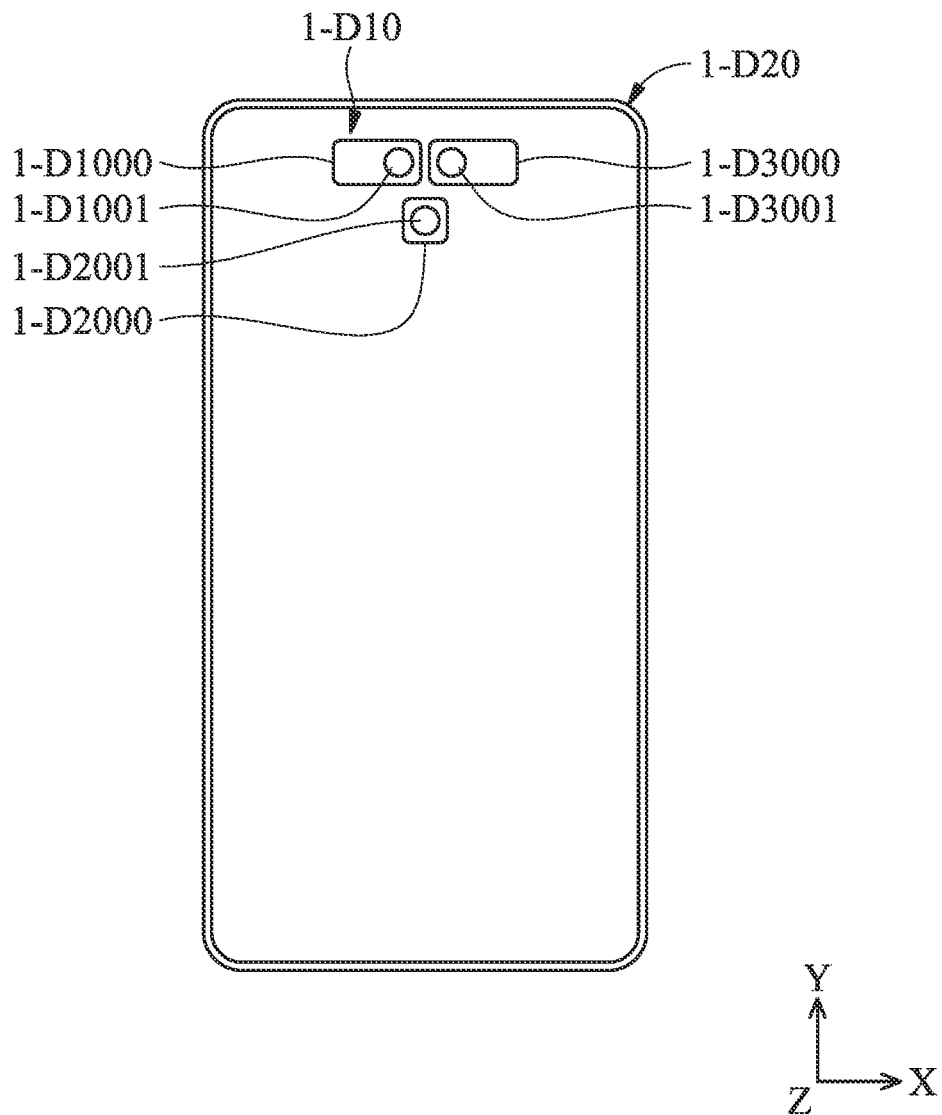
FIG. 24 is a schematic diagram of an electronic device according to another embodiment of the disclosure.
Figure 25:
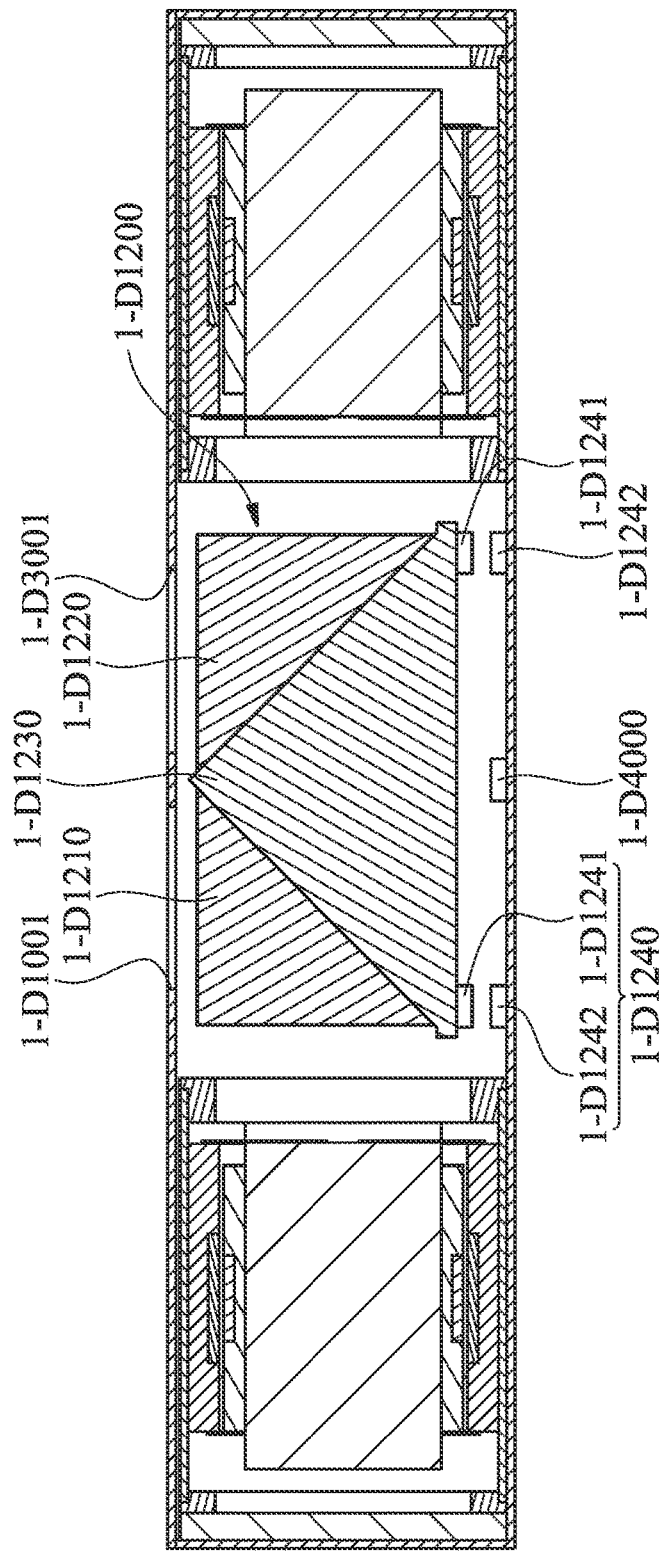
FIG. 25 is a schematic diagram of a first optical module, a third optical module, and a reflecting unit according to another embodiment of the disclosure.

Referring to FIGS. 24 and 25, in another embodiment of the disclosure, an optical system 1-D10 can be disposed in an electronic device 1-D20, and comprise a first optical module 1-D1000, a second optical module 1-D2000, and a third optical module 1-D3000. The structure of the second optical module 1-D2000 is similar to the structure of the first optical module 1-A1000 in the optical system 1-A10, and the first optical module 1-D1000 and the third optical module 1-D3000 can respectively comprise lens units 1-D1100 and 1-D3100 and the image sensors 1-D1300 and 1-D3300, wherein the lens units 1-D1100 and 1-D3100 are the same as the lens unit 1-B1100, and the image sensors 1-D1300 and 1-D3300 are the same as the image sensor 1-B1300. The features thereof are not repeated in the interest of brevity.

A reflecting unit 1-D1200 can be used by the first optical module 1-D1000 and the third optical module 1-D3000. The reflecting unit 1-D1200 comprises two optical members 1-D1210 and 1-D1220 and an optical member holder 1-D1230. The optical members 1-D1210 and 1-D1220 are disposed on the optical member holder 1-D1230, and respectively corresponds to a first light-entering hole 1-D1001 of the first optical module 1-D1000 and a third light-entering hole 1-D3001 of the third optical module 1-D3000. Therefore, the external light entering the optical system 1-D10 from the first light-entering hole 1-D1001 can be reflected by the optical member 1-D1210 and move along the −X-axis (the first direction), and another external light entering the optical system 1-D10 from the third light-entering hole 1-D3001 can be reflected by the optical member 1-D1220 and move along the X-axis (the second direction).

Referring to FIGS. 24 and 25, in this embodiment, the reflecting unit 1-D1200 further comprises a correction driving module 1-D1240, and the optical system 1-D10 further comprises an inertia detecting module 1-D4000. The correction driving module 1-D1240 comprises electromagnetic driving assemblies 1-D1241 and 1-D1242, respectively disposed on the optical member holder 1-D1230 and the case of the reflecting unit 1-D1200. The correction driving module 1-D1240 is used to drive the optical member holder 1-D1230 to rotate. For example, the electromagnetic driving assembly 1-D1241 can be a magnet, and the electromagnetic driving assembly 1-D1242 can be a driving coil. When a current flows through the driving coil (the electromagnetic driving assembly 1-D1242), an electromagnetic effect is generated between the driving coil and the magnet. Thus, the optical member holder 1-D1230 and the optical members 1-D1241 and 1-D1242 disposed thereon can be simultaneously driven to rotate.

The inertia detecting module 1-D4000 can be a gyroscope or an acceleration detector, and electrically connected to the correction driving module 1-D1240. After the inertia detecting module 1-D4000 measures the gravity state or the acceleration state of the optical system 1-D10, it can transmit the measure result to the correction driving module 1-D1240. The correction driving module 1-D1240 can provide a suitable current to the driving assembly 1-D1242 according to the measure result, so as to drive the optical members 1-D1210 and 1-D1220 to rotate.

The refractive indexes of the optical members 1-D1210 and 1-D1220 are greater than the refractive index of the air. In this embodiment, the optical members 1-D1210 and 1-D1220 are prisms. In some embodiments, the optical member 1-D1210 and/or the optical member 1-D1220 are/is reflecting mirror(s).

Figure 26:
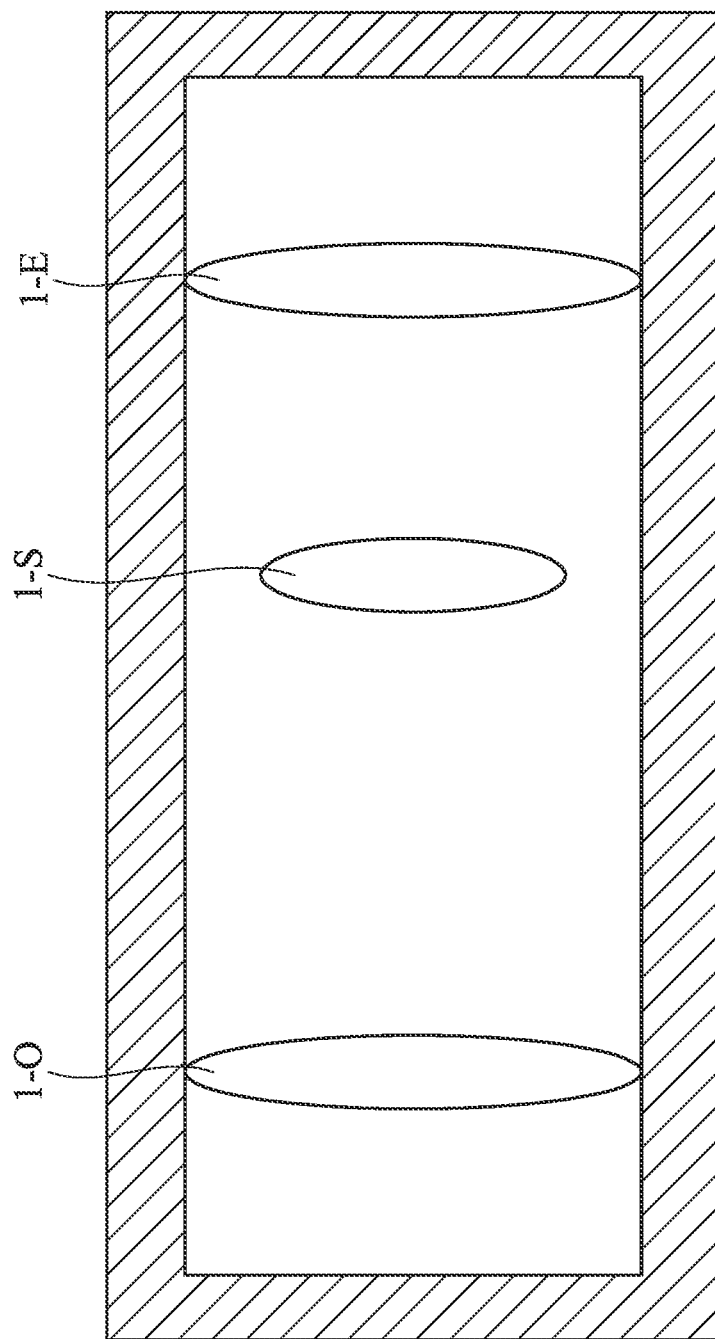
FIG. 26 is a schematic diagram of a lens unit according to some embodiments of the disclosure.

In some embodiments, the lens unit in the aforementioned embodiments can comprise a zoom lens, and the optical module will become a zoom module. For example, as shown in FIG. 26, the lens unit can comprises an objective lens 1-O, an eyepiece lens 1-E, and at least one optical lens 1-S, wherein the optical lens 1-S is disposed between the objective lens 1-O and the eyepiece lens 1-E, and is movable relative to the objective lens 1-O.

In summary, a reflecting unit is provided, including an optical member holder, an optical member, a frame, a first bearing member, a first hinge, and a first driving module. The optical member is disposed on the optical member holder. The first bearing member is disposed on the frame or the optical member holder. The first hinge is pivotally connected to the optical member holder and the frame. The first driving module can drive the optical member holder to rotate relative to the frame. When the optical member holder rotates relative to the frame, the first hinge rotates relative to the optical member holder or the frame via the first bearing member.

Second Group of Embodiments

Figure 27:
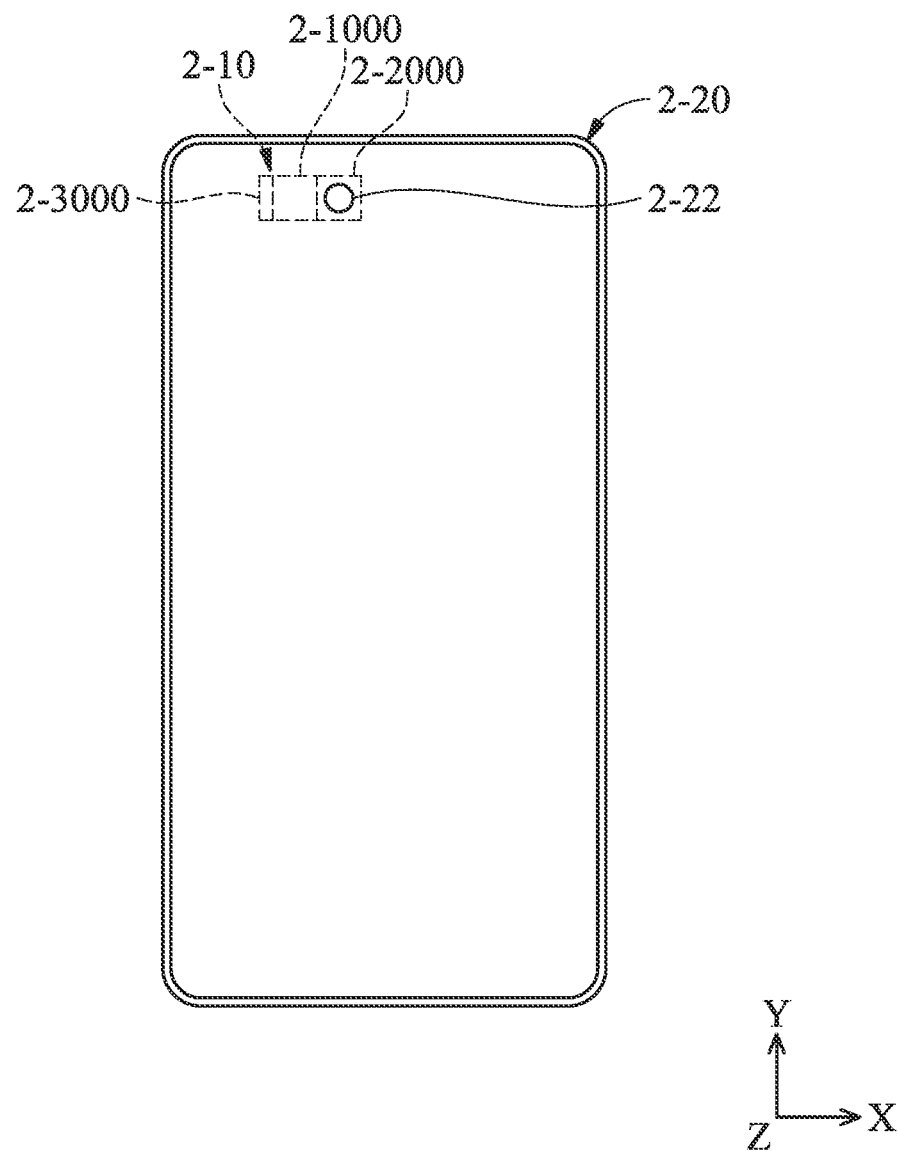
FIG. 27 is a schematic diagram of an electronic device according to an embodiment of the disclosure.

Referring to FIG. 27, in an embodiment of the disclosure, an optical system 2-10 can be disposed in an electronic device 2-20 and used to take photographs or record video. The electronic device 2-20 can be a smartphone or a digital camera, for example. When taking photographs or recording video, the optical system 2-10 can receive light and form an image, wherein the image can be transmitted to a processor (not shown) in the electronic device 2-20, where post-processing of the image can be performed.

Figure 28:
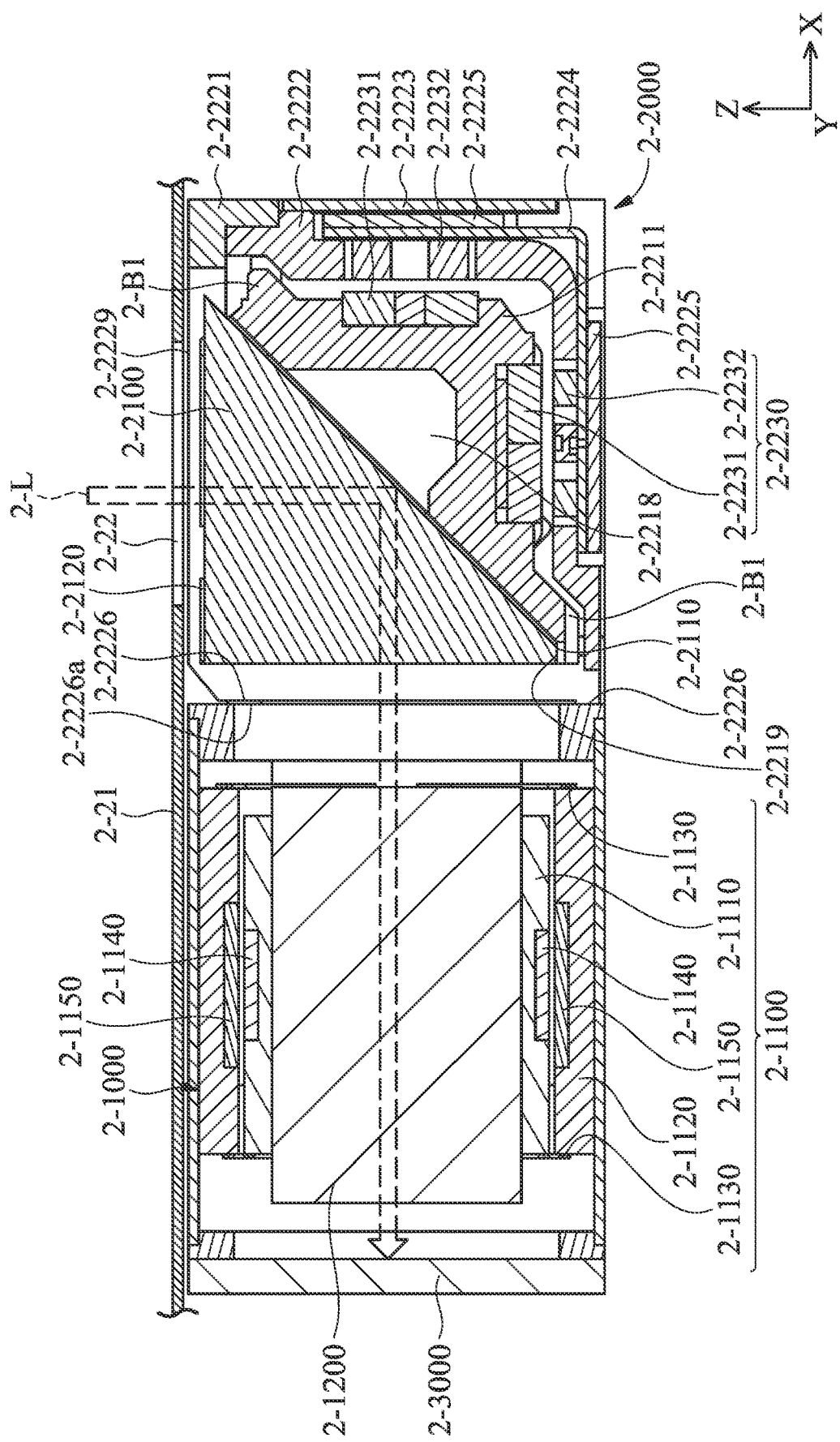
FIG. 28 is a schematic diagram of an optical system according to an embodiment of the disclosure.

Referring to FIG. 28, the optical system 2-10 comprises a lens unit 2-1000, a reflecting unit 2-2000, and an image sensor 2-3000, wherein the lens unit 2-1000 is disposed between the reflecting unit 2-2000 and the image sensor 2-3000, and the reflecting unit 2-2000 is disposed beside an opening 2-22 on an case 2-21 of the electronic device 2-20.

The external light 2-L can enter the optical system 2-10 through the opening 2-22 along a first direction (the Z-axis), and be reflected by the reflecting unit 2-2000. The reflected external light 2-L moves along a second direction (the −X-axis), passes through the lens unit 2-1000 and reaches the image sensor 2-3000. In other words, the reflecting unit 2-2000 can change the moving direction of the external light 2-L from the first direction to the second direction.

As shown in FIG. 28, the lens unit 2-1000 primarily comprises a lens driving mechanism 2-1100 and a lens 2-1200, wherein the lens driving mechanism 2-1100 is used to drive the lens 2-1200 to move relative to the image sensor 2-3000. For example, the lens driving mechanism 2-1100 can comprise a lens holder 2-1110, a frame 2-1120, two spring sheets 2-1130, at least one coil 2-1140, and at least one magnetic member 2-1150.

The lens 2-1200 is affixed to the lens holder 2-1110. Two spring sheets 2-1130 are connected to the lens holder 2-1110 and the frame 2-1120, and respectively disposed on opposite sides of the lens holder 2-1110. Thus, the lens holder 2-1110 can be movably hung in the frame 2-1120. The coil 2-1140 and the magnetic member 2-1150 are respectively disposed on the lens holder 2-1110 and the frame 2-1120, and correspond to each other.

When current flows through the coil 2-1140, an electromagnetic effect is generated between the coil 2-1140 and the magnetic member 2-1150, and the lens holder 2-1110 and the lens 2-1200 disposed thereon can be driven to move relative to the image sensor 2-3000, so as to achieve the purpose of auto focus.

Figure 29:
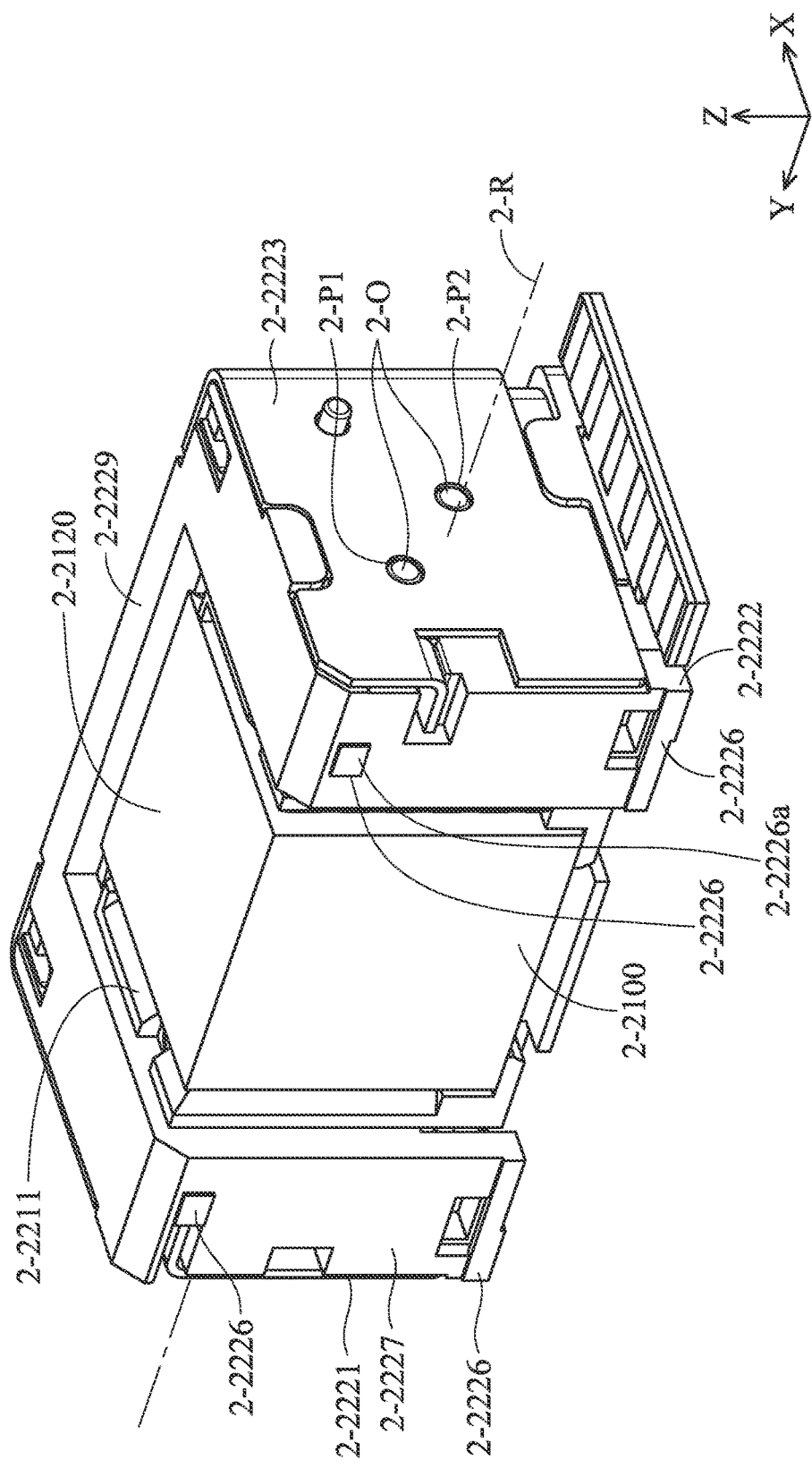
FIG. 29 is a schematic diagram of a reflecting unit according to an embodiment of the disclosure.
Figure 30:
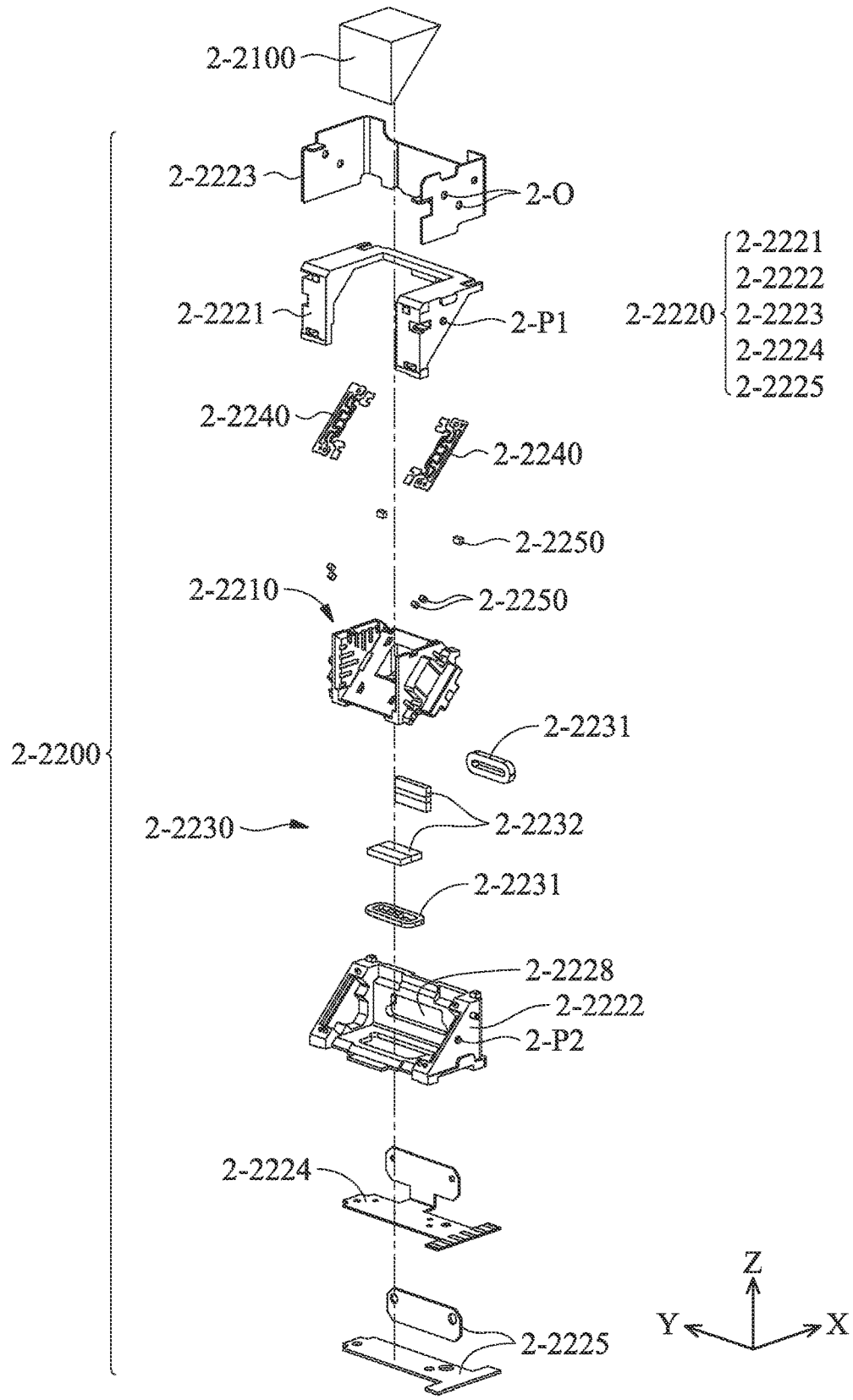
FIG. 30 is an exploded-view diagram of the reflecting unit according to an embodiment of the disclosure.

FIG. 29 is a schematic diagram of the reflecting unit 2-2000 in this embodiment, and FIG. 30 is an exploded-view diagram thereof. Referring to FIGS. 28 to 30, the reflecting unit 2-2000 primarily comprises an optical member 2-2100 and an optical member driving mechanism 2-2200, wherein the optical member driving mechanism 2-2200 comprises a movable portion 2-2210, a fixed portion 2-2220, a driving module 2-2230, a plurality of elastic members 2-2240, and a plurality of damping members 2-2250.

Figure 31:
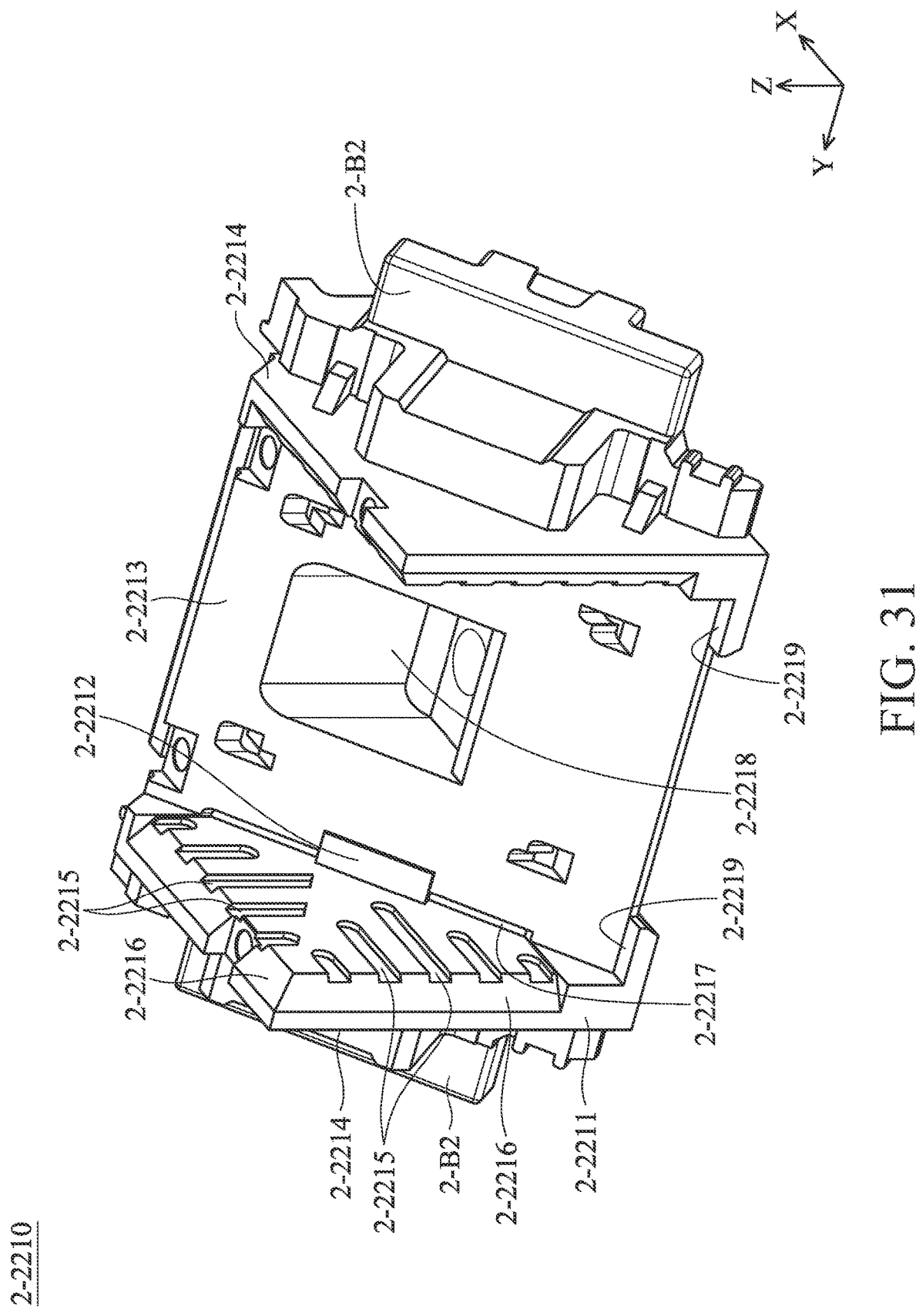
FIG. 31 is a schematic diagram of an optical member holder according to an embodiment of the disclosure.
Figure 32:
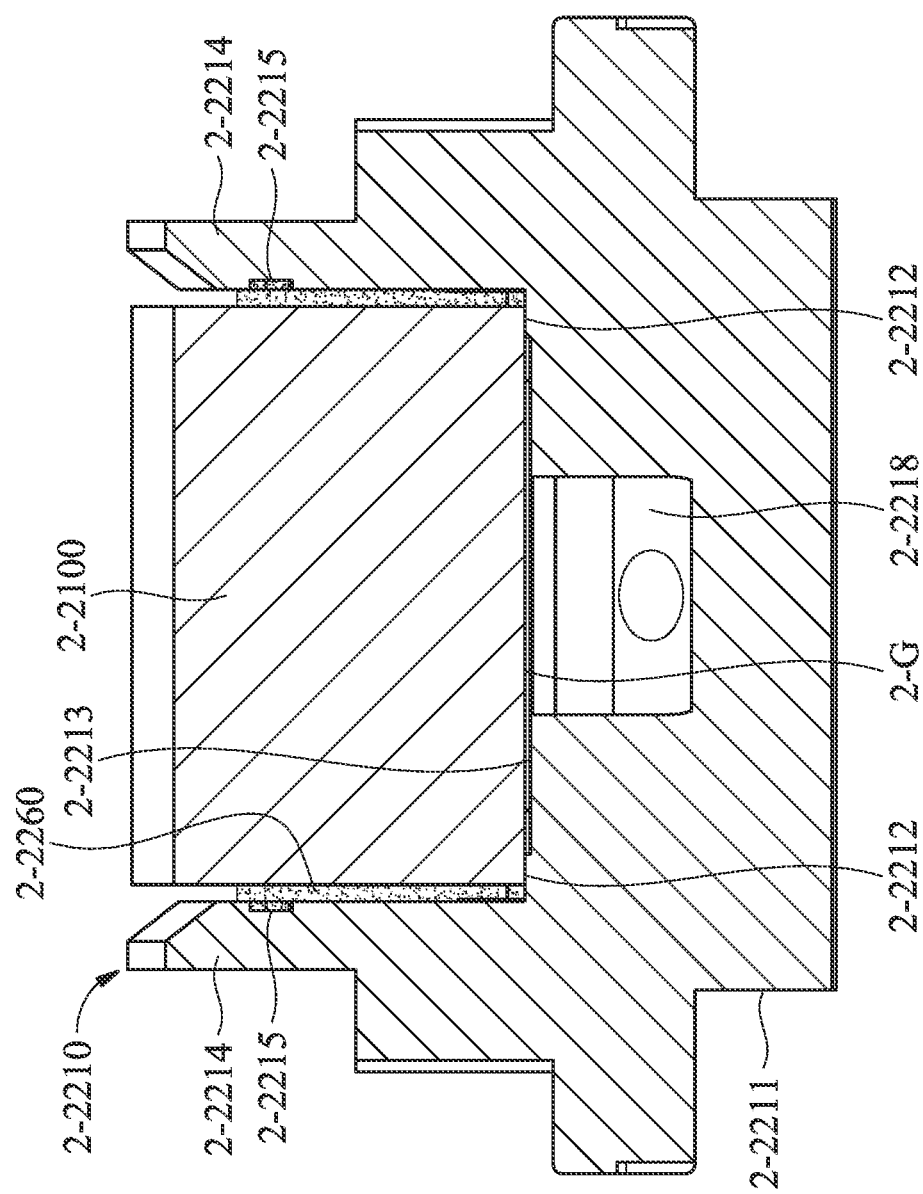
FIG. 32 is a schematic diagram of an optical member disposed on the optical member holder according to an embodiment of the disclosure.

Referring to FIGS. 31 and 32, the movable portion 2-2210 comprises an optical member holder 2-2211 and a plurality of spacing members 2-2212. The spacing members 2-2212 are disposed on a surface 2-2213 of the optical member holder 2-2211, and the optical member 2-2100 is disposed on the spacing members 2-2212.

When the optical member 2-2100 is disposed on the spacing members 2-2212, the surface 2-2213 of the optical holder 2-2211 faces the optical member 2-2100, and a gap 2-G can be formed between the optical member 2-2100 and the surface 2-2213 due to the spacing members 2-2212.

Air can be filled in the gap 2-G. Otherwise, the user can fill a resin in the gap 2-G, wherein the refractive index of the aforementioned resin is less than that of the optical member 2-1000. Therefore, the materials on the opposite sides of the reflecting interface of the optical member 2-1000 can be maintained, and the reflectance of the optical member 2-2100 can be effectively enhanced (if the optical member 2-2100 directly contacts the optical member holder 2-2211, the occurrence of the total internal reflection is usually affected due to the surface which is not totally flat).

In this embodiment, the spacing members 2-2212 are symmetrically disposed on the edge of the surface 2-2213 of the optical member holder 2-2211, and the optical member holder 2-2211 and the spacing members 2-2211 are integrally formed in one piece.

The optical member holder 2-2211 can further comprise at least one attaching wall 2-2214 connected to the surface 2-2213, wherein the normal direction of the attaching wall 2-2214 is different from the normal direction of the surface 2-113. At least one groove 2-2215 is formed on the surface of the attaching wall 2-2214 facing the optical member 2-2100, and the groove 2-2215 is extended to a lateral side 2-2216 of the attaching wall 2-2214. After the optical member 22100 is disposed on the spacing members 2-2212, the user can fill an adhesive member 2-2260 (such as glue) into the groove 2-2215. The adhesive member 2-2260 can be spread to the position between the attaching wall 2-2214 and the optical member 2-2100 and contact the optical member 2-2100. Thus, the optical member 2-2100 can be affixed to the optical member holder 2-2211.

In this embodiment, a glue slot 2-2217 and a depression portion 2-2218 are further formed on the surface 2-2213 of the optical member holder 2-2211. The glue slot 2-2217 is adjacent to the attaching wall 2-2214, therefore, the redundant adhesive member 2-2260 can be accommodated in the glue slot 2-2217 and will not enter the position between the optical member 2-2100 and the surface 2-2213. The position of the depression portion 2-2218 is corresponded to the optical member 2-2100, such that the weight of the optical member holder 2-2211 can be reduced without affecting the reflectance.

Furthermore, as shown in FIGS. 28 and 31, the optical member holder 2-2211 further comprises a abutting surface 2-2219, connected to the surface 2-2213 and facing a cutting surface 2-2110 of the optical member 2-2100. The abutting surface 2-2219 and the cutting surface 2-2110 can be used to position the optical member 2-2100. It should be noted that, the abutting surface 2-2219 is substantially parallel to the cutting surface 2-2110, and is not parallel to the surface 2-2213 and the spacing members 2-2212.

Referring to FIGS. 28 to 30, the fixed portion 2-2220 comprises a frame 2-2221, a base 2-2222, a cover 2-2223, a circuit board 2-2224, and at least one toughened component 2-2225. The frame 2-2221 and the base 2-2222 can be joined together, and protrusions 2-P1 and 2-P2 can be respectively formed on the frame 2-2221 and the base 2-2222. The cover 2-2223 has a plurality of holes 2-O corresponding to the protrusions 2-P1 and 2-P2. Therefore, the frame 2-2221 and the base 2-2222 can be affixed to each other by passing the protrusions 2-P1 and 2-P2 through the holes 2-O.

In this embodiment, the fixed portion 2-2220 further comprises a plurality of (at least three) extending portions 2-2226 protruding from a lateral surface 2-2227 of the frame 2-2221. Each of the extending portions 2-2226 has a contacting surface 2-2226a. The contacting surfaces 2-2226a of the extending portions 2-2226 are coplanar.

When the reflecting unit 2-2000 is assembled in the optical system 2-10, the lateral surface 2-2227 of the fixed portion 2-2220 faces the lens unit 2-1000, and the contacting surfaces 2-2226a contact the lens unit 2-1000 (FIG. 28). Since the contacting surfaces 2-2226a are coplanar, the reflecting unit 2-2000 can be prevented from skewing relative to the lens unit 2-1000 when assembling, and the deviation of the moving direction of the external light 2-L can be avoided.

The circuit board 2-2224 is disposed on the base 2-2222, and electrically connected to the driving module 2-2230. The toughened component 2-2225 is disposed on the circuit board 2-2224, so as to protect the circuit board 2-2224 from impacting by other members. In other words, the circuit board 2-2224 is disposed between the toughened component 2-2225 and the driving module 2-2230, and covered by the toughened component 2-2225.

In some embodiments, the toughened component 2-2225 can be omitted, and the cover 2-2223 of the fixed portion 2-2220 can be extended to the position below the circuit board 2-2224. The circuit board 2-2224 can be disposed between the base 2-2222 and the cover 2-2223.

As shown in FIGS. 28 to 30, the driving module 2-2230 can comprise at least one first electromagnetic driving assembly 2-2231 and at least one second electromagnetic driving assembly 2-2232, respectively disposed on the optical member holder 2-2211 and the circuit board 2-2224. The second electromagnetic driving assembly 2-2232 can pass through a hole 2-2228 of the base 2-2222 and correspond to the first electromagnetic driving assembly 2-2231.

The optical member holder 2-2211 and the optical member 2-2100 can be driven by an electromagnetic effect between the first electromagnetic driving assembly 2-2231 and the second electromagnetic driving assembly 2-2232 to rotate relative to the fixed portion 2-2220. For example, in this embodiment, the first electromagnetic driving assembly 2-2231 can be a driving coil, and the second electromagnetic driving assembly 2-2232 can comprise at least one magnet.

When a current flows through the driving coil (the first electromagnetic driving assembly 2-2231), an electromagnetic effect is generated between the driving coil and the magnet. Thus, the optical member holder 2-2211 and the optical member 2-2100 can be driven to rotate relative to the fixed portion 2-2220 around a rotation axis 2-R (extending along the Y-axis), so as to finely adjust the position of the light 2-L on the image sensor 2-3000.

In some embodiments, the first electromagnetic driving assembly 2-2231 can be a magnet, and the second electromagnetic driving assembly 2-2232 can be a driving coil.

Figure 33:
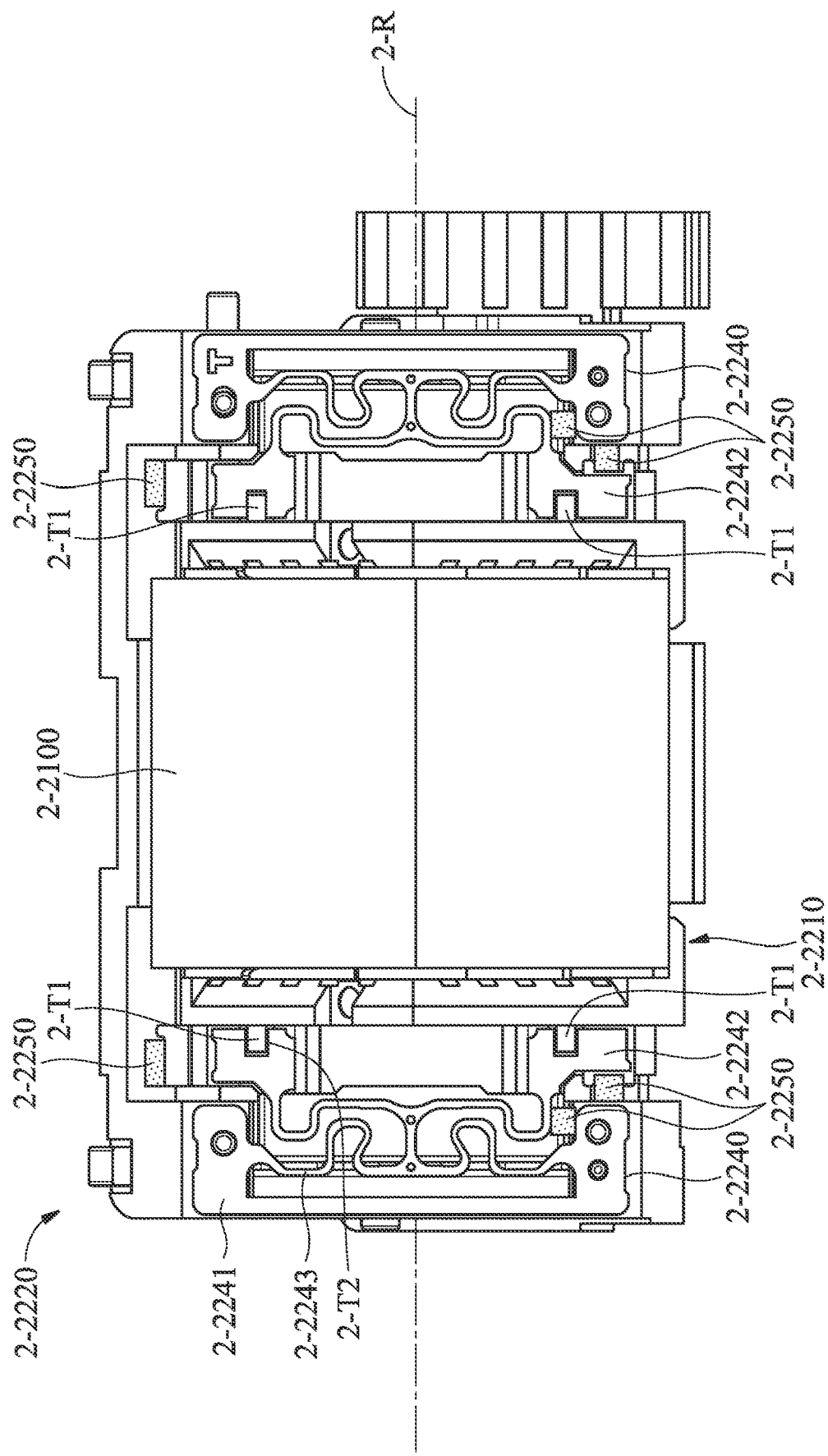
FIG. 33 is a schematic diagram of the reflecting unit according to an embodiment of the disclosure, wherein a frame is omitted.

Referring to FIGS. 30 and 33, the elastic members 2-2240 are connected to the movable portion 2-2210 and the fixed portion 2-2220, so as to hang the movable portion 2-2210 on the fixed portion 2-2220. In particular, each of the elastic members 2-2240 comprises a first fixing section 2-2241, a second fixing section 2-2242, and one or more string sections 2-2243. The first fixing section 2-2241 is affixed to the fixed portion 2-2220, the second fixing section 2-2242 is affixed to the movable portion 2-2210, and the string sections 2-2243 are connected to the first fixing section 2-2241 and the second fixing section 2-2242.

At least one positioning pillar 2-T1 is formed on the optical member holder 2-2211, and at least one positioning recess 2-T2 corresponding to the positioning pillar 2-T1 is formed on the second fixing section 2-2242. When the elastic member 2-2240 is connected to the movable portion 2-2210 and the fixed portion 2-2220, the positioning pillar 2-T1 enters the positioning recess 2-T2. The user can use a glue to stick the positioning pillar 2-T1 and the second fixing section 2-2242, so as to affix the second fixing portion 2-2242 to the movable portion 2-2210.

Figure 35:
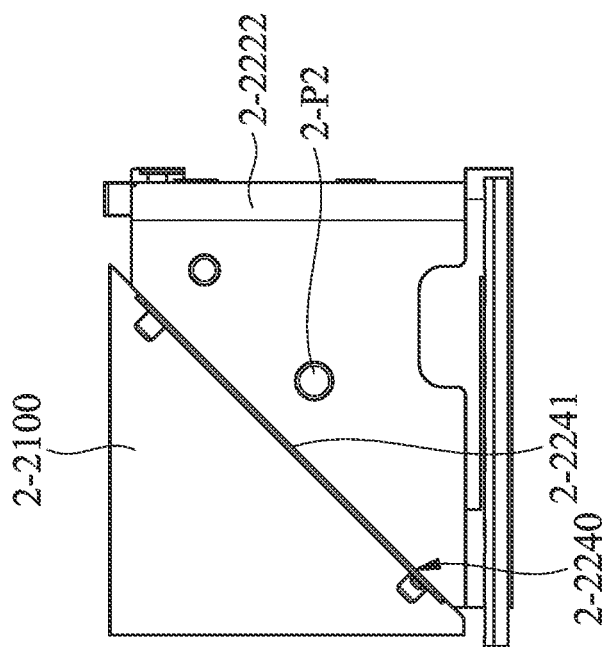
FIG. 35 is a side view of the reflecting unit according to an embodiment of the disclosure, wherein the cover and the frame are omitted.
Figure 34:
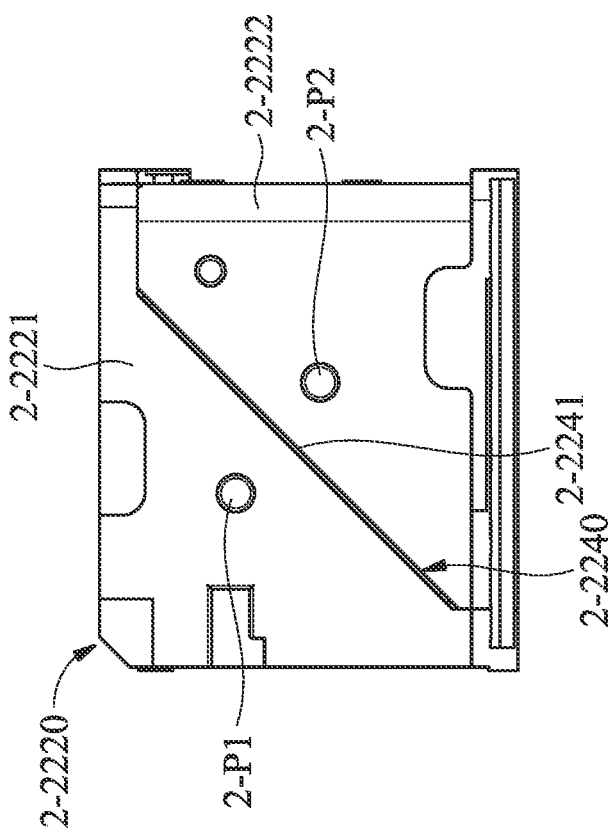
FIG. 34 is a side view of the reflecting unit according to an embodiment of the disclosure, wherein a cover is omitted.

Referring to FIGS. 34 and 35, when the frame 2-2221 and the base 2-2222 of the fixed portion 2-2220 are joined, at least a portion of the first fixing section 2-2241 is clamped between the frame 2-2221 and the base 2-2222. Therefore, the first fixing section 2-2241 can be affixed to the fixed portion 2-2220.

It should be noted that, in this embodiment, the second fixing sections 2-2242 of the elastic members 2-2240 disposed on the movable portion 2-2210 are coplanar, so as to apply an uniform elastic force on the optical member holder 2-2211. Furthermore, as seen from the rotation axis 2-R, at least a portion of the optical member 2-2100 and each of the elastic members 2-2230 overlap (as shown in FIG. 35).

As shown in FIG. 33, in this embodiment, some damping members 2-2250 are connected to the optical member holder 2-2211 and the fixed portion 2-2220, and some damping members 2-2250 are connected to the first fixing section 2-2241 and the string section 2-2243. These damping members 2-2250 can reduce the vibration when the driving module 2-2230 drives the optical member holder 2-2211 to rotate relative to the fixed portion 2-2220.

It should be note that, the damping members 2-2250 are disposed on the positions away from the rotation axis 2-R, and the center of the optical member holder 2-2211 is situated between the damping members 2-2250 which connected the same members. For example, the damping members 2-2250 are adjacent to the corners of the surface 2-2213 of the optical member holder 2-2211, and the center of the optical member holder 2-2211 is situated between two damping members 2-2250 connected the optical member holder 2-2211 and the fixed portion 2-2220 (and/or situated between two damping members 2-2250 connected to the first fixing section 2-2241 and the string section 2-2243). Therefore, the deviation of the optical member holder 2-2211 when the driving module 2-2230 drives the optical member holder 2-2211 to rotate can be avoided.

In some embodiments, the reflecting unit 2-2000 also comprises the damping members 2-2250 connected to the second fixing section 2-2242 and the string section 2-2243.

Figure 36:
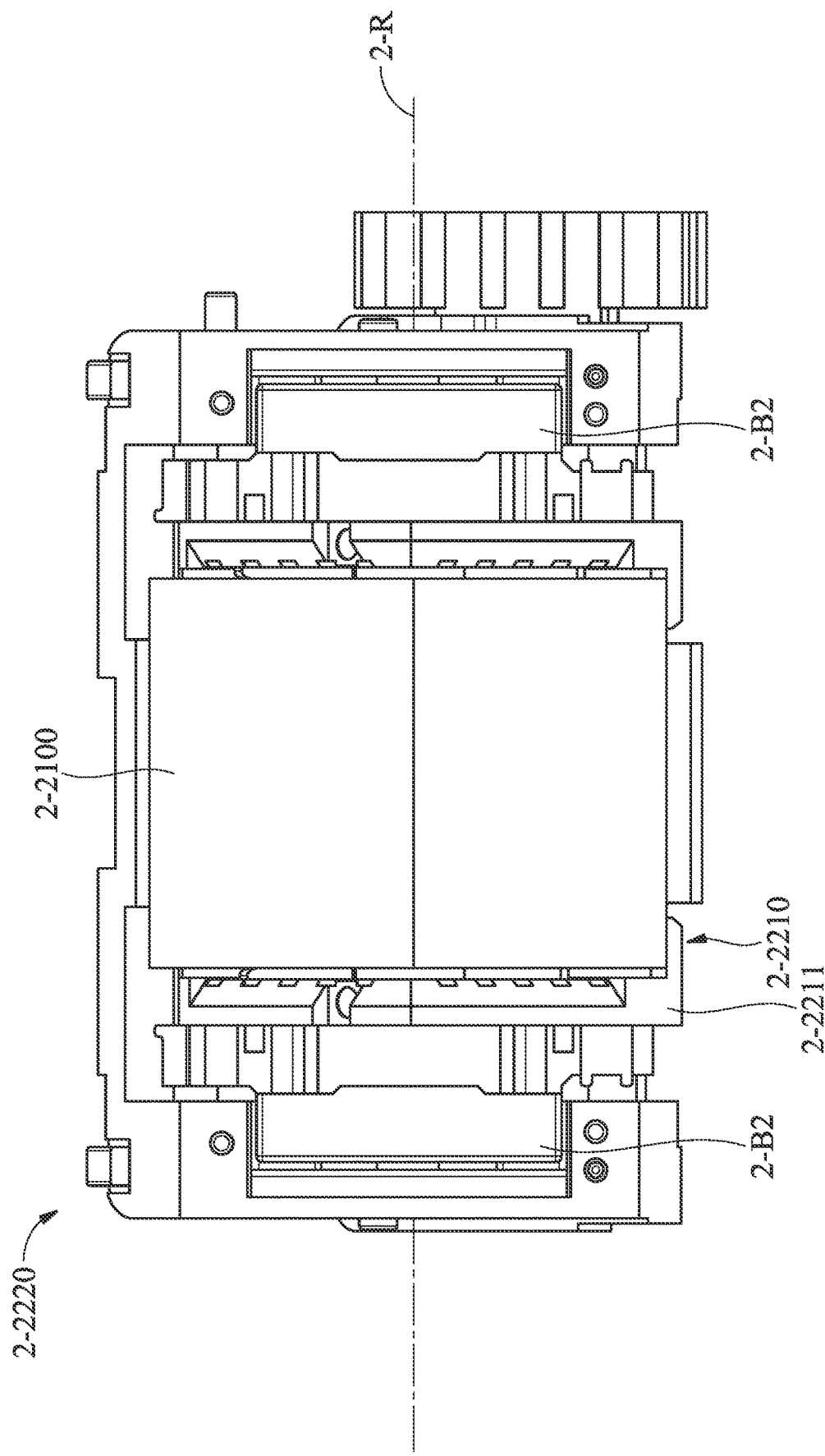
FIG. 36 a schematic diagram of the reflecting unit according to an embodiment of the disclosure, wherein the frame and the elastic member are omitted.

Referring to FIGS. 28, 31, and 36, in this embodiment, the optical member holder 2-2211 can further comprise at least one rotation restricting structure 2-B1 and at least one shift restricting structure 1-B2, respectively used to restrict the rotation angle and the shifting range of the optical member holder 2-2211.

In particular, the rotation restricting structures 2-B1 can protrude from the first electromagnetic driving assembly 2-2231, and the shift restricting structure 2-B2 can be disposed on the opposite sides of the optical member 2-2100 along the rotation axis 2-R. When the optical member holder 2-2211 rotates relative to the fixed portion 2-2220 to a predetermined angle, the rotation restriction structures 2-B1 contact the fixed portion 2-2220, a gap is formed between the first electromagnetic driving assembly 2-2231 and the second electromagnetic driving assembly 2-2232, and other gap is formed between the shift restricting structures 2-B2 and the fixed portion 2-2220.

When the optical member holder 2-2211 shifts relative to the fixed portion 2-2220 to a predetermined position, the shift restriction structures 2-B2 contact the fixed portion 2-2220, and a gap is formed between the rotation restriction structures 2-B1 and the fixed portion 2-2220.

Owing to the aforementioned structure, the moving range of the optical member holder 2-2211 can be restricted. Damage to the optical member 2-2100 and the driving module 2-2230 due to collision can be avoided, and the dust caused by friction between the members can also be reduced.

In some embodiments, the rotation restricting structure 2-B1 can be formed on the shift restricting structure 2-B2. The rotation restricting structure 2-B1 and the shift restricting structure 2-B2 can be integrally formed in one piece. In other words, in some embodiments, the rotation restricting structure 2-B1 can be used to restrict the shift range of the optical member holder 2-2211.

Furthermore, in this embodiment, the light-entering surface 2-2120 of the optical member 2-2100 is disposed between the an outer surface 2-2229 of the fixed portion 2-2220 and the optical member holder 2-2211, and the light-entering surface 2-2120 does not protrude from the outer surface 2-2229 during the optical member holder 2-221 moves relative to the fixed portion 2-2229. Therefore, some foreign object falling on the reflecting unit 2-2000 can be blocked by the fixed portion 2-2220 and do not contact the optical member 2-2100 directly.

The aforementioned reflecting unit 2-2000 can be also applied on the reflecting unit 1-B1200, 1-C1200, or 1-D1200 in embodiments of the disclosure.

In summary, an optical member driving mechanism is provided, including a fixed portion, a movable portion, and a driving module, wherein the movable portion is movably connected to the fixed portion and includes an optical member holder and a spacing member. The optical member holder can support an optical member and has a surface facing the optical member. The optical member can change the moving direction of an external light. The spacing member is disposed between the surface and the optical member, and a gap is formed between the surface and the optical member. The driving module can drive the movable portion to move relative to the fixed portion.

Third Group of Embodiments

Figure 37:
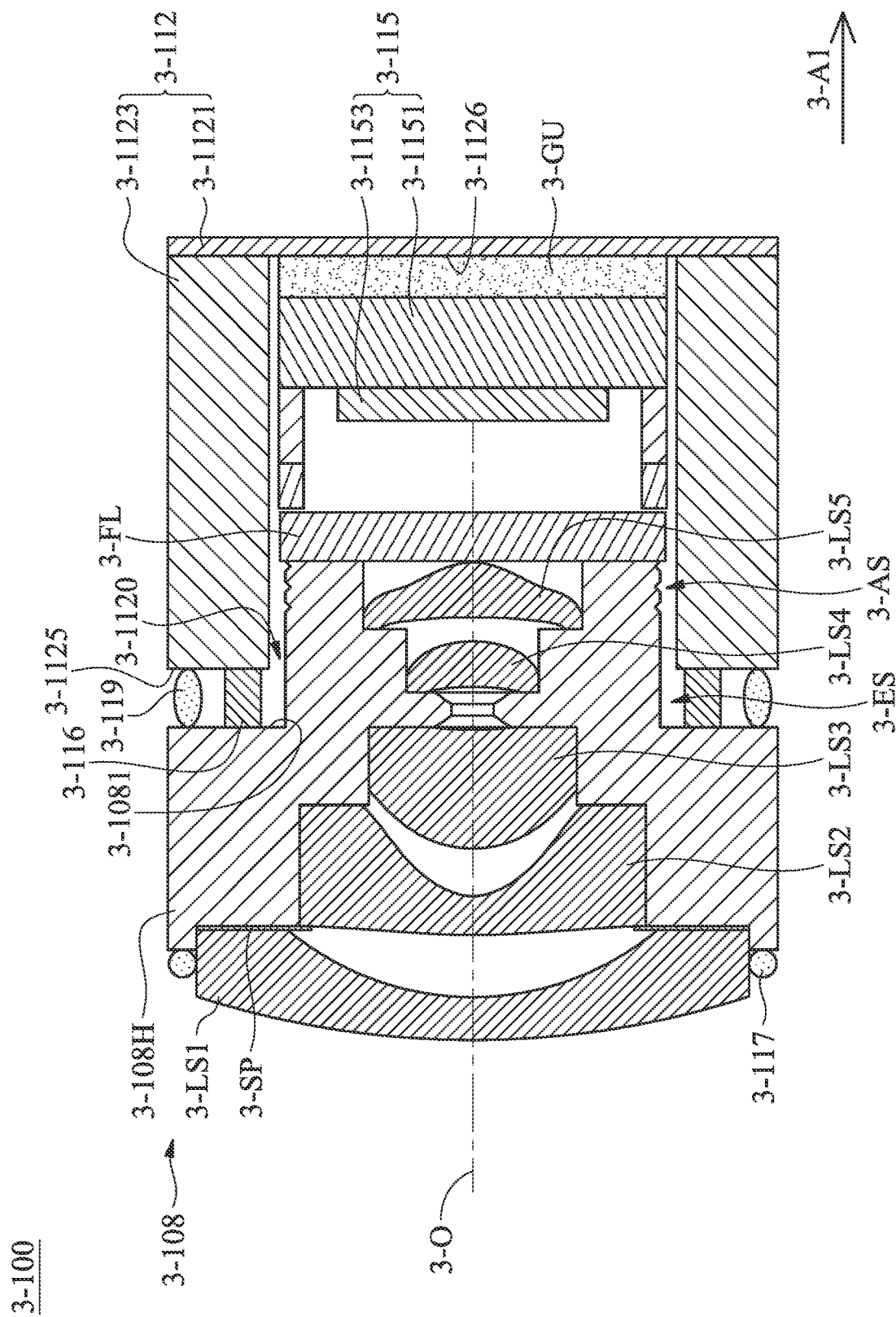
FIG. 37 is a schematic diagram of a camera system according to an embodiment of the present disclosure.

Please refer to FIG. 37, which is a schematic diagram of a camera system 3-100 according to an embodiment of the present disclosure. The camera system 3-100 of the present disclosure can be installed in various electronic devices or portable electronic devices, for example, on a smart phone or a tablet computer, for the user to perform the function of capturing images. In this embodiment, the camera system 3-100 can be disposed on various transportation vehicles, such as a car. The camera system 3-100 may be a camera system with a fixed focal length, but it is not limited thereto. In other embodiments, the camera system may also be a voice coil motor (VCM) with an auto focus (AF) function.

As shown in FIG. 37, the camera system 3-100 includes a lens module 3-108, a fixed frame 3-112, and a photosensitive module 3-115. The lens module 3-108 is disposed on the photosensitive module 3-115 and is connected to the fixed frame 3-112 by a connecting member 3-116. As shown in FIG. 37, the lens module 3-108 includes a lens barrel 3-108H and one or more optical elements. The lens barrel 3-108H may be made of a material with a thermal expansion coefficient less than 50 ($10^{-6}$/K @ 20° C.), which means that the thermal expansion coefficient of the lens barrel 3-108H at 20° C. is less than 50 ($10^{-6}$/K). For example, the lens barrel 3-108H is made of a metal material, such as Kovar, which has better thermal conductivity and a lower thermal expansion coefficient, so that when the temperature of the external environment is high (such as 60° C.), the camera system 3-100 and the external environment can quickly enter the thermal equilibrium state, thereby solving the problem of the image quality affected by temperature variation.

Furthermore, the lens barrel 3-108H is for accommodating the optical elements (for example, a first lens 3-LS1, a second lens 3-LS2, a third lens 3-LS3, a fourth lens 3-LS4 and a fifth lens 3-LS5), and the lens module 3-108 defines an optical axis 3-0. Specifically, the first lens 3-LS1 to the fifth lens 3-LS5 are arranged along the optical axis 3-O. For example, the second lens 3-LS2 is disposed between the first lens 3-LS1 and the photosensitive module 3-115.

In this embodiment, the aforementioned lenses may be made of a glass material and have a low thermal expansion coefficient, such as 7.1 ($10^{-6}$/K @ 20° C.). In addition, the lens module 3-108 may have at least one spacer 3-SP disposed between the first lens 3-LS1 and the second lens 3-LS2, and the thermal expansion coefficient of the spacer 3-SP is less than 50 ($10^{-6}$/K @ 20° C.). For example, the spacer 3-SP may be made of a metal material, such as Kovar. Because the spacer 3-SP has a low coefficient of thermal expansion, when the camera system 3-100 is heated, influence to a spacing between adjacent two lenses due to the thermal expansion of the spacer 3-SP can reduce.

In addition, the camera system 3-100 may further include a first airtight adhesive component 3-117 disposed on the lens barrel 3-108H, and the first airtight adhesive component 3-117 surrounds the first lens 3-LS1. Therefore, the first airtight adhesive component 3-117 can effectively prevent the air of the external environment from entering the gap between the first lens 3-LS1 and the lens barrel 3-108H, to increase the airtightness of the lens barrel 3-108H.

In this embodiment, the camera system 3-100 may further include a filter 3-FL disposed between the lens module 3-108 and the photosensitive module 3-115, and the filter 3-FL is configured to filter the light entering the lens module 3-108. In this embodiment, the filter 3-FL may be an infrared light filter, but it is not limited thereto. In addition, the filter 3-FL can be made of a glass material.

As shown in FIG. 37, the photosensitive module 3-115 can include a base 3-1151 and a photosensitive element 3-1153. The photosensitive element 3-1153 is disposed on the base 3-1151, and the photosensitive element 3-1153 corresponds the lens module 3-108. External light can travel along a direction 3-A1 from a light incident side (the left side of the first lens 3-LS1) to the lens module 3-108, and the external light is received by the photosensitive module 3-115 after passing through the plurality of lenses, so as to generate a digital image signal. In this embodiment, the base 3-1151 may be made of, for example, a ceramic material, and the photosensitive element 3-1153 may be made of, for example, silicon.

As shown in FIG. 37, the lens module 3-108 and the photosensitive module 3-115 are disposed on the fixed frame 3-112. Specifically, the fixed frame 3-112 includes a bottom portion 3-1121 and a side wall 3-1123. The fixed frame 3-112 can form an accommodating space 3-AS for accommodating the photosensitive module 3-115. Furthermore, the fixed frame 3-112 further includes a first surface 3-1125 located on the side wall 3-1123. The first surface 3-1125 faces the light incident side, and the lens module 3-108 is disposed on the first surface 3-1125 by the connecting member 3-116. Specifically, the lens barrel 3-108H has a third surface 3-1081, and the connecting member 3-116 is configured to connect the third surface 3-1081 and the first surface 3-1125. The connecting member 3-116 may be solder or glue, but it is not limited thereto. It should be noted that the connecting member 3-116 may surround an opening 3-1120 formed by the side wall 3-1123.

In this embodiment, the camera system 3-100 may further include a second airtight adhesive component 3-119 disposed between the first surface 3-1125 and the third surface 3-1081 of the lens module 3-108. The second airtight adhesive component 3-119 may be a glass frit, but it is not limited thereto. The second airtight adhesive component 3-119 may also surround the opening 3-120 formed by the side wall 3-1123.

By providing the connecting member 3-116 and the second airtight adhesive component 3-119, an enclosed space 3-ES can be formed between the fixed frame 3-112, the photosensitive module 3-115 and the lens module 3-108, and the enclosed space 3-ES includes the accommodating space 3-AS. The enclosed space 3-ES is isolated from the external environment outside of the camera system 3-100. Therefore, it can prevent foreign objects (for example, dust in the air) from entering the camera system 3-100 and affecting the image quality. In addition, based on the configuration of the enclosed space 3-ES, the influence of the thermal convection of the external environment to the camera system 3-100 can also be reduced.

Furthermore, by providing the connecting member 3-116 and the second airtight adhesive component 3-119, the overall mechanical strength of the camera system 3-100 can be increased, and the overall sealing effect can also be increased. In this embodiment, the connecting member 3-116 is closer to the optical axis 3-O of the lens module 3-108 than the second airtight adhesive component 3-119. Based on this configuration, the manufacturing process of the camera system 3-100 can be more convenient.

In addition, the fixed frame 3-112 further includes a second surface 3-1126, and the second surface 3-1126 and the first surface 3-1125 are located on different planes. In addition, in this embodiment, the photosensitive module 3-115 is fixed to the second surface 3-1126 of the bottom portion 3-1121 by glue 3-GU.

It should be noted that the side wall 3-1123 may be made of a material with a thermal expansion coefficient less than 50 ($10^{-6}$/K @ 20° C.). For example, the side wall 3-1123 is made of a metal material. Because the side wall 3-1123 is made of a metal material, it has better thermal conductivity and a lower thermal expansion coefficient, so that the camera system 3-100 and the external environment may quickly enter the thermal equilibrium state, thereby preventing the problem of the image quality affected by temperature variation.

Figure 38:
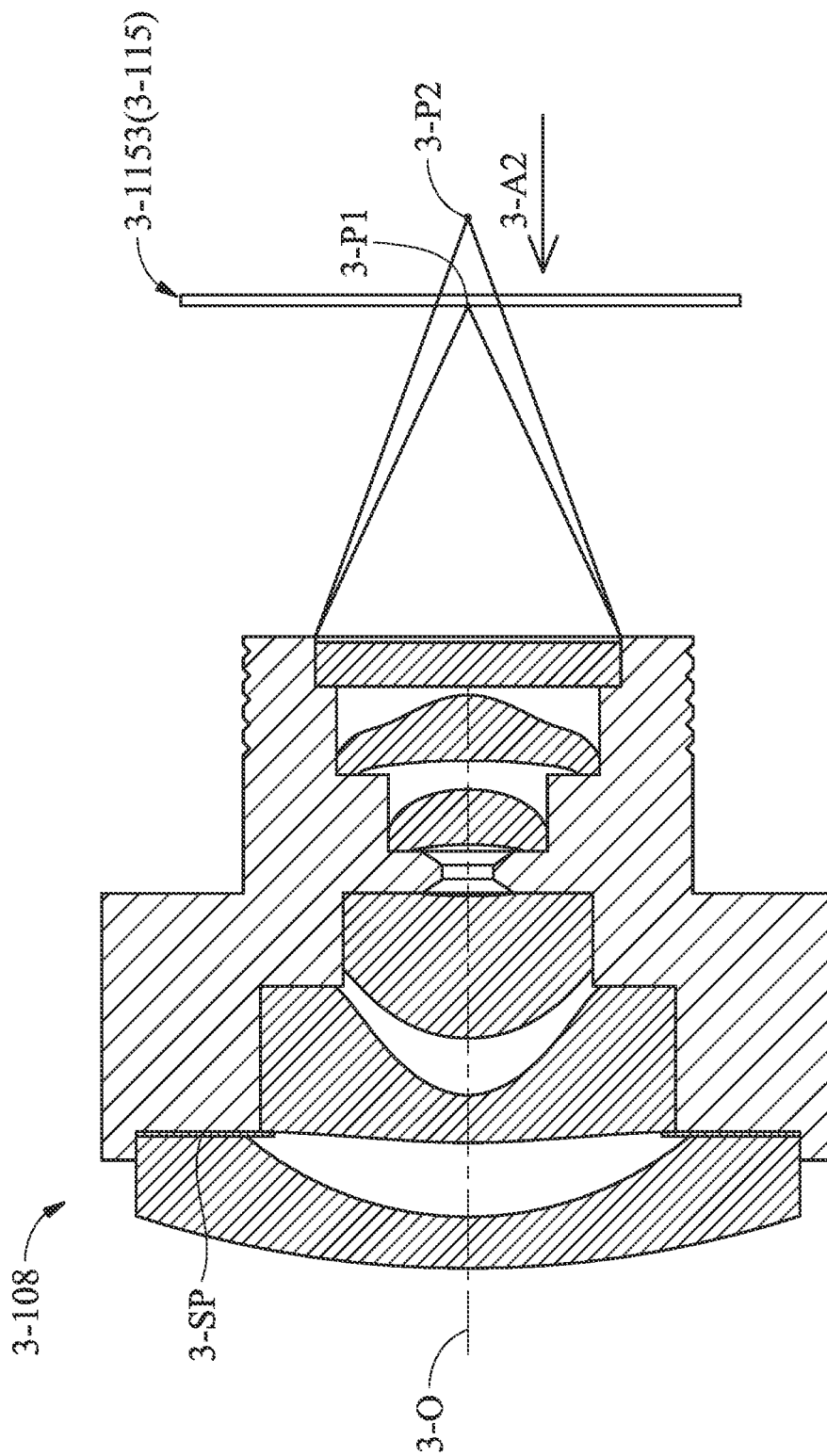
FIG. 38 is a diagram of a lens module and a photosensitive element of the photosensitive module in FIG. 37 of the present disclosure.

Please refer to FIG. 37 and FIG. 38. FIG. 38 is a diagram of the lens module 3-108 and the photosensitive element 3-1153 of the photosensitive module 3-115 in FIG. 37 of the present disclosure. When the camera system 3-100 is not heated (for example, 25° C.), a focus plane of the lens module 3-108 may be located on a position 3-P1 in FIG. 38, that is, on the photosensitive element 3-1153 of the photosensitive module 3-115. However, when the temperature of the lens module 3-108 rises, the focus plane of the lens module 3-108 may move to the rear of the photosensitive element 3-1153 to a position 3-P2. At this time, the image generated by the photosensitive module 3-115 may blur.

In order to solve the above problems, the connecting member 3-116 and the side wall 3-1123 of the present disclosure may be designed to have different thermal expansion coefficients. For example, the thermal expansion coefficient of the connecting member 3-116 is greater than the thermal expansion coefficient of the side wall 3-1123. When the temperature of the camera system 3-100 rises, the expansion length of the connecting member 3-116 along the optical axis 3-O is greater than the expansion length of the side wall 3-1123 along the optical axis 3-O. That is, the variation of a distance between the first surface 3-1125 and the third surface 3-1081 is greater than the variation of a distance between first surface 3-1125 and the second surface 3-1126. Therefore, the focus plane on the position 3-P2 can be moved toward the lens module 3-108 along a direction 3-A2 and can be returned to the photosensitive element 3-1153 of the photosensitive module 3-115, so that the photosensitive module 3-115 can generate a clear image. It should be noted that the thermal expansion coefficients of the connecting member 3-116 and the side wall 3-1123 can be adjusted to suit actual needs.

Figure 39:
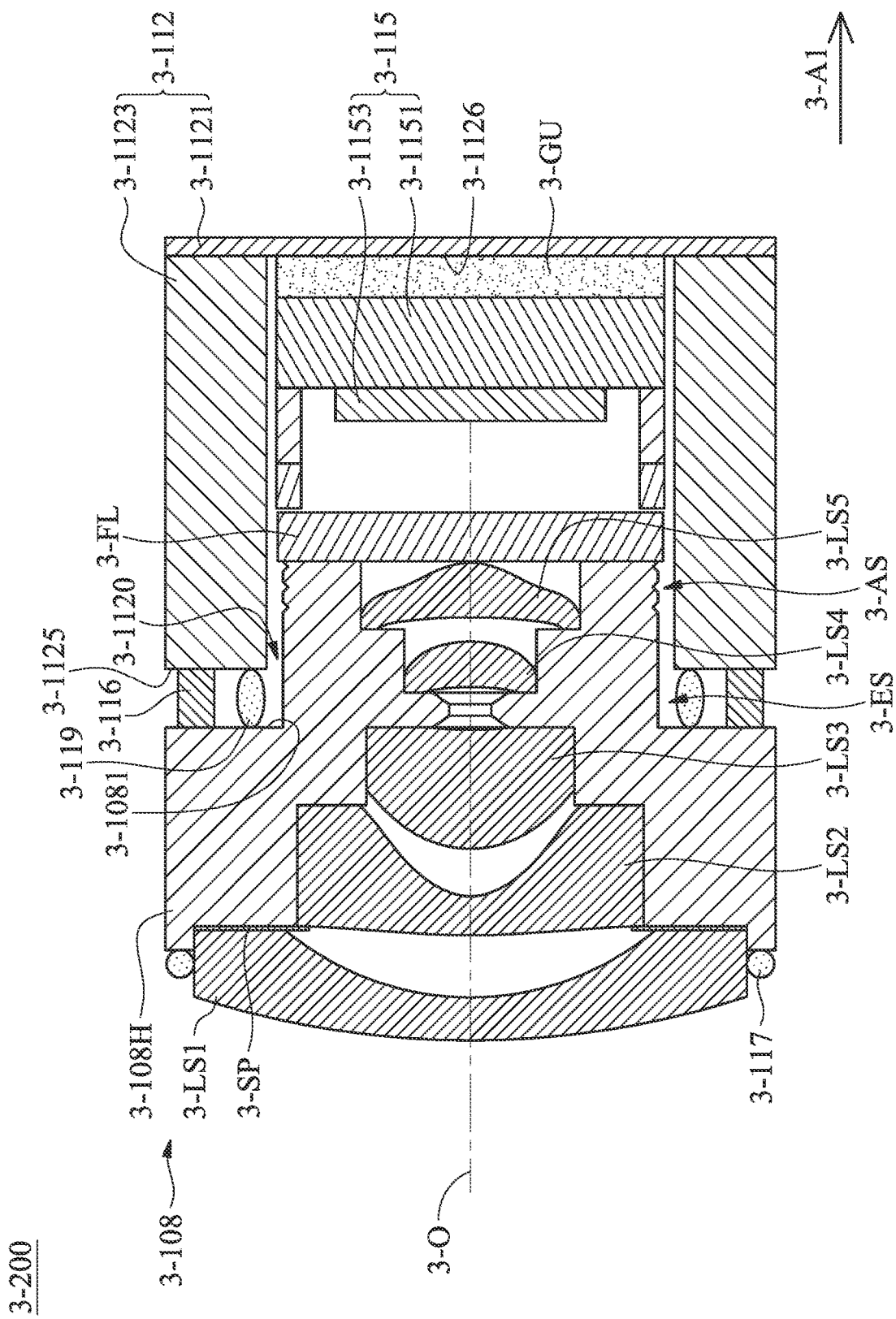
FIG. 39 is a schematic diagram of a camera system according to another embodiment of the present disclosure.

Please refer to FIG. 39, which is a schematic diagram of a camera system 3-200 according to another embodiment of the present disclosure. The camera system 3-200 is similar to the aforementioned camera system 3-100, and the difference between them is that the connecting member 3-116 in this embodiment is farther away from the optical axis 3-O of the lens module 3-108 than the second airtight adhesive component 3-119. This configuration can avoid contamination of the photosensitive module 3-115 when the connecting member 3-116 is provided.

Figure 40:
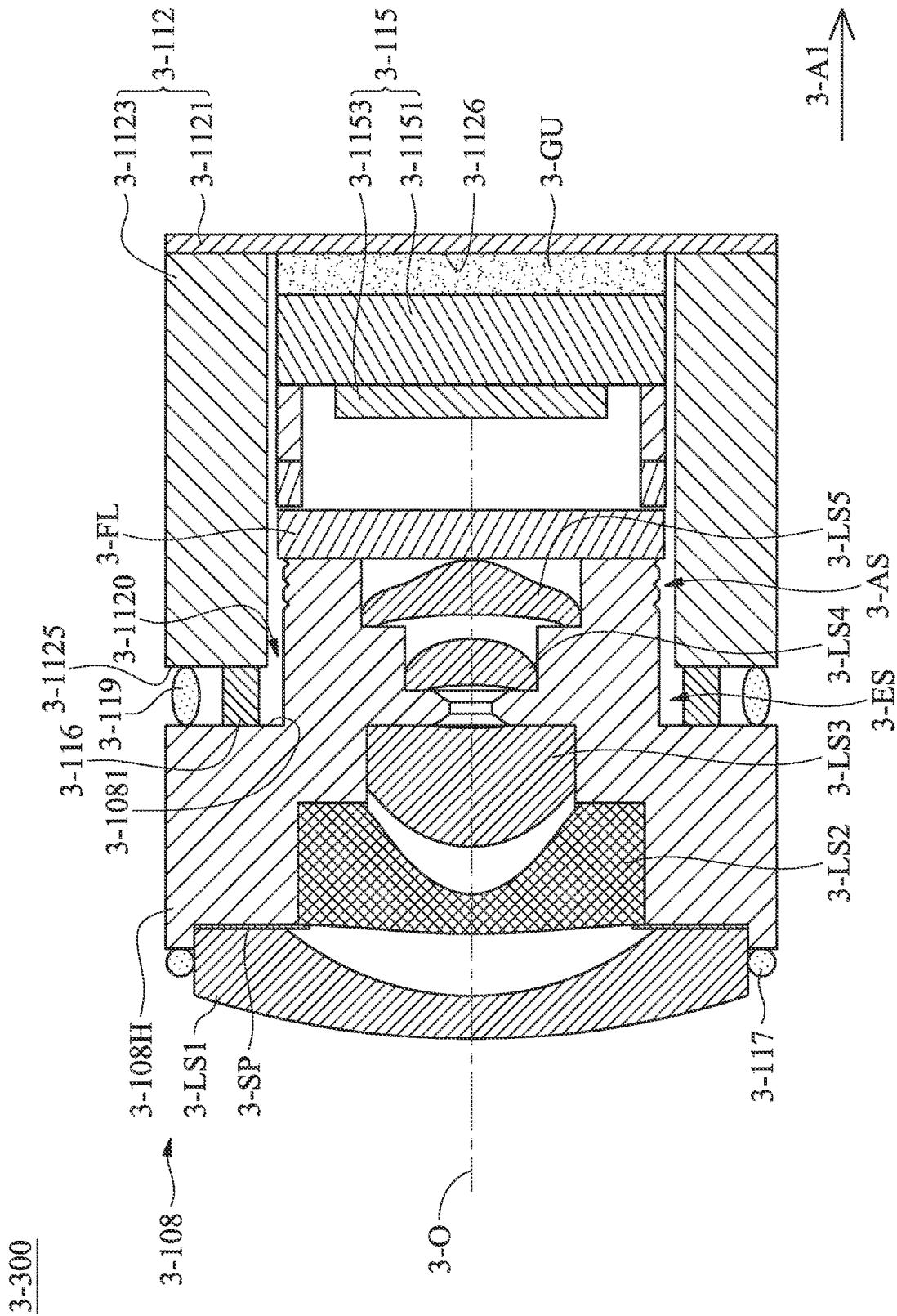
FIG. 40 is a schematic diagram of a camera system according to another embodiment of the present disclosure.

Next, please refer to FIG. 40, which is a schematic diagram of a camera system 3-300 according to another embodiment of the present disclosure. The camera system 3-300 is similar to the aforementioned camera system 3-100, and the difference between them is that the first lens 3-LS1 and the second lens 3-LS2 in this embodiment can be made of different materials. For example, the first lens 3-LS1 may be made of glass, and the second lens 3-LS2 may be made of a plastic material. A thermal expansion coefficient of the first lens 3-LS1 is lower than a thermal expansion coefficient of the second lens 3-LS2.

Because the thermal expansion coefficient of the first lens 3-LS1 is low, the problem of the gap between the first lens 3-LS1 and the lens barrel 3-108H due to thermal expansion can be solved, thereby improving airtightness of the lens module 3-108. In addition, in this embodiment, the hardness of the first lens 3-LS1 is greater than that of the second lens 3-LS2, so that the first lens 3-LS1 at the outer side can protect the second lens 3-LS2 at the inner side.

Figure 41:
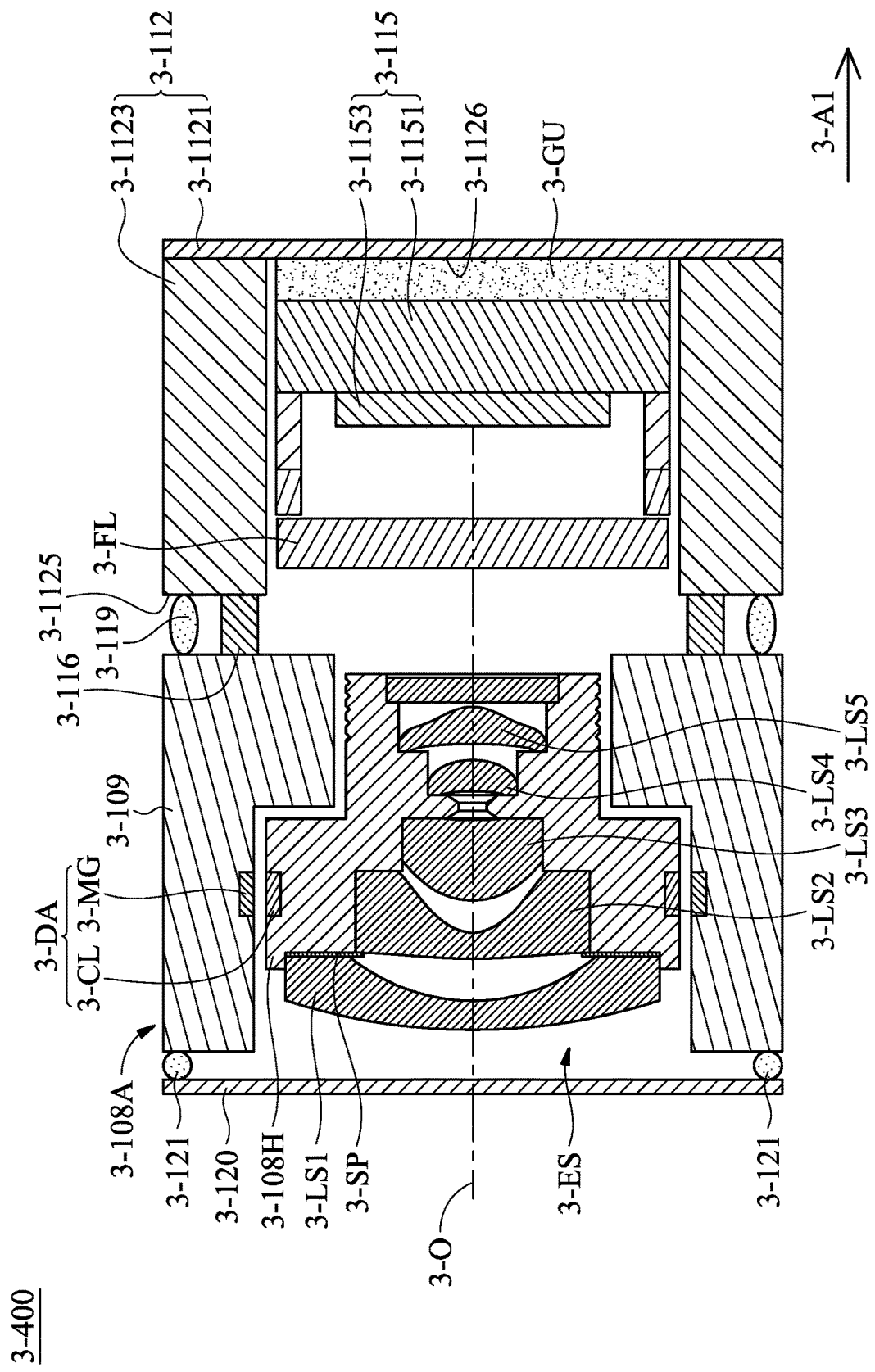
FIG. 41 is a schematic diagram of a camera system according to another embodiment of the present disclosure.

Next, please refer to FIG. 41, and FIG. 41 is a schematic diagram of a camera system 3-400 according to another embodiment of the present disclosure. The camera system 3-400 is similar to the camera system 3-100 described above, and the difference between them is that a lens module 3-108A in this embodiment further includes a driving assembly 3-DA, a holder 3-109 and a transparent protective cover 3-120. The lens barrel 3-108H is movably disposed in the holder 3-109. For example, the lens barrel 3-108H is suspended within the holder 3-109 by two elastic members (not shown).

The driving assembly 3-DA includes two magnets 3-MG and two coils 3-CL, the coils 3-CL are disposed on opposite sides of the lens barrel 3-108H, and the magnets 3-MG corresponding to the coils 3-CL are disposed on the holder 3-109. When the coils 3-CL are provided with electricity, the coils 3-CL may act with the magnets 3-MG to generate an electromagnetic force, so as to drive the lens barrel 3-108H with the lenses to move relative to the photosensitive module 3-115 along the optical axis 3-O, so that the autofocus function of the camera system 3-400 can be achieved.

Furthermore, as shown in FIG. 41, in this embodiment, the camera system 3-400 further includes a third airtight adhesive component 3-121 which is disposed between the transparent protective cover 3-120 and the holder 3-109 (with the drive assembly 3-DA), and the third airtight adhesive component 3-121 surrounds the lens barrel 3-108H. Based on the configuration of the third airtight adhesive component 3-121 and the second airtight adhesive component 3-119, an enclosed space 3-ES can be formed between the transparent protective cover 3-120, the holder 3-109, the driving assembly 3-DA, the fixed frame 3-112 and the photosensitive module 3-115, and the enclosed space 3-ES is isolated from the external environment outside of the camera system 3-400.

Based on the arrangement of the enclosed space 3-ES, the influence of the thermal convection of the external environment to the camera system 3-400 can also be reduced. In addition, the transparent protective cover 3-120 can also protect the first lens 3-LS1, so as to prevent the first lens 3-LS1 from being scratched.

It should be noted that any of the foregoing camera systems may also be applied to the optical modules 1-A1000, 1-A2000, 1-A3000, 1-B2000, 1-C2000, or 1-D2000 of the present disclosure.

The present disclosure provides camera systems that can be disposed on various transportation vehicles. Several components in the camera system can be made of materials with thermal expansion coefficients less than 50 ($10^{-6}$/K @ 20° C.). For example, the lenses can be made of glass, the spacer, the lens barrel and the fixed frame can be made of Kovar, and the base can be made, for example, of a ceramic material. In contrast to the conventional camera system, because the thermal expansion coefficients of the components in the camera system of the present disclosure are similar, when the camera system is in a high-temperature external environment, the thermal expansion of each component changes little, thereby improving stability of the camera system to change of temperature.

Fourth Group of Embodiments

Figure 42:
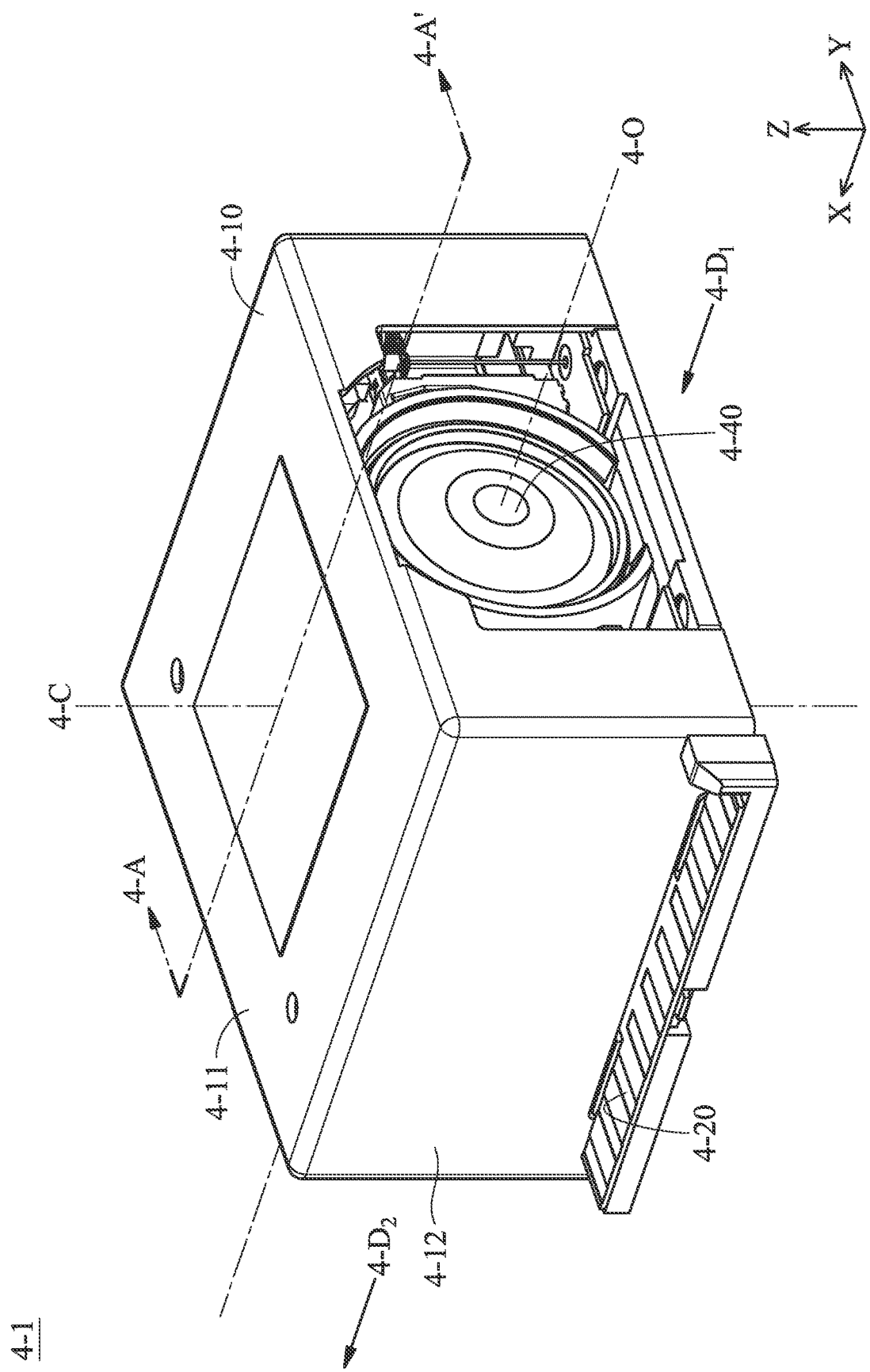
FIG. 42 is a perspective view illustrating an optical member driving mechanism in accordance with an embodiment of the present disclosure.

Refer to FIG. 42, wherein FIG. 42 is a perspective view illustrating an optical member driving mechanism 4-1 in accordance with an embodiment of the present disclosure. It should be noted that, in this embodiment, the optical member driving mechanism 4-1 may be disposed in the electronic devices (not shown) with camera function for driving an optical member 4-40, and can perform an autofocus (AF) and/or optical image stabilization (OIS) function.

Figure 43:
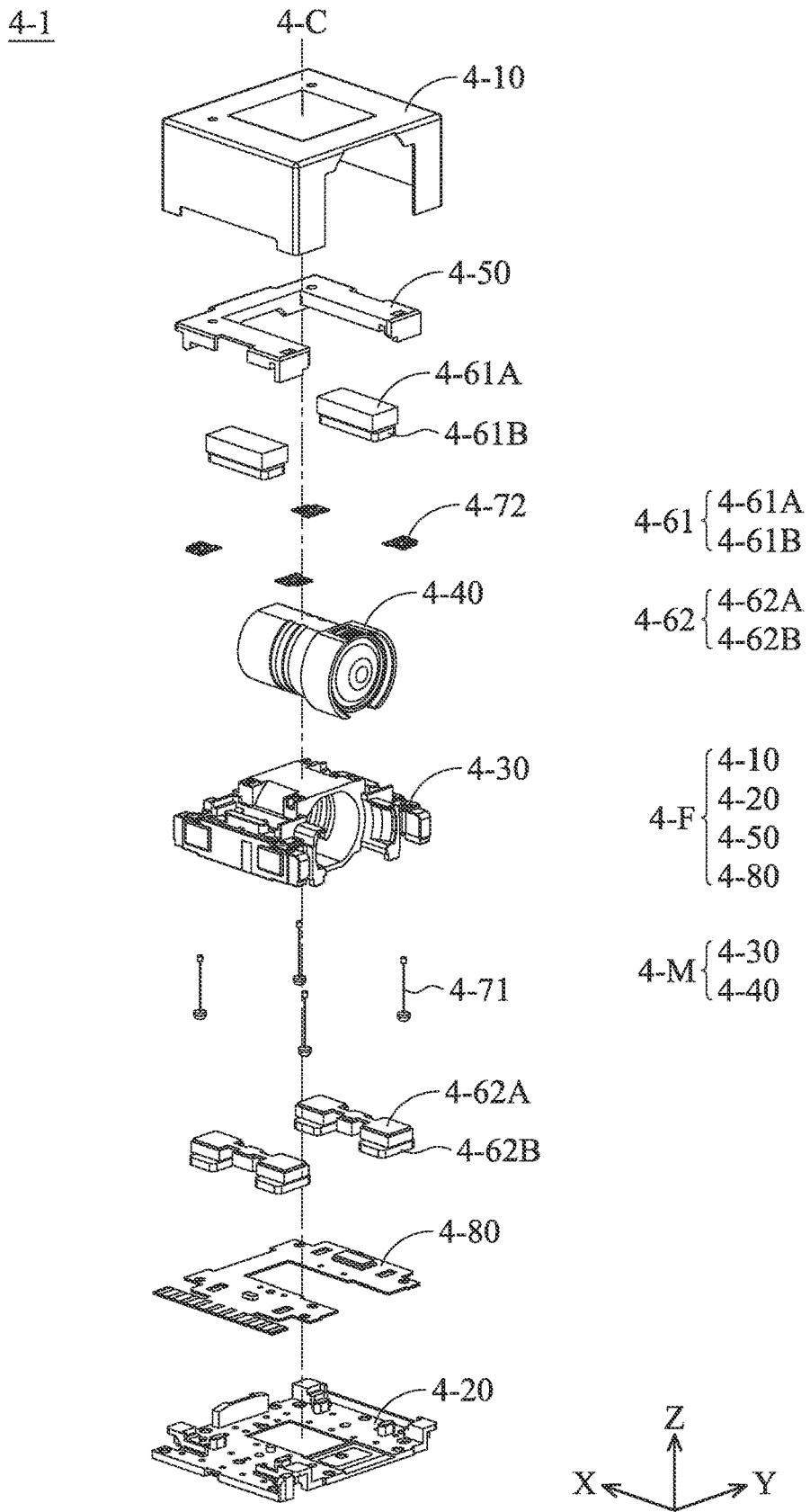
FIG. 43 is an exploded view illustrating the optical member driving mechanism shown in FIG. 42.

Refer to FIG. 43, wherein FIG. 43 is an exploded view illustrating the optical member driving mechanism 4-1 shown in FIG. 42. In the present embodiment, the optical member driving mechanism 4-1 has a substantial rectangular structure. The optical member driving mechanism 4-1 mainly includes a fixed portion 4-F, a movable portion 4-M, a plurality of first elastic members 4-71, a plurality of second elastic members 4-72, a first driving assembly 4-61, and a second driving assembly 4-62. The fixed portion 4-F includes a housing 4-10, a base 4-20, a frame 4-50, and a circuit component 4-80. The housing 4-10 has a hollow structure, which includes a top surface 4-11, four sidewalls 4-12, wherein the housing 4-10 and the base 4-20 may be assembled as a hollow case for containing interior members of the optical member driving mechanism 4-1. The frame 4-50 is disposed in the housing 4-10, and affixed to the housing 4-10. The circuit component 4-80 is disposed on the base 4-20 for transmitting electric signals, performing function of autofocus and/or optical image stabilization. For example, the optical member driving mechanism 4-1 may control the position of the optical member 4-40 in order to perform camera function.

The movable portion 4-M is movably connected to the fixed portion 4-F. The movable portion 4-M mainly includes a carrier 4-30, and the carrier 4-30 carries the optical member 4-40. As shown in FIG. 43, the carrier 4-30 is movably connected to the housing 4-10 and the base 4-20. The first elastic members 4-71 extend in a first direction (Z-axis), and are elastically connected to the base 4-20 and the carrier 4-30, wherein the first direction is perpendicular to the optical axis 4-O. In addition, the second elastic members 4-72 are disposed on the carrier 4-30, and connected to the first elastic members 4-71 and the carrier 4-30. In other words, the carrier 4-30 may be connected to the base 4-20 via the first elastic members 4-71 and the second elastic members 4-72, and the first elastic members 4-71 and the second elastic members 4-72 are metallic materials.

The first driving assembly 4-61 may include a first magnetic member 4-61A and a corresponding first driving coil 4-61B. The first magnetic member 4-61A is disposed on the frame 4-50, and the first driving coil 4-61B is disposed on the carrier 4-30. When a current is applied to the first driving coil 4-61B, an electromagnetic driving force may be generated by the first driving coil 4-61B and the first magnetic member 4-61A (namely, the first driving assembly 4-61) to drive the carrier 4-30 and the optical member 4-40 to move along the first direction (Z-axis) relative to the base 4-20. Therefore, the autofocus or optical image stabilization function is performed.

In addition, the second driving assembly 4-62 may include a second magnetic member 4-62A and a corresponding second driving coil 4-62B. The second magnetic member 4-62A is disposed on the carrier 4-30, and the second driving coil 4-62B is disposed on the base 4-20. When a current is applied to the second driving coil 4-62B, an electromagnetic driving force may be generated by the second driving assembly 4-62 to drive the carrier 4-30 and the optical member 4-40 to move along the optical axis (X-axis) relative to the base 4-20. Therefore, the autofocus function is performed. The carrier 4-30 may be movably suspended between the frame 4-50 and the base 4-20 by the electromagnetic driving forces of the first driving assembly 4-61, the second driving assembly 4-62, and the forces of the first elastic members 4-71, the second elastic members 4-72.

Figure 44:
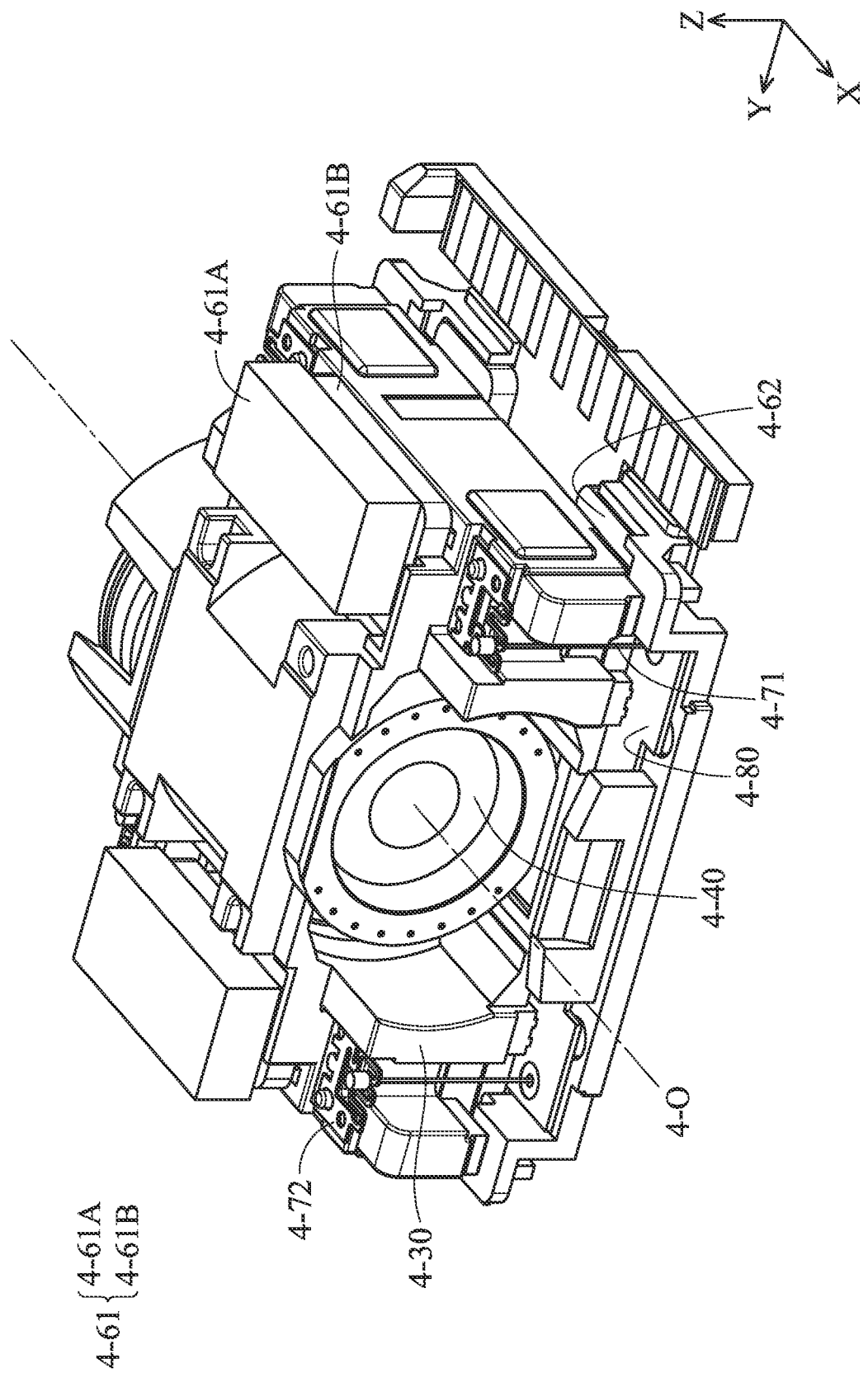
FIG. 44 is a perspective view illustrating the interior of the optical member driving mechanism shown in FIG. 42.

Refer to FIG. 44, wherein FIG. 44 is a perspective view illustrating the interior of the optical member driving mechanism 4-1 shown in FIG. 42. It should be noted that for the sake of clearly illustrating the structure inside the optical member driving mechanism 4-1, the housing 4-10 and the frame 4-50 are not illustrated. In the present embodiment, the first driving coil 4-61B of the first driving assembly 4-61 is connected to the first elastic members 4-71 via the second elastic members 4-72. Therefore, the electrical signals may be transmitted from the circuit component 4-80 to the first driving coil 4-61B via the first elastic members 4-71 for controlling the position of the carrier 4-30 by the first driving assembly 4-61. In the present embodiment, the first driving coil 4-61B is electrically connected to the circuit component 4-80 via the first driving coil 4-61B, and whereby the circuit for electrically connecting the first driving coil 4-61B and the circuit component 4-80 may not be additionally disposed. Therefore, the circuit structure in the optical member driving mechanism 4-1 may be simplified.

Figure 45:
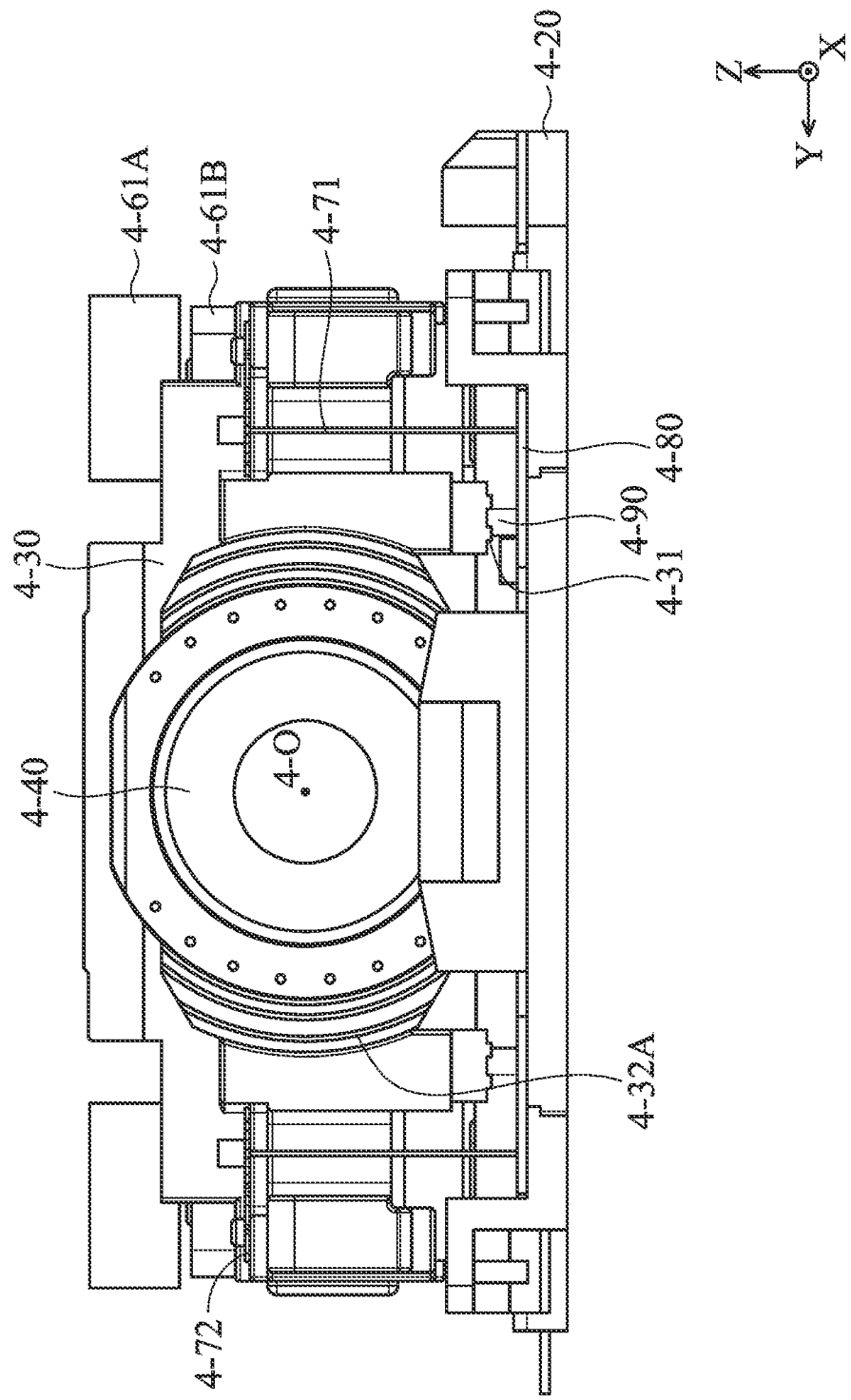
FIG. 45 is a schematic view illustrating the optical member driving mechanism as viewed in a light exit direction.

FIG. 45 is a schematic view illustrating the optical member driving mechanism 4-1 as viewed in a light exit direction 4-$D_o$. As shown in FIG. 45, the optical member driving mechanism 4-1 further includes a plurality of damping materials 4-90, which are disposed between the circuit component 4-80 and the carrier 4-30, and located on an imaginary plane parallel to the optical axis 4-O (namely, the plane parallel to the X-Y plane). For example, the damping materials 4-90 may be gel or any other damping material with buffer effect. By arranging the damping materials 4-90, the oscillating effect of the optical member driving mechanism 4-1 may be reduced. Therefore, after arriving to a predetermined position, the carrier 4-30 may rapidly become stable.

In the present embodiment, the carrier 4-30 further includes a plurality of damping material limiting portions 4-31, which protrude towards the circuit component 4-80, and extend in the first direction (Z-axis). In addition, the damping materials 4-90 are disposed between the damping material limiting portions 4-31 and the circuit component 4-80. By arranging the damping material limiting portions 4-31, the contact area between the damping materials 4-90 and the carrier 4-30 may be increased, enhancing the buffer effect of the damping materials 4-90. Therefore, the carrier 4-30 may become stable more rapidly after moving.

In addition, as viewed in the light exit direction 4-$D_o$, the carrier 4-30 further includes a plurality of first bonding recesses 4-32A, which are disposed in the carrier 4-30 and adjacent to the optical member 4-40. In the present embodiment, the first bonding recesses 4-32A are symmetrically disposed towards the optical member 4-40, wherein the optical axis 4-O is the axis of symmetry. The first bonding recesses 4-32A are arranged along a second direction (Y-axis), wherein the second direction is perpendicular to the first direction (Z-axis) and the optical axis (X-axis). An adhesive (not shown) may be disposed in the first bonding recesses 4-32A in order to bond the optical member 4-40 to the carrier 4-30 stably.

Figure 46:
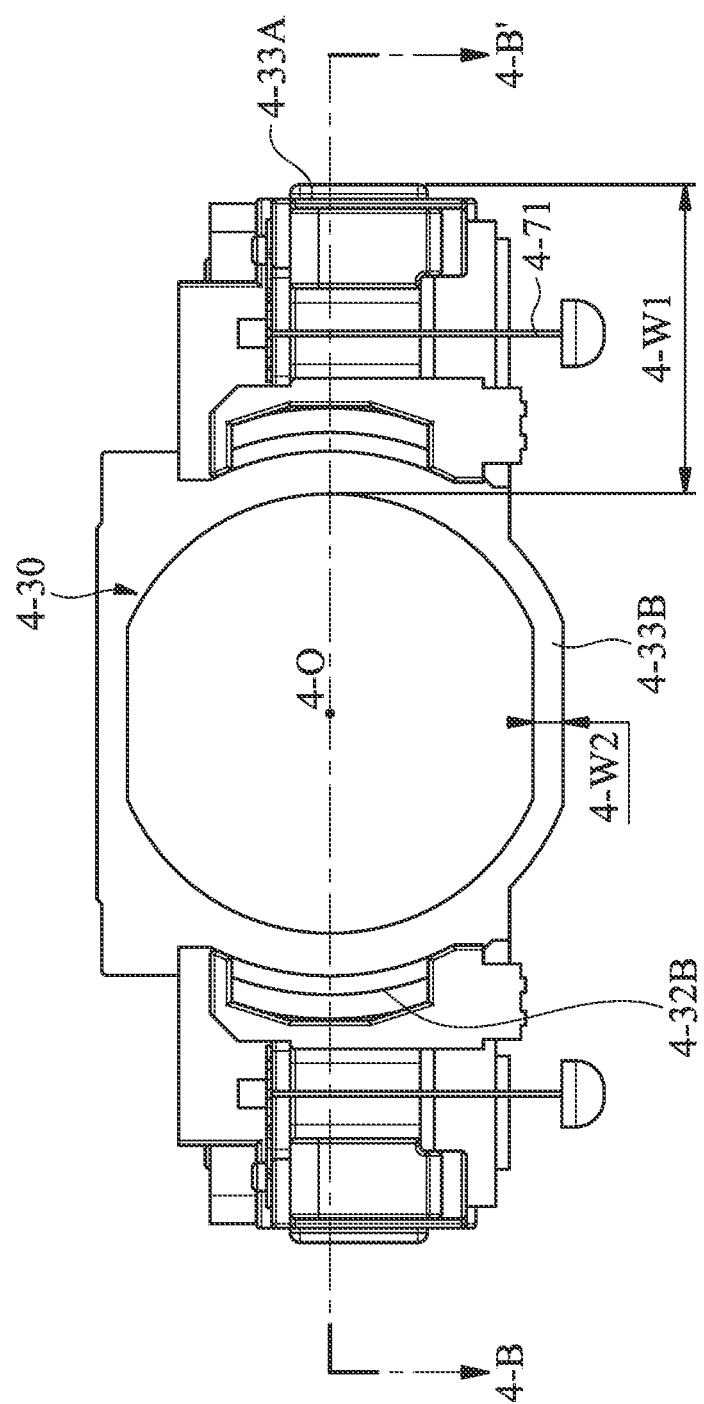
FIG. 46 is a schematic view illustrating a carrier as viewed in a light incident direction.

Refer to FIG. 46, wherein FIG. 46 is a schematic view illustrating the carrier 4-30 as viewed in a light incident direction 4-$D_i$. As shown in FIG. 46, as view in the light incident direction 4-$D_i$, the carrier 4-30 further includes a plurality of second bonding recesses 4-32B, which are disposed in the carrier 4-30, and adjacent to the optical member 4-40. In other words, the first bonding recesses 4-32A and the second bonding recesses 4-32B are disposed on opposite sides of the carrier 4-30. In the present embodiment, the second bonding recesses 4-32B are symmetrically disposed towards the optical member 4-40, wherein the optical axis 4-O is the axis of symmetry. The second bonding recesses 4-32B are also arranged along the second direction (Y-axis). Similarly, an adhesive (not shown) may be disposed in the second bonding recesses 4-32B in order to bond the optical member 4-40 to the carrier 4-30.

In addition, the carrier 4-30 further includes two first sidewalls 4-33A and two second sidewalls 4-33B respectively located on different opposite side of the optical member 4-40. In the present embodiment, the first sidewalls 4-33A are located on left and right sides of the optical member 4-40, and the second sidewalls 4-33B are located on upper and lower sides of the optical member 4-40. The first sidewalls 4-33A are arranged along the second direction (Y-axis), and the second sidewalls 4-33B are arranged along the first direction (Z-axis). A first width 4-W1 of the first sidewalls 4-33A is greater than a second sidewall 4-W2. By the aforementioned design, the structural strength, along the second direction (Y-axis), of the carrier 4-30 may be enhanced, preventing the optical member 4-40 from damage due to collision.

Figure 47:
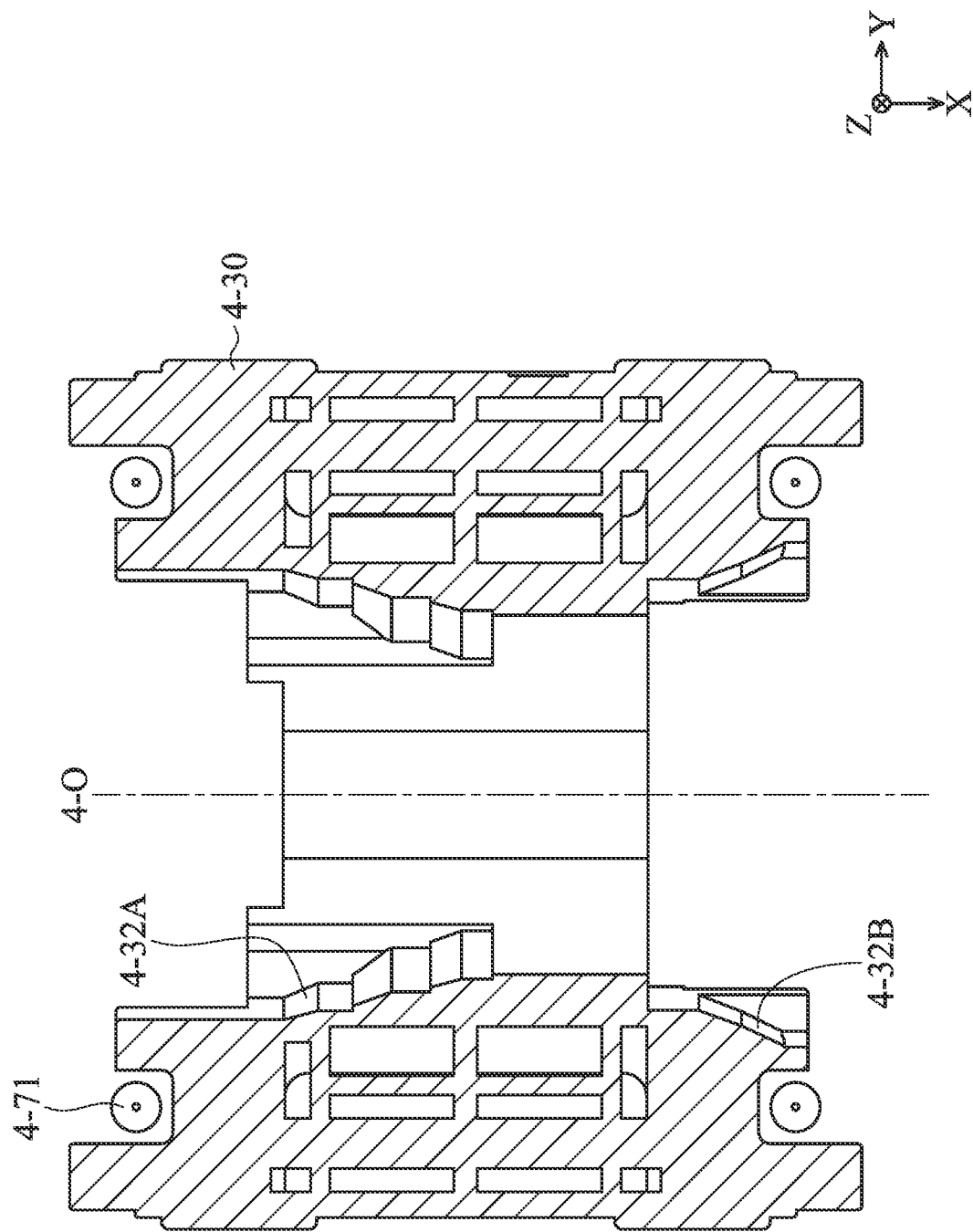
FIG. 47 is a cross-sectional view along line 4-B shown in FIG. 46.
Figure 48:
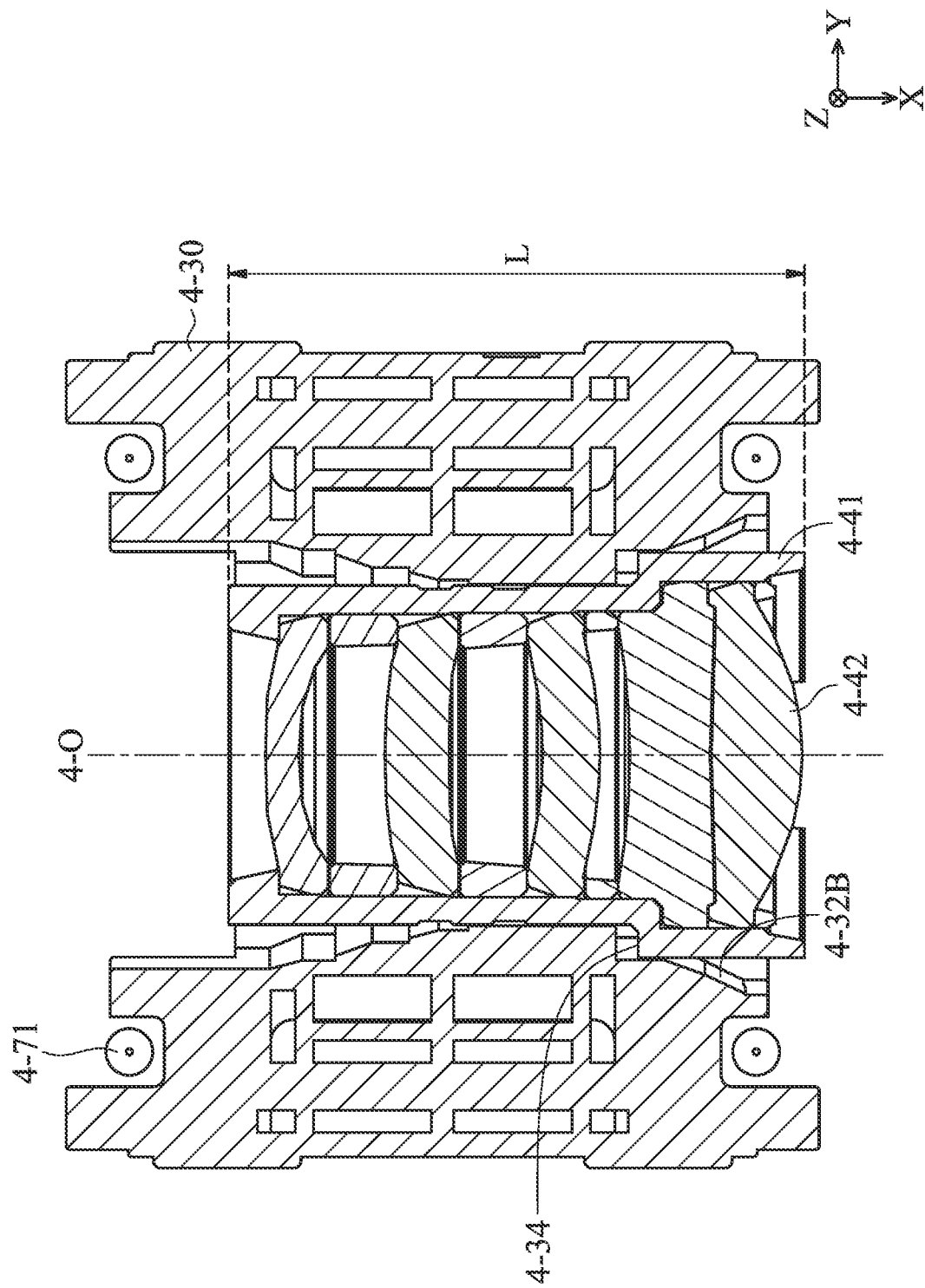
FIG. 48 is a cross-sectional view illustrating the carrier shown in FIG. 47 with an optical member.

FIG. 47 is a cross-sectional view along line 4-B shown in FIG. 46. As shown in FIG. 47, as viewed along the optical axis 4-O, the first bonding recesses 4-32A and the second bonding recesses 4-32B at least partially overlap, and thereby the optical member 4-40 may be affixed to the carrier 4-30 more stably. In addition, FIG. 48 is a cross-sectional view illustrating the carrier 4-30 shown in FIG. 47 with the optical member 4-40. In the present embodiment, the carrier 4-30 has a surface 4-34, which faces the optical member 4-40, and is perpendicular to the optical axis 4-O. The optical member 4-40 includes a lens barrel 4-41, and a length L of the optical member 4-40 along the optical axis 4-O is at least greater than 5 mm. Therefore, the lens barrel 4-41 may contain at least five lenses 4-42, such that great optical effect may be achieved.

Figure 49:
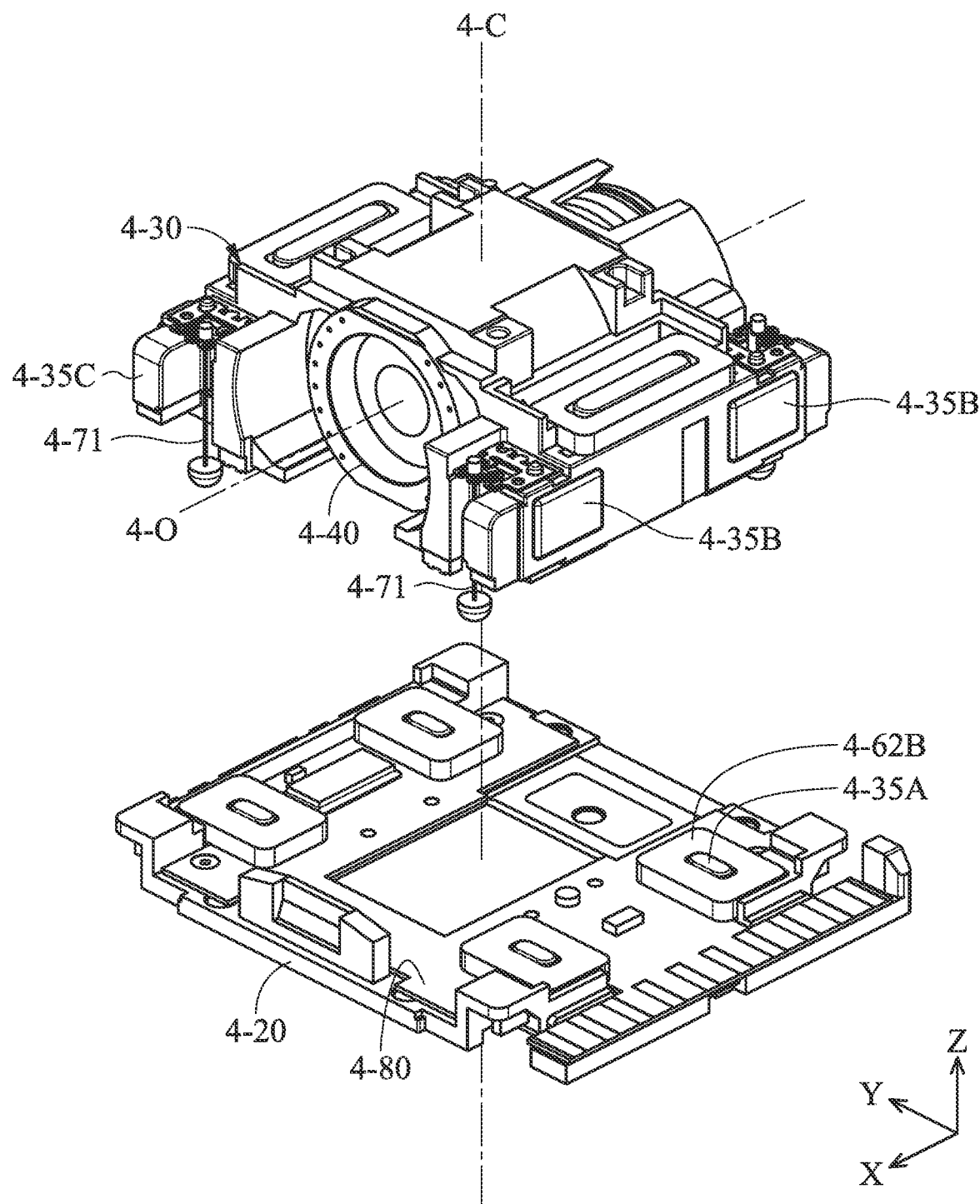
FIG. 49 is a perspective view illustrating the separated carrier and base in accordance with another embodiment of the present disclosure.

Refer to FIG. 49, wherein FIG. 49 is a perspective view illustrating the separated carrier 4-30 and base 4-20 in accordance with one embodiment of the present disclosure. As shown in FIG. 49, the carrier 4-30 further includes a first direction stopping portion 4-35A, a second direction stopping portion 4-35B, and a third direction stopping portion 4-35C, which are disposed on the first sidewalls for limiting the moving range of the movable portion 4-M (including the carrier 4-30). For example, the first direction stopping portion 4-35A is disposed on a surface, which is perpendicular to the first direction (Z-axis), of the carrier 4-30 (namely, protruding from an X-Y plane of the carrier 4-30) for limiting the moving range of the movable portion 4-M in the first direction. The second direction stopping portion 4-35B is disposed on a surface, which is perpendicular to the second direction (Y-axis), of the carrier 4-30 (namely, protruding from a Z-X plane of the carrier 4-30) for limiting the moving range of the movable portion 4-M in the second direction. The third direction stopping portion 4-35C is disposed on a surface, which is perpendicular to the optical axis 4-O, of the carrier 4-30 (namely, protruding from a Y-Z plane of the carrier 4-30) for limiting the moving range of the movable portion 4-M in the optical axis 4-O.

As viewed along the second direction (Y-axis), the third direction stopping portion 4-35C and the first elastic members 4-71 may partially overlap. In addition, the first elastic members 4-71 are located between the optical member 4-40 and the second direction stopping portion 4-35B, or between the optical member 4-40 and the third direction stopping portion 4-35C. By the aforementioned design, the size, in a horizontal direction (X-Y plane), of the optical member driving mechanism 4-1 may be effectively reduced, and thereby when the carrier 4-30 moves, the carrier 4-30 may be prevented from colliding with the circuit component 4-80, which is disposed on the base 4-20.

FIG. 50 is a plane view illustrating the carrier 4-30 and the base 4-20 shown in FIG. 49. The first driving coil 4-61B of the first driving assembly 4-61 is disposed around the first direction stopping portion 4-35A, which is located on the carrier 4-30. The second driving coil 4-62B of the second driving assembly 4-62 is disposed around the first direction stopping portion 4-35A, which is located on the base 4-20. It should be noted that a height of the first direction stopping portion 4-35A along the first direction (Z-axis) is greater than a height of the first driving coil 4-61B and/or the second driving coil 4-62B along the first direction. Therefore, the first driving coil 4-61B and/or the second driving coil 4-62B may be prevented from damage due to the collision with the movable portion 4-M.

Figure 51:
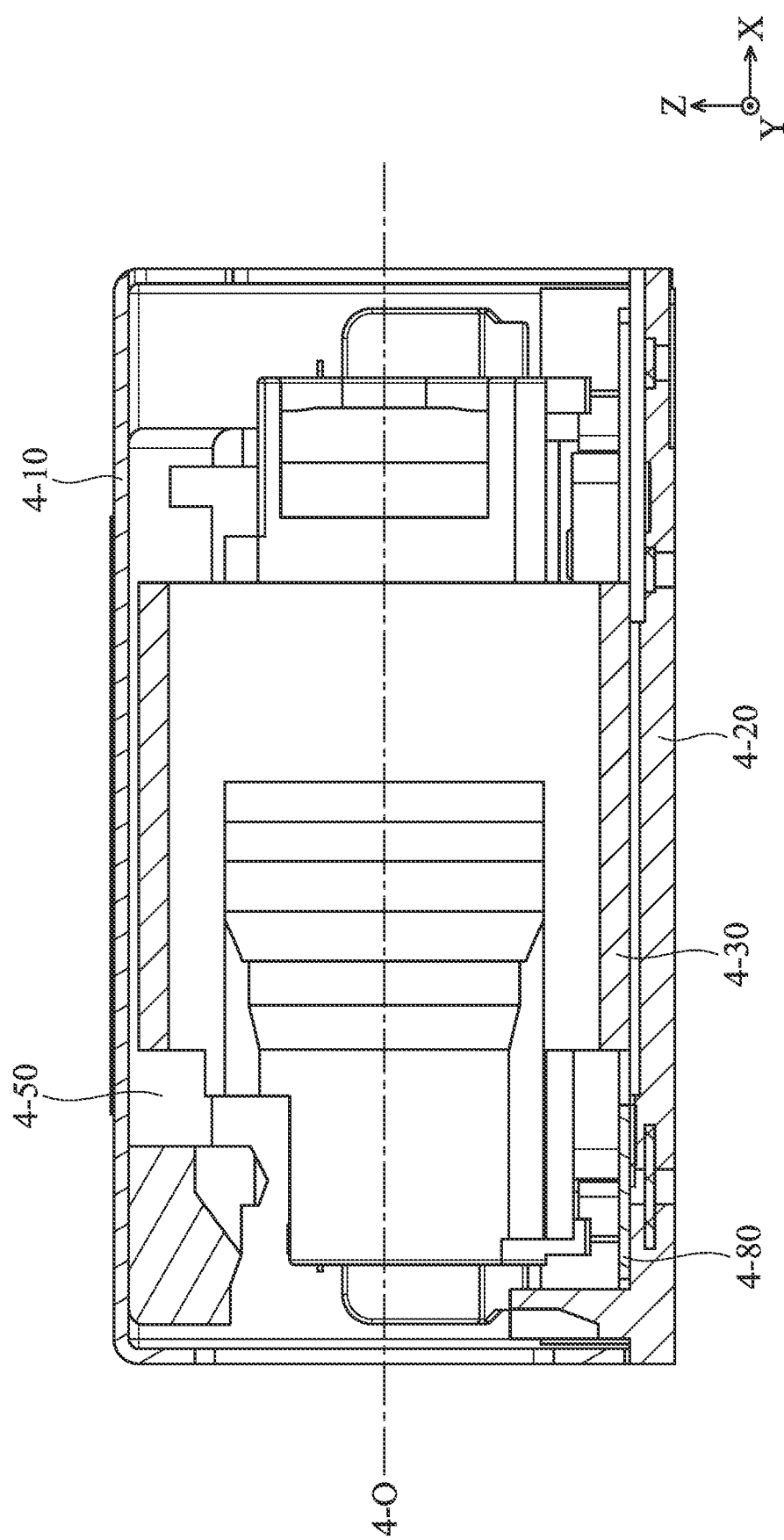
FIG. 51 is a cross-sectional view along line 4-A shown in FIG. 42.

FIG. 51 is a cross-sectional view along line 4-A shown in FIG. 42. As shown in FIG. 51, the circuit component 4-80 is disposed on the base 4-20, wherein as viewed along the second direction (Y-axis), which is perpendicular to the first direction (Z-axis), the optical axis 4-O, the circuit component 4-80 and the carrier 4-30 partially overlap. Therefore, the size of optical member driving mechanism 4-1 may be reduced in Z-axis, making it easier to arrange the optical member driving mechanism 4-1 in thin electronic devices.

Figure 52:
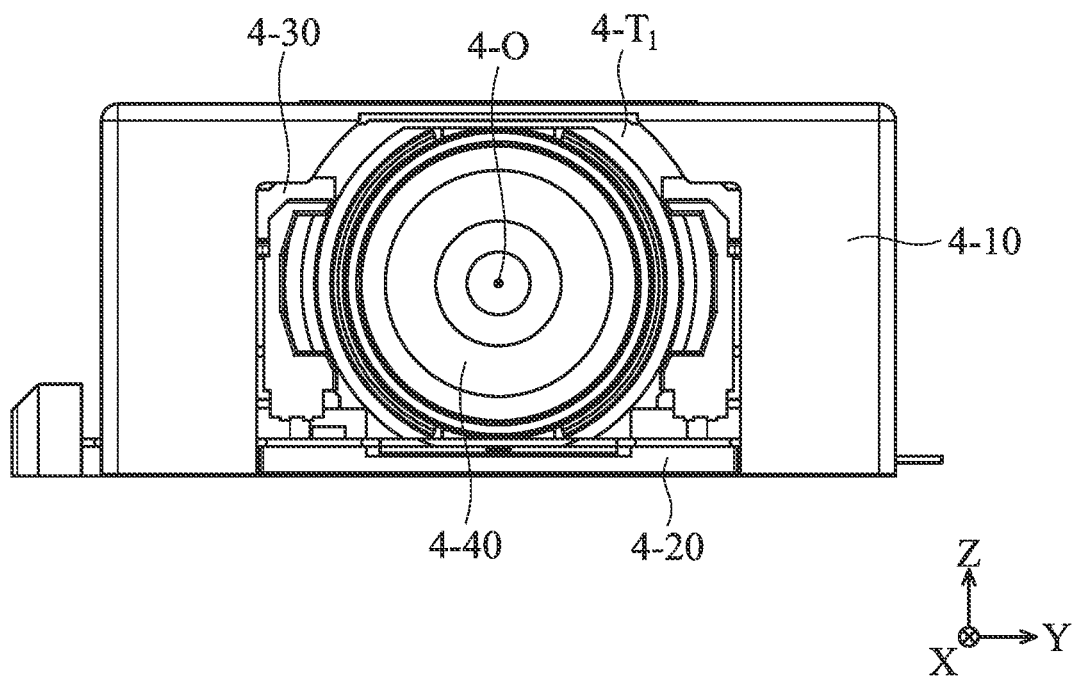
FIG. 52 is a schematic view illustrating the optical member driving mechanism shown in FIG. 42 as viewed in a light incident direction.
Figure 53:
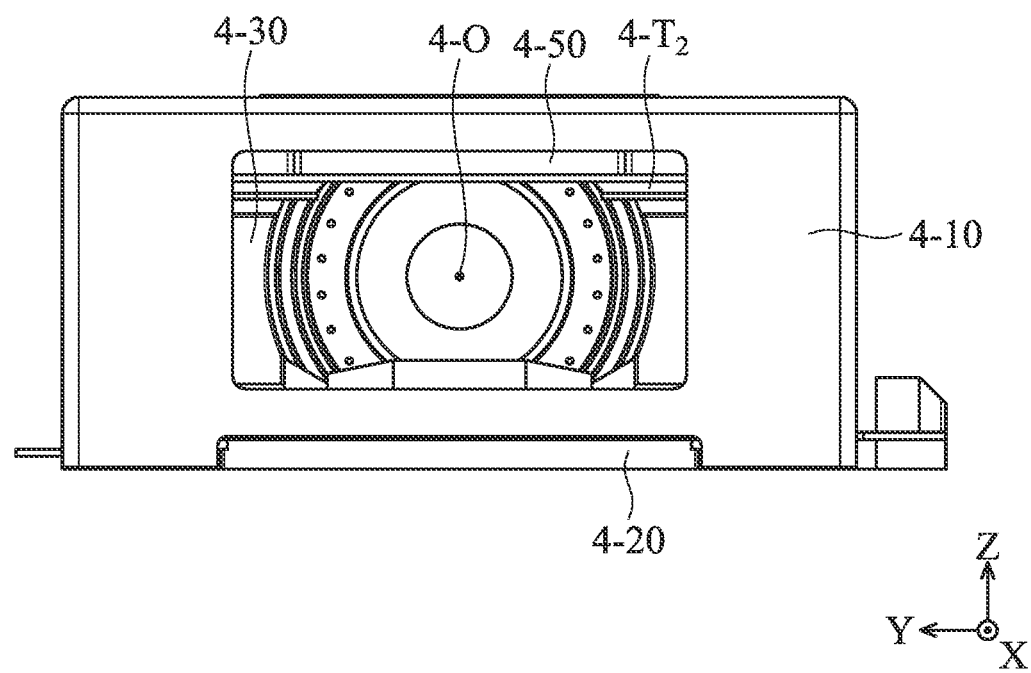
FIG. 53 is a schematic view illustrating the optical member driving mechanism shown in FIG. 42 as viewed in a light exit direction.

Refer to FIGS. 52 and 53, wherein FIG. 52 is a schematic view illustrating the optical member driving mechanism 4-1 shown in FIG. 42 as viewed in the light incident direction 4-$D_i$, and FIG. 53 is a schematic view illustrating the optical member driving mechanism 4-1 shown in FIG. 42 as viewed in the light exit direction 4-$D_o$. As shown in FIGS. 52 and 53, the housing 10 has four sidewalls 4-12, a first opening 4-$T_1$, and a second opening 4-$T_2$. The first opening 4-$T_1$ and the second opening 4-$T_2$ are respectively disposed on different sidewalls 4-12 of the housing 4-10. The first opening 4-$T_1$ is closer to the light incident direction 4-$D_i$ of the optical member 4-40 than second opening 4-$T_2$, and the second opening 4-$T_2$ is near the image sensing member (not shown) disposed out of the optical member driving mechanism 4-1. The optical axis 4-O may pass through the first opening 4-$T_1$ and the second opening 4-$T_2$. The second opening 4-$T_2$ is formed by the frame 4-50, the housing 4-10, and the base 4-20. Therefore, the first opening 4-$T_1$ may be greater than the second opening 4-$T_2$. By arranging for the second opening 4-$T_2$ to be smaller, the light incident to the optical member driving mechanism 4-1 may be concentrated on the image sensing member, increasing the image quality.

As set forth above, the present disclosure provides an optical member driving mechanism with an elastic member electrically connected to a driving assembly. By arranging for the elastic member to be a portion of the circuit, the circuit structure of the optical member driving mechanism may be simplified. In addition, the optical member driving mechanism 4-1 may also be applied to the lens unit of the optical modules 1-B1000, 1-B3000, 1-C1000, 1-C3000, 1-D1000, or 1-D3000 in the present disclosure.

Fifth Group of Embodiments

Figure 54:
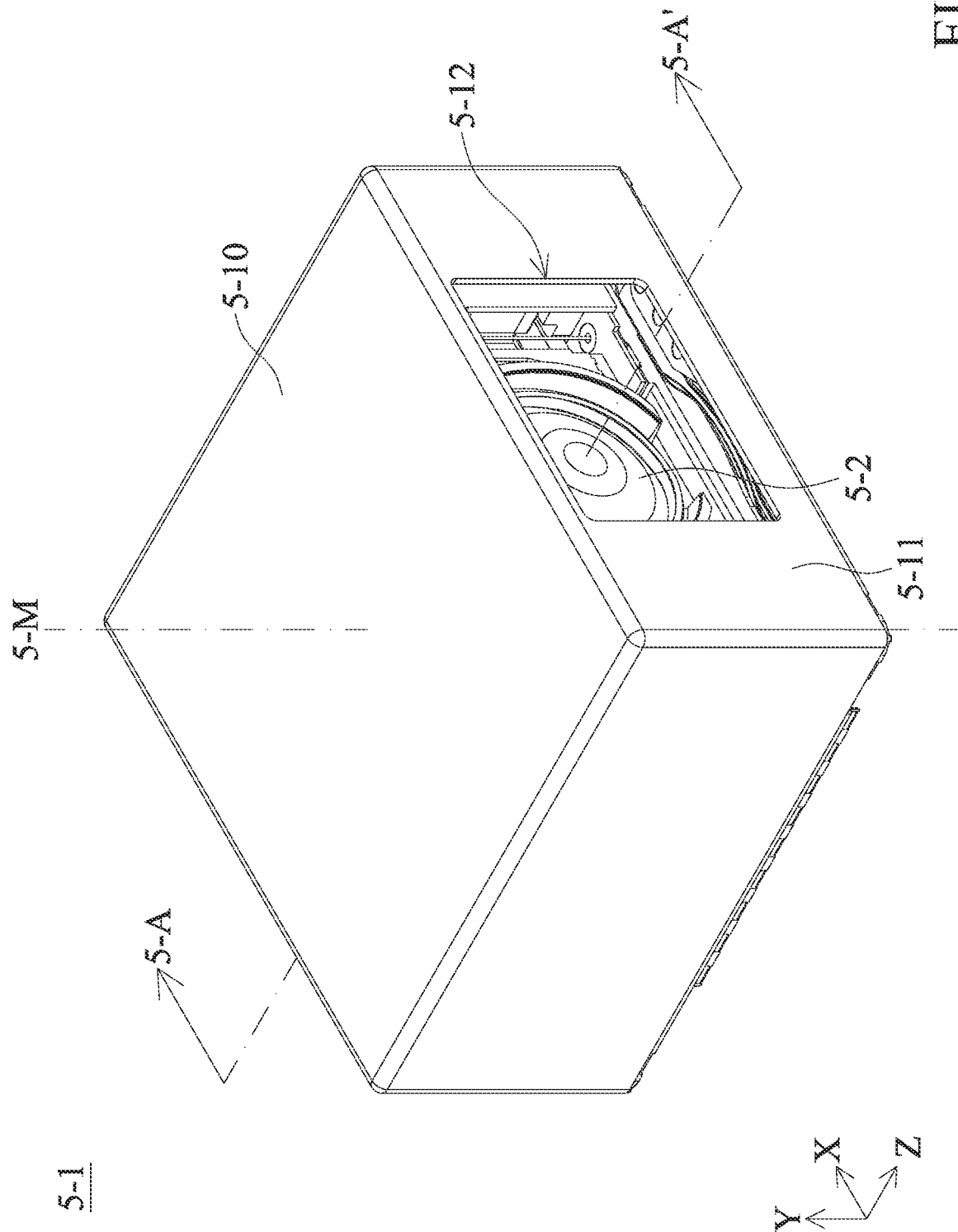
FIG. 54 is a perspective view of a lens unit in accordance with some embodiments of this disclosure.
Figure 55:
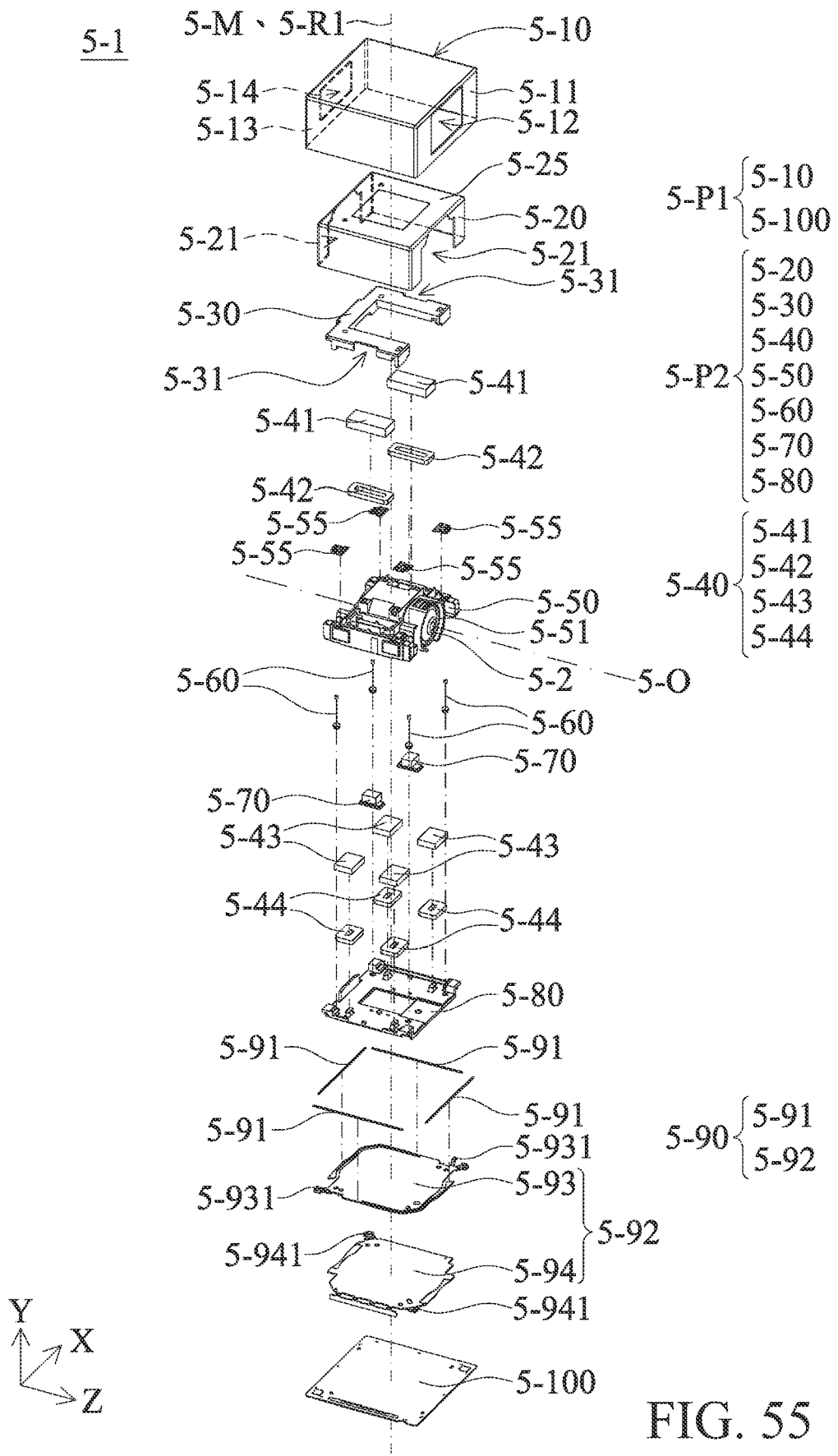
FIG. 55 is an exploded view of the lens unit of FIG. 54.

FIG. 54 is a perspective view of a lens unit 5-1 in accordance with some embodiments of this disclosure. FIG. 55 is an exploded view of the lens unit 5-1 in FIG. 54. The lens unit 5-1 has a central axis 5-M. The lens unit 5-1 includes a fixed portion 5-P1, a movable portion 5-P2, and a first driving assembly 5-90, wherein the movable portion 5-P2 is movably connected to the fixed portion 5-P1, and holds a lens 5-2 with an optical axis 5-O. The central axis 5-M of the lens unit 5-1 is not parallel to the optical axis 5-O of the lens 5-2. The first driving assembly 5-90 connects the fixed portion 5-P1 and the movable portion 5-P2, and drives the movable portion 5-P2 to move relative to the fixed portion 5-P1.

As shown in FIG. 55, in this embodiment, the fixed portion 5-P1 includes an outer frame 5-10 and a bottom 5-100. The movable portion 5-P2 includes a housing 5-20, a framework 5-30, a second driving assembly 5-40, four leaf springs 5-55, a holder 5-50, four elastic elements 5-60, two position sensing elements 5-70, and a base 5-80. The first driving assembly 5-90 includes a body 5-92 and four biasing elements 5-91 made of a shape memory alloy (SMA). It is noted that the elements of the lens unit 5-1 may be added or removed depending on users' needs.

The outer frame 5-10 is located above the bottom 5-100, and may be combined with the bottom 5-100. The methods for combining the outer frame 5-10 and the bottom 5-100 may be rivet joint, engagement or welding, etc. The movable portion 5-P2 and the first driving assembly 5-90 are accommodated in a space formed by the combination of the outer frame 5-10 and the bottom 5-100. Additionally, the outer frame 5-10 and the bottom 5-100 are arranged along the central axis 5-M of the lens unit 5-1.

The outer frame 5-10 includes a first side wall 5-11 and a second side wall 5-13 parallel to the central axis 5-M. A first perforation 5-12 is formed on the first side wall 5-11, and a second perforation 5-14 is formed on the second side wall 5-13. The positions of the first perforation 5-12 and the second perforation 5-14 correspond to the lens 5-2. As shown in FIG. 54, the movable portion 5-P2 is located between the first side wall 5-11 and the second side wall 5-13.

The housing 5-20 is located under the outer frame 5-10, made of a metal material, and is fixedly connected to the base 5-80. A top surface 5-25 of the housing 5-20 is perpendicular to the central axis 5-M, and two openings 5-21 are formed on the housing 5-20. Additionally, the positions of the openings 5-21 correspond to the lens 5-2.

The framework 5-30 is under the housing 5-20, and two openings 5-31 are formed on the framework 5-30.

The second driving assembly 5-40 drives the holder 5-50 to move relative to the base 5-80. The second driving assembly 5-40 includes two X-axis magnets 5-41, two X-axis coils 5-42, four Z-axis magnets 5-43, and four Z-axis coils 5-44. The two X-axis magnets 5-41 may be accommodated in the openings 5-31 of the frame 5-30.

The two X-axis magnets 5-41 may be permanent magnets with bar structures, and correspond to the two X-axis coils 5-42. The X-axis coils 5-42 have substantially elliptical structures, and the winding axes of the X-axis coils 5-42 are substantially perpendicular to the optical axis 5-O. The X-axis magnets 5-41 and the X-axis coils 5-42 are arranged adjacent to the holder 5-50 and are disposed above the holder 5-50.

Figure 56:
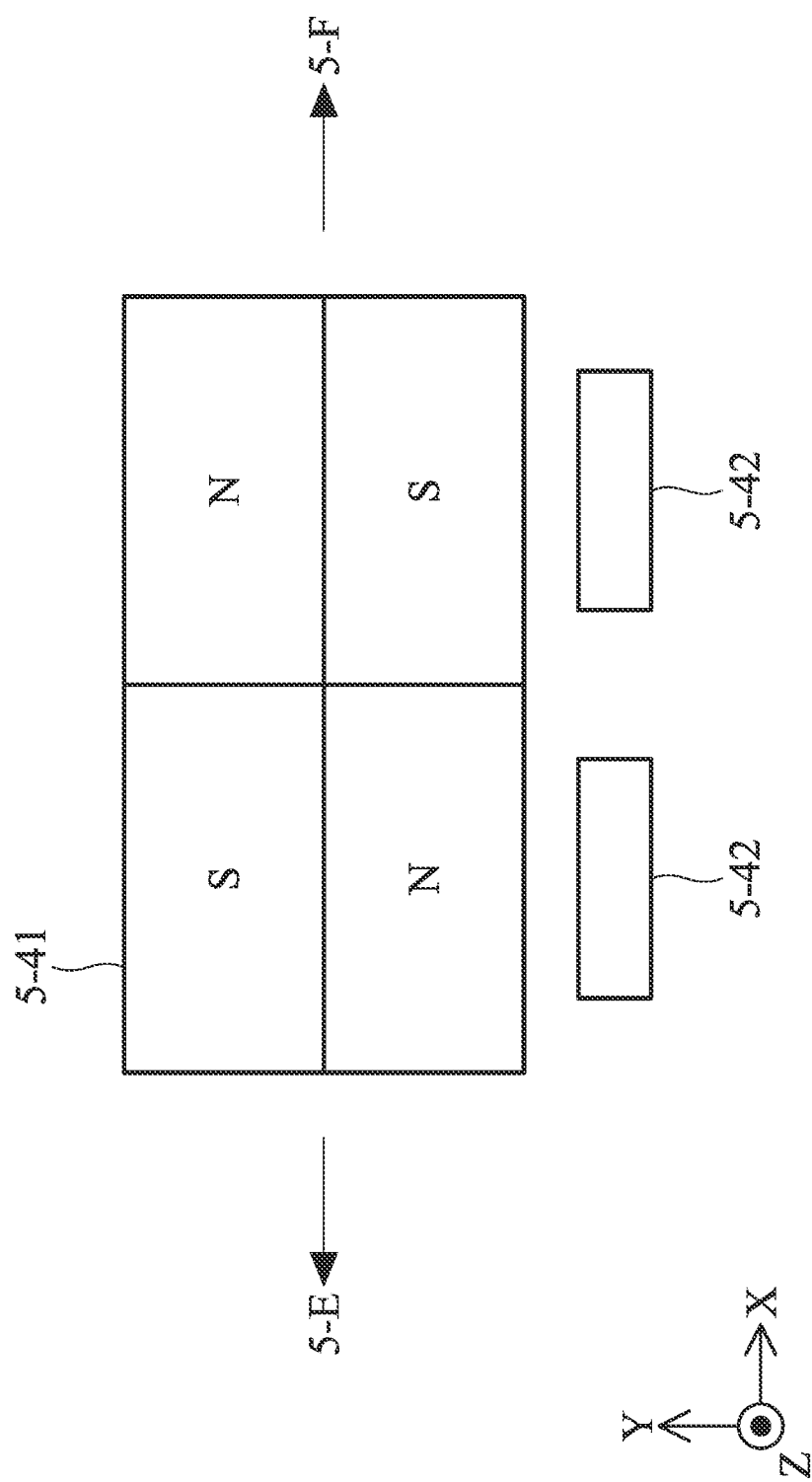
FIG. 56 and FIG. 57 are schematic views of the arrangement of the magnets and the coils of the second driving assembly.

Please refer to FIG. 56. FIG. 56 is a schematic view of the X-axis magnets 5-41 and the corresponding X-axis coils 5-42 of the second driving assembly. As shown in FIG. 56, the X-axis magnets 5-41 is a multi-pole magnet, having two pairs of magnetic pole, and the arrangement direction of the magnetic poles of the X-axis magnets 5-41 is substantially perpendicular to the optical axis 5-O. Additionally, the opposite magnetic poles are adjacent to each other, and the X-axis coils 5-42 directly face to the magnetic poles of the X-axis magnets 5-41. When a current is supplied to the X-axis coils 5-42, an attractive magnetic force or a repulsive magnetic force is generated between the X-axis magnets 5-41 and the X-axis coils 5-42 to drive the holder 5-50 and the lens 5-2 inside the holder 5-50 to move along a direction indicated by the arrows 5-E and 5-F, that is perpendicular to the optical axis 5-O (X-axis), thereby achieving the optical image stabilization function.

Similarly, the four Z-axis magnets 5-43 may be permanent magnets with bar structures, and correspond to the four Z-axis coils 5-44. The Z-axis coils 5-44 have substantially elliptical structures, and the winding axes of the Z-axis coils 5-44 are substantially perpendicular to the optical axis 5-O. The Z-axis magnets 5-43 and the Z-axis coils 5-44 are arranged adjacent to the holder 5-50 and are disposed below the holder 5-50.

The arrangement of the Z-axis magnets 5-43 and the Z-axis coils 5-44 is similar to that of the X-axis magnets 5-41 and X-axis coils 5-42. Therefore, the arrangement of the X-axis magnets 5-41 and X-axis coils 5-42 in FIG. 56 may also be referred. The Z-axis magnets 5-43 have two pairs of magnetic pole, and the arrangement direction of the magnetic poles of the Z-axis magnets 5-43 is substantially parallel to the optical axis 5-O. Additionally, the opposite magnetic poles are adjacent to each other, and the Z-axis coils 5-44 directly face to the magnetic poles of the Z-axis magnets 5-43. When a current is supplied to the Z-axis coils 5-44, an attractive magnetic force or a repulsive magnetic force is generated between the Z-axis magnets 5-43 and the Z-axis coils 5-44 to drive the holder 5-50 and the lens 5-2 inside the holder 5-50 to move along a direction that is parallel to the optical axis 5-O (Z-axis), thereby achieving the auto focus function.

Figure 57:
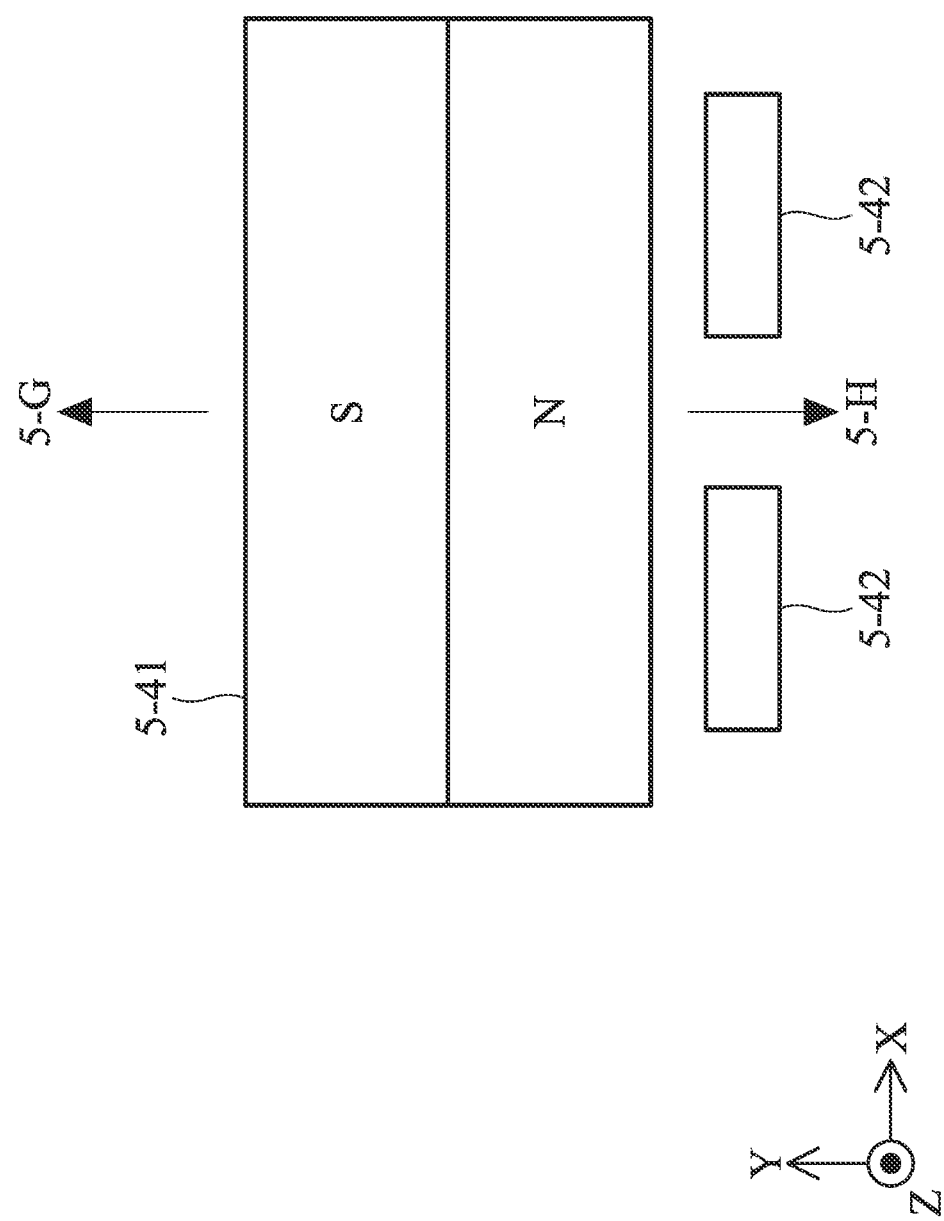

It is noted that the arrangement direction of the magnetic poles of the X-axis magnets 5-41 and the Z-axis magnets 5-43 is not limited thereto. FIG. 57 is a schematic view of the X-axis magnets 5-41 and the corresponding X-axis coils 5-42 of the second driving assembly in accordance with another embodiment of this disclosure. For example, the X-axis magnets 5-41 and the Z-axis magnets 5-43 may only have a pair of magnetic poles. Additionally, the X-axis coils 5-42 and the Z-axis coils 5-44 are respectively and directly face to the X-axis magnets 5-41 and the Z-axis magnets 5-43. The arrangement direction of the magnetic poles of the X-axis magnets 5-41 and the Z-axis magnets 5-43 may be parallel to the main axis 5-M, such that a magnetic force generated between the X-axis magnets 5-41 and the corresponding X-axis coils 5-42 and/or the Z-axis magnets 5-43 and the corresponding Z-axis coils 5-44 may drive the holder 5-50 and the lens 5-2 inside the holder 5-50 to move along a direction indicated by the arrows 5-G and 5-H, that is parallel to the main axis 5-M (Y-axis), thereby achieving the optical image stabilization function.

Moreover, the second driving assembly 5-40 may also drive the holder 5-50 to rotate, for example, rotating around a first rotation axis 5-R1. In this embodiment, the first rotation axis 5-R1 is the central axis 5-M, but is not limited thereto. The first rotation axis 5-R1 may be parallel to the central axis 5-M.

In summary, when a current is supplied to the X-axis coils 5-42 and/or the Z-axis coils 5-44 of the second driving assembly 5-40, an attractive magnetic force or a repulsive magnetic force is generated between the X-axis coils 5-42 and the corresponding X-axis magnets 5-41 and/or between the Z-axis coils 5-44 and the corresponding Z-axis magnets 5-43, in order to drive the holder 5-50 move or rotate relative to the base 5-80. For example, the second driving assembly 5-40 may drive the holder 5-50 to move along a direction that is parallel to or perpendicular to the optical axis 5-O. Alternatively, the second driving assembly 5-40 may drive the holder 5-50 to move in a direction parallel to or perpendicular to the central axis 5-M. Also, the second driving assembly 5-40 may drive the holder 5-50 to rotate.

Please refer to FIG. 55 again. The holder 5-50 is disposed between the framework 5-30 and the base 5-80. The holder 5-50 has a through hole 5-51 for holding the lens 5-2. In some embodiments, the through hole 5-51 forms a thread structure corresponding to another thread structure on the periphery of the lens 5-2, such that the lens 5-2 may be screwed into the through hole 5-51. In this embodiment, the central axis 5-M of the lens unit 5-1 is perpendicular to the optical axis 5-O of the lens 5-2, but is not limited thereto.

Four elastic elements 5-60 are respectively disposed at four corners of the base 5-80, and are connected to the four leaf springs 5-55 and the base 5-80. The leaf springs 5-55 are located above the holder 5-50 and are electrically connected to the X-axis coils 5-42, and thus a current may be supplied to the X-axis coils 5-42 and a magnetic force may be generated between the X-axis coils 5-42 and the X-axis magnets 5-41.

The two position sensing elements 5-70 are disposed adjacent to the holder 5-50 for sensing the position of the holder 5-50. The position sensing elements 5-70 may be a hall sensor, a magnetoresistive effect sensor (MR sensor), a giant magnetoresistive effect sensor (GMR sensor), a tunneling magnetoresistive effect sensor (TMR sensor), an optical encoder or an infrared sensor.

The base 5-80 is disposed between the holder 5-50 and the bottom 5-100, and is movably connected to the holder 5-50.

The first driving assembly 5-90 is located between the fixed portion 5-P1 and the movable portion 5-P2, and connected to the movable portion 5-P2 for driving the movable portion 5-P2 to move relative to the fixed portion 5-P1. The first driving assembly 5-90 includes four biasing elements 5-91 made of shape memory alloy and the body 5-92.

The biasing elements 5-91 are disposed above the body 5-92. The biasing elements 5-91 include an iron-based alloy, a copper-based alloy (for example, copper-zinc-aluminum alloy, copper-aluminum-nickel alloy), a titanium-nickel alloy, a titanium-palladium alloy, a titanium-nickel-copper alloy, a titanium-nickel-palladium alloy, a gold-cadmium alloy, a thallium-indium alloy or combination of any above-described shape memory alloy.

In this embodiment, when viewed along the center axis 5-M, the four biasing elements 5-91 do not cross or overlap each other. Additionally, the four biasing elements 5-91 are symmetrically disposed. However, the biasing elements 5-91 may not be symmetrically disposed if any deviation is produced when assembling.

The body 5-92 may be further defined as a first substrate 5-93 and a second substrate 5-94. The first substrate 5-93 is located above the second substrate 5-94. The first substrate 5-93 includes two protrusions 5-931, and the second substrate 5-94 also includes two protrusions 5-941. The four biasing elements 5-91 are respectively connected to the protrusions 5-931 and the protrusions 5-941, such that the structure of the first driving assembly 5-90 may be more stable.

After the lens unit 5-1 is assembled, the base 5-80 of the movable portion 5-P2 is located on the first substrate 5-93, and the second substrate 5-94 is located on the bottom 5-100 of the fixed portion 5-P1. In this embodiment, the size of the first substrate 5-93 is slightly larger than the size of the base 5-80, such that the periphery of the body 5-92 surrounds around the base 5-80, which means the first driving assembly 5-90 surrounds around the movable portion 5-P2. Also, a portion of the first driving assembly 5-90 is disposed between the movable portion 5-P2 and the first side wall 5-11 of the outer frame 5-10, wherein one of the biasing elements 5-92 is disposed between the movable portion 5-P2 and the first side wall 5-11 of the outer frame 5-10 as well.

The shape memory alloy deforms when the temperature changes. Therefore, at least one driving signal (e.g. current, voltage) may be applied to the four biasing elements 5-91 by a power source. The driving signals may be the same or different. The temperature of the four biasing elements 5-91 are controlled respectively, and the lengths of the four biasing elements 5-91 are changed respectively, the lengths of the four biasing elements 5-91 may be changed identically or differently. Moreover, the driving signal is calculated based on a compensation information. The relationship between the compensation information and the driving signal will be described with FIG. 64 in the following description.

For example, when a driving signal is applied to the biasing elements 5-91, the temperature of the biasing elements 5-91 are changed, and thus the lengths of the biasing elements 5-91 are lengthened or shortened to make the first substrate 5-93 move. The position of the base 5-80 on the first substrate 5-93 is changed because the base 5-80 is connected to the first substrate 5-93, such that the movable portion 5-P2 moves relative to the fixed portion 5-P1. When stopping applying driving signal, the biasing elements 5-91 may be restored to its original length due to the characteristics of the shape memory alloy.

Figure 58:
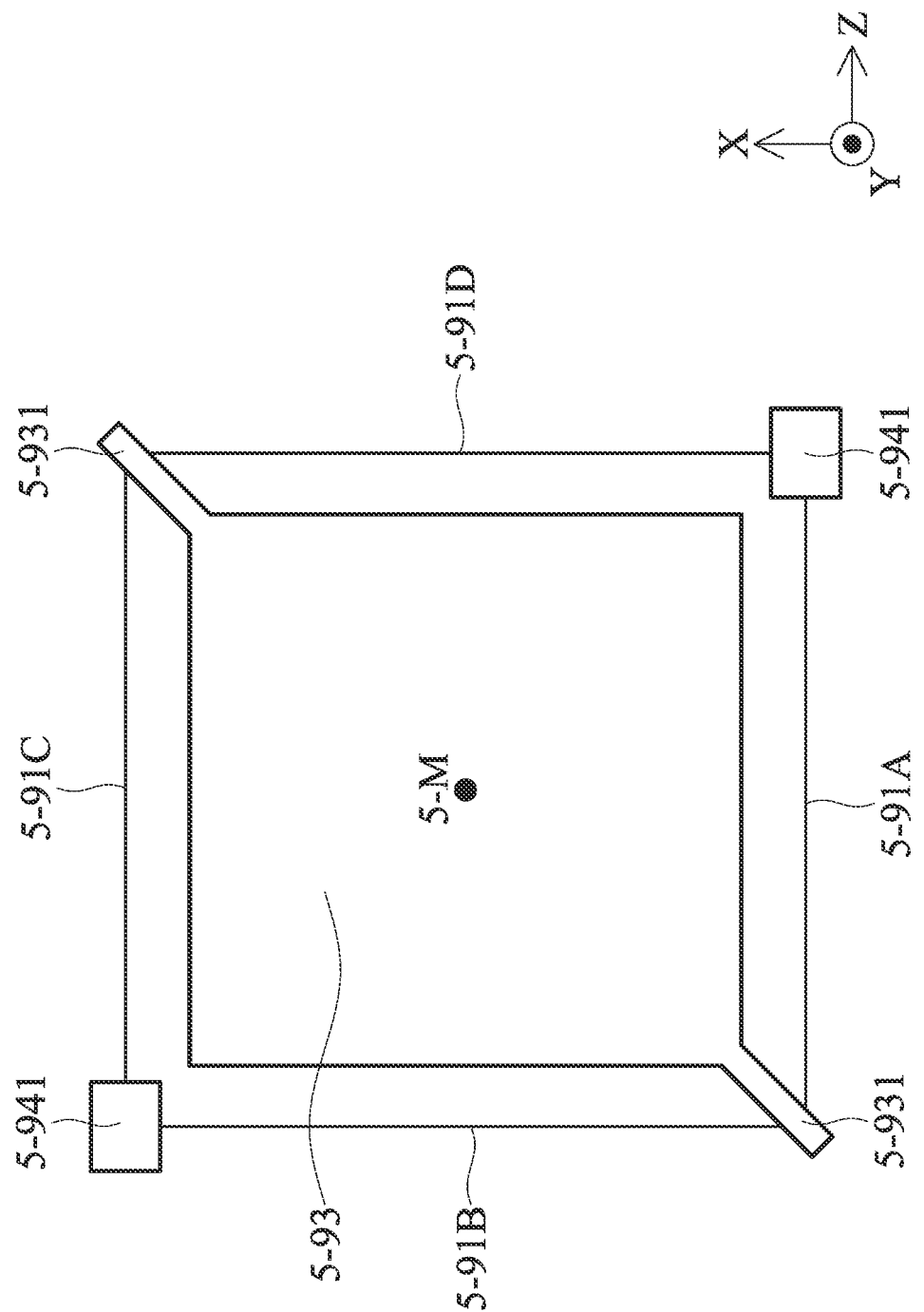
FIGS. 58 to 60 are top views of a first driving assembly.
Figure 59:
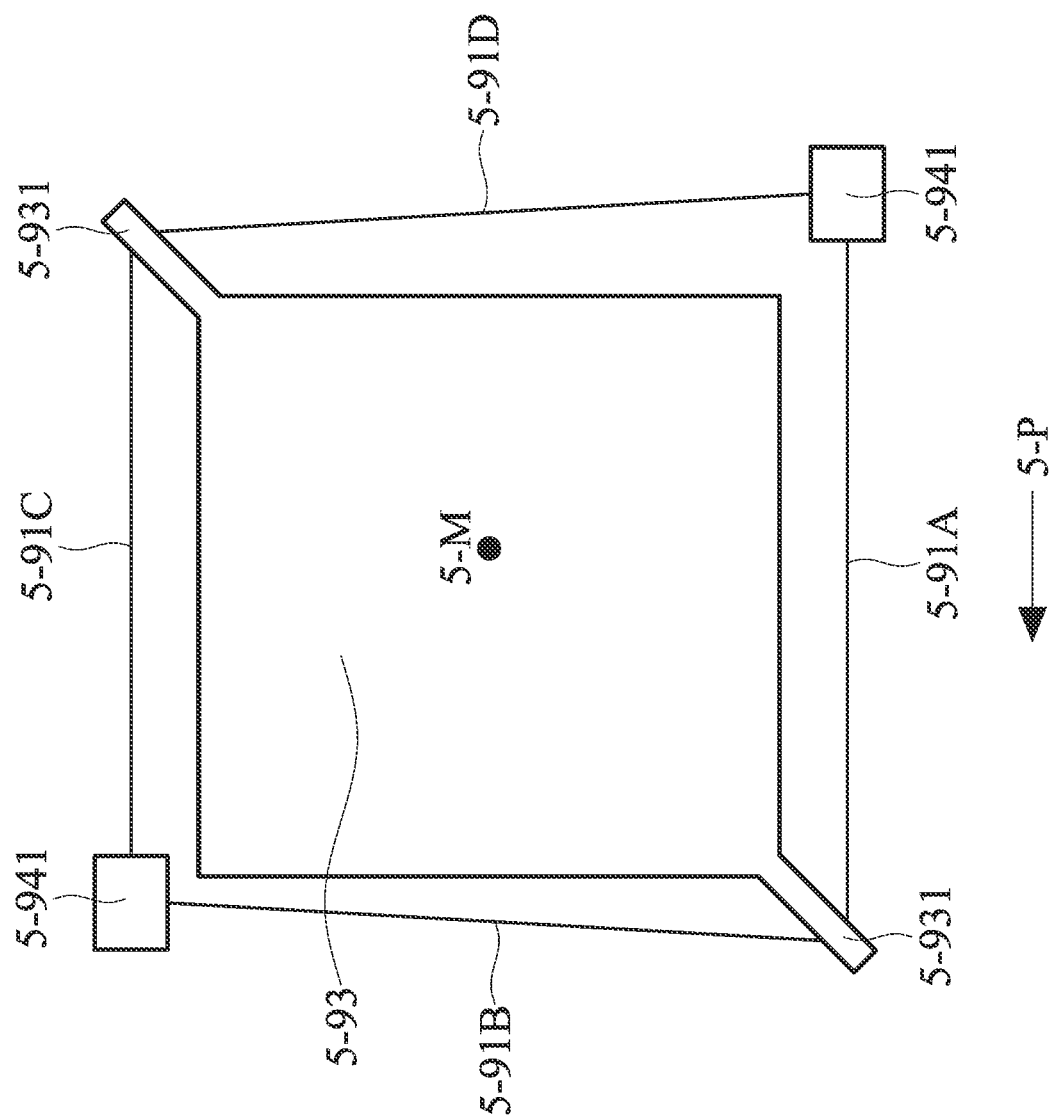
Figure 60:
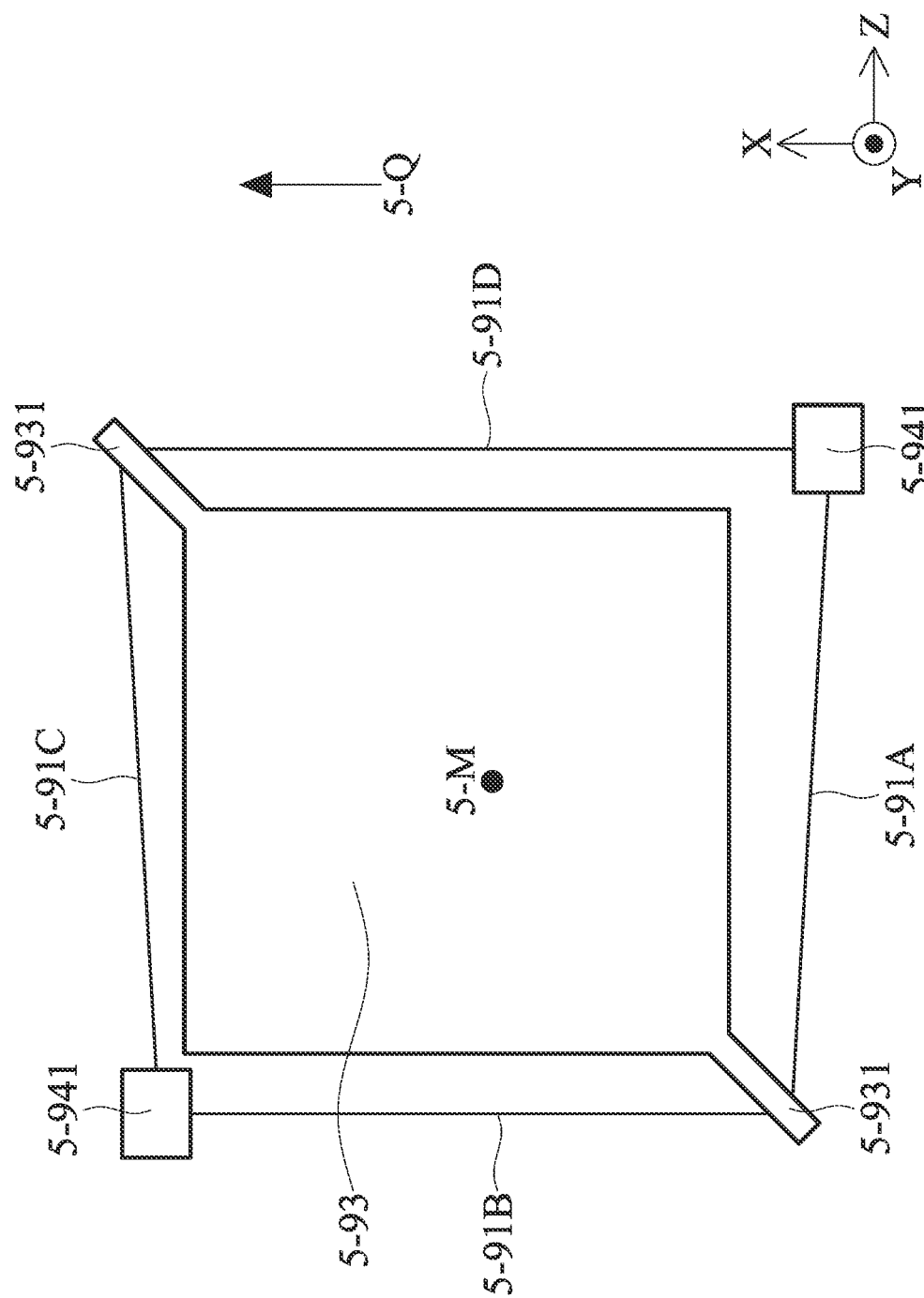

Next, please refer to FIGS. 58 to 60 to better understand the acting way of the first driving assembly 5-90. FIG. 58, FIG. 59 and FIG. 60 are top views of the first driving assembly 5-90. It is noted that since the second substrate 5-94 is located above the base 5-100 of the fixed portion 5-P1, the second substrate 5-94 remains stationary. That is, in FIGS. 58 to 60, the positions of the two protrusions 5-941 of the second substrate 5-94 remained unchanged. It is the first substrate 5-93 which is connected to the base 5-80 of the movable portion 5-P2 move relative to the second substrate 5-94. Moreover, for convenience of explanation, the first substrate 5-93 and the second substrate 5-94 are greatly simplified in FIGS. 58 to 60, and only the two protrusions 5-941 of the second substrate 5-94 are shown. The four biasing elements 5-91 are further defined as a first biasing element 5-91A, a second biasing element 5-91B, a third biasing element 5-91C and a fourth biasing element 5-91D.

As shown in FIG. 58, no driving signal is applied at this time, and the four biasing elements 5-91 maintain the original lengths and are symmetrically arranged.

As shown in FIG. 59, when the applied driving signal makes the length of the first biasing element 5-91A lengthened, and makes the length of the third biasing element 5-91C shortened, the first substrate 5-93 moves relative to the second substrate 5-94 along a direction indicated by the arrow 5-P (negative Z-axis), which means the position correction and the displacement compensation is performed in the negative Z-axis direction. Vice versa, when the length of the first biasing element 5-91A is shortened and the length of the third biasing element 5-91C is lengthened, the first substrate 5-93 moves relative to the second substrate 5-94 along the positive Z-axis to perform the position correction and the displacement compensation.

As shown in FIG. 60, when the applied driving signal makes the length of the second biasing element 5-91B shortened, and makes the length of the fourth biasing element 5-91D lengthened, the first substrate 5-93 moves relative to the second substrate 5-94 along a direction indicated by the arrow 5-Q (positive X-axis), which means the position correction and the displacement compensation is performed in the positive X-axis direction. Vice versa, when the length of the second biasing element 5-91B is lengthened and the length of the fourth biasing element 5-91D is shortened, the first substrate 5-93 moves relative to the second substrate 5-94 along the negative X-axis to perform the position correction and the displacement compensation.

Furthermore, the movable portion 5-P2 may be rotated by the first driving assembly 5-90 via the biasing elements 5-91. For example, the movable portion 5-P2 may be rotated around the aforementioned first rotation axis 5-R1 in FIG. 55.

In summary, the length of the biasing elements 5-91 is controlled by applying an appropriate driving signal, the first driving assembly 5-90 may drive the movable portion 5-P2 to move or to rotate relative to the fixed portion 5-P1. For example, the first driving assembly 5-90 may drive the movable portion 5-P2 to move along a direction that is parallel to or perpendicular to the optical axis 5-O. Alternatively, the first driving assembly 5-90 may drive the movable portion 5-P2 to move along a direction that is perpendicular to the central axis 5-M. Also, the first driving assembly 5-90 may drive the movable portion 5-P2 to rotate.

The first driving assembly 5-90 drives the movable portion 5-P2 to move or rotate by controlling the length of the biasing elements 5-91 for achieving the auto focus or optical image stabilization functions, thereby improving the quality of the image produced by the lens unit 5-1. Compared with a lens unit that achieves displacement correction by an element requires a magnetic field to be generated, such as a magnetic element or a driving coil, the biasing elements 5-91 have much smaller volume than the magnetic element or the driving coil, and thus the lens unit 5-1 may be miniaturized. In addition, when the first driving assembly 5-90 drives the movable portion 5-P2 to move or rotate, no magnetic field or electromagnetic wave is generated, thereby reducing the electromagnetic interference inside the lens unit 5-1. Additionally, the driving force generated by the shape memory alloy is higher than the driving force generated by the magnetic element or the driving coil, thereby achieving a better correction effect. Besides, the quality of images or videos of the electronic device provided with the lens unit 5-1 is improved.

Figure 61:
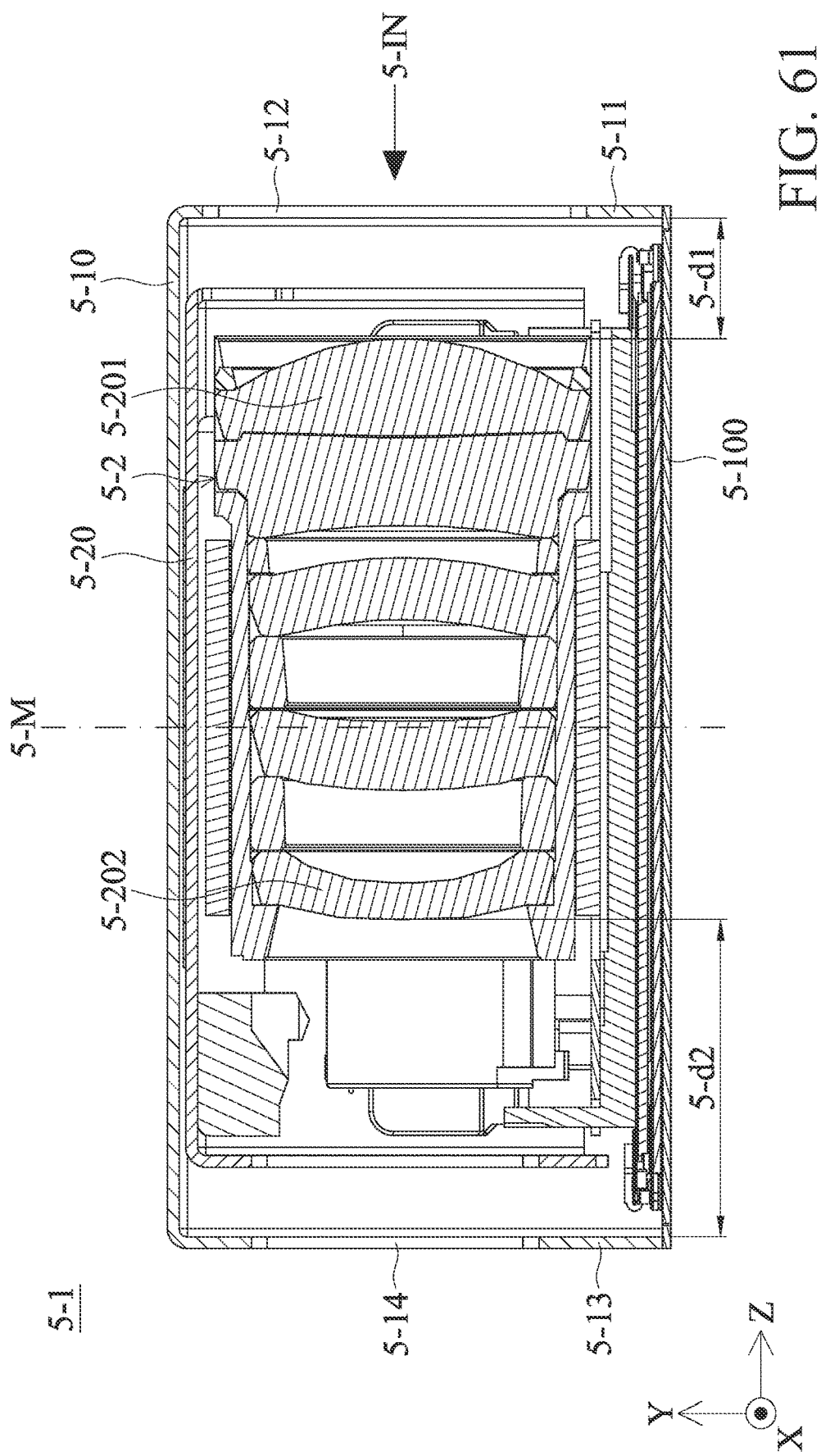
FIG. 61 is a cross-sectional view illustrated along the line 5-A-5-A' of FIG. 54.
Figure 62:
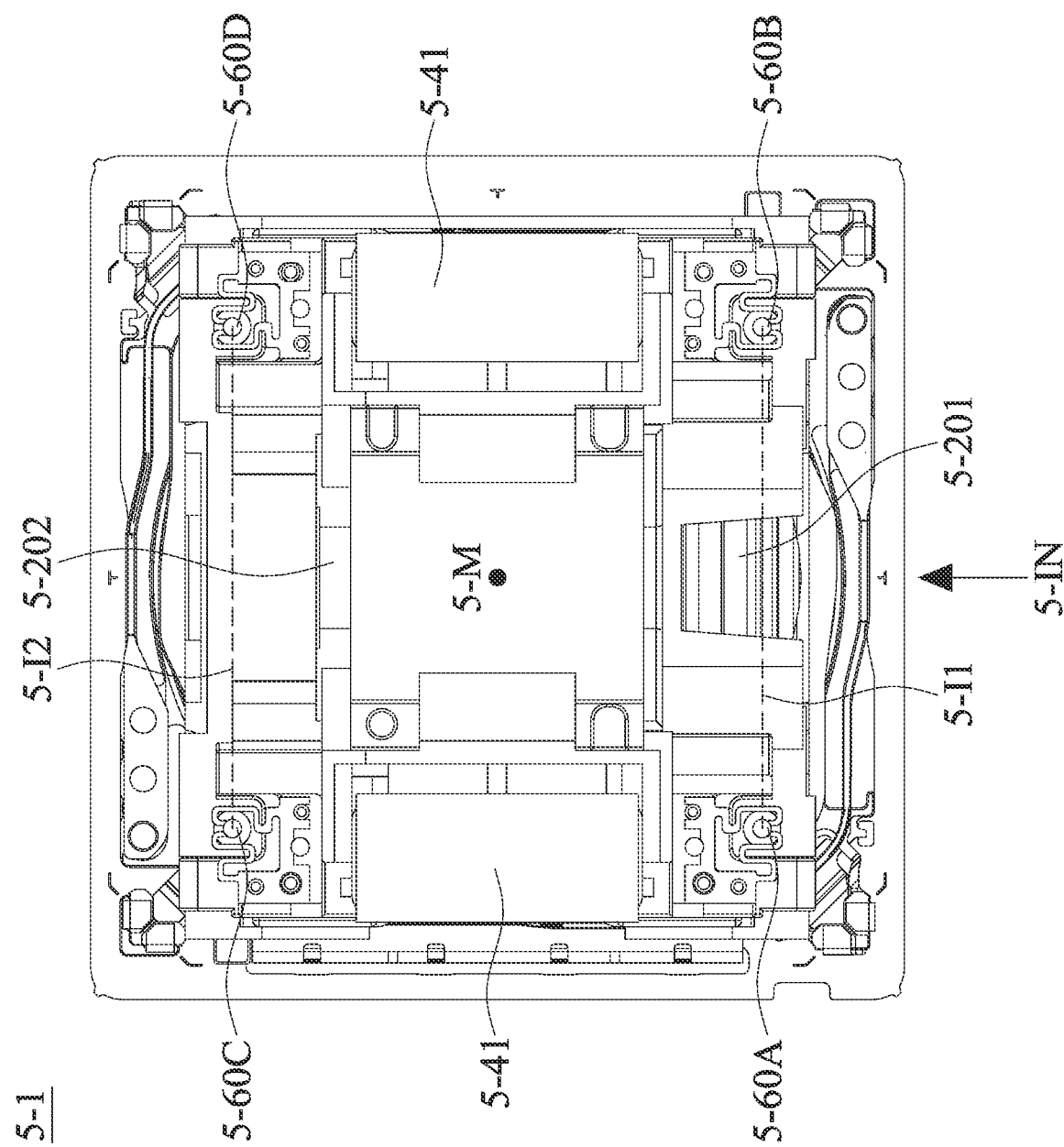
FIG. 62 is a plan view of the lens unit with a portion of elements omitted in accordance with some embodiments of this disclosure.
Figure 63:
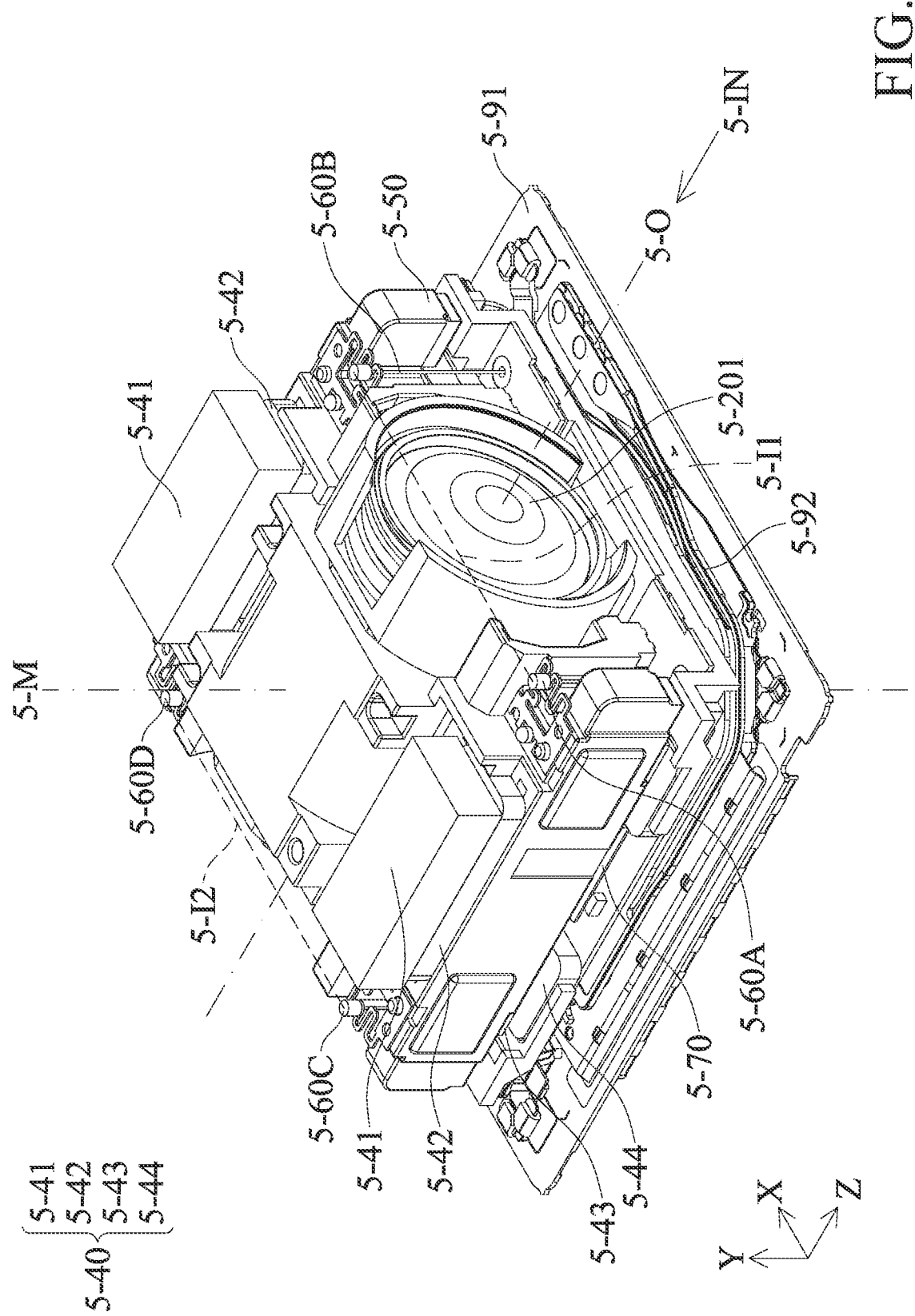
FIG. 63 is a perspective view of the lens unit with a portion of the element omitted in accordance with some embodiments of this disclosure.

Next, please refer to FIGS. 61 to 63, in order to better understand the position relationship between the lens 5-2 and the elastic elements 5-60. FIG. 61 is a cross-sectional view illustrated along the line 5-A-5-A' of FIG. 54. FIG. 62 is a plan view of the lens unit 5-1 with the outer frame 5-10, the housing 5-20, and the framework 5-30 omitted in accordance with some embodiments of this disclosure. FIG. 63 is a plan view of the lens unit 5-1 with the outer frame 5-10, the housing 5-20, and the framework 5-30 omitted in accordance with some embodiments of this disclosure.

As shown in FIG. 61, in this embodiment, the lens 5-2 includes a first lens 5-201, a second lens 5-202, and a plurality of lenses between the first lens 5-201 and the second lens 5-202. The number of lenses between the first lens 5-201 and the second lens 5-202 may be added or removed depending on users' demands. The position of the first lens 5-201 faces the first perforation 5-12 of the outer frame 5-10, and the position of the second lens 5-202 faces the second perforation 5-14 of the outer frame 5-10, and the first lens 5-201 is closer to an incident light 5-IN than the second lens 5-202. As shown in FIG. 61, a difference 5-$d1$ between the first lens 5-201 and the first perforation 5-12 is less than a difference 5-$d2$ between the second lens 5-202 and the second perforation 5-14 Since the difference 5-$d1$ is different from the difference 5-$d2$, the lens 5-2 is not located at the center of the lens unit 5-1, and thus elements with larger volume may be disposed between the second lens 5-202 and the second side wall 5-13 to achieve the effects of miniaturization of the device.

As shown in FIG. 62 and FIG. 63, the four elastic elements 5-60 may be further defined as a first elastic element 5-60A, a second elastic element 5-60B, a third elastic element 5-60C, and a fourth elastic element 5-60D. The first elastic element 5-60A and the second elastic element 5-60B are closer to the first lens 5-201 and the incident light 5-IN, and the third elastic element 5-60C and the fourth elastic element 5-60D are closer to the second lens 5-202.

As described above, the first elastic element 5-60A and the second elastic element 5-60B are closer to the first lens 5-201 while the third elastic element 5-60C and the fourth elastic element 5-60D are closer to the second lens 5-202. When viewed along a direction parallel to the central axis 5-M, a virtual line 5-11 connecting the first elastic element 5-60A to the second elastic element 5-60B partially overlaps with the first lens 5-201. On the contrary, a virtual line 5-12 connecting the third elastic element 5-60C to the fourth elastic element 5-60D does not overlap with the second lens 5-202.

Figure 64:
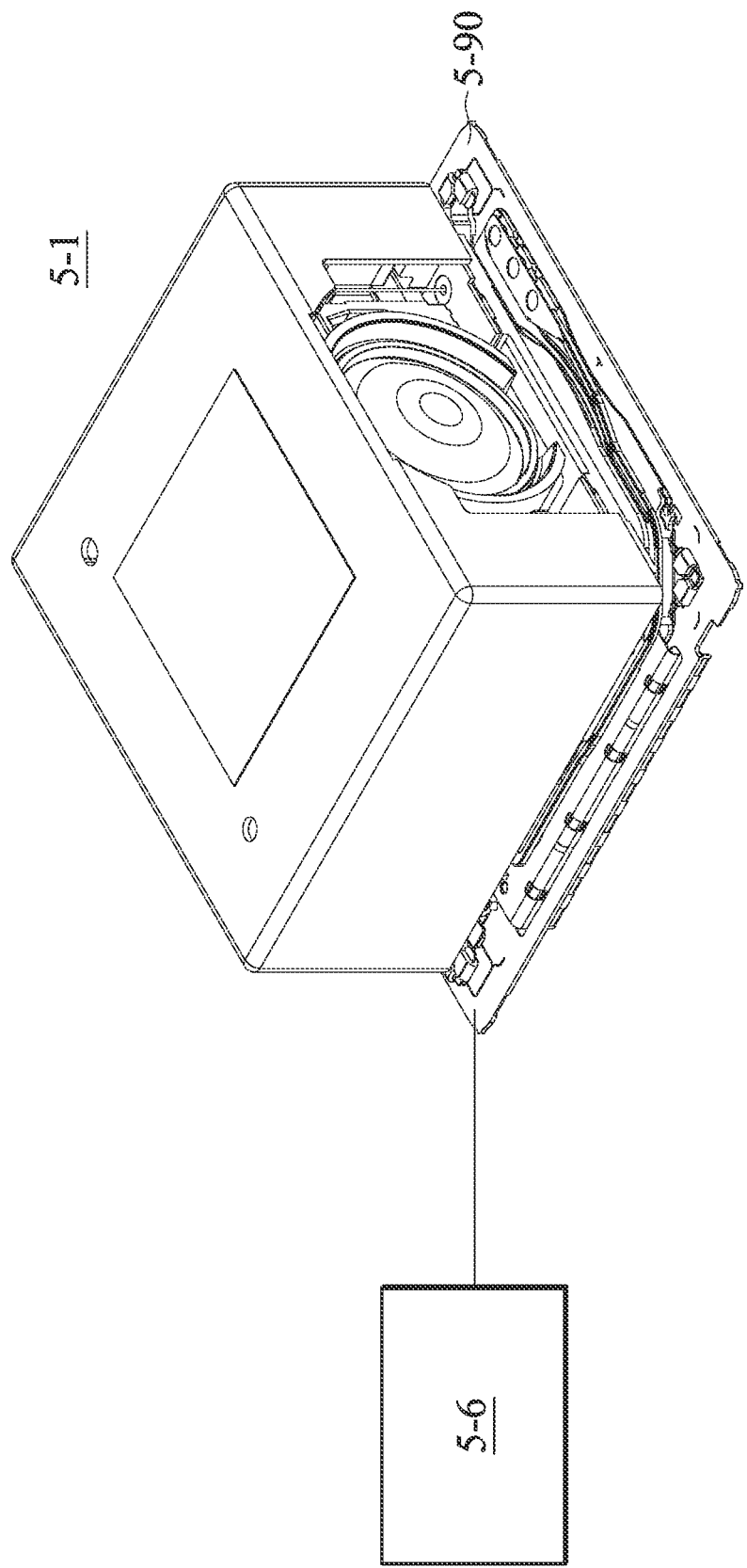
FIG. 64 is a schematic view of the lens unit and a driving unit in accordance with some embodiments of this disclosure.

Next, please refer to FIG. 64. FIG. 64 is a schematic view of the lens unit 5-1 and a driving unit 5-6 in accordance with some embodiments of this disclosure. As shown in FIG. 64, the first driving assembly 5-90 is electrically connected to the external driving unit 5-6. Therefore, the second driving assembly 5-40 may be electrically connected to the external driving unit 5-6 via the first driving assembly 5-90. The driving unit 5-6 includes a drive IC, a control IC, etc. The driving unit 5-6 makes the first driving assembly 5-90 drive the movable portion 5-P2 and/or the second driving assembly 5-40 drive the holder 5-50 to move or rotate in response to the compensation information.

By simultaneously performing position correction and displacement compensation by the first driving assembly 5-90 and the second driving assembly 5-40, the lens unit 5-1 may have a wider correction range, and may correct the position of the holder 5-50 more quickly, thereby achieving better operational results.

Here, the maximum distance that the first driving assembly 5-90 drives the movable portion 5-P2 to move relative to the fixed portion 5-P1 is defined as a first limit movement range. That is, the movable portion 5-P2 may move within the first limit movement range. Additionally, the maximum distance that the second driving assembly 5-40 drives the holder 5-50 to move relative to the base 5-90 is defined as a second limit movement range. That is, the holder 5-50 may move within the second limit movement range.

It is noted that the sum of the first limit movement range and the second limit movement range of the lens unit 5-1 of this disclosure is designed to be smaller than the distance between the movable portion 5-P2 and the fixed portion 5-P1. As a result, even if the first driving assembly 5-90 moves the maximum distance (the first limit movement range) and/or the second driving assembly 5-40 moves the maximum distance (the second limit movement range), the movable portion 5-P2 still does not collide with the fixed portion 5-P1, thereby reducing the possibility of the damage of the lens unit 5-1 and extending the life of the lens unit 5-1.

The compensation information includes the shock or the vibration on the lens unit 5-1, the distance or the movement of the shooting object, and so on. A compensation value is calculated based on the compensation information, and the compensation value is the overall distance or angle required to correct the position of the lens units 5-1. According to the compensation value, the first driving assembly 5-90 and the second driving assembly 5-40 may act separately or together to actually move a distance that is equal to the compensation value, thereby achieving the position correction more rapidly.

For example, when the compensation value is less than the first limit movement range, the position correction may be performed by the first driving assembly 5-90 only. The first driving assembly 5-90 drives the movable portion 5-P2 to move a distance that is equal to the compensation value.

For example, when the compensation value is greater than the first limit movement range, the position correction is performed collectively by the first driving assembly 5-90 and the second driving assembly 5-40. The first driving assembly 5-90 drives the movable portion 5-P2 to move a distance that is equal to the first limit movement range, and the second driving assembly 5-40 drives the holder 5-50 to move a distance that is equal to the compensation value minus the first limit movement range.

For example, when the compensation value is less than the second limit movement range, the position correction is performed by the second driving assembly 5-40 only. The second driving assembly 5-40 drives the holder 5-50 to move a distance that is equal to the compensation value.

For example, when the compensation value is greater than the second limit movement range, the position correction is performed collectively by the first driving assembly 5-90 and the second driving assembly 5-40. The second driving assembly 5-40 drives the holder 5-50 to move a distance that is equal to the second limit movement range of motion, and the first driving assembly 5-90 drives the movable portion 5-P2 to move a distance that is equal to the compensation value minus the second limit movement range.

In summary, Table 1 is the distance that the movable portion 5-P2 and the holder 5-50 move under different situations. The sum of the distance that the first driving assembly 5-90 drives the movable portion 5-P2 and the distance that the second driving assembly 5-40 drives the holder 5-50 to move is the compensation value.

TABLE 1

The distance that the movable portion 5-P2 and the holder 5-50 move under different situations

| | The distance that the first driving assembly 5-90 drives the movable portion 5-P2 to move | The distance that the second driving assembly 5-40 drives the holder 5-50 to move |
|---|---|---|
| The compensation value is less than the first limit movement range | The compensation value | None |
| The compensation value is less than the second limit movement range | None | The compensation value |
| The compensation value is greater than the first limit movement range | The first limit movement range | The compensation value minus the first limit movement range |
| The compensation value is greater than the second limit movement range | The compensation value minus the second limit movement range | The second limit movement range |

Figure 65:
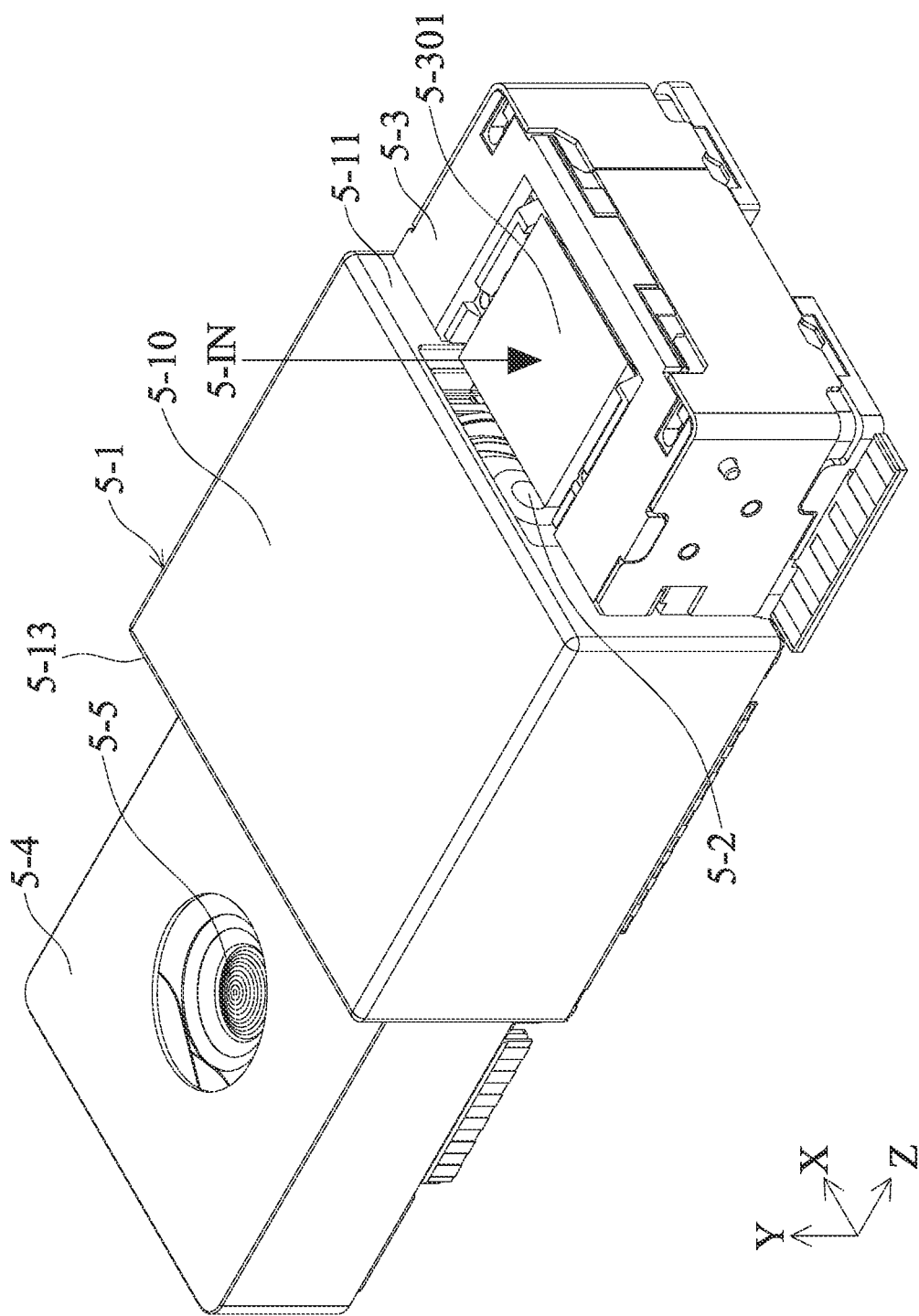
FIG. 65 is a perspective view of the lens unit, a reflecting unit, a lens holding unit in accordance with some embodiments of this disclosure.
Figure 66:
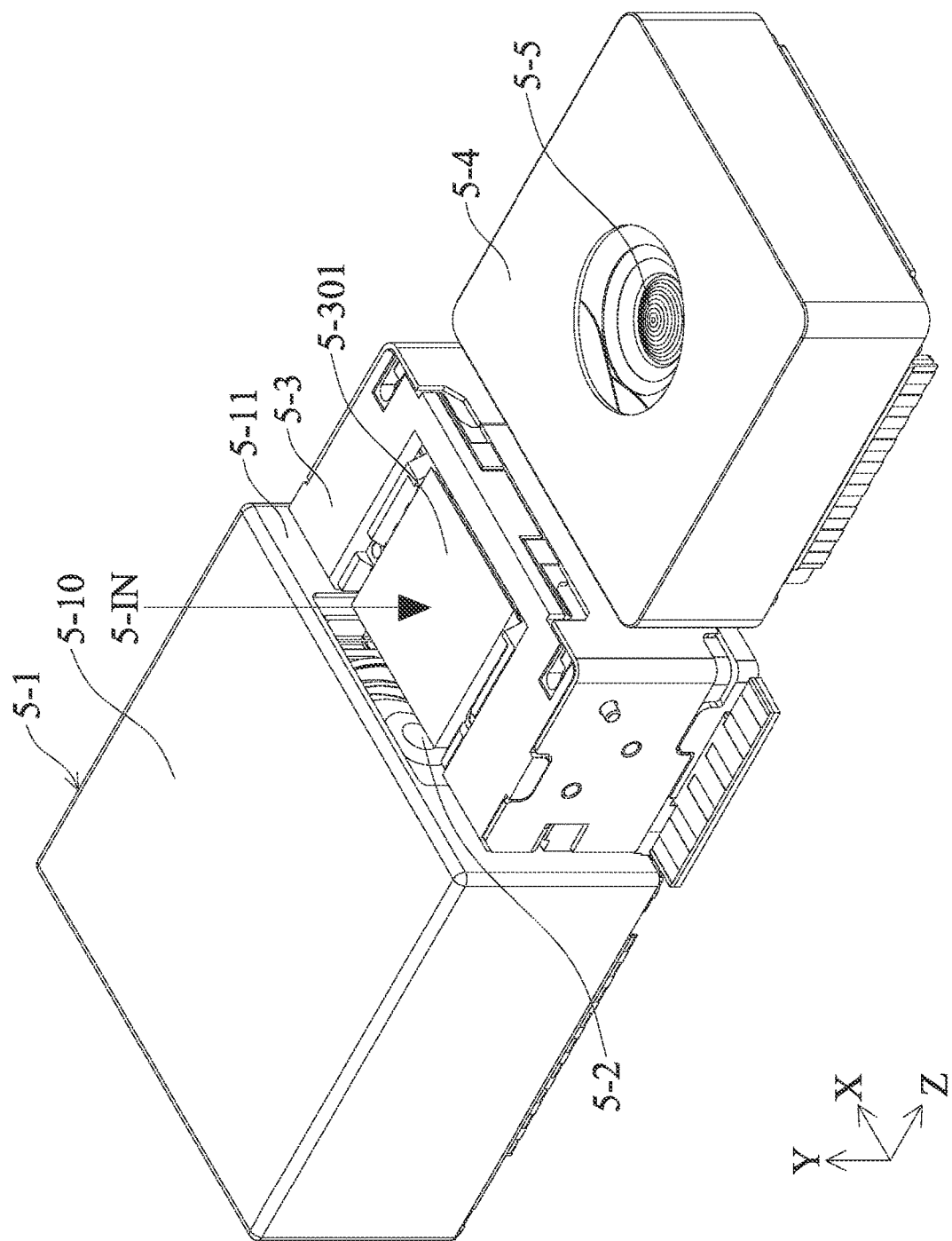
FIG. 66 is a perspective view of the lens unit, the reflecting unit, the lens holding unit in accordance with some embodiments of this disclosure.

Next, please refer to FIG. 65 and FIG. 66 together. FIG. 65 and FIG. 66 are perspective views of the lens unit 5-1, a reflecting unit 5-3, and a lens holding unit 5-4. In FIG. 65 and FIG. 66, the arrangement of the lens unit 5-1, the reflecting unit 5-3, and the lens holding unit 5-4 is different.

As shown in FIG. 65, the reflecting unit 5-3 is disposed adjacent to the first side wall 5-11 of the outer frame 5-10 of the lens unit 5-1. It is noted that the direction of the incident light 5-IN in FIG. 65 is different from the direction of the incident light 5-IN in FIG. 61. The direction of the incident light 5-IN in FIG. 65 is parallel to the Y-axis while the direction of the incident light 5-IN in FIG. 61 is parallel to the Z-axis. This is because the reflecting unit 5-3 may change the direction of the incident light 5-IN and adjust the direction of the incident light 5-IN to be substantially parallel to the optical axis 5-O of the lens 5-2, i.e. parallel to the Z-axis. That's the reason why the direction of incident light 5-IN is shown parallel to the optical axis 5-O of the lens 5-2 in FIG. 61.

Figure 67:
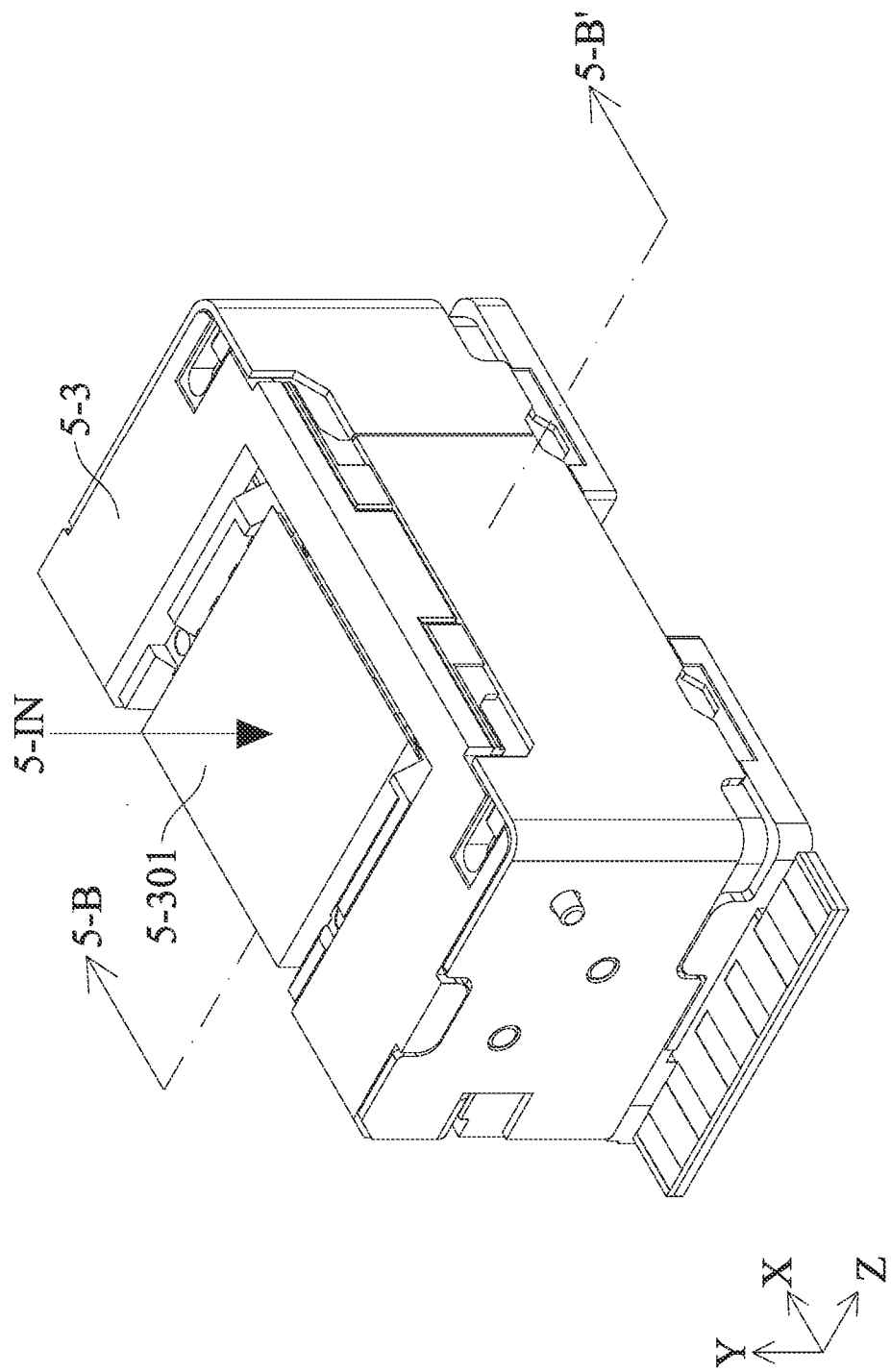
FIG. 67 is a perspective view of the reflecting unit in accordance with some embodiment of this disclosure.
Figure 68:
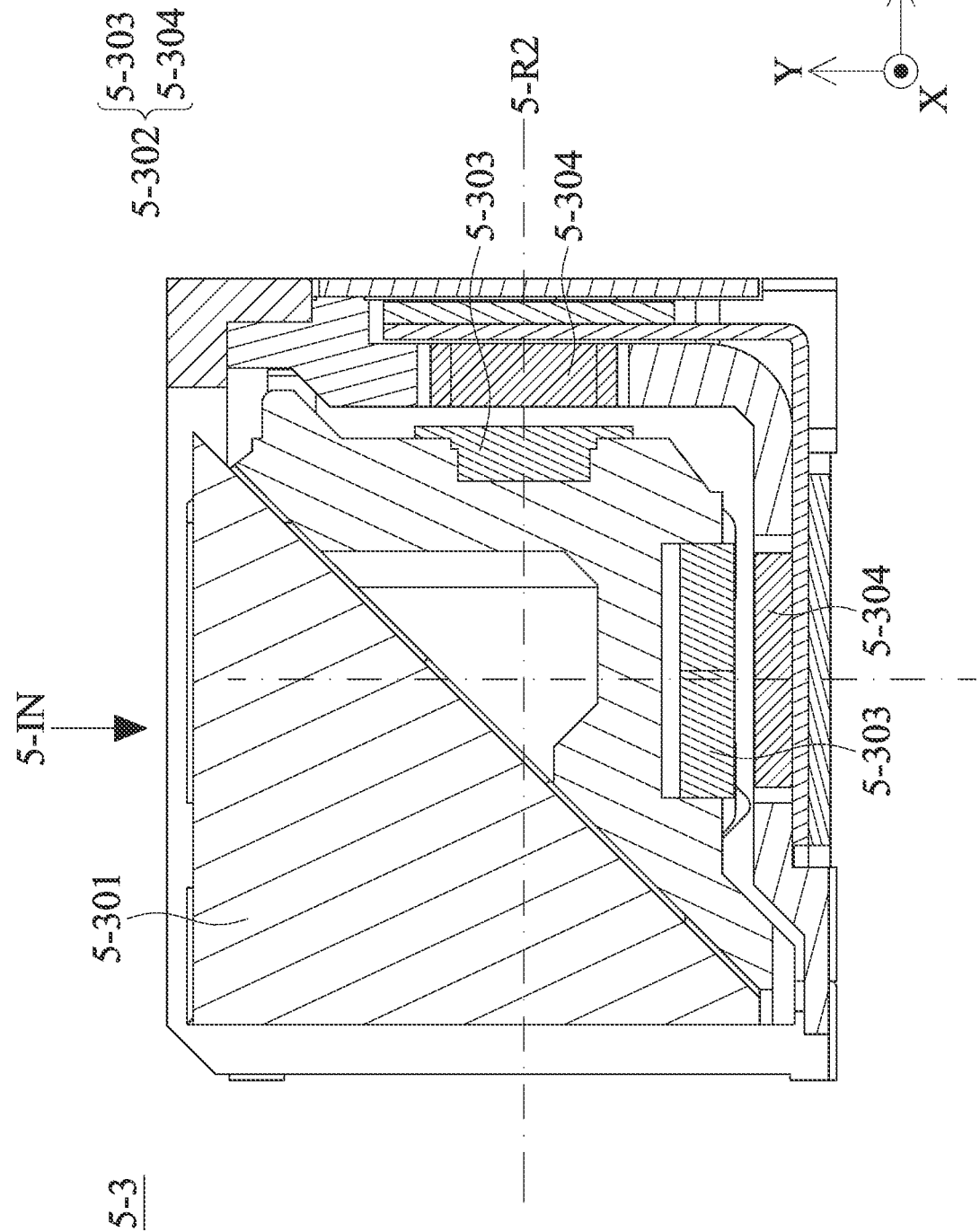
FIG. 68 is a cross-sectional view illustrated along the line 5-B-5-B' of FIG. 67.

Please refer to FIG. 67 and FIG. 68 to better understand the structure of the reflecting unit 5-3. FIG. 67 is a perspective view of the reflecting unit 5-3 in accordance with some embodiments of this disclosure. FIG. 68 is a cross-sectional view illustrated along line 5-B-5-B' of FIG. 67. The reflecting unit 5-3 includes an optical path adjustment element 5-301 and an optical path adjustment element driving assembly 5-302.

The optical path adjustment element 5-301 may be a mirror, a refractive prism, a beam splitter, etc. The incident light 5-IN may be received by the optical path adjustment element 5-301. Additionally, the direction of the incident light 5-IN may be adjusted by the rotation of the optical path adjustment element 5-301. The optical path adjustment element driving assembly 5-302 includes two optical path adjustment elements driving magnetic elements 5-303 and two corresponding optical path adjustment element driving coils 5-304. When a current is supplied to the optical path adjustment element driving coil 5-304, an electromagnetic induction occurs between the optical path adjustment element driving coil 5-304 and the optical path adjustment element driving magnetic element 5-303, so that the optical path adjustment element driving assembly 5-302 drives the optical path adjustment element 5-301 to rotate around a second rotation axis 5-R2, which is perpendicular to the central axis 5-O of the lens unit 5-1.

Please refer to FIG. 65 and FIG. 66 again. The lens holding unit 5-4 holds another lens 5-5. As shown in FIG. 65, the lens holding unit 5-4 is disposed adjacent to the second side wall 5-13 of the outer frame 5-10 of the lens unit 5-1, such that the lens unit 5-1 is disposed between the lens holding unit 5-4 and the reflecting unit 5-3. As shown in FIG. 66, the lens holding unit 5-4 is disposed adjacent to the reflecting unit 5-3, such that the reflecting unit 5-3 is disposed between the lens unit 5-1 and the lens holding unit 5-4. The lens 5-2 in the lens unit 5-1 and the other lens 5-5 in the lens holding unit 5-4 may be taken images separately. Therefore, when disposed on an electronic device, a double lens may be formed to enhance applicability.

The reflecting unit 5-3 may receive the incident light 5-IN and change the direction of the incident light 5-IN, and the lens holding unit 5-4 may be a corresponding receiving unit, and vice versa. That is, the lens holding unit 5-4 may be an emitting unit and the reflecting unit 5-3 may be a corresponding receiving unit. With structured light, infrared ray or ultrasonic waves, this disclosure may achieve the effects of depth sensing, spatial scanning, etc. Additionally, this disclosure may be applied to spatial planning, compensating for the impact of the environment, improving the blurring of images or videos when the light is bad or weather is poor, and enhancing the quality of shooting or recording.

Figure 69:
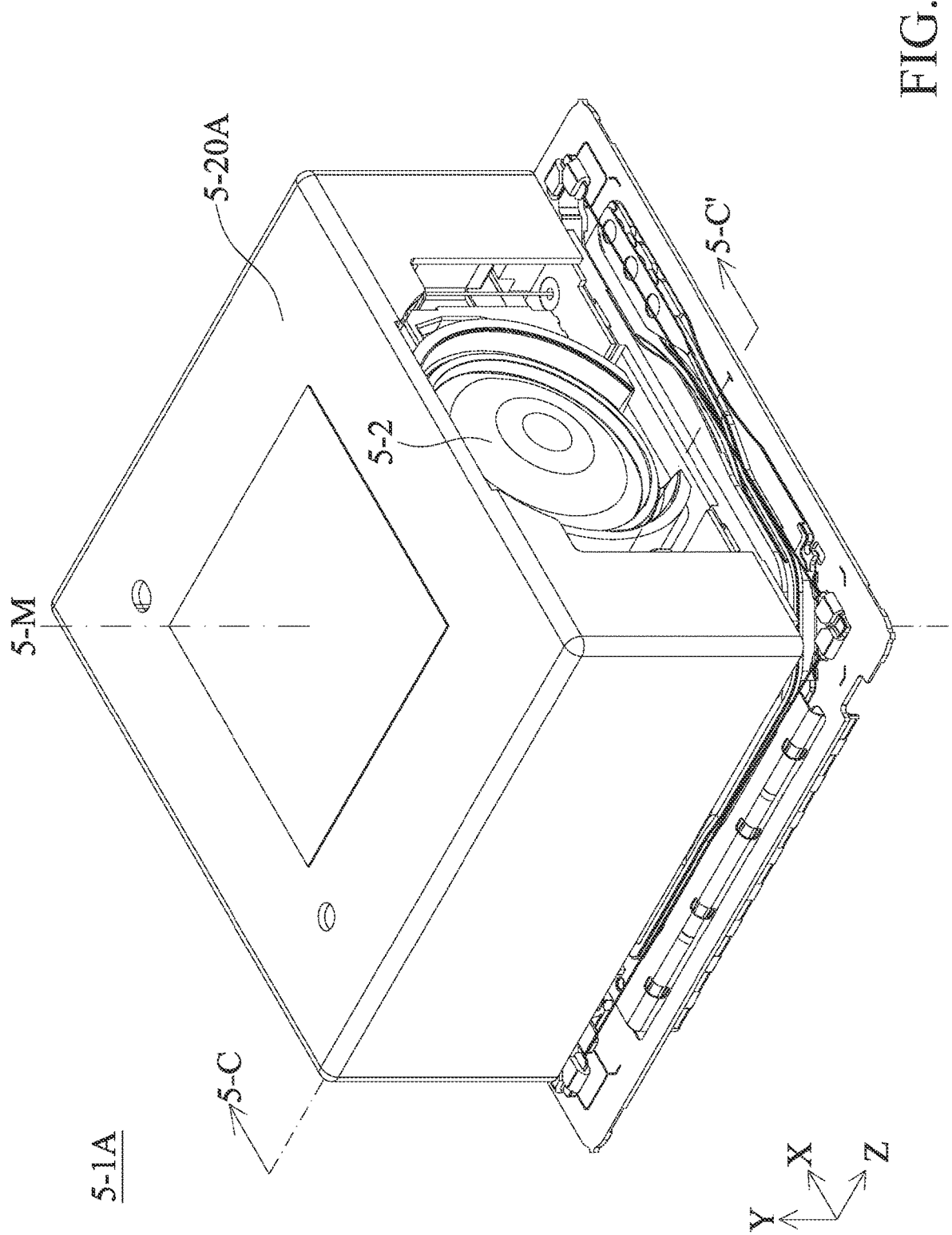
FIG. 69 is a perspective view of a lens unit in accordance with some embodiments of this disclosure.
Figure 70:
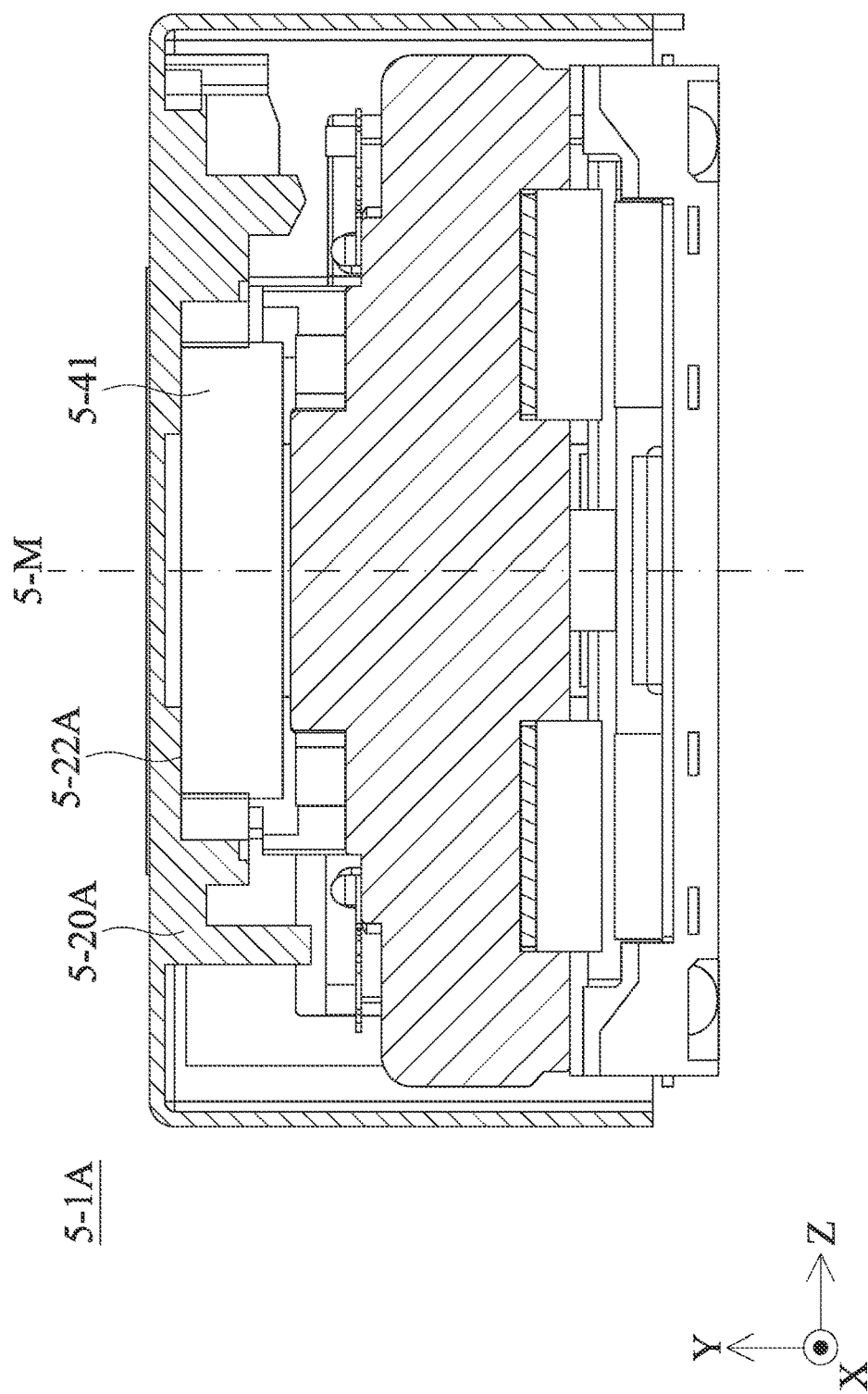
FIG. 70 is a cross-sectional view illustrated along the line 5-C-5-C' of FIG. 69.

FIG. 69 and FIG. 70 show a lens unit 5-1A in accordance with another embodiment of this disclosure. FIG. 69 is a perspective view of the lens unit 5-1A. FIG. 70 is a cross-sectional view illustrated along the line 5-C-5-C' of FIG. 69. In the following description, the same elements will be denoted by the same symbols, and the same content will not be described again, and similar elements are denoted by similar symbols.

The lens unit 5-1A and the lens unit 5-1 is substantially the same, the difference is that a housing 5-20A of the lens unit 5-1A may replace the housing 5-20 and the framework 5-30 of the lens unit 5-1, and the housing 5-20A of the lens unit 5-1A is made of a plastic material. As shown in FIG. 70, an accommodation portion 5-22A is formed on the housing 5-20A to accommodate X-axis magnets 5-41, i.e. to accommodate a portion of the second driving assembly 5-40. Therefore, the overall structure of the lens unit 5-1A is simplified, the manufacture cost is reduced, and the production efficiency is enhanced.

The lens unit 5-1 and 5-1A can also be applied to the lens unit of the optical modules 1-B1000, 1-B3000, 1-C1000, 1-C3000, 1-D1000, or 1-D3000 in the embodiment of this disclosure.

Based on this disclosure, the biasing elements made of a shape memory alloy may improve the speed and accuracy of the displacement correction of the lens unit of this disclosure, thereby better achieving the auto focus or optical image stabilization functions. Moreover, the displacement compensation of the lens unit of this disclosure may be simultaneously performed by the first driving assembly and the second driving assembly, thereby improving the correction efficiency. In addition, the lens unit of this disclosure may be combined with a reflecting unit and a lens holding unit to achieve the effects of depth sensing, spatial scanning, etc.

Sixth Group of Embodiments

Figure 71:
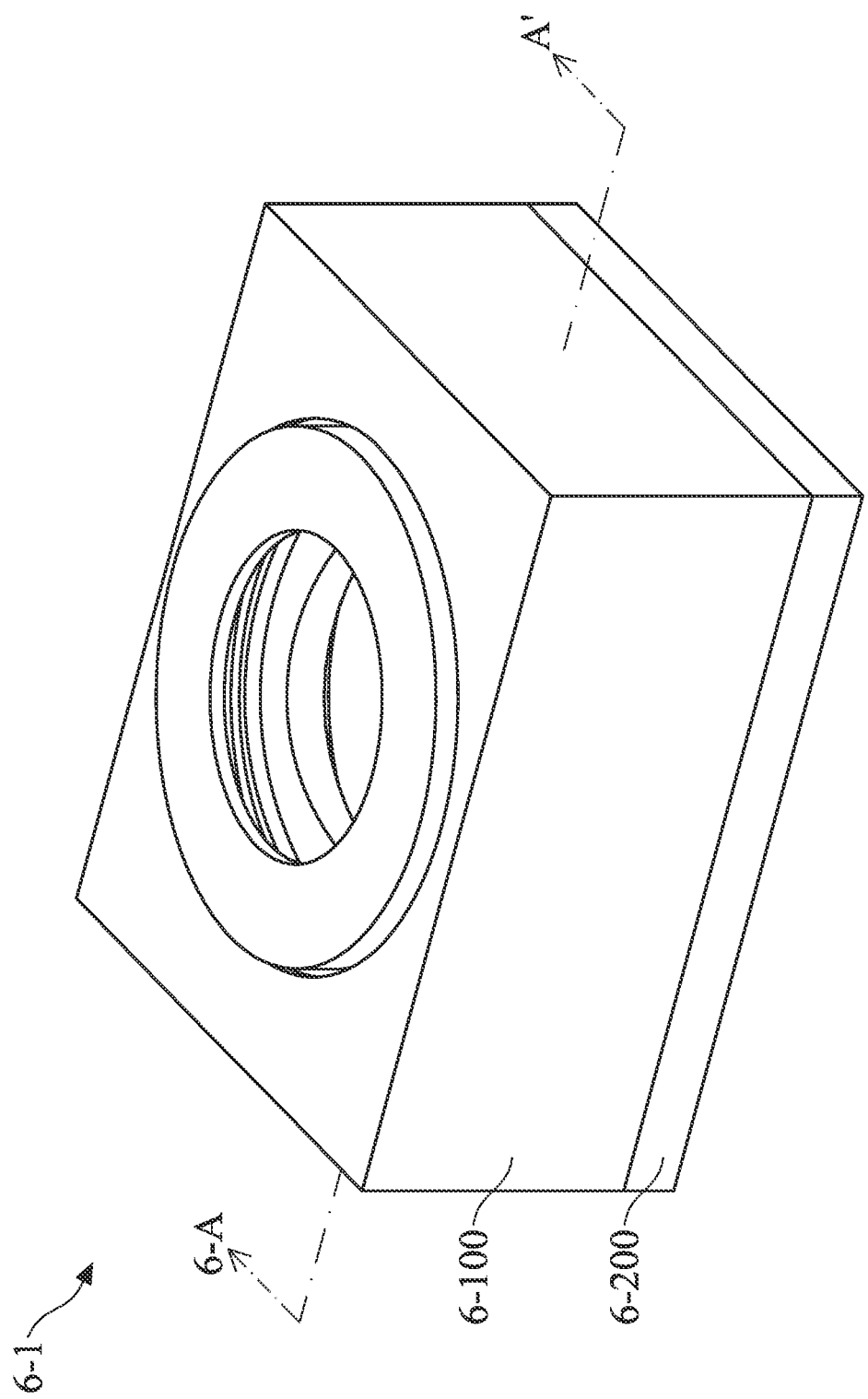
FIG. 71 is a perspective view of an image capturing device according to some embodiments of the present disclosure.
Figure 72:
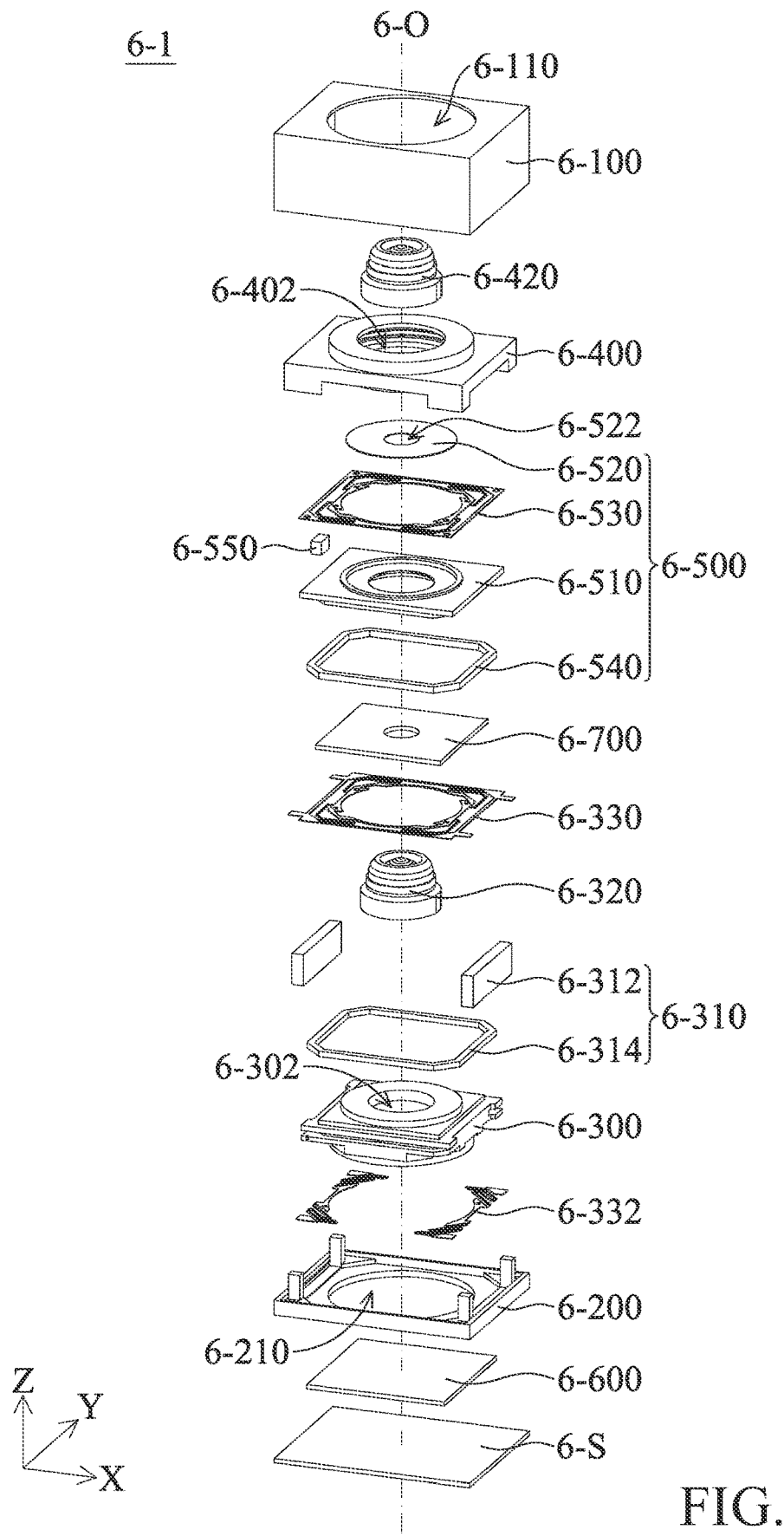
FIG. 72 is an exploded view of the image capturing device in FIG. 71.
Figure 74:
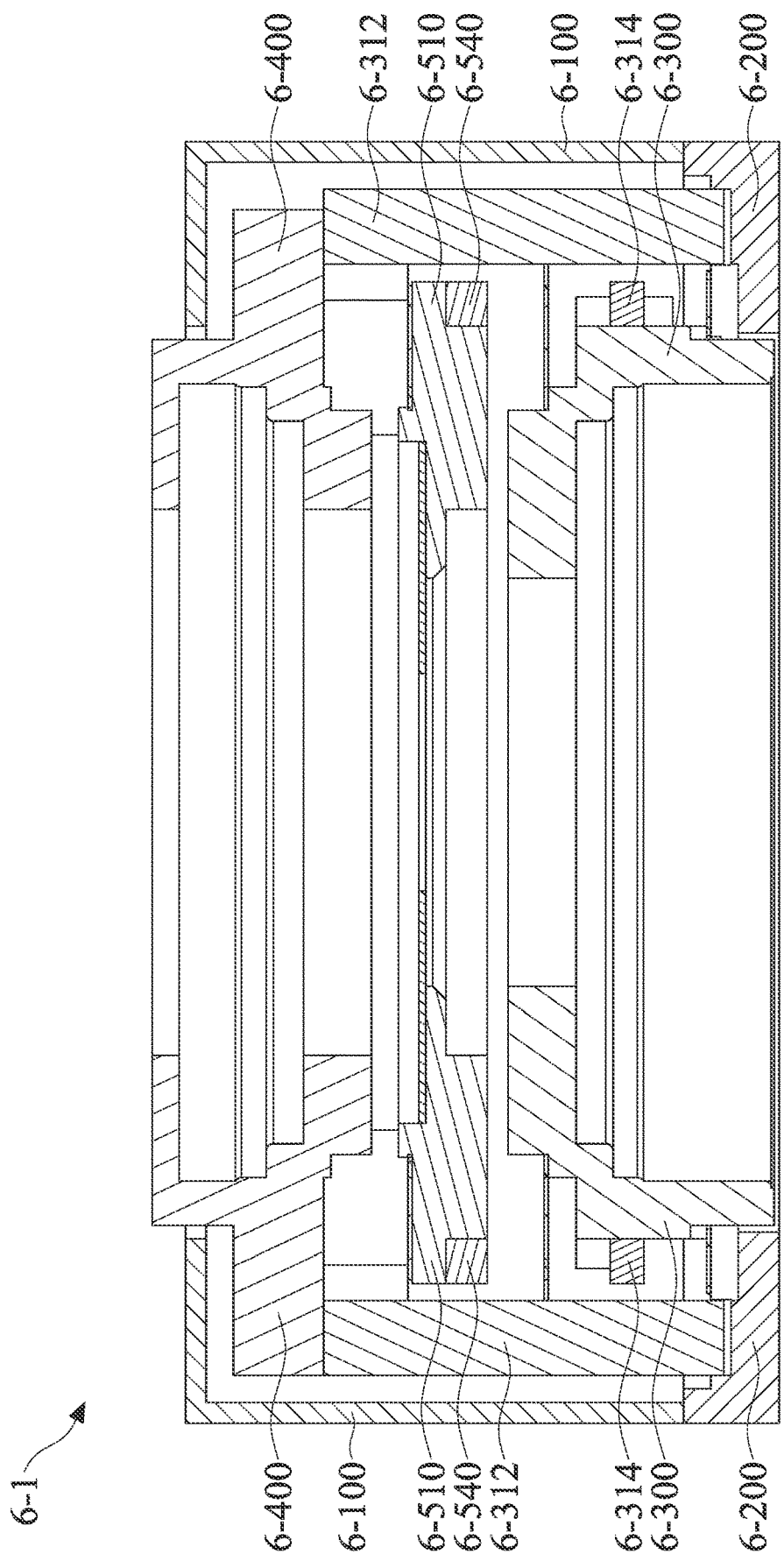
FIG. 74 is a cross sectional view illustrated along a line 6-A-A' in FIG. 71.

Firstly, referring to FIGS. 71, 72 and 74, which are a perspective view, a exploded view and a cross sectional view illustrated along a line 6-A-A' in FIG. 71 of an image capturing device 6-1, according to some embodiments of the present disclosure. The image capturing device 6-1 mainly includes a case 6-100, a bottom 6-200 and other elements disposed between the case 6-100 and the bottom 6-200. For example, in FIG. 72, a first holder 6-300, a first driving component 6-310 (includes a first magnetic element 6-312 and a second magnetic element 6-314), a first lens unit 6-320, an upper spring 6-330, a lower spring 6-332, a second holder 6-400, a second lens unit 6-420, an aperture unit 6-500 (includes an aperture holder 6-510, an aperture 6-520, a spring 6-530 and a magnetic element 6-540) and a spacer 6-700 are disposed between the case 6-100 and the bottom 6-200. Furthermore, the image capturing device 6-1 further includes an image sensor 6-600 disposed on another side of the bottom 6-200 relative to the aforementioned elements, and the image sensor 6-600 may be disposed on a substrate 6-S.

The case 6-100 and the bottom 6-200 may be combined to form an outer case of the image capturing device 6-1. It should be noted that a case opening 6-110 and a bottom opening 6-210 are formed on the case 6-100 and the bottom 6-200, respectively. The center of the case opening 6-110 corresponds to an optical axis 6-O of the first lens unit 6-320 and the second lens unit 6-420, and the bottom opening 6-210 corresponds to the image sensor 6-600. Accordingly, the first lens unit 6-320 and the second lens unit 6-420 disposed in the image capturing device 6-1 and the image sensor 6-600 can perform image focusing in the direction of the optical axis 6-O (i.e. Z direction). In some embodiments, the case 6-100 and the bottom 6-200 may be made of nonconductive materials (e.g. plastic), so short circuits or electrical interference between the first lens unit 6-320 or the second lens unit 6-420 and other electronic elements around may be prevented. In some embodiments, the case 6-100 and the bottom 6-200 may be made of metal to enhance the mechanical strength of the case 6-100 and the bottom 6-200.

The first holder 6-300 has a through hole 6-302, and the first lens unit 6-320 may be fixed in the through hole 6-302. For example, the first lens unit 6-320 may be fixed in the through hole 6-302 by locking, adhering, engaging, etc., and is not limited. The second magnetic element 6-314 may be, for example, a coil, and may be disposed around on an outer surface of the first holder 6-300. The first magnetic element 6-312 may be, for example, a magnetic element such as magnet, multi-pole magnet, etc., and the first magnetic element 6-312 may be fixed in the case 6-100. The first driving component 6-310 (including the first magnetic element 6-312 and the second magnetic element 6-314) is disposed in the case 6-100 and corresponds to the first lens unit 6-320, and the first driving component 6-310 is used for driving the first lens unit 6-320 to move relative to the case 6-100.

Specifically, a magnetic force may be created by the interaction between the first magnetic element 6-312 and the second magnetic element 6-314 to move the first holder 6-300 relative to the case 6-100 along the Z direction to achieve rapid focusing. Furthermore, the second holder 6-400 includes a through hole 6-402, and the second lens unit 6-420 may be fixed in the through hole 6-402. For example, the second lens unit 6-420 may be fixed in the through hole 6-402 by locking, adhering, engaging, and is not limited. By providing the first lens unit 6-320 and the second lens unit 6-420 corresponding to the same optical axis 6-O, the image capturing space of the image capturing device 6-1 may be increased to enhance the quality of image capturing.

In this embodiment, the first holder 6-300 and the first lens unit 6-320 disposed in the first holder 6-300 are movably disposed in the case 6-100. More specifically, the first holder 6-300 is suspended in the case 6-100 by the upper spring 6-330 and the lower spring 6-332 made of a metal material (FIG. 74). The upper spring 6-330 and the lower spring 6-332 may be disposed on two sides of the first holder 6-300. When a current is supplied to the second magnetic element 6-314, the second magnetic element 6-314 can act with the magnetic field of the first magnetic element 6-312 to generate an electromagnetic force to move the first holder 6-300 and the first lens unit 6-320 along the optical axis 6-O direction relative to the case 6-100 to achieve auto focusing. Furthermore, in this embodiment, the second holder 6-400 and the second lens unit 6-420 in the second holder 6-400 may be fixed in the case 6-100. As a result, auto focusing may be achieved by only adjusting the position of the first holder 6-300 and the first lens unit 6-320 in the first holder 6-300, and the quantity of required elements may be decreased to achieve miniaturization.

Furthermore, the substrate 6-S may be, for example, a flexible printed circuit (FPC), which may be fixed on the bottom 6-200 by adhering. In this embodiment, the substrate 6-S is electrically connected to other electronic elements disposed in the image capturing device 6-1 or outside the image capturing device 6-1. For example, the substrate 6-S may provide electronic signal to the second magnetic element 6-314 through the upper spring 6-330 or the lower spring 6-332 to control the movement of the first holder 6-300 along X, Y or Z directions. It should be noted that a coil may be formed on the substrate 6-S (e.g. a flat printed coil, not shown). As a result, a magnetic force may be created between the substrate 6-S and the first magnetic element 6-312 to drive the first holder 6-300 move along a direction parallel to the optical axis 6-O (Z direction) or a direction perpendicular to the optical axis 6-O (parallel to the XY plane) to achieve auto focus (AF) or optical image stabilization (OIS).

In some embodiments, position sensors (not shown) may be disposed in the image capturing device 6-1 to detect the position of the elements in the image capturing device 6-1. The position sensors may be suitable position sensors such as Hall, MR (Magneto Resistance), GMR (Giant Magneto Resistance), or TMR (Tunneling Magneto Resistance) sensors.

In the aperture unit 6-500, the aperture 6-520 is disposed on the aperture holder 6-510 and includes an opening 6-522 for controlling the amount of light passing through the aperture unit 6-500. In general, when the diameter of the opening 6-522 of the aperture 6-520 is enlarged, the light flux of the incident light may be increased. As a result, it can be applied in a low brightness environment, and the influence of the background signal may be decreased to avoid image noise. Furthermore, in a high brightness environment, the sharpness of the image may be increased by reducing the diameter of the opening 6-522 of the aperture 6-520, and the image sensor 6-600 may be prevented from overexposure.

In some embodiments, a spring 6-530 and a magnetic element 6-540 may be disposed on the aperture holder 6-510 to allow the aperture unit 6-500 moving relative to the case 6-100. For example, the magnetic element 6-540 may be a coil, and the magnetic element 6-540 may interact with the magnetic field of the first magnetic element 6-312 to drive the aperture unit 6-500 move along the direction of the optical axis 6-O (Z direction) to achieve auto focusing. However, the present disclosure is not limited thereto. For example, the aperture unit 6-500 may be disposed on the first lens unit 6-320 rather than providing the spring 6-530 and the magnetic element 6-540, to move the aperture unit 6-500 and the first holder 6-300 together. As a result, the quantity of elements may be reduced to achieve miniaturization.

Furthermore, a spacer 6-700 may be disposed between the first holder 6-300 and the aperture unit 6-500 to prevent the first holder 6-300 and the aperture unit 6-500 from colliding with each other when the first holder 6-300 moving relative to the aperture unit 6-500. Furthermore, in some embodiments, the aperture unit 6-500 may be fixed on the case 6-100, and the optical image stabilization or the auto focus may be achieved by only moving the first lens unit 6-320 or the second lens unit 6-420. As a result, the quantity of elements may be reduced to achieve miniaturization.

Although the aperture 6-520 of the aperture unit 6-500 is illustrated as having a fixed diameter, it is only for illustration, and the present disclosure is not limited thereto. For example, in some embodiments, a driving element 6-550 (e.g. spring, magnets, coils, etc.) may be provided in the case 6-100 to adjust the diameter of the aperture 6-520 of the aperture unit 6-500. In this embodiment, the aperture 6-520 may be formed of a plurality of adjustable portions (e.g. including aperture elements having multiple different diameters, or movable elements which can combine to form apertures having different diameters). As a result, the amount of light passing through the aperture unit 6-500 may be controlled to meet different requirements of image capturing.

Figure 73:
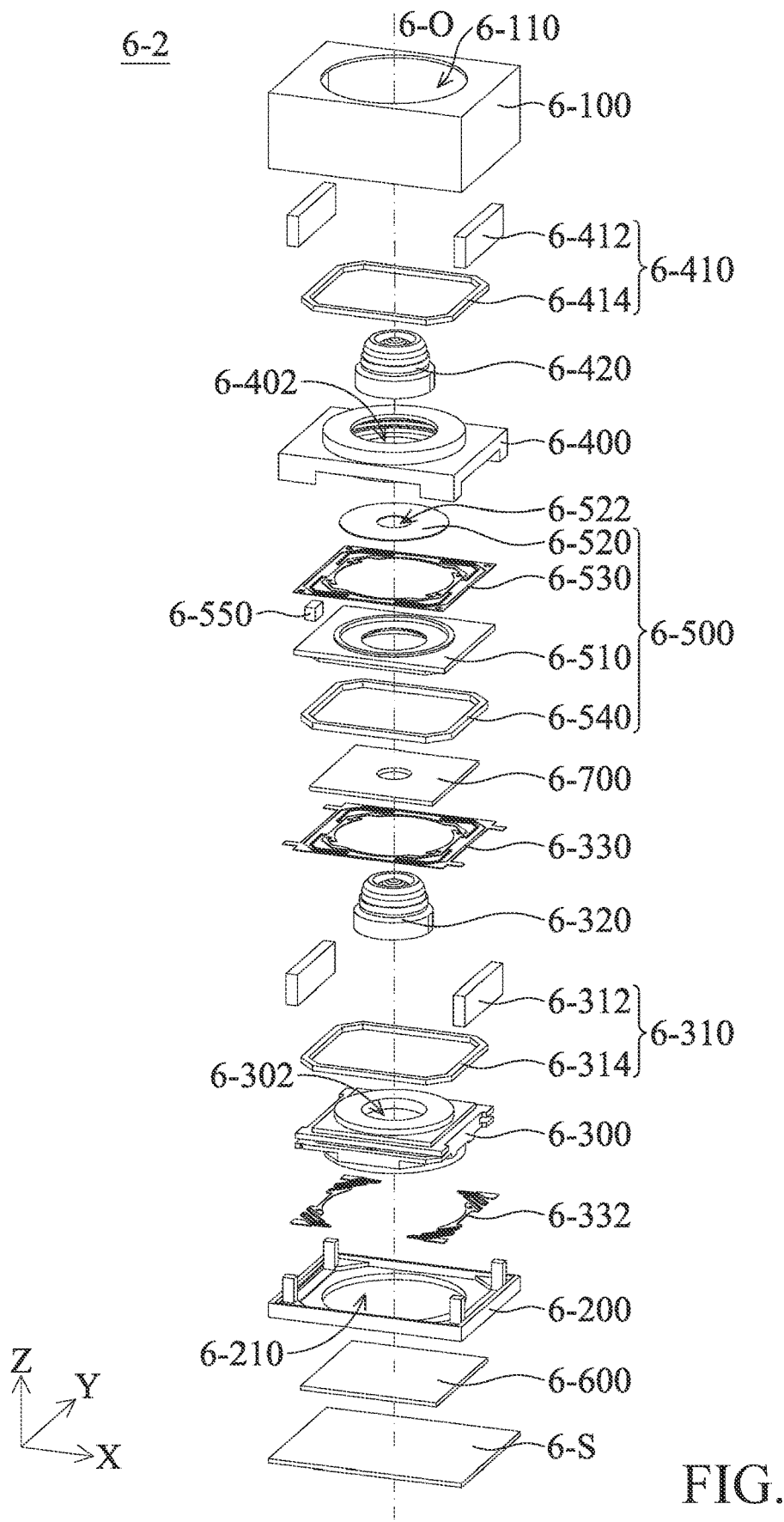
FIG. 73 is an exploded view of an image capturing device according to some embodiments of the present disclosure.

In the embodiment shown in FIG. 72, the second holder 6-400 and the second lens unit 6-420 in the second holder 6-400 are fixed in the case 6-100, but the present disclosure is not limited thereto. For example, referring to FIG. 73, an exploded view of an image capturing device 6-2 according to other embodiments of the present disclosure is shown. The difference between the image capturing device 6-2 and the image capturing device 6-1 is that the image capturing device 6-2 further includes a second driving component 6-410 (including a third magnetic element 6-412 and a fourth magnetic element 6-414), an upper spring and a lower spring (not shown) corresponding to the second lens unit 6-420 and disposed on the second holder 6-400, to drive the second lens unit 6-420 to move relative to the case 6-100. The third magnetic element 6-412 may be, for example, a magnet, and the fourth magnetic element 6-414 may be, for example, a coil.

As a result, when current is applied to the fourth magnetic element 6-414, the fourth magnetic element 6-414 may interact with the magnetic field of the third magnetic element 6-412 to create an electromagnetic force to drive the second holder 6-400 and the second lens unit 6-420 to move relative to the case 6-100 along the optical axis 6-O (Z direction) to achieve auto focus.

Furthermore, in some embodiments, the third magnetic element 6-412 may be omitted, and the fourth magnetic element 6-414 may interact with the magnetic field of the first magnetic element 6-312 to drive the second holder 6-400 and the second lens unit 6-420 moving relative to the case 6-100 along the optical axis 6-0. In this embodiment, a spacer (not shown) may be disposed between the second holder 6-400 and the aperture unit 6-500 to prevent collision between the second holder 6-400 and the aperture unit 6-500 during their movement. Furthermore, the third magnetic element 6-412 is omitted, so the dimensions of the image capturing device 6-2 may be minimized further to achieve miniaturization.

Furthermore, in some embodiments, the aperture unit 6-500 may be fixed on the second holder 6-400 to allow the second holder 6-400 and the aperture unit 6-500 use the third magnetic element 6-412 and the fourth magnetic element 6-414 together, and move the second holder 6-400 and the aperture unit 6-500 together, without providing the spring 6-530 and the magnetic 6-540 in the aforementioned embodiments on the aperture unit 6-500. As a result, the quantity of elements may be reduced to achieve miniaturization.

Figure 75:
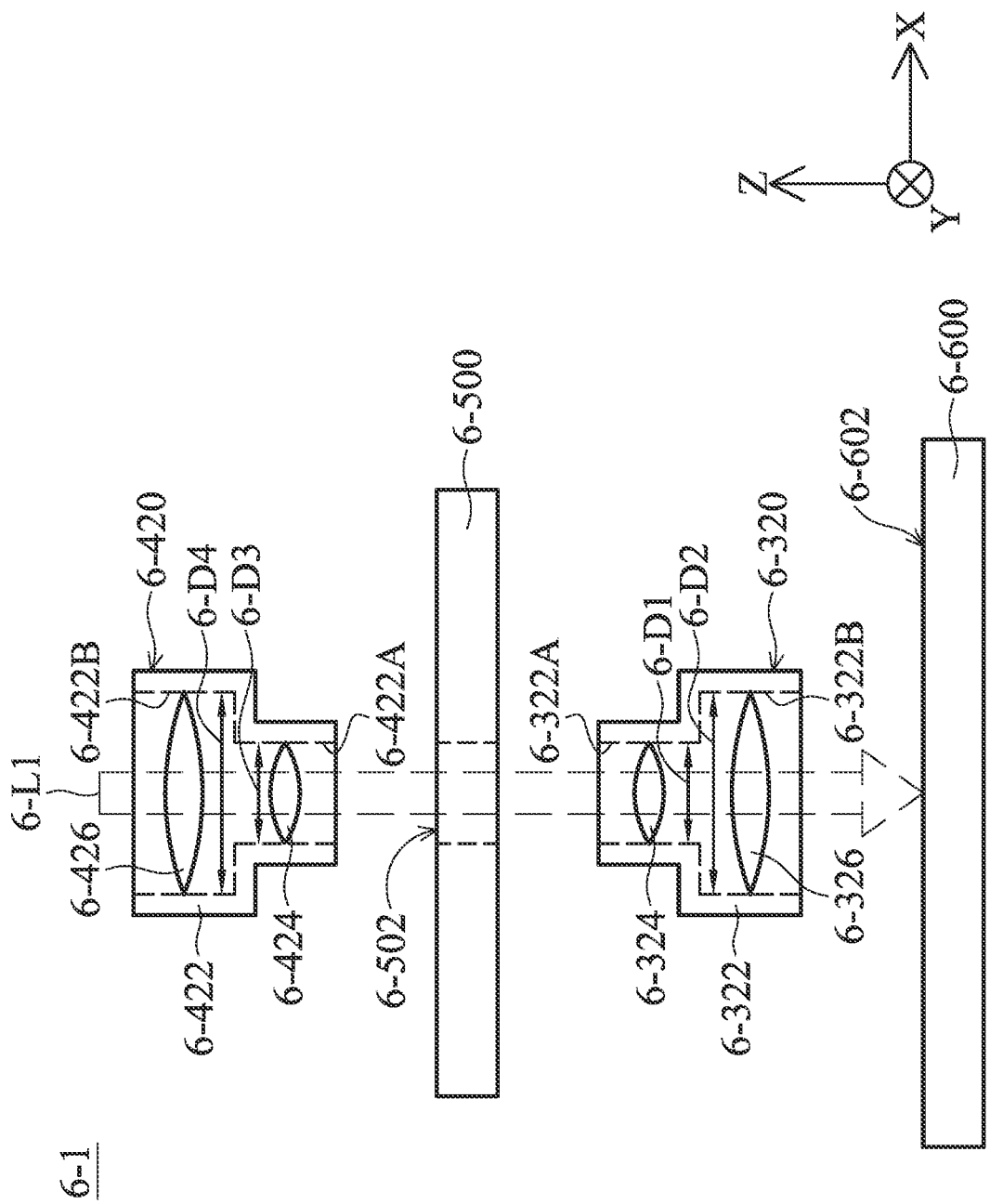
FIG. 75 is a schematic view showing the position relationship between some elements of the image capturing device in FIG. 71.

Referring to FIG. 75, position relationship between some elements of the image capturing device 6-1 of FIG. 71 is shown. In FIG. 75, only the first lens unit 6-320, the second lens unit 6-420, the aperture unit 6-500 and the image sensor 6-600 are shown for simplicity.

The first lens unit 6-320 includes a barrel 6-322 and a first lens 6-324 and a second lens 6-326 disposed in the barrel 6-322. The inner surface of the barrel 6-322 includes a first bearing surface 6-322A and a second bearing surface 6-322B. In this embodiment, the barrel 6-322 is contacted to the first lens 6-324 through the first bearing surface 6-322A, and contacted to the second lens 6-326 through the second bearing surface 6-322B. The diameter 6-D1 of the first lens 6-324 is less than the diameter 6-D2 of the second lens 6-326, and the aperture unit 6-500, the first lens 6-324 and the second lens 6-326 are arranged in order.

Furthermore, the second lens unit 6-420 includes a barrel 6-422 and a first lens 6-424 and a second lens 6-426 disposed in the barrel 6-422. The inner surface of the barrel 6-422 includes a first bearing surface 6-422A and a second bearing surface 6-422B. In this embodiment, the barrel 6-422 is contacted to the first lens 6-424 through the first bearing surface 6-422A, and contacted to the second lens 6-426 through the second bearing surface 6-422B. The diameter 6-D3 of the first lens 6-424 is less than the diameter 6-D4 of the second lens 6-426, and the aperture unit 6-500, the first lens 6-424 and the second lens 6-426 are arranged in order.

The first lenses 6-324 and 6-424 and the second lenses 6-326 and 6-426 may be, for example, convex lenses to focus the light collected from the external environment of the image capturing device 6-1 toward a desired direction. As a result, when light 6-L1 from the external environment is incident to the image capturing device 6-1 along Z direction (as shown in FIG. 75), the light 6-L1 may sequentially pass through the second lens unit 6-420, the aperture unit 6-500 and the first lens unit 6-320, therefore reaches the image sensor 6-600. As a result, an image may be formed on a sensing surface 6-602 of the image sensor 6-600.

As a result, the angle and the width of the light passing through the aperture unit 6-500 may be controlled by controlling the position of the aperture unit 6-500, as shown in the aforementioned embodiments. As a result, the brightness of the image received may be controlled to get images having desired qualities. Furthermore, the lights passing through the aperture opening 6-502 of the aperture unit 6-500 are not parallel, so the lights may be allowed to form images on the image sensor 6-600. By arranging the aperture unit 6-500, the first lens 6-324 (or 6-424) having smaller dimensions and the second lens 6-324 (or 6-424) having greater dimensions in order, the incident light 6-L1 may be focused at the aperture unit 6-500 to pass through the aperture unit 6-500 having a smaller diameter to meet different design requirements.

The diameter of the aperture opening 6-502 of the aperture unit 6-500 may be reduced by providing an aperture unit 6-500 between the first lens unit 6-320 and the second lens unit 6-420 to increase the depth of field of the received image. Furthermore, by forming a symmetric structure where the first lens unit 6-320 and the second lens unit 6-420 are positioned on two sides of the aperture unit 6-500, the clarity of the image received may be further enhanced. Moreover, the first lens unit 6-320, the second lens unit 6-420 and the aperture unit 6-500 may be packaged in a single image capturing device (e.g. the image capturing device 6-1) together, the complexity of the process may be reduced, and the yield may be enhanced. However, the present disclosure is not limited thereto. For example, in some embodiments, the aperture unit 6-500, the second lens unit 6-420, the first lens unit 6-320 and the image sensor 6-600 may be arranged in order, to meet specific design requirements.

In conventional mobile electronic devices (e.g. cellphones), the thickness of the image capturing device (the dimensions in the Z direction) is desired to be reduced to achieve miniaturization. As a result, a reflecting unit may be disposed in the aforementioned image capturing device to change the direction of light, so some elements may be arranged in directions different from the Z direction (e.g. X direction or Y direction) to reduce the dimensions of the electronic device in the Z direction. For example, referring to FIG. 76, a position relationship between some elements of an image capturing device 6-3 is shown, according to some embodiments of the present disclosure. Similar to FIG. 75, some elements of the image capturing device 6-3 in FIG. 76 are omitted.

Figure 76:
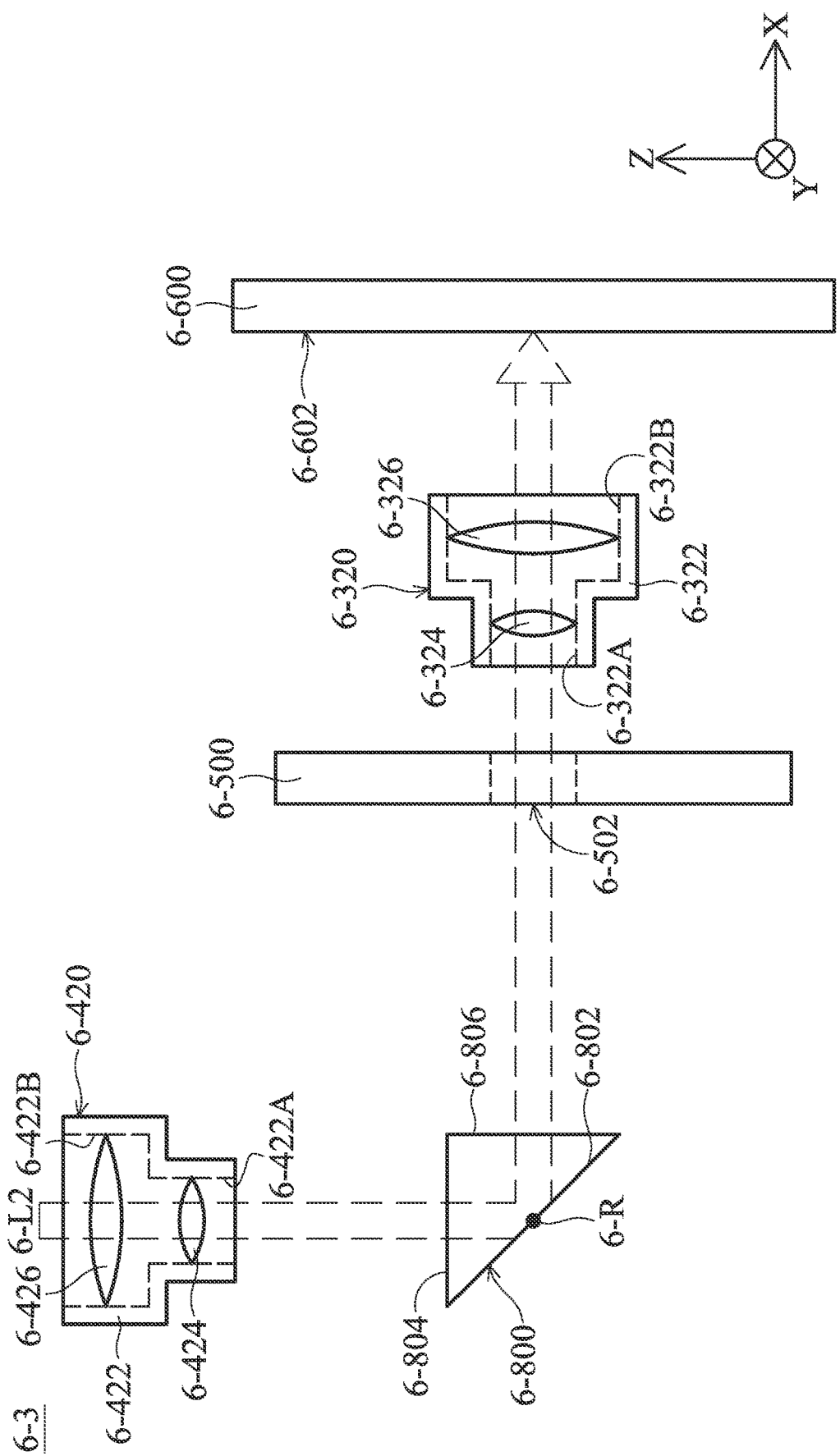
FIG. 76 is a schematic view of the position relationship between some elements of the image capturing device according to some embodiments of the present disclosure.

In FIG. 76, the image capturing device 6-3 mainly includes the first lens unit 6-320, the second lens unit 6-420, the aperture unit 6-500, the image sensor 6-600 and a reflecting unit 6-800. In this embodiment, the reflecting unit 6-800 may be disposed on an inclined surface (not shown) of the case 6-100. The second lens unit 6-420 and the reflecting unit 6-800 may be arranged along Z direction. The aperture unit 6-500 and the first lens unit 6-320 may be disposed between the reflecting unit 6-800 and the image sensor 6-600, and the reflecting unit 6-800, the aperture unit 6-500, the first lens unit 6-320 and the image sensor 6-600 may be arranged along the X direction. In other words, the reflecting unit 6-800 may be disposed between the aperture unit 6-500 and the second lens unit 6-420.

The reflecting unit 6-800 may be an element that can reflect light, such as a prism, and the reflecting unit 6-800 includes a reflecting surface 6-802, a side 6-804 (first side) and a side 6-806 (second side). By allowing the lens units (e.g. the first lens unit 6-320 and the second lens unit 6-420), the reflecting unit 6-800, the aperture unit 6-500, etc. being disposed in the same image capturing device (i.e. modularization), the quality of the image may be enhanced as well as decreasing the dimensions of the image capturing device 6-3, and the tolerance may be decreased when different modules are assembled with each other. Therefore, the quality of image capturing may be increased further.

In this embodiment, the second lens unit 6-420 is disposed at a side corresponding to the side 6-804 (the first side), and the first lens unit 6-320 and the aperture unit 6-500 are disposed at another side corresponding to the side 6-806 (the second side), and the side 6-804 and the side 6-806 are not parallel to each other. It should be noted that the first bearing surface 6-322A of the first lens unit 6-320 and the first bearing surface 6-422A of the second lens unit 6-420 face different directions in this embodiment. Furthermore, in some embodiments, no additional lens is disposed between the first lens unit 6-320 and the second lens unit 6-420. In other words, when light 6-L2 from the external environment passes through the second lens unit 6-420, the light 6-L2 from the external environment does not pass through any other lens before entering the first lens unit 6-320. As a result, the dimensions of the image capturing device 6-3 may be reduced to achieve miniaturization.

Therefore, when the light 6-L2 from the external environment entering the image capturing device 6-3 along Z direction, the light 6-L2 may pass through the second lens unit 6-420 and may be reflected by the reflecting surface 6-802 of the reflecting unit 6-800, wherein the reflecting surface 6-802 is substantially parallel to the Y direction and is tilted relative to the X and Z directions. Afterwards, the light 6-L2 being reflected may pass through the aperture opening 6-502 of the aperture unit 6-500 and the first lens unit 6-320 along a direction substantially identical to the X direction to reach the image sensor 6-600 to form an image on a sensing surface 6-602 of the image sensor 6-600. Because the reflecting unit 6-800, the aperture unit 6-500, the first lens unit 6-320 and the image sensor 6-600 are arranged along the X direction rather than the Z direction, the dimensions of the image capturing device 6-3 on the Z direction may be reduced to achieve miniaturization.

Suitable driving elements, such as springs, magnets, coils, etc., may be disposed on the reflecting unit 6-800 to allow the reflecting unit 6-800 changing the direction of light by rotating the reflecting unit 6-800. For example, the reflecting unit 6-800 may rotate relative to the case 6-100 (FIG. 72) along the axis 6-R in FIG. 76. In this embodiment, the axis 6-R is substantially parallel to the Y direction, but the present disclosure is not limited thereto. For example, suitable driving elements may be provided to allow the reflecting unit 6-800 rotating relative to axes parallel to the X or Z directions. As a result, the image capturing surface 6-3 may capture images from different directions to increase the flexibility of the image capturing device.

In some embodiments, the reflecting unit 6-800 does not rotate, and the first lens unit 6-320 may perform auto focus along the X direction. Furthermore, in other embodiments, when the reflecting unit 6-00 rotates with the axis 6-R, the first lens unit 6-320 may perform auto focus and rotate along a direction parallel to the X direction at the same time.

Figure 77:
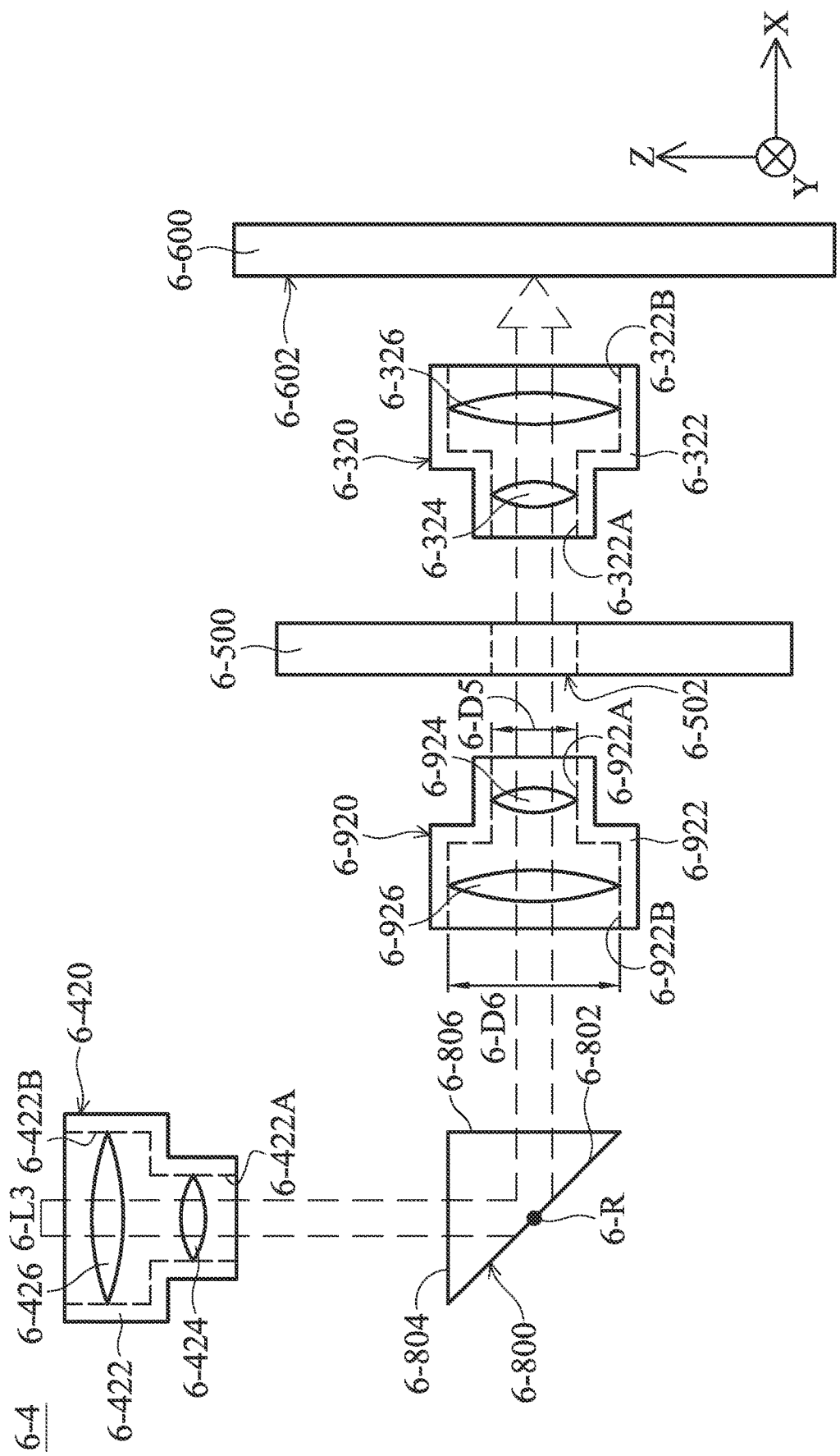
FIG. 77 is a schematic view of the position relationship between some elements of the image capturing device according to some embodiments of the present disclosure.

Furthermore, in some embodiments, an additional lens unit may be provided between the reflecting unit 6-800 and the aperture unit 6-500. For example, FIG. 77 illustrates the position relationship between some elements of an image capturing device 6-4, according to some embodiments of the present disclosure. In FIG. 77, besides the first lens unit 6-320 and the second lens unit 6-420, an additional third lens unit 6-920 may be provided between the reflecting unit 6-800 and the aperture unit 6-500. The third lens unit 6-920 may include identical or similar structures with the first lens unit 6-320 or the second lens unit 6-420. For example, in some embodiments, the third lens unit 6-920 includes a barrel 6-922 and a first lens 6-924 and a second lens 6-926 disposed in the barrel 6-922.

The inner surface of the barrel 6-922 includes a first bearing surface 6-922A and a second bearing surface 6-922B. In this embodiment, the barrel 6-922 contacts the first lens 6-924 through the first bearing surface 6-922A, and contacts the second lens 6-926 through the second bearing surface 6-922B. The diameter 6-D5 of the first lens 6-924 is less than the diameter 6-D6 of the second lens 6-926, and the aperture unit 6-500, the first lens 6-924 and the second lens 6-926 are arranged in order. By further providing the third lens unit 6-920 in the image capturing device 6-4, light 6-L3 may pass through more lenses to increase the space for image capturing, therefore allows the image capturing device 6-4 receiving a better image.

Figure 78:
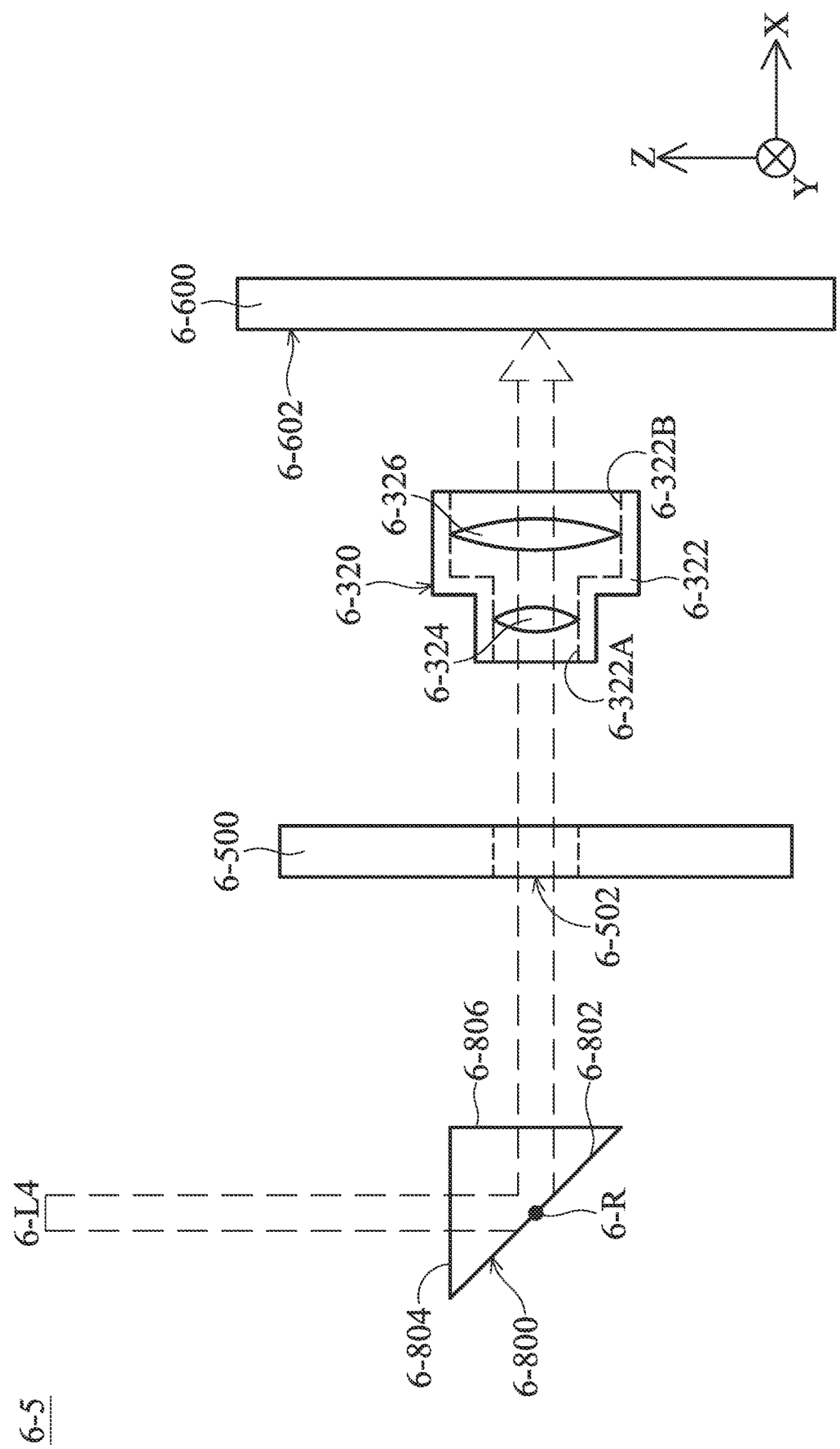
FIG. 78 is a schematic view of the position relationship between some elements of the image capturing device according to some embodiments of the present disclosure.

In some embodiments, the second lens unit 6-420 may be omitted to further reduce the dimensions along the Z direction. For example, FIG. 78 illustrates the position relationship between some elements of an image capturing device 6-5, according to some embodiments of the present disclosure. The difference between the image capturing device 6-5 in FIG. 78 to the aforementioned embodiments is that the image capturing device 6-5 does not include the second lens unit 6-420 arranged with the reflecting unit 6-800 along the Z direction. As a result, light 6-L4 from the external environment may directly pass through and be reflected by the reflecting unit 6-800 to pass through the aperture unit 6-500 and entering the first lens unit 6-320, therefore forms an image on the sensing surface 6-602 of the image sensor 6-600. By this configuration, the dimensions of the image capturing device 6-5 on the Z direction may be reduced further to allow the thickness of an electronic device (e.g. cellphone) using the image capturing device 6-5 on the Z direction being further reduced.

Figure 79:
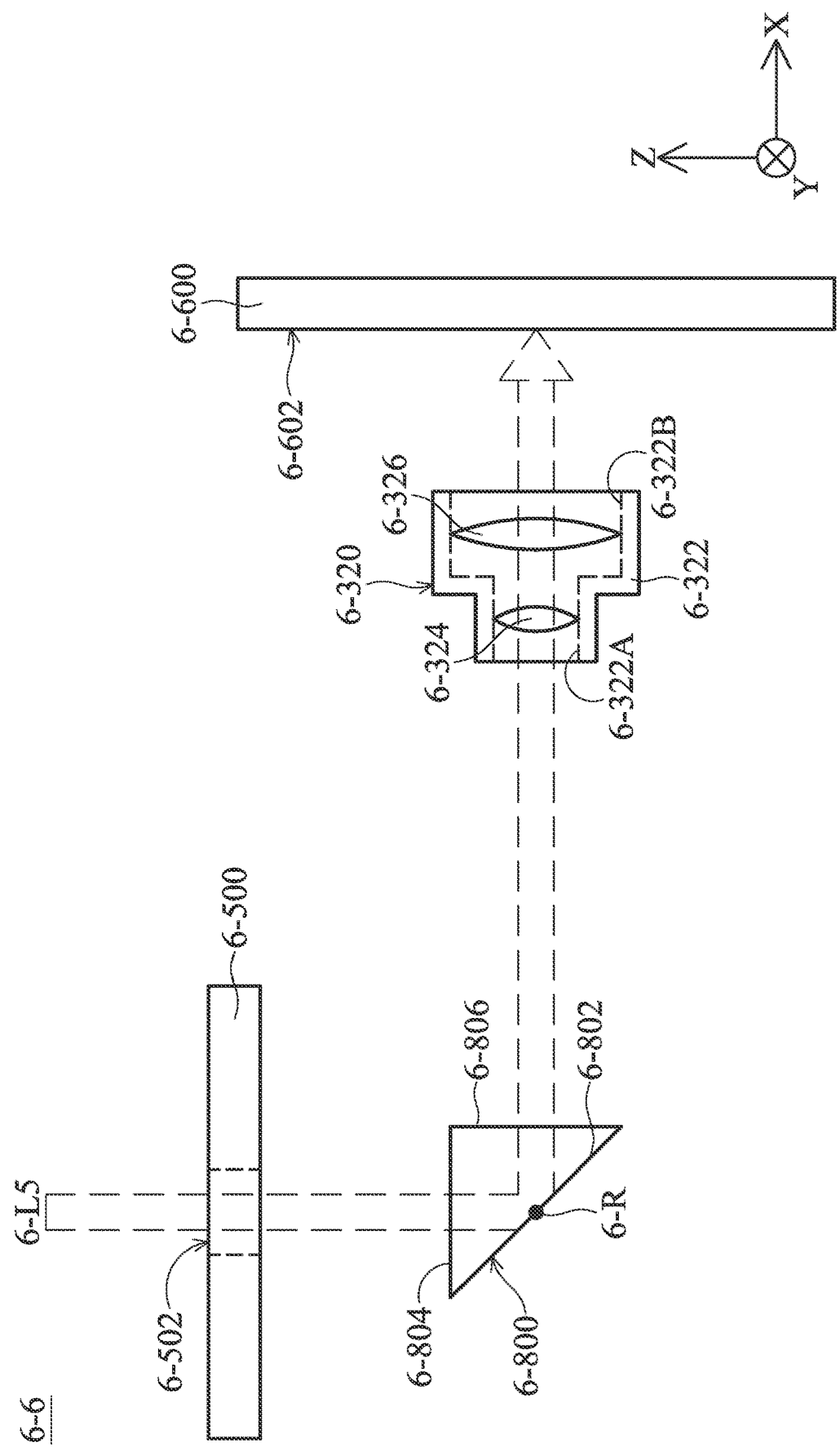
FIG. 79 is a schematic view of the position relationship between some elements of the image capturing device according to some embodiments of the present disclosure.

Furthermore, in some embodiments, the aperture unit 6-500 and the first lens unit 6-320 may be disposed at different sides of the reflecting unit 6-800. For example, FIG. 79 illustrates the position relationship between some elements of an image capturing device 6-6, according to some embodiments of the present disclosure. In FIG. 79, the aperture unit 6-500 is disposed at a side corresponding to the side 6-804 of the reflecting unit 6-800, the first lens unit 6-320 is disposed on another side corresponding to the side 6-806 of the reflecting unit 6-800. As a result, light 6-L5 from the external environment may be reflected by the reflecting unit 6-800 after passing through the aperture unit 6-500 to change traveling direction, and then passes through the first lens unit 6-320 to form an image on the sensing surface 6-602 of the image sensor 6-600 to fulfill different design requirements. Furthermore, the image capturing devices 6-1, 6-2, 6-3, 6-4, 6-5 and 6-6 may be applied in the optical modules 1-A1000, 1-A2000, 1-A3000, 1-B2000, 1-C2000, or 1-D2000 in some embodiments of the present disclosure. Furthermore, the light intensity adjusting assembly 7-50, the optical system 8-1, the aperture unit 9-1 and the aperture unit 10-1 of some embodiments of the present disclosure may be applied in the image capturing devices 6-1, 6-2, 6-3, 6-4, 6-5 and 6-6.

In summary, an image capturing device is provided in the present disclosure. By changing the position of the aperture unit in the image capturing device, the quality of the image received by the image capturing device may be enhanced to fulfill different image capturing requirements. Furthermore, by providing a reflecting unit in the image capturing device, the thickness of the electronic device using this image capturing device may be reduced to achieve miniaturization. Moreover, by allowing the lens units, the reflecting unit, the aperture unit, etc. being disposed in the same image capturing device (i.e. modularization), the quality of the image may be enhanced and the dimensions of the image capturing device may be decreased, and the tolerance may be decreased when different modules are assembled with each other to further increase the quality of image capturing.

Seventh Group of Embodiments

Figure 80:
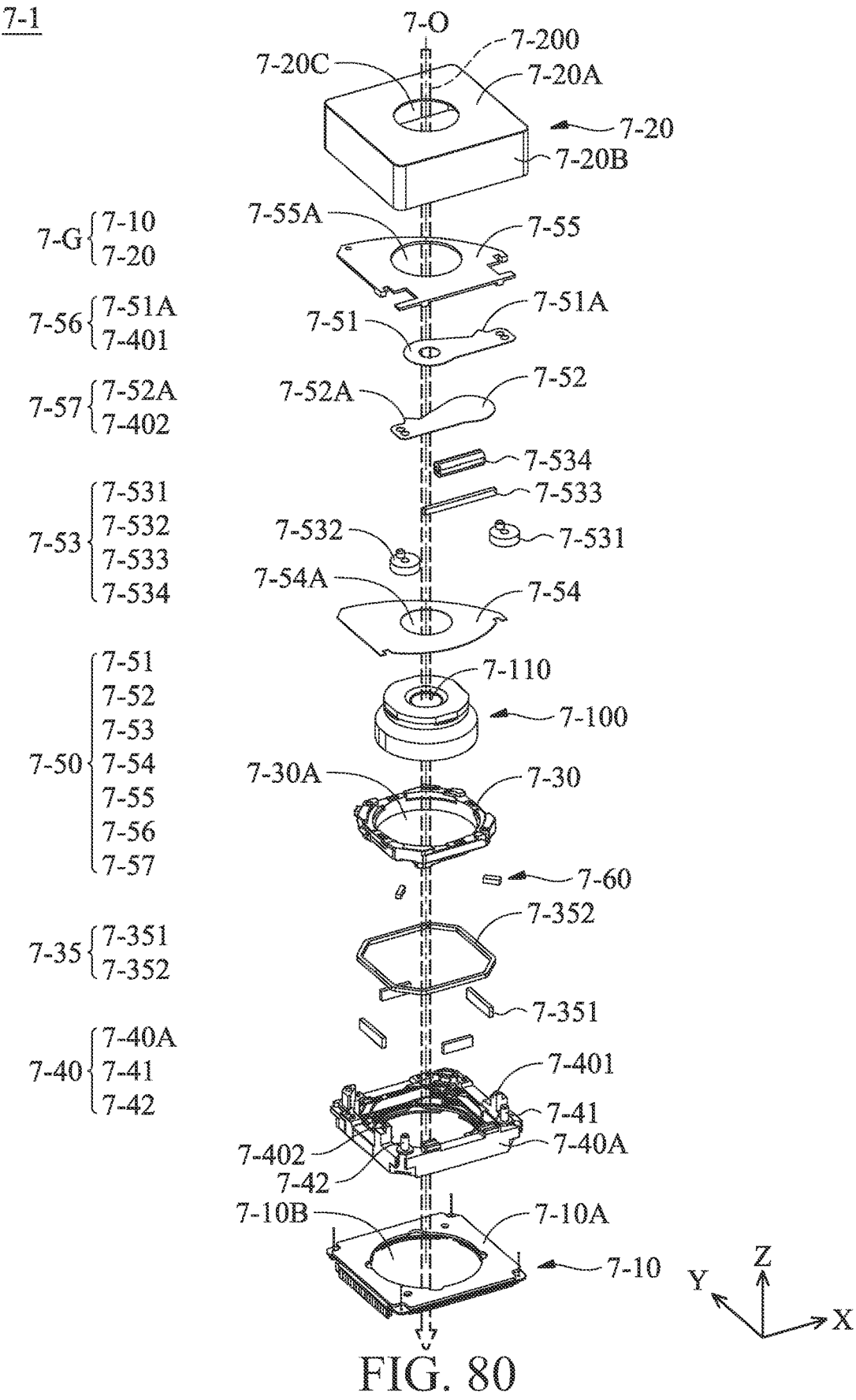
FIG. 80 is an exploded view of an optical element driving mechanism according to the present disclosure.

Firstly, referring to FIG. 80, FIG. 80 is an exploded view of an optical element driving mechanism 7-1 according to an embodiment of the present disclosure. The optical element driving mechanism 7-1 includes a base 7-10, a top cover 7-20, a holder 7-30, a holder driving mechanism 7-35, a frame 7-40, a light intensity adjusting assembly 7-50 and two optical element stop members 7-60.

The base 7-10 is combined with the top cover 7-20 to form a housing 7-G of the optical element driving mechanism 7-1. The base 7-10 constitutes a bottom wall 7-10A of the housing 7-10G, and the top cover 7-20 constitutes a top wall 7-20A and four side walls 7-20B of the housing 7-G. The base 7-10 has an opening 7-10B facing an image sensor (not shown) placed outside the optical element driving mechanism 7-1. The top cover 7-20 has an opening 7-20C. The center of the opening 7-20C is corresponding to an optical axis 7-O of an optical element 7-100. The optical element 7-100 has an opening 7-110 so that light 7-200 passes through the opening 7-110 to the optical element 7-100, and the optical axis 7-O is parallel to the Z-axis direction.

The holder 7-30 is located between the base 7-10 and the top cover 7-20. The holder 7-30 is movably connected to the frame 7-40. The holder 7-30 is suspended inside the center of the frame 7-40 by the upper spring and the lower spring (not shown) made of a metal material. The holder 7-30 has a through hole 7-30A. A corresponding threaded structure (not shown) is formed between the through hole 7-30A and the optical element 7-100 so that locks the optical element 7-100 in the through hole 7-30A. The holder 7-30 and the optical element 7-100 are moved relative to the frame 7-40 in the direction of the optical axis 7-O.

The holder driving mechanism 7-35 includes four driving magnetic elements 7-351 and a driving coil 7-352. The driving magnetic elements 7-351 are disposed on the frame 7-40. In some embodiments, the number of the driving magnetic elements may also be two. The driving coil 7-352 is disposed on the outer surface of the holder 7-30. More specifically, the driving coil 7-352 is wounded around the outer surface of the holder 7-30 which is opposite to the frame 7-40. When a current is supplied to the driving coil 7-352, the driving coil 7-352 may act with a magnetic field of the driving magnetic element to generate an electromagnetic force to move the holder 7-30 and the optical element 7-100 relative to the frame 7-40 in the direction of the optical axis 7-O.

The frame 7-40 is movably connected to the base 7-10 and the holder 7-30. The frame 7-40 includes a frame body 7-40A, a first shaft 7-41 and a second shaft 7-42. The frame body 7-40A is located on the base 7-10. The first shaft 7-41 and the second shaft 7-42 are integrally form with the frame body 7-40A. Therefore, relative to the frame body 7-40A, the first shaft 7-41 and the second shaft 7-42 are fixed and non-rotatable. Moreover, the first shaft 7-41 and the second shaft 7-42 are parallel to each other but do not contact to each other.

The light intensity adjusting assembly 7-50 is disposed on the frame 7-40. The light intensity adjusting assembly 7-50 includes a first shutter 7-51, a second shutter 7-52, a shutter driving member 7-53, a supporting plate 7-54 and a top cover 7-55. The light intensity adjusting assembly 7-50 adjusts the luminous flux to the optical element 7-100.

Figure 81:
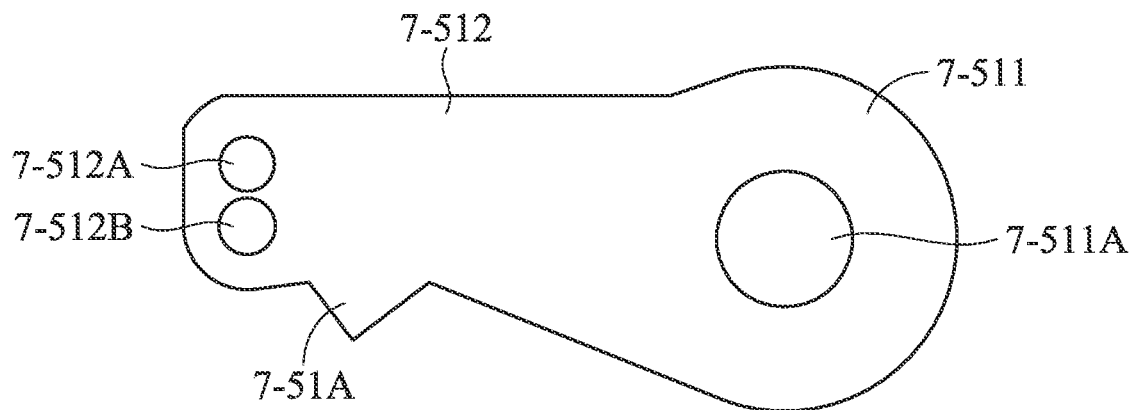
FIG. 81 is a schematic view of a first shutter of the optical element driving mechanism according to the present disclosure.

The first shutter 7-51 is disposed above the frame 7-40. As shown in FIG. 81, the first shutter 7-51 has a first blocking part 7-511 and a first extending part 7-512. The first blocking part 7-511 is an arc-shaped part of the first shutter 7-51, so that the first blocking part 7-511 blocks the opening 7-110 of the optical element 7-100. The first extending part 7-512 includes a protruded first stop member 7-51A. The first extending part 7-512 extends from the first blocking part 7-511 in side cut, that is, the first extending part 7-512 includes two sides with the feature of side cut, and the two sides with the feature of side cut gradually approach each other. Therefore, the diameter of the first blocking part 7-511 is greater than the distance between the two sides with the feature of side cut. In the present embodiment, the first blocking part 7-511 has an opening 7-511A which allows a portion of light 7-200 to enter the optical element 7-100 via the opening 7-511A and the opening 7-110, thereby achieving the effect of restricting the luminous flux to the optical element 7-100. The first extending part 7-512 has two openings 7-512A and 7-512B. The opening 7-512A is passed through by the first shaft 7-41. The function of the first stop member 7-51A is described later.

Figure 82:
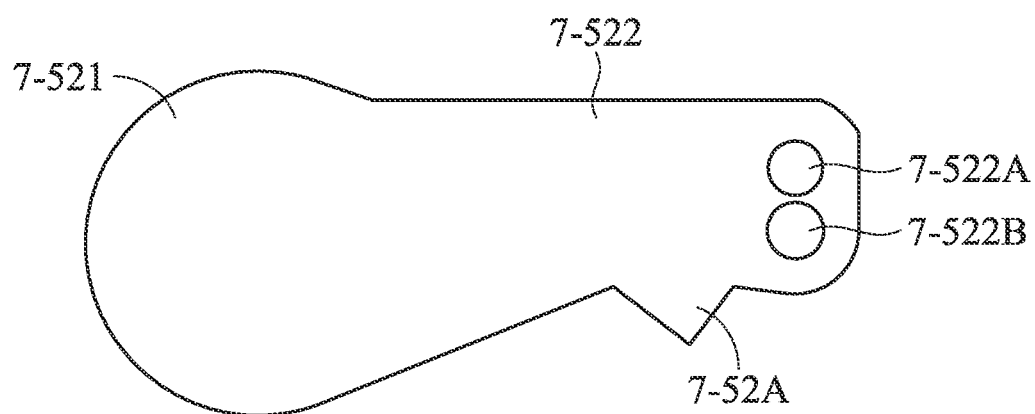
FIG. 82 is a schematic view of a second shutter of the optical element driving mechanism according to the present disclosure.

The second shutter 7-52 is disposed between the first shutter 7-51 and the frame 7-40. As shown in FIG. 82, the second shutter has a second blocking part 7-521 and a second extending part 7-522. The second blocking part 7-521 is an arc-shaped part of the second shutter 7-52, so that the second blocking part 7-521 blocks the opening 7-110 of the optical element 7-100. The second extending part 7-522 includes a protruded second stop member 7-52A. The second extending part 7-522 extends from the second blocking part 7-521 in side cut, that is, the second extending part 7-522 includes two sides with the feature of side cut, and the two sides with the feature of side cut gradually approach each other. Therefore, the diameter of the second blocking part 7-521 is greater than the distance between the two sides with the feature of side cut. In the present embodiment, the second blocking part 7-521 totally blocks the opening 7-110 of the optical element 7-100, and does not allow light 7-200 to enter the optical element 7-100 via the opening 7-110, thereby achieving the effect of restricting the luminous flux to the optical element 7-100. The second extending part 7-522 has two openings 7-522A and 7-522B. The opening 7-522A is passed through by the second shaft 7-42. The function of the second stop member 7-52A is described later.

Please refer to FIG. 80, the shutter driving member 7-53 is disposed on the frame 7-40, and is located between the second shutter 7-52 and the frame 7-40. The shutter driving member 7-53 includes a first magnetic element 7-531, a second magnetic element 7-532, a magnetic permeable element 7-533 and a solenoid 7-534. The shutter driving member 7-53 drives the first shutter 7-51 and the second shutter 7-52 to rotate relative to the holder 7-30 and the frame 7-40.

Figure 83:
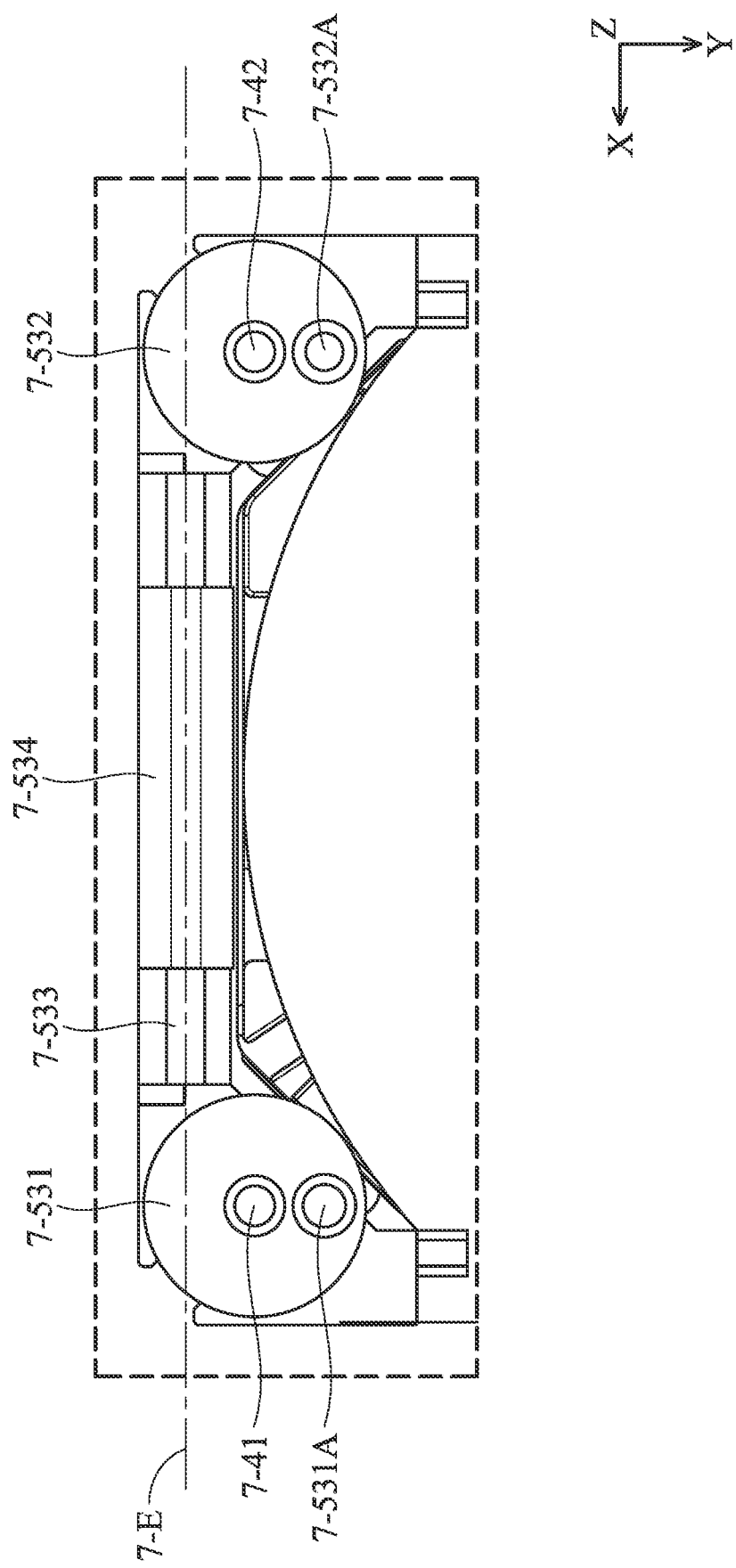
FIG. 83 is a schematic view of a shutter driving member of the optical element driving mechanism according to the present disclosure.

As shown in FIG. 83, the first magnetic element 7-531 and the second magnetic element 7-532 are passed through by the first shaft 7-41 and the second shaft 7-42 respectively. The first magnetic element 7-531 and the second magnetic element 7-531 have protruded parts 7-531A and 7-532A. The protruded part 7-531A of the first magnetic element 7-531 passes through the opening 7-512B of the first shutter 7-51 (as shown in FIG. 81), and the protruded part 7-532A of the second magnetic element 7-532 passes through the opening 7-522B of the second shutter 7-52 (as shown in FIG. 82). The materials of the first magnetic element 7-531 and the second magnetic element 7-532 are permanent magnets. The magnetic permeable element 7-533 is disposed between the first magnetic element 7-531 and the second magnetic element 7-531, and the magnetic permeable element 7-533 extends in a extending direction 7-E perpendicular to the optical axis 7-O. The extending direction 7-E is parallel to the X-axis. More specifically, the magnetic permeable element 7-533 may have a long strip structure, and the two ends of the magnetic permeable element 7-533 extend adjacent to the first magnetic element 7-531 and the second magnetic element 7-532 respectively.

The center of the magnetic permeable element 7-533 is not overlapped with the first shaft 7-41 and the second shaft 7-42 when observing along the extending direction 7-E. The magnetic permeable element 7-533 is made of magnetic permeable materials, for example, the magnetic permeable material forming the magnetic permeable element 7-533 may be nickel-iron alloy. The solenoid 7-534 covers the middle part of the magnetic permeable element 7-533. More specifically, the two ends of the magnetic permeable element 7-533 are not covered by the solenoid 7-534. The solenoid 7-534 receives the current to generate a magnetic field, thereby driving the first magnetic element 7-531 and the second magnetic element 7-532 rotate about the first shaft 7-41 and the second shaft 7-42, respectively.

Figure 84:
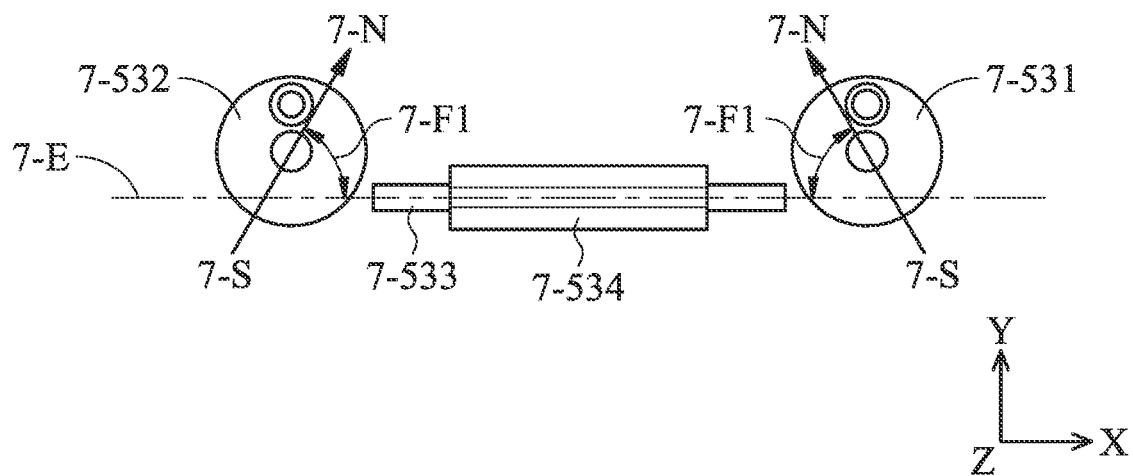
FIGS. 84 and 85 are schematic views of magnetic pole directions of a first magnetic element and second magnetic element of the shutter driving member of the optical element driving mechanism according to the present disclosure.
Figure 85:
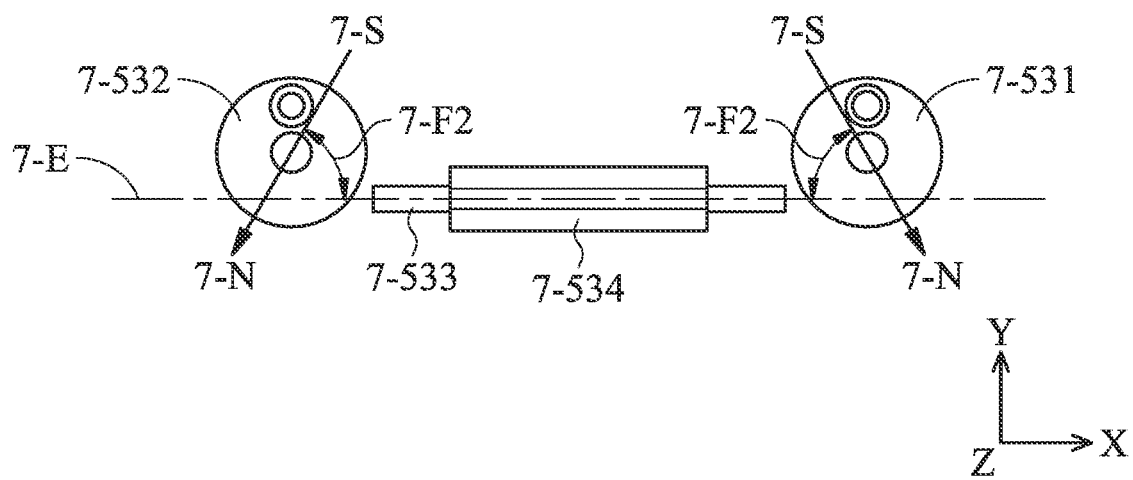

Please refer to FIGS. 84 and 85, FIGS. 84 and 85 are schematic views of disposition of the magnetic pole directions of the first magnetic element 7-531 and second magnetic element 7-532. As shown in FIG. 84, directions of north poles 7-N of the first magnetic element 7-531 and the second magnetic element 7-532 and the extending direction 7-E has same angles 7-F1 when a current is not supplied to the solenoid 7-534. Alternatively, the magnetic pole directions of the first magnetic element 7-531 and second magnetic element 7-532 may be disposed as shown in FIG. 85, directions of south poles 7-S of the first magnetic element 7-531 and the second magnetic element 7-532 and the extending direction 7-E has same angles 7-F2 when the current is not supplied to the solenoid 7-534.

Figure 86:
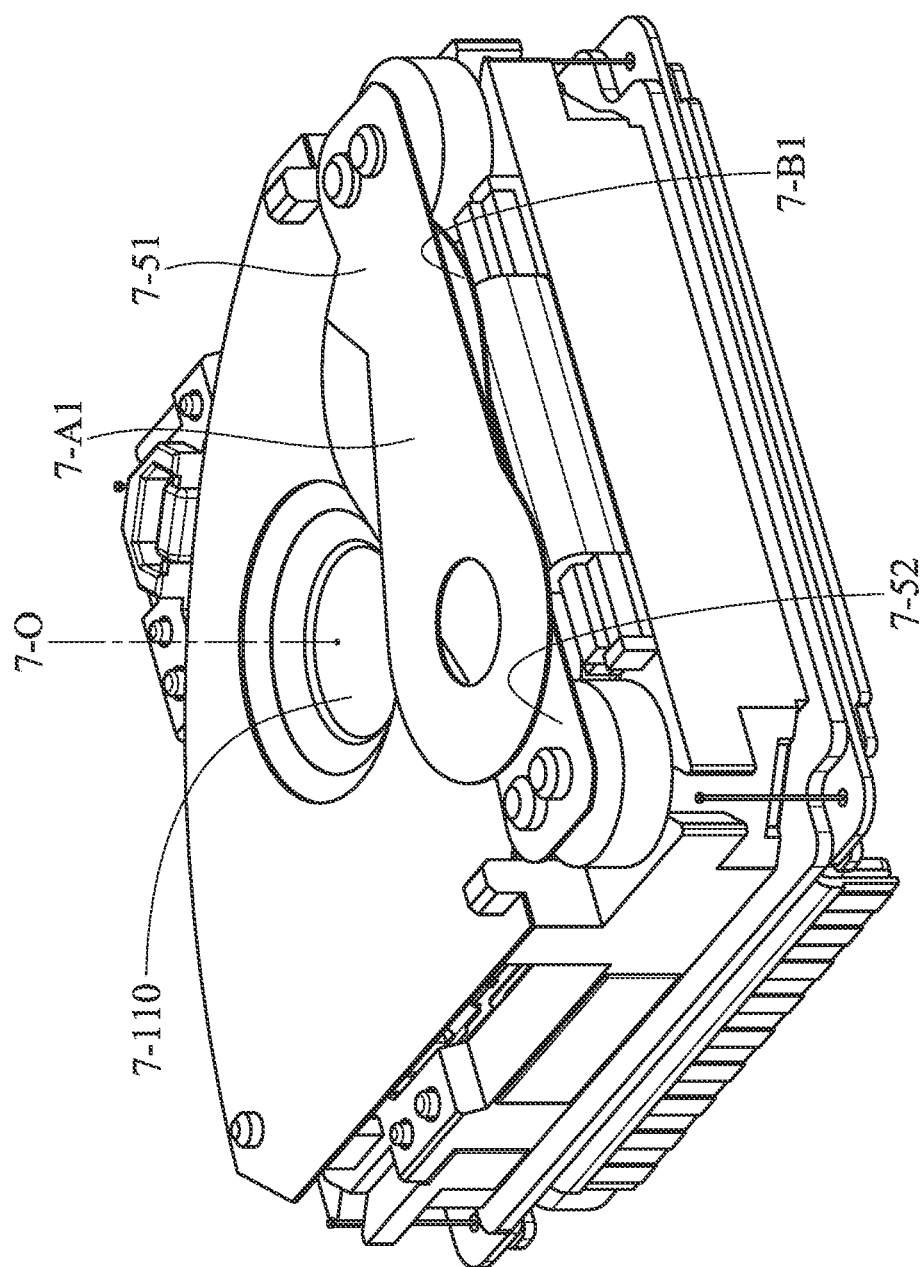
FIGS. 86, 87 and 88 are schematic views of the relationship of relative positions of the first shutter and the second shutter of the optical element driving mechanism according to the present disclosure.
Figure 87:
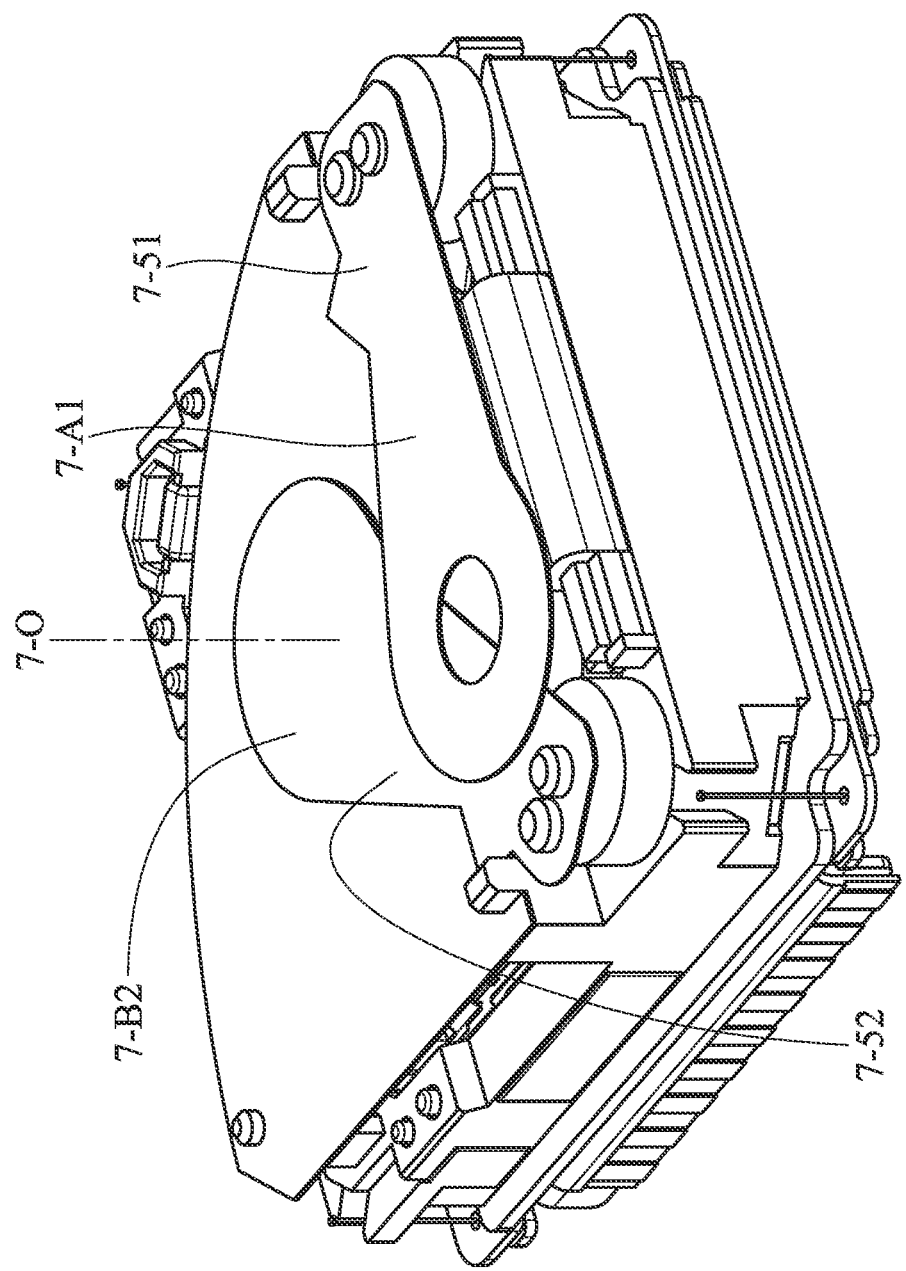
Figure 88:
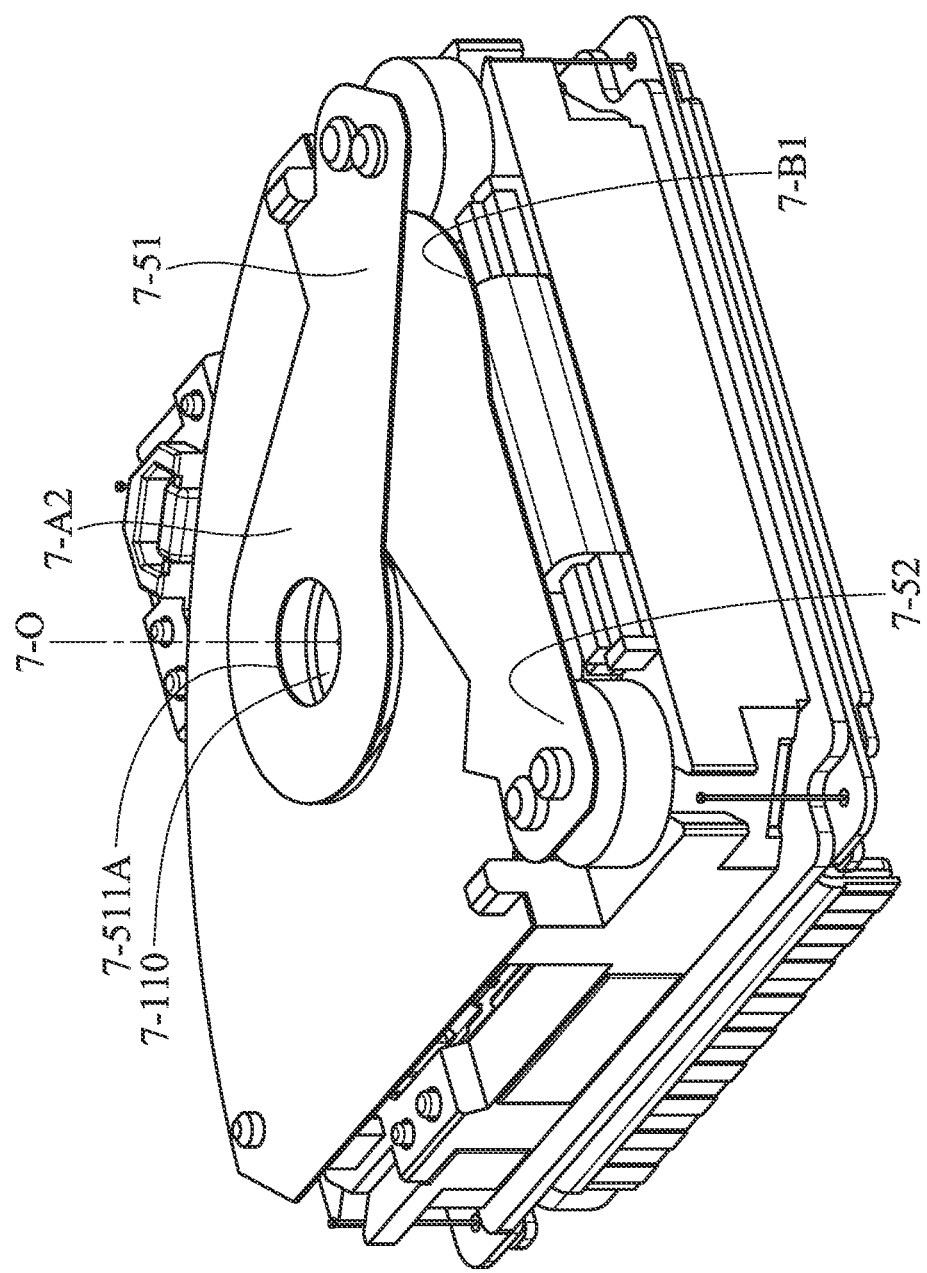

FIGS. 86, 87 and 88 are schematic views of the relationship of relative positions of the first shutter 7-51 and the second shutter 7-52 of the optical element driving mechanism 7-1. The shutter driving member 7-53 drives and change the positions of the first shutter 7-51 and the second shutter 7-52 by the incoming current. No matter which positions the first shutter 7-51 and the second shutter 7-52 are located, the first shutter 7-51 is partially overlapped with the second shutter 7-52 when observing along the optical axis 7-O.

The shutter driving member 7-53 drives the first shutter 7-51 to move between the first beginning position 7-A1 and the first final position 7-A2. When the current is not suppled to the shutter driving member 7-53, the first magnetic element 7-531 attracts the magnetic permeable element 7-533 and makes the first shutter 7-51 located at the first beginning position 7-A1.

When the first shutter 7-51 is located at the first beginning position 7-A1, the first shutter 7-51 is not overlapped with the optical element 7-100 when observing along the optical axis 7-O. When the first shutter 7-51 is located at the first final position 7-A2, the first shutter 7-51 is partially overlapped with the optical element 7-100 when observing along the optical axis 7-O.

The shutter driving member 7-53 drives the second shutter 7-52 to move between the second beginning position 7-B1 and the second final position 7-B2. When the current is not suppled to the shutter driving member 7-53, the second magnetic element 7-532 attracts the magnetic permeable element 7-533 and makes the second shutter 7-52 located at the second beginning position 7-A2.

When the second shutter 7-52 is located at the second beginning position 7-B1, the second shutter 7-52 is not overlapped with the optical element 7-100 when observing along the optical axis 7-O. When the second shutter 7-52 is located at the second final position 7-B2, the second shutter 7-52 is overlapped with the optical element 7-100 when observing along the optical axis 7-O. Thus, in this state, the second shutter 7-52 blocks the light 7-200 to the opening 7-110.

FIG. 86 shows the first shutter 7-51 and the second shutter 7-52 of the optical element driving mechanism 7-1 of the present disclosure located at the first beginning position 7-A1 and the second beginning position 7-B1, respectively. In this state, the light 7-200 to the optical element 7-100 via the opening 7-110 is not blocked by the first shutter 7-51 or the second shutter 7-52. Thus, the light 7-200 totally enters the optical element 7-100 via the opening 7-110.

FIG. 87 shows the first shutter 7-51 and the second shutter 7-52 of the optical element driving mechanism 7-1 of the present disclosure located at the first beginning position 7-A1 and the second final position 7-B2, respectively. In this state, the light 7-200 to the optical element 7-100 via the opening 7-110 is blocked by the second shutter 7-52 but is not blocked by the first shutter 7-51. Thus, the second shutter 7-52 does not allow the light 7-200 to enter the optical element 7-100 via the opening 7-110.

FIG. 88 shows the first shutter 7-51 and the second shutter 7-52 of the optical element driving mechanism 7-1 of the present disclosure located at the first final position 7-A2 and the second beginning position 7-B1, respectively. In this state, the light 7-200 to the optical element 7-100 via the opening 7-110 is blocked by the first shutter 7-51 but is not blocked by the second shutter 7-52. Thus, the opening 7-511A of the first shutter 7-51 allows a portion of the light 7-200 to enter the optical element 7-100 via the opening 7-110.

Therefore, the quantity of the luminous flux to the optical element 7-100 via the opening 7-110 may be controlled by driving and changing positions of the first shutter 7-51 and the second shutter 7-52 by the shutter driving member 7-53.

Figure 89:
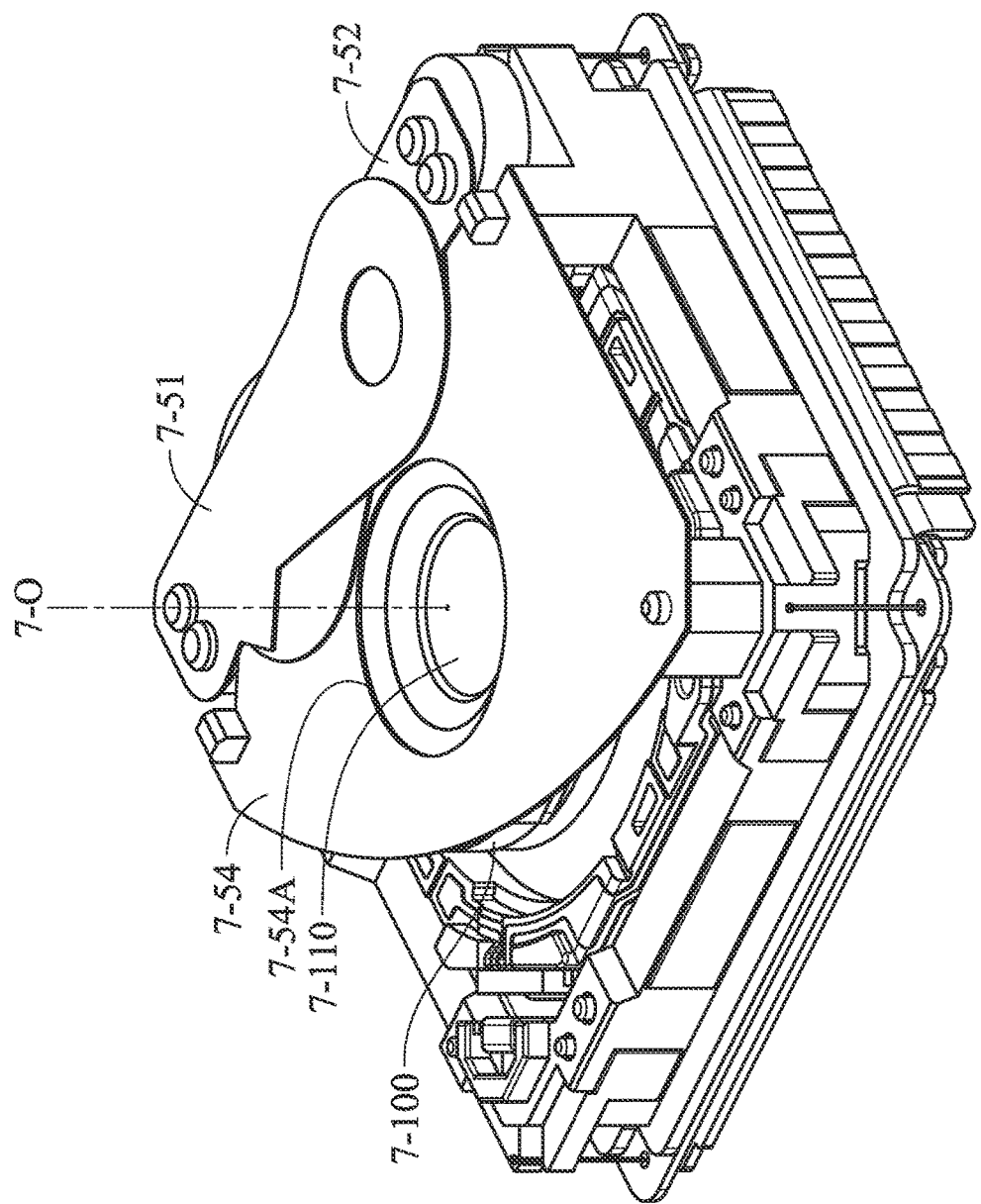
FIGS. 89 and 90 are schematic views of the relationship of relative positions of the first shutter, the second shutter and a supporting plate of the optical element driving mechanism according to the present disclosure.
Figure 90:
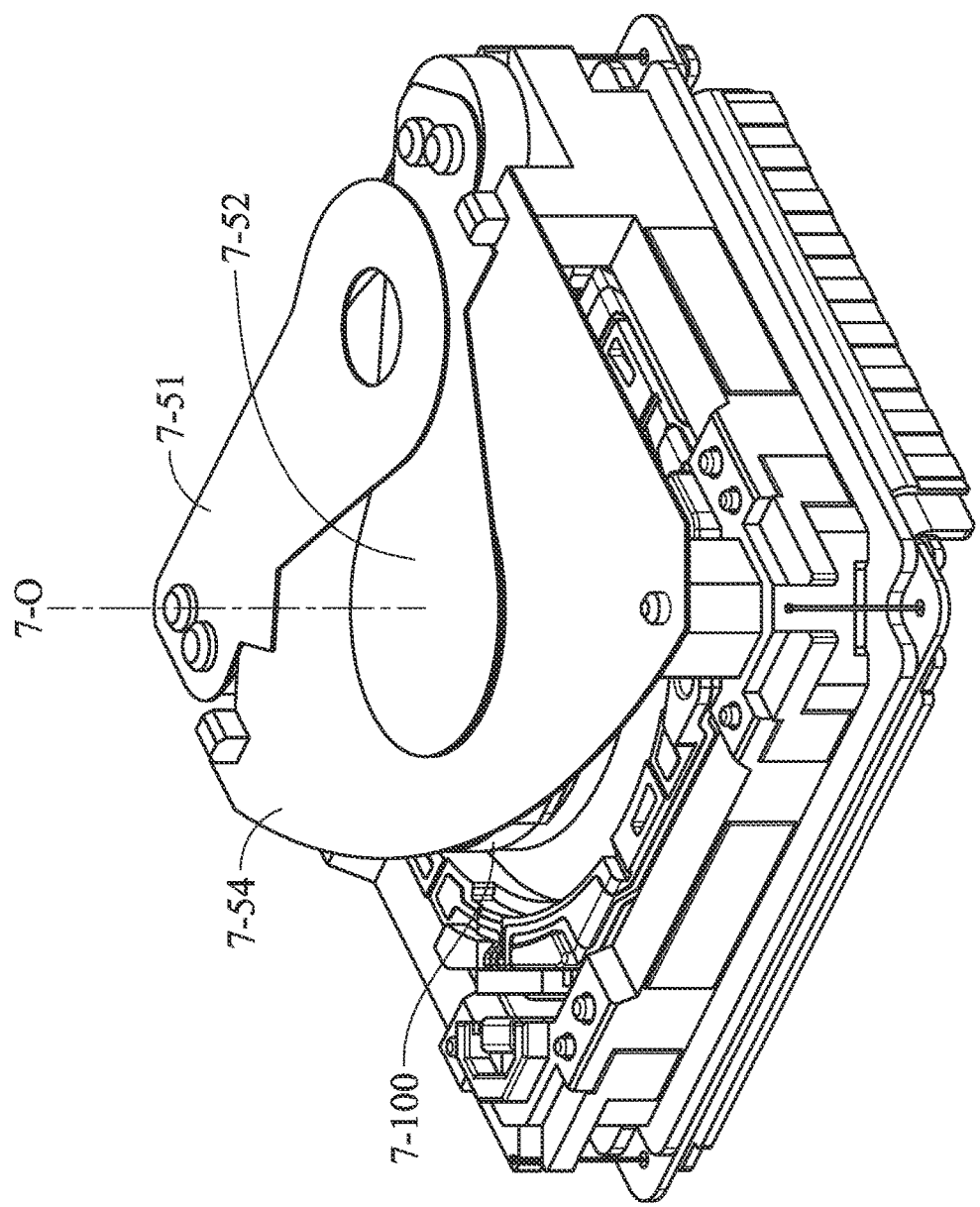

As shown in FIGS. 89 and 90, the supporting plate 7-54 is located between the second shutter 7-52 and the optical element 7-100 to prevent the first shutter 7-51 and the second shutter 7-52 from contacting the optical element 7-100. The supporting plate 7-54 has an opening 7-54A which allows the light 7-200 to enter the optical element 7-100 via the opening 7-54A and the opening 7-110. The supporting plate 7-54 is partially overlapped with the second shutter 7-52 when observing along the optical axis 7-O.

Figure 91:
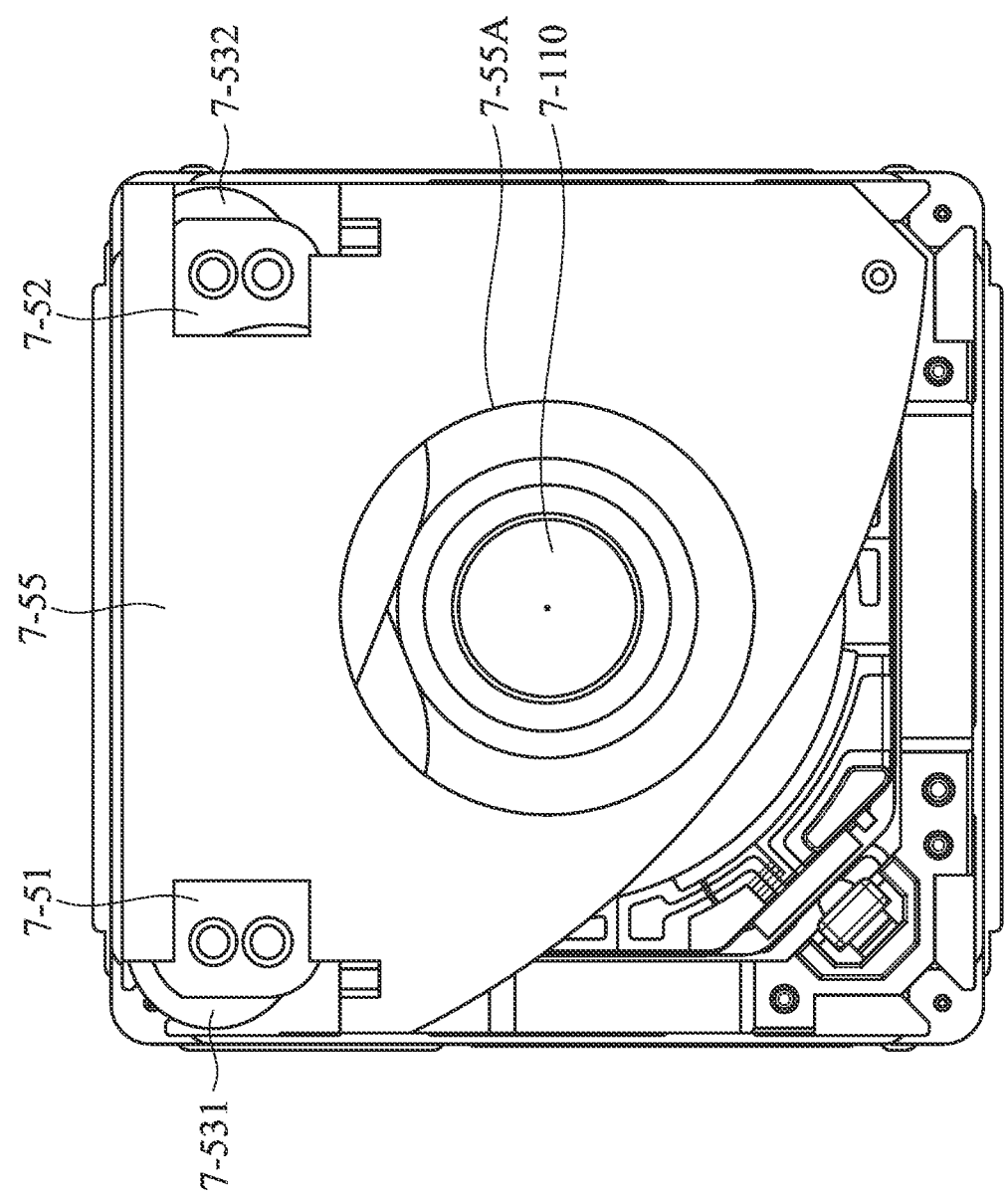
FIG. 91 is a top view of the optical element driving mechanism according to the present disclosure.
Figure 92:
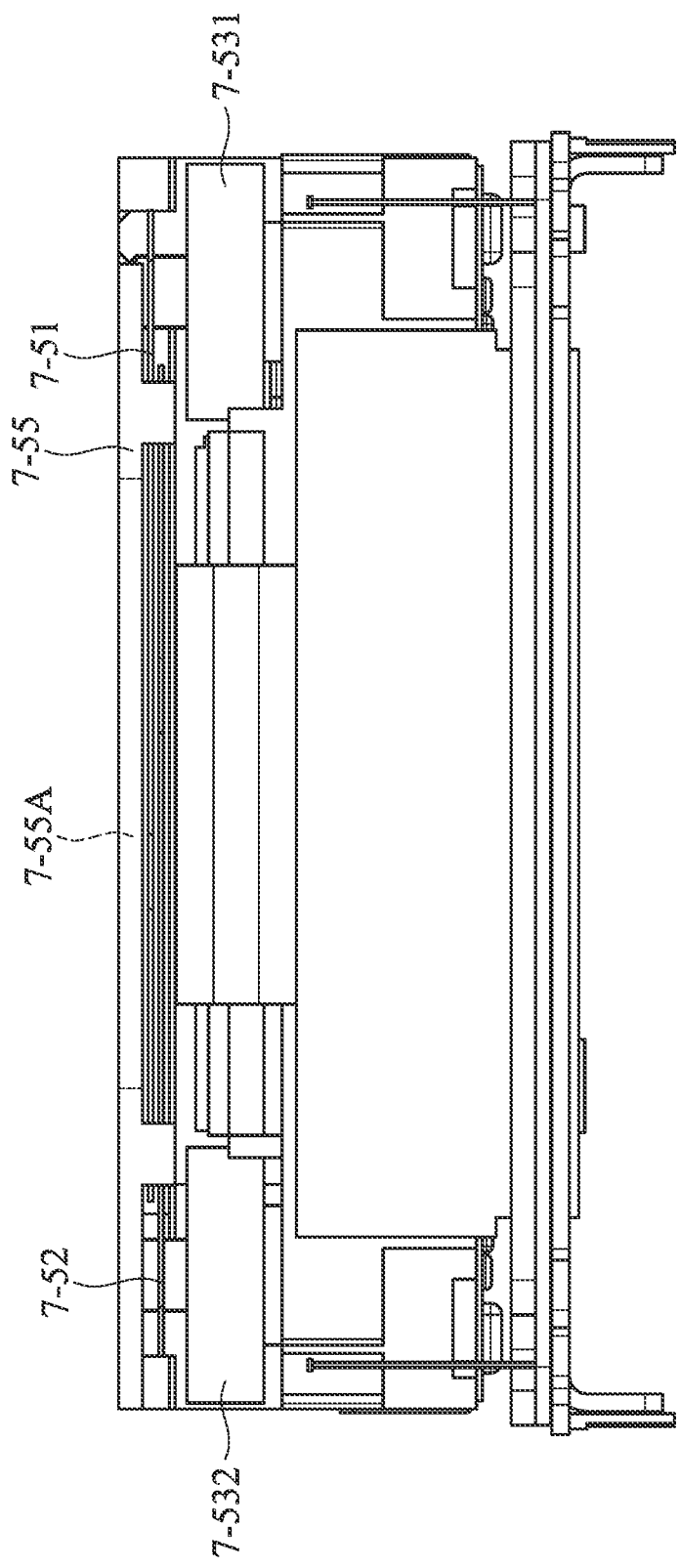
FIG. 92 is a side view of the optical element driving mechanism according to the present disclosure.

As shown in FIGS. 91 and 92, the top cover 7-55 is located above the first shutter 7-51. The top cover 7-55 has an opening 7-55A which allows the light 7-200 to pass through the opening 7-55A to the opening 7-110. More specifically, the first shutter 7-51 is located between the top cover 7-55 and the first magnetic element 7-531, and the second shutter 7-52 is located between the top cover 7-55 and the second magnetic element 7-532.

Figure 93:
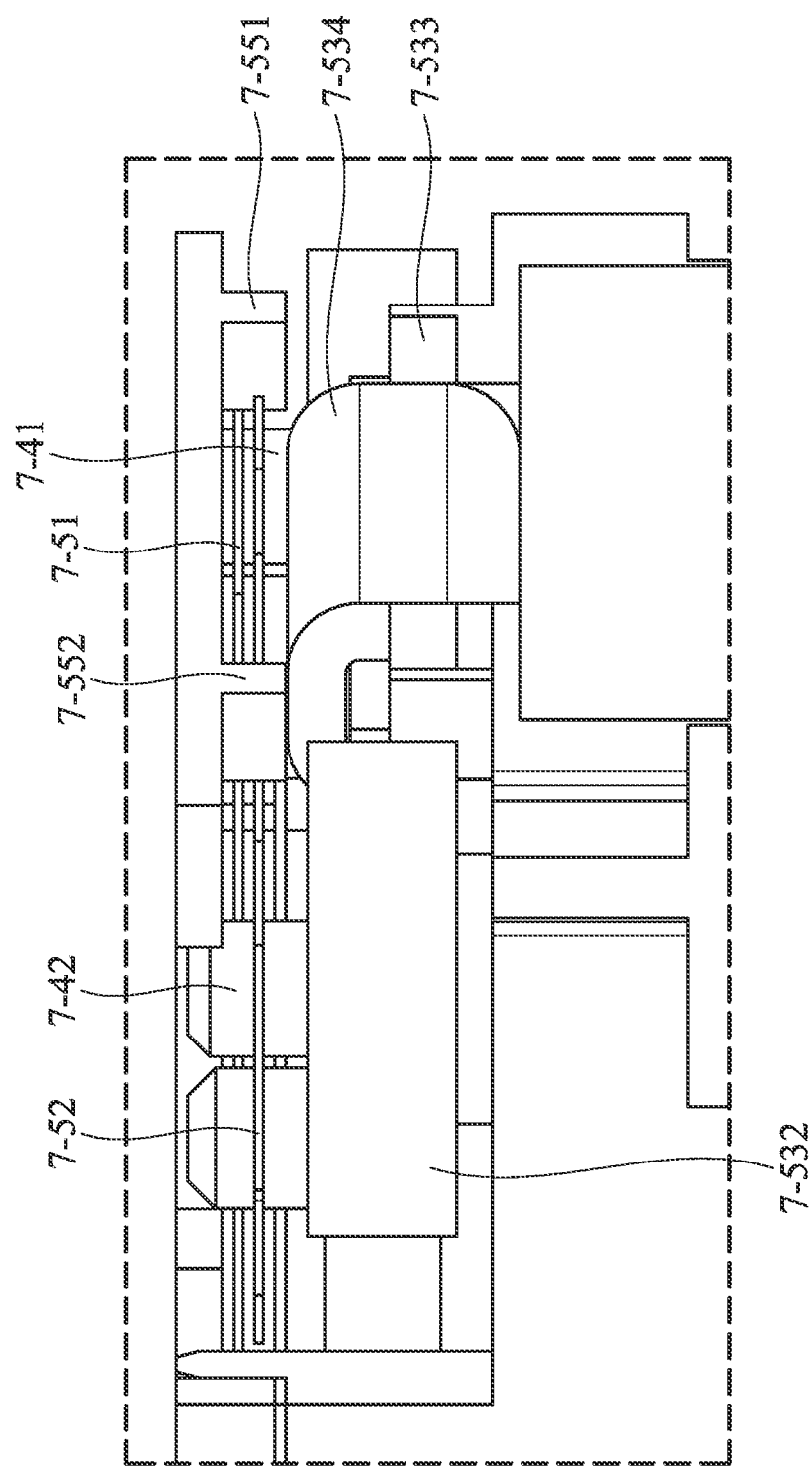
FIG. 93 is a side view of the optical element driving mechanism according to the present disclosure.

As shown in FIG. 93, in an embodiment, the top cover 7-55 has a first protruded portion 7-551 and a second protruded portion 7-552. When the first shutter 7-51 moves to the first beginning position 7-A1, the first protruded portion 7-551 blocks the first shutter 7-51 such that the first shutter 7-51 halts at the first beginning position 7-A1. Similarly, when the second shutter 7-52 moves to the second beginning position 7-B1, the second protruded portion 7-552 blocks the second shutter 7-52 such that the second shutter 7-52 halts at the second beginning position 7-B1. Therefore, the first protruded portion 7-551 of the top cover 7-55 restricts the range of movement of the first shutter 7-51 within the first beginning position 7-A1, and the second protruded portion 7-552 of the top cover 7-55 restricts the range of movement of the second shutter 7-52 within the second beginning position 7-B1.

Figure 94:
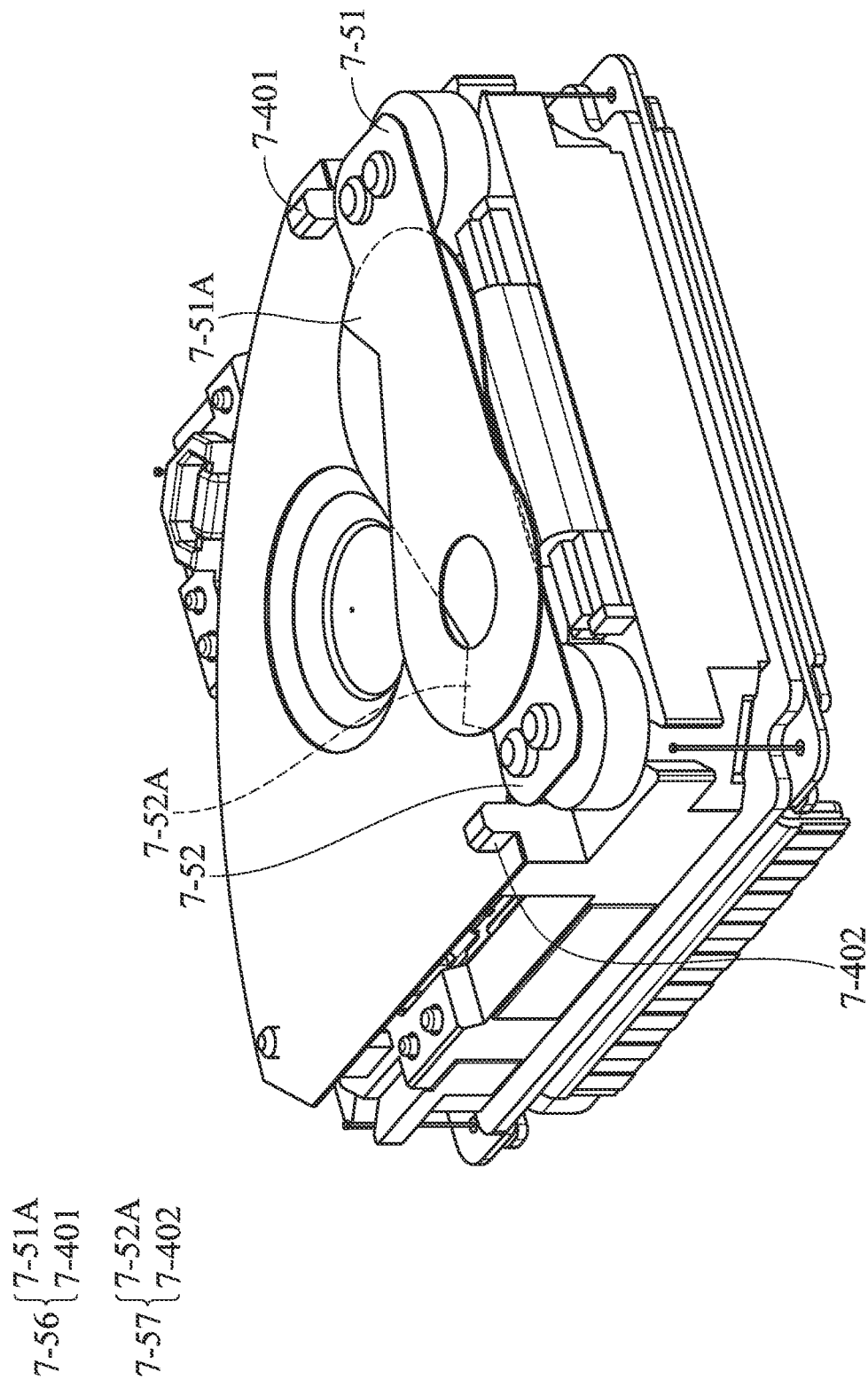
FIG. 94 is a schematic view of a first stop mechanism and a second stop mechanism of the optical element driving mechanism according to the present disclosure.

Please refer to FIGS. 81 and 94, a protruded portion 7-401 located at the frame 7-40 and the first stop member 7-51A located at the first shutter 7-51 consist a first stop mechanism 7-56. When the first shutter 7-51 moves to the first final position 7-A2, the protruded portion 7-401 blocks the first stop member 7-51A such that the first shutter 7-51 halts at the first final position 7-A2 (as shown in FIG. 88). Therefore, the first stop mechanism 7-56 restricts the range of movement of the first shutter 7-51 within the first final position 7-A2.

Please refer to FIGS. 82 and 94, another protruded portion 7-402 located at the frame 7-40 and the second stop member 7-52A located at the second shutter 7-52 consist a second stop mechanism 7-57. When the second shutter 7-52 moves to the second final position 7-B2, the protruded portion 7-402 blocks the second stop member 7-52A such that the second shutter 7-52 halts at the second final position 7-B2 (as shown in FIG. 87). Therefore, the second stop mechanism 7-57 restricts the range of movement of the second shutter 7-52 within the second final position 7-B2.

Figure 95:
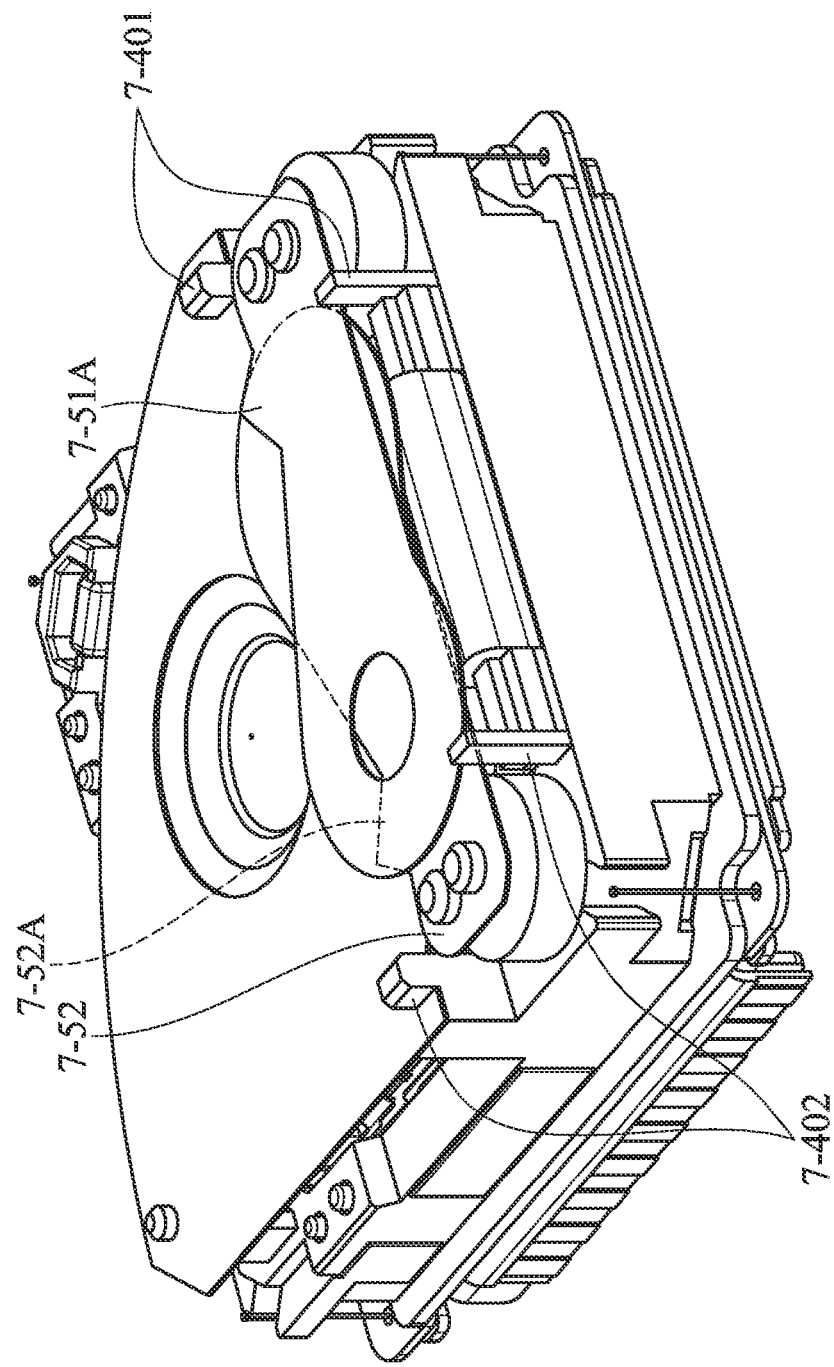
FIG. 95 is a schematic view of the first stop mechanism and the second stop mechanism of the optical element driving mechanism according to the present disclosure.

Please refer to FIG. 95, in another embodiment, the top cover (not shown) may not have protruded portion. Under this circumstance, the first stop mechanism 7-56A includes two protruded portions 7-401 located at the frame 7-40 and the first stop member 7-51A located at the first shutter 7-51. When the first shutter 7-51 moves to the first beginning position 7-A1, the protruded portion 7-401 blocks the first shutter 7-51 such that the first shutter 7-51 halts at the first beginning position 7-A1. When the first shutter 7-51 moves to the first final position 7-A2, the protruded portion 7-401 blocks the first stop member 7-51A such that the first shutter 7-51 halts at the first final position 7-A2 (as shown in FIG. 88). Therefore, the range of movement of the first shutter 7-51 is merely restricted by the first stop mechanism 7-56A. The second stop mechanism 7-57A includes the other two protruded portions 7-402 located at the frame 7-40 and the second stop member 7-52A located at the second shutter 7-52. When the second shutter 7-52 moves to the second beginning position 7-B1, the protruded portion 7-402 blocks the second shutter 7-52 such that the second shutter 7-52 halts at the second beginning position 7-B1. When the second shutter 7-52 moves to the second final position 7-B2, the protruded portion 7-402 blocks the second stop member 7-52A such that the second shutter 7-52 halts at the second final position 7-B2 (as shown in FIG. 87). Therefore, the range of movement of the second shutter 7-52 is merely restricted by the second stop mechanism 7-57A.

Figure 97:
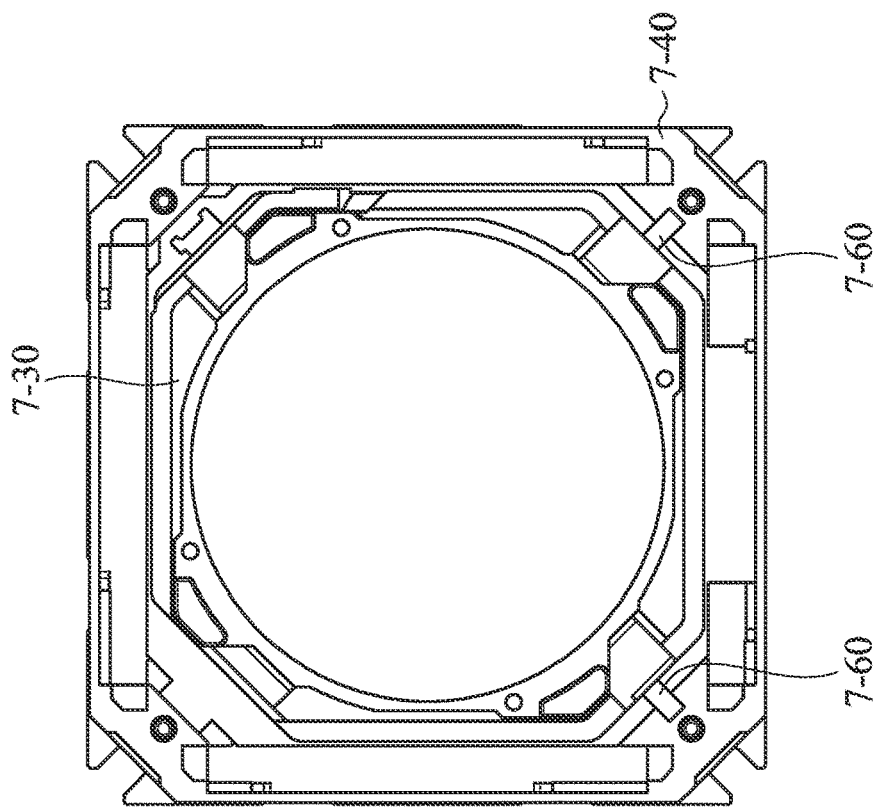
FIG. 97 is a bottom view of the holder, the frame and the optical element stop member according to the present disclosure.
Figure 96:
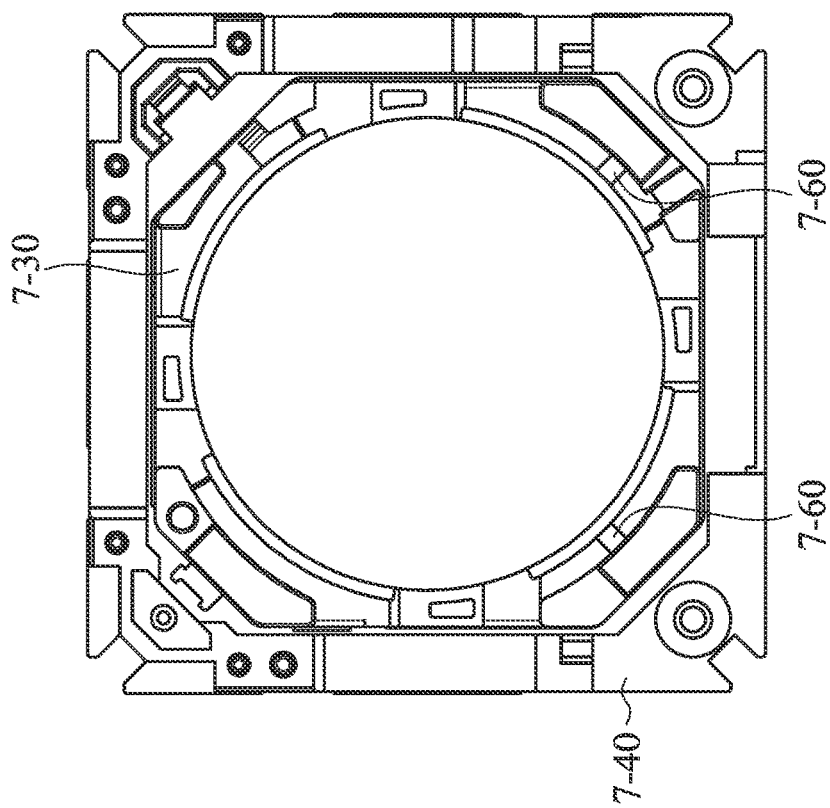
FIG. 96 is a top view of a holder, a frame and an optical element stop member according to the present disclosure.

As shown in FIGS. 96 and 97, the optical element stop members 7-60 are disposed on the frame 7-40. The optical element stop members 7-60 extend from the holder 7-30 to a housing space (not shown) of the frame 7-40. The housing space of the frame 7-40 has a height parallel to the direction of the optical axis 7-O, such height is greater than heights of the optical element stop members 7-60. Thus, the optical element stop members 7-60 are allowed to move in the direction of the optical axis 7-O in the housing space of the frame 7-40. The housing space of the frame 7-40 has a width perpendicular to the direction of the optical axis 7-O, such width is substantially the same as the widths of the optical element stop members 7-60. Thus, the optical element stop members 7-60 are not allowed to move in the direction perpendicular to the optical axis 7-O and not allowed to rotate about the optical axis 7-O. The optical element stop members 7-60 and the housing space of the frame 7-40 can restrict the range of movement of the holder 7-30 along the optical axis 7-O and restrict the holder 7-30 from rotating.

Figure 98:
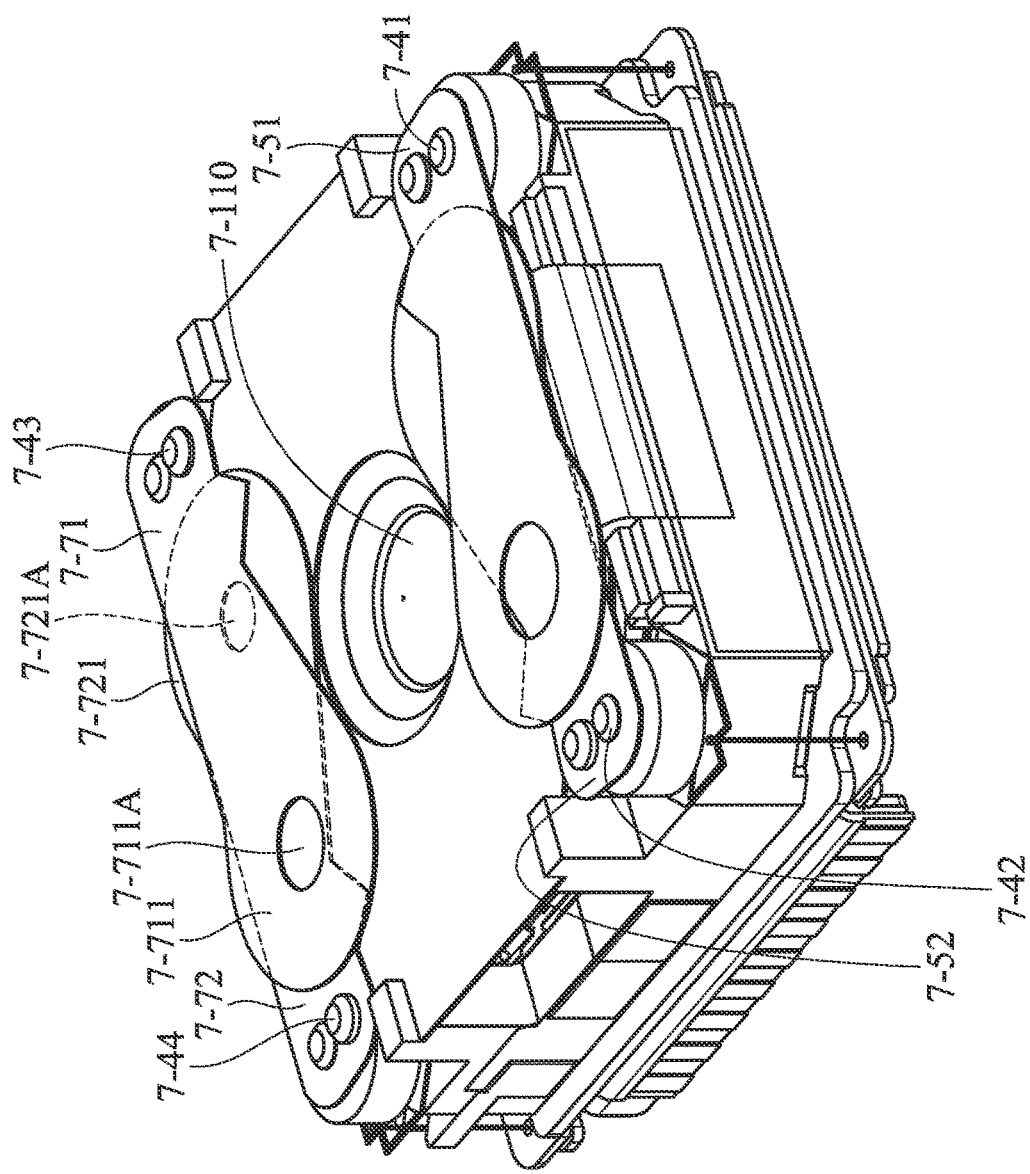
FIG. 98 is a schematic view of an optical element driving mechanism with four shutters according to the present disclosure.

FIG. 98 illustrates another embodiment of the present disclosure. The structure of the optical element driving mechanism 7-2 of the present embodiment is substantially the same as the optical element driving mechanism 7-1 of the embodiments described above, for the reason of simplification, the similar parts are not repeated hereinafter.

The main difference between the optical element driving mechanism 7-2 of the present embodiment and the optical element driving mechanism 7-1 of the embodiments described above is that the optical element driving mechanism 7-1 of the embodiments described above has two shutters, while the optical element driving mechanism 7-2 of the present embodiment has four shutters. Hence, the other two shutters are mainly described hereinbelow, as for the description of the corresponding elements, structures and dispositions, one can take the embodiments described above as references.

As shown in FIG. 98, the frame 7-40 of the optical element driving mechanism 7-2 of the present embodiment further includes a third shaft 7-43 and a fourth shaft 7-44 disposed on the frame body 7-40A. The third shaft 7-43 and the fourth shaft 7-44 are integrally form with the frame body 7-40A. Therefore, relative to the frame body 7-40A, the third shaft 7-43 and the fourth shaft 7-44 are fixed and non-rotatable. Moreover, the third shaft 7-43 and the fourth shaft 7-44 are parallel to each other but do not contact to each other.

The light intensity adjustment assembly 7-50 of the optical element driving mechanism 7-2 of the present embodiment further includes a third shutter 7-71 and a fourth shutter 7-72 and elements which are similar to the embodiments described above.

The structure of the third shutter 7-71 is substantially similar to the first shutter 7-51, the similar parts are not repeated herein. The main difference between the third shutter 7-71 and the first shutter 7-51 is that the size of the opening 7-711A of the third blocking part 7-711 of the third shutter 7-71 is different from the size of the opening 7-511A of the first blocking part 7-511 of the first shutter 7-51. More specifically, the luminous flux to the optical element 7-100 via the opening 7-711A and the opening 7-110 is different from the luminous flux to the optical element 7-100 via the opening 7-511A and the opening 7-110.

The structure of the fourth shutter 7-72 is substantially similar to the first shutter 7-51 and the third shutter 7-71, the similar parts are not repeated herein. The main difference between the fourth shutter 7-72 and the first shutter 7-51 and the third shutter 7-71 is that the size of the opening 7-721A of the fourth blocking part 7-721 of the fourth shutter 7-72 is different from the size of the opening 7-511A of the first blocking part 7-511 of the first shutter 7-51 and the size of the opening 7-711A of the third blocking part 7-711 of the third shutter 7-71. More specifically, the luminous flux to the optical element 7-100 via the opening 7-721A and the opening 7-110 is different from the luminous flux to the optical element 7-100 via the opening 7-511A and the opening 7-110, and the luminous flux to the optical element 7-100 via the opening 7-721A and the opening 7-110 is different from the luminous flux to the optical element 7-100 via the opening 7-711A and the opening 7-110.

Since the optical element driving mechanism 7-2 is provided with a third shutter 7-71 and a fourth shutter 7-72, the luminous flux to the optical element can be more controlled and have more choices.

In some embodiments, the number of shutters can be one, three, five, six or more. In fact, the number of shutters is not limited by the embodiments of the present disclosure. As for the description of the corresponding elements, structures and dispositions, one can take the embodiments described above as references, the similar parts are not repeated herein.

The aforementioned optical element driving mechanism 7-1 and optical element driving mechanism 7-2 may also be applied in the optical modules 1-A1000, 1-A2000, 1-A3000, 1-B2000, 1-C2000, or 1-D2000 in some embodiments of the present disclosure.

In summary, an optical system that can continuously control the size of the aperture opening is provided in the present disclosure. Accordingly, different user requirements of image capturing may be fulfilled. Furthermore, the aperture unit may be disposed on the movable portion and no additional driving element is required to drive the aperture unit, so that miniaturization may be achieved. Moreover, a control unit having predetermined information is provided outside the optical system, so the position sensor used in conventional optical systems may be omitted to further achieve miniaturization.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system, comprising:
   a first optical module comprising a first light-entering hole;
   a second optical module comprising a second light-entering hole;
   a third optical module comprising a third light-entering hole; and
   a reflecting unit,
   wherein the second light-entering hole is close to the first light-entering hole and the third light-entering hole, and a focal length of the second optical module is different from a focal length of the first optical module and a focal length of the third optical module, wherein the reflecting unit comprises an optical member and a first driving module for driving the optical member to rotate around a first rotation axis, wherein when the optical member is rotated around the first rotation axis to a first angle, the optical member faces toward the first optical module, wherein when the optical member is rotated around the first rotation axis to a second angle, the optical member faces toward the third optical module.

2. The optical system as claimed in claim 1, wherein the first optical module, the second optical module, and the third optical module are disposed on the same side of the optical system, and the second optical module is disposed between the first optical module and the third optical module.

3. The optical system as claimed in claim 1, wherein the first optical module and the third optical module are linearly arranged in a direction that is parallel with a side of the optical system, and the second optical module and the first optical module are not linearly arranged in the direction.

4. The optical system as claimed in claim 1, wherein the reflecting unit comprises a first optical member for changing a moving direction of a first external light to a first direction, and the first external light enters the first optical module along the first direction.

5. The optical system as claimed in claim 4, further comprising a second optical member for changing a moving direction of a second external light to a second direction, and the second external light enters the third optical module along the second direction.

6. The optical system as claimed in claim 5, wherein the first direction is substantially parallel with the second direction.

7. The optical system as claimed in claim 5, wherein the reflecting unit further comprises a correction driving module for driving the first optical member and the second optical member to move.

8. The optical system as claimed in claim 7, wherein the reflecting unit further comprises an inertia detecting module for measuring a gravity state or an acceleration state of the optical system.

9. The optical system as claimed in claim 8, wherein the correction driving module drives the first optical member and the second optical member to rotate according to results measured by the inertia detecting module.

10. The optical system as claimed in claim 1, further comprising a first image sensor disposed in the first optical module, wherein when the optical member is in the first angle, an external light is reflected by the optical member to reach the first image sensor.

11. The optical system as claimed in claim 10, further comprising a second image sensor opposite to the first image sensor, wherein when the optical member is in the second angle, the external light is reflected by the optical member to reach the second image sensor.

12. The optical system as claimed in claim 1, wherein the first light-entering hole and the third light-entering hole are integrally formed.

13. The optical system as claimed in claim 1, wherein the reflecting unit comprises:
an optical member holder, wherein the optical member is disposed on the optical member holder;
a frame;
a first bearing member disposed on the frame; and
a first hinge pivotally connected to the optical member holder and the frame, wherein when the optical member holder rotates relative to the frame, the first hinge rotates relative to the optical member holder or the frame via the first bearing member.

14. The optical system as claimed in claim 13, wherein the reflecting unit further comprises a housing and a second driving module, and the second driving module drives the frame to rotate relative to the housing.

15. The optical system as claimed in claim 13, wherein the reflecting unit further comprises a first steady member for providing a stabilizing force to maintain the optical member holder in an original position relative to the frame.

16. The optical system as claimed in claim 1, wherein the first optical module comprises a first lens unit comprising a first lens group for focusing an external light so that the external light travels in a desired direction.

17. The optical system as claimed in claim 1, wherein the third optical module comprises a second lens unit comprising a second lens group for focusing an external light so that the external light travels in a desired direction.

18. An optical system, comprising:
a first optical module comprising a first light-entering hole;
a second optical module comprising a second light-entering hole;
a third optical module comprising a third light-entering hole;
a reflecting unit comprising a first optical member for changing a moving direction of a first external light to a first direction; and
a second optical member for changing a moving direction of a second external light to a second direction,
wherein the second light-entering hole is close to the first light-entering hole and the third light-entering hole, and a focal length of the second optical module is different from a focal length of the first optical module and a focal length of the third optical module,
wherein the first external light enters the first optical module along the first direction, and the second external light enters the third optical module along the second direction,
wherein the reflecting unit further comprises a correction driving module for driving the first optical member and the second optical member to move,
wherein the reflecting unit further comprises an inertia detecting module for measuring a gravity state or an acceleration state of the optical system.

19. An optical system, comprising:
a first optical module comprising a first light-entering hole;
a second optical module comprising a second light-entering hole;
a third optical module comprising a third light-entering hole; and
a reflecting unit commonly used by the first optical module and the third optical module,
wherein the second light-entering hole is close to the first light-entering hole and the third light-entering hole, and a focal length of the second optical module is different from a focal length of the first optical module and a focal length of the third optical module,
wherein the reflecting unit comprises:
an optical member holder;
an optical member disposed on the optical member holder;

a frame;

a first bearing member disposed on the frame;

a first hinge pivotally connected to the optical member holder and the frame; and a first driving module driving the optical member holder to rotate relative to the frame, wherein when the optical member holder rotates relative to the frame, the first hinge rotates relative to the optical member holder or the frame via the first bearing member.

20. The optical system as claimed in claim 19, wherein the reflecting unit further comprises a housing and a second driving module driving the frame to rotate relative to the housing.

* * * * *